US012460702B1

(12) United States Patent
Tay

(10) Patent No.: US 12,460,702 B1
(45) Date of Patent: Nov. 4, 2025

(54) FLEXIBLE RAMP FOR RAISING A LEVELING EXTENSION

(71) Applicant: Armin Sebastian Tay, Waco, TX (US)

(72) Inventor: Armin Sebastian Tay, Waco, TX (US)

( * ) Notice: Subject to any disclaimer, the term of this patent is extended or adjusted under 35 U.S.C. 154(b) by 0 days.

(21) Appl. No.: 18/292,898

(22) PCT Filed: Aug. 29, 2022

(86) PCT No.: PCT/US2022/041797
§ 371 (c)(1),
(2) Date: Jan. 27, 2024

(87) PCT Pub. No.: WO2023/034165
PCT Pub. Date: Mar. 9, 2023

(51) Int. Cl.
*F16H 9/08* (2006.01)
*F16H 61/662* (2006.01)

(52) U.S. Cl.
CPC ............. *F16H 9/08* (2013.01); *F16H 61/662* (2013.01); *F16H 2061/66295* (2013.01)

(58) Field of Classification Search
CPC . F16H 9/08; F16H 2061/66295; F16H 61/662
USPC ............................................................ 474/53
See application file for complete search history.

(56) References Cited

U.S. PATENT DOCUMENTS 223,119 A * 12/1879 Detrick ..................... F16H 9/08 474/83
258,784 A * 5/1882 Mallon ..................... F16H 9/08 474/83
311,402 A * 1/1885 Withington ............... F16H 9/08 474/83
316,136 A * 4/1885 Foss .......................... F16H 9/08 474/83
514,693 A * 2/1894 Ashton et al. ............ F16H 9/08 474/84
594,622 A * 11/1897 Honinger .................. F16H 9/08 474/84
692,219 A * 1/1902 Temple ..................... F16H 9/10 474/54
703,359 A * 6/1902 White ....................... F16H 9/08 474/85

(Continued)

FOREIGN PATENT DOCUMENTS

EP 1311777 B1 10/2010
EP 2764279 B1 1/2018
WO WO2019212978 A1 11/2019

*Primary Examiner* — Henry Y Liu

(57) ABSTRACT

A Flexible Ramp for a Cone Assembly that uses a Torque Transmitting Member; said Cone Assembly uses a Transmission Belt that has its teeth shaped below its belt. Said Flexible Ramp can ideally raise a Leveling Extension of said Torque Transmitting Member or a Non-Torque Transmitting Member from a base surface of a Cone of said Cone Assembly to a raised surface of said Cone, for all pitch diameters of said Cone Assembly. When said Leveling Extension is positioned on a raised surface, it can support the teeth of said Transmission Belt; even-though the teeth of said Torque Transmitting Member have tooth bases, and said Non-Torque Transmitting Member has a base surface for the teeth of said Transmission Belt; since the thickness of said tooth bases and said base surface can be compensated by the height of the raised surface on which said Leveling Extension is positioned.

4 Claims, 72 Drawing Sheets

(56) References Cited

U.S. PATENT DOCUMENTS

| | | | | | |
|---|---|---|---|---|---|
| 704,203 | A * | 7/1902 | Moorhouse | F16H 9/08 | 474/85 |
| 708,439 | A * | 9/1902 | White | F16H 9/08 | 474/83 |
| 757,751 | A * | 4/1904 | Kessler | F16H 9/08 | 74/484 R |
| 759,139 | A * | 5/1904 | Temple | F16H 9/10 | 285/902 |
| 759,872 | A * | 5/1904 | Evans et al. | F16H 9/08 | 474/89 |
| 781,978 | A * | 2/1905 | White | F16H 9/08 | 474/83 |
| 792,220 | A * | 6/1905 | Johnston | F16H 55/54 | 474/54 |
| 837,651 | A * | 12/1906 | Wandless | F16H 9/10 | 474/54 |
| 847,695 | A * | 3/1907 | Richter | F16H 9/08 | 474/83 |
| 898,745 | A * | 9/1908 | Johnson | F16H 9/08 | 474/139 |
| 950,010 | A * | 2/1910 | Slonecker | F16H 9/08 | 474/83 |
| 1,063,410 | A * | 6/1913 | Bixby | F16H 9/08 | 474/83 |
| 1,075,037 | A * | 10/1913 | Jackson | F16H 9/08 | 474/83 |
| 1,091,338 | A * | 3/1914 | Houpt | F16H 9/08 | 474/1 |
| 1,160,414 | A * | 11/1915 | Kelsey | F16H 9/10 | 474/55 |
| 1,256,418 | A * | 2/1918 | Yocom | F16H 9/08 | 474/83 |
| 1,379,504 | A * | 5/1921 | Young | F16H 9/10 | 474/54 |
| 2,344,341 | A * | 3/1944 | Coen | F16H 9/08 | 474/54 |
| 2,638,008 | A * | 5/1953 | Guibert | G01F 15/02 | 474/83 |
| 2,705,892 | A * | 4/1955 | Yeager | F16H 9/08 | 474/70 |
| 2,801,547 | A * | 8/1957 | Guibert | F16G 1/28 | 474/83 |
| 2,864,263 | A * | 12/1958 | Rawson | F16G 1/22 | 474/248 |
| 2,898,772 | A * | 8/1959 | Campbell | F16H 9/08 | 474/146 |
| 2,941,409 | A * | 6/1960 | Witt | F16H 9/08 | 474/83 |
| 3,613,468 | A * | 10/1971 | Rand | F16H 9/04 | 474/50 |
| 3,894,439 | A * | 7/1975 | Borello | F16H 9/08 | 474/131 |
| 3,906,809 | A * | 9/1975 | Erickson | F16H 9/24 | 474/83 |
| 4,875,389 | A * | 10/1989 | Fragnito | F16H 9/08 | 474/53 |
| 5,226,854 | A * | 7/1993 | Hauser | F16H 9/08 | 474/83 |
| 6,656,070 | B2 * | 12/2003 | Tay | F16H 9/10 | 474/83 |
| 7,713,153 | B2 * | 5/2010 | Naude | F16H 9/24 | 474/49 |
| 7,722,490 | B2 * | 5/2010 | Tay | F16H 9/08 | 474/83 |
| 7,803,077 | B1 * | 9/2010 | Spaude | F16H 9/08 | 474/83 |
| 8,628,439 | B2 * | 1/2014 | Tay | F16H 9/00 | 474/83 |
| 9,651,123 | B2 * | 5/2017 | Tay | F16H 9/08 | |
| 9,958,064 | B2 * | 5/2018 | Tay | F16H 63/065 | |
| 9,964,209 | B2 * | 5/2018 | Tay | F16H 61/66259 | |
| 2002/0091026 | A1 * | 7/2002 | Tay | F16H 9/10 | 474/83 |
| 2003/0050139 | A1 * | 3/2003 | Anderson | F16H 9/08 | 474/83 |
| 2004/0121874 | A1 * | 6/2004 | Brass | F16H 15/42 | 475/214 |
| 2005/0202912 | A1 * | 9/2005 | Tay | F16H 63/062 | 474/83 |
| 2006/0252589 | A1 * | 11/2006 | Tay | F16H 63/067 | 474/49 |
| 2008/0058137 | A1 * | 3/2008 | Tay | F16H 55/56 | 474/8 |
| 2008/0058138 | A1 * | 3/2008 | Tay | F16H 9/00 | 474/83 |
| 2009/0069132 | A1 * | 3/2009 | Tay | F16H 9/08 | 474/83 |
| 2009/0214357 | A1 * | 8/2009 | Galley | F16H 9/08 | 417/362 |
| 2010/0062884 | A1 * | 3/2010 | Tay | F16H 63/067 | 474/25 |
| 2013/0023366 | A1 * | 1/2013 | Tay | F16H 9/08 | 474/83 |
| 2013/0130854 | A1 * | 5/2013 | Tay | F16H 9/08 | 474/83 |
| 2013/0310205 | A1 * | 11/2013 | Tay | F16H 9/08 | 474/83 |
| 2014/0094332 | A1 * | 4/2014 | Tay | F16H 61/0021 | 474/28 |
| 2014/0141909 | A1 * | 5/2014 | Tay | F16H 63/065 | 474/28 |
| 2014/0213398 | A1 * | 7/2014 | Tay | F16H 9/08 | 474/83 |
| 2014/0235385 | A1 * | 8/2014 | Tay | F16H 9/16 | 474/101 |
| 2014/0235389 | A1 * | 8/2014 | Tay | F16H 7/12 | 474/137 |
| 2015/0126316 | A1 * | 5/2015 | Tay | F16H 9/08 | 474/162 |
| 2015/0135895 | A1 * | 5/2015 | Tay | F16H 63/38 | 74/817 |
| 2015/0233450 | A1 * | 8/2015 | Tay | F16H 7/12 | 474/113 |
| 2016/0123437 | A1 * | 5/2016 | Tay | F16H 9/08 | 474/69 |
| 2016/0123463 | A1 * | 5/2016 | Tay | F16H 9/08 | 477/44 |
| 2016/0178035 | A1 * | 6/2016 | Tay | F16H 9/08 | 474/148 |
| 2016/0334014 | A1 * | 11/2016 | Tay | F16H 61/16 | |
| 2018/0335107 | A1 * | 11/2018 | Tay | F16H 9/24 | |
| 2020/0182335 | A1 * | 6/2020 | Tay | F16H 9/08 | |
| 2021/0277982 | A1 * | 9/2021 | Tay | F16G 5/18 | |
| 2022/0065336 | A1 * | 3/2022 | Tay | F16H 9/08 | |
| 2022/0170535 | A1 * | 6/2022 | Tay | F16H 9/04 | |

* cited by examiner 10
9A
11
10-M1-S1
9-M1
9-M2
10-M1
9B-S1
10-M1-S2
9B
9C
10-M1-S3
10-M1-S4
10-M2
10-M2-S1
46
47
48
9C-S3
10-M1-S5

91B
91B-S6
91B-S7
91B-S7

91B
91B-S4
91B-S6
91B-S7
91B-S4
91B-S5
91B-S7

91B
91B-S8
91B-S1
91B-S5
91B-S7
91B-S4
91B-S3
229
91B-S8
91B-S2
91B-S6
91B-S4
229

91C 91C
91C-S1

91C
91C-S1

91B
91B-S3
112
91B-S5
91B-S7
91B-S6
91B-S7
112-A2

91E
91E-S4
94

91E
94
86C-S2
95
96
84A

95-S2
95-S1

95

95

91E

91E 91E
91E-S6
91E-S7
91E-S2
91E-S3
91E-S4
91E-S5
91E-S1
91E-S6

94

94-S2
94-S3
94
94-S1

94

115A
115A-M2
115B-M1
118
117
119

115A-M2
115A-M1
118
117
119

115A-M2
115A-M1

91D
115A
97-M2
118
80-S1
117

115A-M2-S3
121

115A-M2-S3
115A-M2-S1

115A-M2
115A-M2-S2
115A-M2-S3
121
115A-M2-S1

115A-M1
115A-M1-S3
120
115A-M1-S1

115A-M1
115A-M1-S2
115A-M1-S3
115A-M1-S1
120

FLEXIBLE RAMP FOR RAISING A LEVELING EXTENSION

CROSS-REFERENCE TO RELATED APPLICATIONS

This invention is entitled to the benefits of:

U.S. patent application Ser. No. 17/465,807 filed on 2 Sep. 2021

Provisional Patent Application (PPA) Ser. No. 63/307,135 filed on 6 Feb. 2022

Provisional Patent Application (PPA) Ser. No. 63/320,778 filed on 17 Mar. 2022

Provisional Patent Application (PPA) Ser. No. 63/394,926 filed on 3 Aug. 2022

BACKGROUND

Field of Invention

This invention relates to torque/speed transmissions, specifically to a Flexible Ramp that can be used to raise a Leveling Extension of a Torque Transmitting Member or a Non-Torque Transmitting Member from a base surface of a Cone of a Cone Assembly to a raised surface of that Cone, for all pitch diameters of that Cone; so as to allow the teeth of said Torque Transmitting Member to have tooth bases, and so as to allow said Non-Torque Transmitting Member to have a base surface for the teeth of a Transmission Belt. Said Cone Assembly, of which a "Cone with One Torque Transmitting Member" is an example, is for the construction of Continuously Variable Transmissions (CVT's).

Description of Prior Art

A "Cone with One Torque Transmitting Member" is basically a Cone that has a Torque Transmitting Member that is rotatably fixed relative to the surface of its Cone, but can slide axially relative to the surface of its Cone. Sliding the Torque Transmitting Member axially relative to the surface of its Cone, changes the pitch-diameter of its Cone.

The Torque Transmitting Member is used for torque transmission and can be made toothed. Preferably (although not absolutely necessary), a "Cone with One Torque Transmitting Member" also has a Non-Torque Transmitting Member, which is primarily used to maintain the alignment of the Transmission Belt of its Cone and balance-out the centrifugal forces of the Torque Transmitting Member.

A CVT that can be constructed out of two "Cone with One Torque Transmitting Member"; and a "Cone with One Torque Transmitting Member" that uses a Torque Transmitting Member that has a Leveling Extension and a Non-Torque Transmitting Member that has a Leveling Extension are described in the prior art.

An example of a CVT that can be constructed out of two "Cone with One Torque Transmitting Member", which are labeled as Driving Cone 1A and Driven Cone 1B, is shown in FIGS. 1 to 4. This CVT comprises of a Driving Cone 1A mounted on one spline that is coupled by a Transmission Belt 2 to a Driven Cone 1B mounted on another spline. A Tensioning Pulley 3, which is positioned on the slack side of Transmission Belt 2, is used to maintain the proper tension in Transmission Belt 2 for all operating conditions of the CVT. And a Support Pulley 4 is used to ensure that for each Cone at least a portion of its torque transmitting member is engaged with Transmission Belt 2 for torque transmission at all times. Tensioning Pulley 3 and Support Pulley 4 are mounted so that they can freely move sideways in the horizontal direction, and Tensioning Pulley 3 is pushed upwards in the vertical direction.

Driving Cone 1A and Driven Cone 1B are each a "Cone with One Torque Transmitting Member". Driving Cone 1A has a Torque Transmitting Member 1A-M1-S1, a Torque Transmitting Member Leveling Extension 1A-M1-S2, a Non-Torque Transmitting Member 1A-M2-S1, and a Non-Torque Transmitting Member Leveling Extension 1A-M2-S2. Driven Cone 1B has a Torque Transmitting Member 1B-M1-S1, a Torque Transmitting Member Leveling Extension 1B-M1-S2, a Non-Torque Transmitting Member 1B-M2-S1, and a Non-Torque Transmitting Member Leveling Extension 1B-M2-S2. Torque Transmitting Members 1A-M1-S1 and 1B-M1-S1 have teeth so that toothed torque transmission can be used.

The Torque Transmitting Members (Torque Transmitting Member 1A-M1-S1 and Torque Transmitting Member 1B-M1-S1) and the Non-Torque Transmitting Members (Non-Torque Transmitting Member 1A-M2-S1 and Non-Torque Transmitting Member 1B-M2-S1), each have a Leveling Extension (Torque Transmitting Member Leveling Extension 1A-M1-S2, Non-Torque Transmitting Member Leveling Extension 1A-M2-S2, Torque Transmitting Member Leveling Extension 1B-M1-S2, or Non-Torque Transmitting Member Leveling Extension 1B-M2-S2) attached to them, and an Empty Middle Section.

The Leveling Extension of a Torque Transmitting Member is inserted into the Empty Middle Section of its Non-Torque Transmitting Member, from which it can move in-and-out as required as the pitch-diameter of its Cone is changed; so that it can cover the surface of its Cone located between the rear-end of its Torque Transmitting Member and the front-end of its Non-Torque Transmitting Member for all pitch diameters of its Cone.

And the Leveling Extension of a Non-Torque Transmitting Member is inserted into the Empty Middle Section of its Torque Transmitting Member, from which it can move in-and-out as required as the pitch-diameter of its Cone is changed; so that it can cover the surface of its Cone located between the rear-end of its Non-Torque Transmitting Member and the front-end of its Torque Transmitting Member for all pitch diameters of its Cone.

Each Leveling Extension has a bottom surface that is inclined so that it can rest on the surface of its Cone, and a top surface that is level so that it can provide a level resting surface for the teeth of Transmission Belt 2 on the surfaces of its Cone that are not covered by a Torque Transmitting Member or a Non-Torque Transmitting Member.

The teeth of Torque Transmitting Member 1A-M1-S1 and Torque Transmitting Member 1B-M1-S1 cannot have tooth bases; and Non-Torque Transmitting Member 1A-M2-S1 and Non-Torque Transmitting Member 1B-M2-S1 cannot have a base surface for the teeth of Transmission Belt 2; since the resting surfaces for the teeth of Transmission Belt 2 are provided by the Leveling Extensions. If Torque Transmitting Member 1A-M1-S1 and/or Torque Transmitting Member 1B-M1-S1 had tooth bases, then these tooth bases would be positioned on top of the resting surfaces for the teeth of Transmission Belt 2 that are provided by the Leveling Extensions; so that the height of the resting surfaces for the teeth of Transmission Belt 2 would be uneven. And if Non-Torque Transmitting Member 1A-M2-S1 and/or Non-Torque Transmitting Member 1B-M2-S1 had a base surface for the teeth of Transmission Belt 2, then these base surfaces would be positioned on top of the resting surfaces for the teeth of Transmission Belt 2 that are provided by the Leveling Extensions; so that the height of the resting surfaces for the teeth of Transmission Belt 2 would be uneven.

LISTING OF PRIOR ARTS

U.S. Pat. No. 7,713,153; Issue Date: 11 May 2010; Patentee: Naude.
U.S. Pat. No. 6,656,070; Issue Date: 2 Dec. 2003; Patentee: Tay.
U.S. Pat. No. 7,722,490; Issue Date: 25 May 2010; Patentee: Tay.
U.S. Pat. No. 8,628,439; Issue Date: 14 Jan. 2014; Patentee: Tay.
U.S. Pat. No. 9,651,123; Issue Date: 16 May 2017; Patentee: Tay.
U.S. Pat. No. 9,958,064; Issue Date: 1 May 2018; Patentee: Tay.
U.S. Pat. No. 9,964,209; Issue Date: 8 May 2018; Patentee: Tay.
European Patent EP2764279; Issue Date: 17 Jan. 2018; Patentee: Tay.
European Patent EP1311777; Issue Date: 6 Oct. 2010; Patentee: Tay.
U.S. patent application Ser. No. 15/965,948 (Pub. #US 2018/0335107); Filing Date: 29 Apr. 2018; Applicant: Tay.
U.S. patent application Ser. No. 16/618,789; Filing Date: 2 Dec. 2019; Applicant: Tay.
U.S. patent application Ser. No. 16/706,769 (Pub. #US 2020/0182335); Filing Date: 8 Dec. 2019; Applicant: Tay.
Int. App. PCT/US2019/029671 (pub. #: WO/2019/212978); Filing Date: 29 Apr. 2019; Applicant: Tay.

BRIEF SUMMARY OF THE INVENTION

A Flexible Ramp that can be used to ideally raise a Leveling Extension of a Torque Transmitting Member or a Non-Torque Transmitting Member from a base surface of a Cone of a Cone Assembly to a raised surface of that Cone for all pitch diameters of that Cone; so as to allow the teeth of said Torque Transmitting Member to have tooth bases, and so as to allow said Non-Torque Transmitting Member to have a base surface for the teeth of a Transmission Belt.

Said Flexible Ramp comprises of a Ramp and a Side Wall that is connected to said Ramp such that said Flexible Ramp bends as one unit. Said Side Wall is shaped such that the neutral-axis of said Flexible Ramp coincides or almost coincides with the neutral-axis of the Leveling Extension it raises through-out the entire length of said Flexible Ramp. Said Side Wall has a cable that is used to help control the neutral-axis of said Flexible Ramp.

Allowing the teeth of a Torque Transmitting Member to have tooth bases, will greatly increase the strength of those teeth. Since the tooth bases will link the separate tooth sides of those teeth so that they bend as a single unit. And allowing a Non-Torque Transmitting Member to have a base surface will significantly reduce the stress on its Transmission Belt, so that more torque can be transmitted. The innovation of this disclosure will increase the chances of a commercially viable non-friction dependent CVT; which has not been accomplished by the prior art.

BRIEF DESCRIPTION OF THE SEVERAL VIEWS OF THE DRAWING

FIG. 120 shows a side-view of Torque Transmitting Member 52.

FIG. 121 shows a side-view of Non-Torque Transmitting Member 53.

FIG. 122 shows a front-view of Cone Assembly 55.

FIG. 123 shows a side-view of Torque Transmitting Member 56.

FIG. 124 shows a side-view of Non-Torque Transmitting Member 57.

FIG. 125 shows a front-view of Cone Assembly 59.

FIG. 126 shows a side-view of Flanged Transmission Belt 60.

FIG. 127 shows a sectional-view of Flanged Transmission Belt 60.

FIG. 128 shows a rear-view of Reinforcement Plate 61.

FIG. 129 shows a side-view of Reinforcement Plate 61.

FIG. 130 shows a rear-view of Reinforcement Plate 62.

FIG. 131 shows a side-view of Leveling Extension 63.

Figure 132:
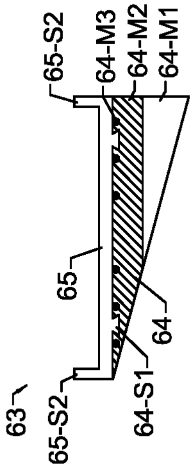

FIG. 132 shows a sectional-view of Leveling Extension 63.

Figure 133:
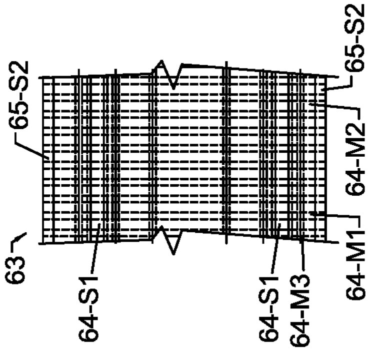

FIG. 133 shows a top-view of Leveling Extension 63.

Figure 134:
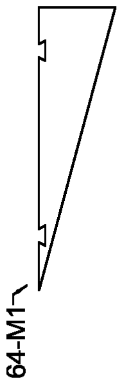

FIG. 134 shows a rear-view of a Supporting Plate 64-M1.

Figure 135:
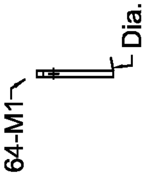

FIG. 135 shows a side-view of a Supporting Plate 64-M1.

Figure 136:
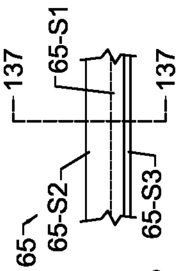

FIG. 136 shows a side-view of Transmission Belt Rest 65.

Figure 137:
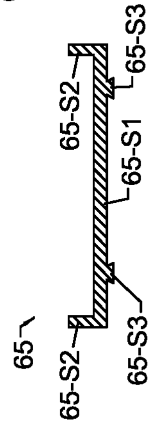

FIG. 137 shows a sectional-view of Transmission Belt Rest 65.

Figure 138:
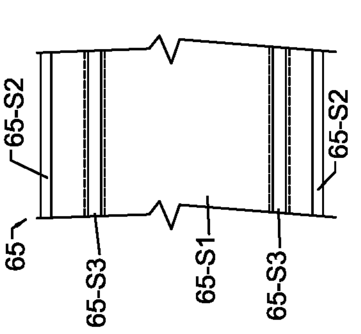

FIG. 138 shows a top-view of Transmission Belt Rest 65.

Figure 139:
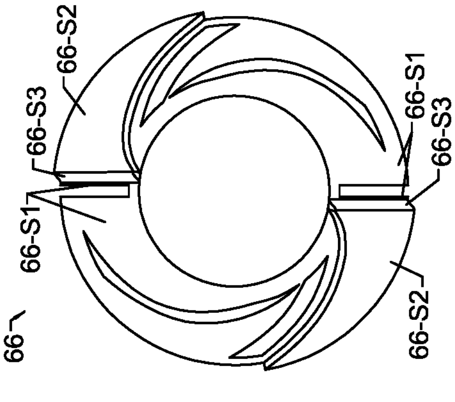

FIG. 139 shows a front-view of Cone 66.

Figure 140:
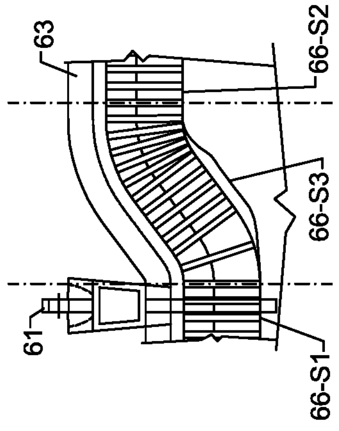

FIG. 140 shows a side-view of a section of a Leveling Extension 63 that is exiting its Leading End Torque Transmitting Member Reinforcement Plate (in FIG. 140 a Reinforcement Plate 61 is used as the Leading End Torque Transmitting Member Reinforcement Plate), and is guided by Ramp Surface 66-S3 from Base Surface 66-S1 to Raised Surface 66-S2.

Figure 141:
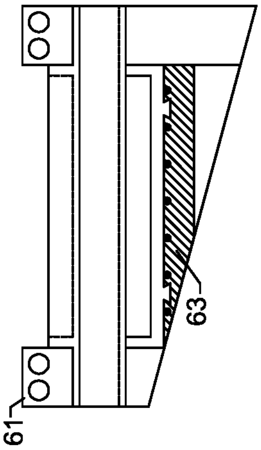

FIG. 141 shows a partial rear-view of FIG. 140.

Figure 142:
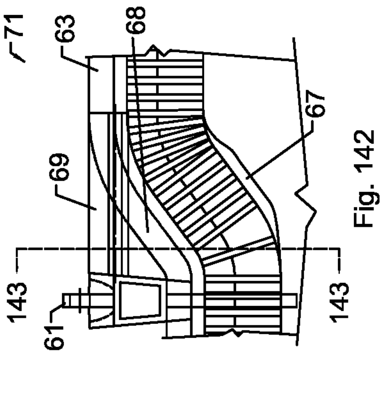

FIG. 142 shows a side-view of a section of a Leveling Extension 63 that is exiting its Leading End Torque Transmitting Member Reinforcement Plate (in FIG. 142 a Reinforcement Plate 61 is used as the Leading End Torque Transmitting Member Reinforcement Plate); and all other visible (not covered) parts of Leveling Extension Ramp Guide 71.

Figure 143:
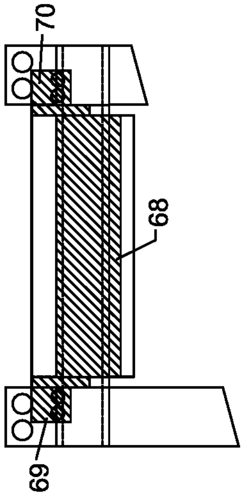

FIG. 143 shows a sectional-view of FIG. 142.

Figure 144:
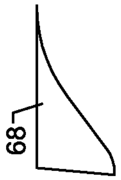

FIG. 144 shows a side-view of Ramp Tooth Resting Filler 68.

Figure 145:
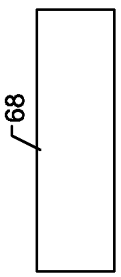

FIG. 145 shows a front-view of Ramp Tooth Resting Filler 68.

Figure 146:
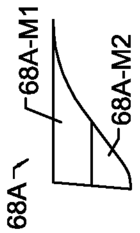

FIG. 146 shows a side-view of Ramp Tooth Resting Filler 68A.

Figure 147:
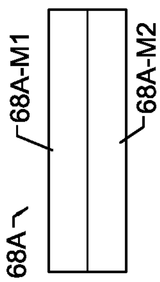

FIG. 147 shows a front-view of Ramp Tooth Resting Filler 68A.

Figure 148:

FIG. 148 shows a side-view of Ramp Tooth Resting Filler 68B.

Figure 149:
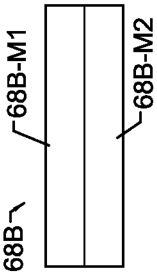

FIG. 149 shows a front-view of Ramp Tooth Resting Filler 68B.

Figure 150:
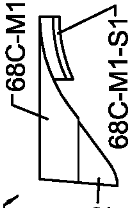

FIG. 150 shows a side-view of Ramp Tooth Resting Filler 68C.

Figure 151:
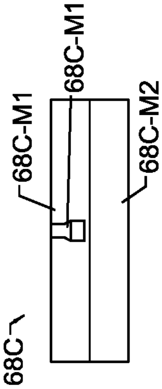

FIG. 151 shows a front-view of Ramp Tooth Resting Filler 68C.

Figure 152:
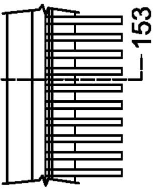

FIG. 152 shows a side-view of Leveling Extension 63A.

Figure 153:
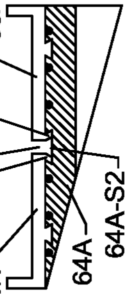

FIG. 153 shows a sectional-view of Leveling Extension 63A.

Figure 154:
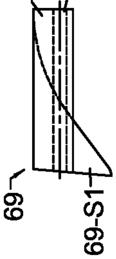

FIG. 154 shows a side-view of Left Flange Filler 69.

Figure 155:
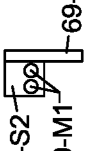

FIG. 155 shows a front-view of Left Flange Filler 69.

Figure 156:
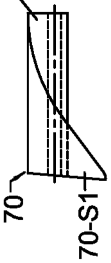

FIG. 156 shows a side-view of Right Flange Filler 70.

Figure 157:
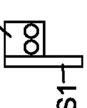

FIG. 157 shows a front-view of Right Flange Filler 70.

Figure 158:
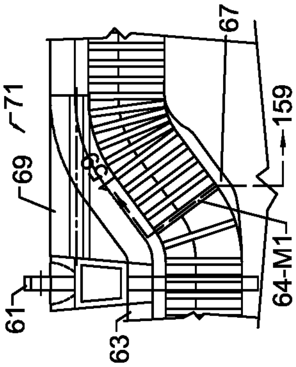

FIG. 158 shows a side-view of a section of a Leveling Extension 63 that is exiting its Leading End Torque Transmitting Member Reinforcement Plate (in FIG. 158 a Reinforcement Plate 61 is used as the Leading End Torque Transmitting Member Reinforcement Plate); also shown are Ramp Leveling Base 67 and Left Flange Filler 69.

Figure 159:
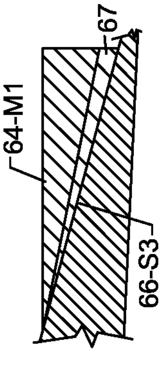

FIG. 159 shows a sectional-view of FIG. 158.

Figure 160:
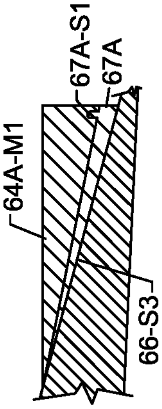

FIG. 160 shows the sectional-view of FIG. 159 for which Ramp Leveling Base 67 is replaced with Ramp Leveling Base 67A, and Supporting Plate 64-M1 is replaced with Supporting Plate 64A-M1.

Figure 161:
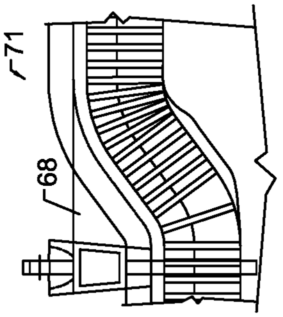

FIG. 161 shows a side-view of a section of a Leveling Extension 63 that is exiting its Leading End Torque Transmitting Member Reinforcement Plate (in FIG. 161 a Reinforcement Plate 61 is used as the Leading End Torque Transmitting Member Reinforcement Plate); also shown is Ramp Tooth Resting Filler 68.

Figure 162:
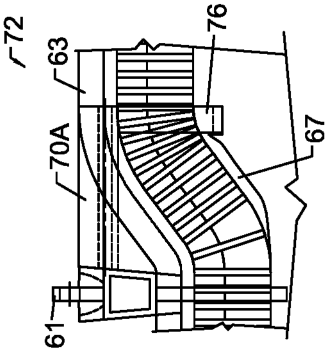

FIG. 162 shows a side-view of a section of a Leveling Extension 63 that is exiting its Leading End Torque Transmitting Member Reinforcement Plate (in FIG. 162 a Reinforcement Plate 61 is used as the Leading End Torque Transmitting Member Reinforcement Plate); and all other visible (not covered) parts of Leveling Extension Ramp Guide 72.

Figure 163:
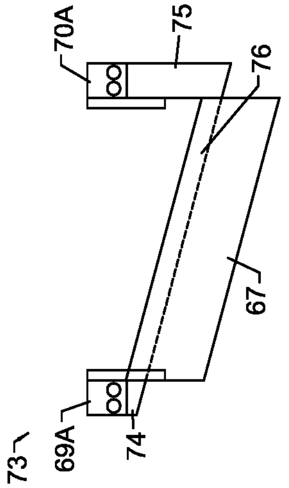

FIG. 163 shows a rear-view of Guiding Member 73.

Figure 164:
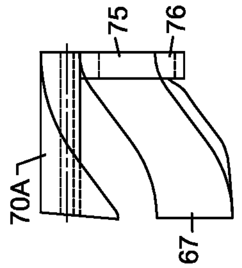

FIG. 164 shows a right-view of Guiding Member 73 when it is oriented as shown in FIG. 163.

Figure 165:
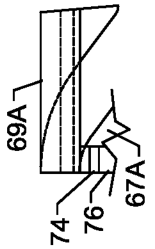

FIG. 165 shows a left-view of Guiding Member 73 when it is oriented as shown in FIG. 163.

Figure 166:
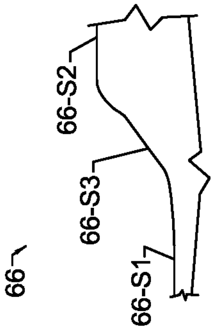

FIG. 166 shows a front-view of a section of a Cone 66, which has an infinite diameter (straight surface).

Figure 167:
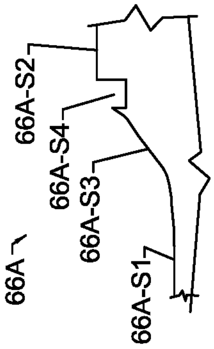

FIG. 167 shows a front-view of a section of a Cone 66A, which has an infinite diameter (straight surface).

Figure 168:
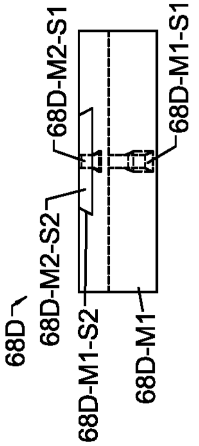

FIG. 168 shows a rear-view of Ramp Tooth Resting Filler 68D.

Figure 169:
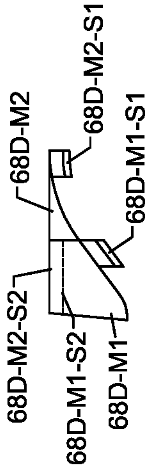

FIG. 169 shows a side-view of Ramp Tooth Resting Filler 68D.

Figure 170:
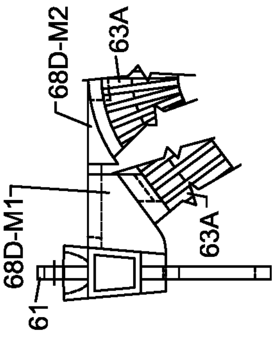

FIG. 170 shows a side-view of a Ramp Tooth Resting Filler 68D that is fixed to its Leading End Torque Transmitting Member Reinforcement Plate (in FIG. 170 a Reinforcement Plate 61 is used as the Leading End Torque Transmitting Member Reinforcement Plate), and held in place by a Leveling Extension 63A.

Figure 171:
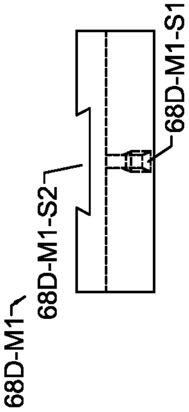

FIG. 171 shows a rear-view of Rear Member 68D-M1.

Figure 172:
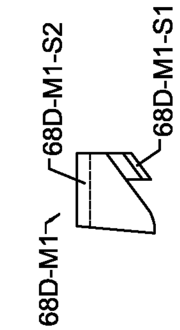

FIG. 172 shows a side-view of Rear Member 68D-M1.

Figure 173:
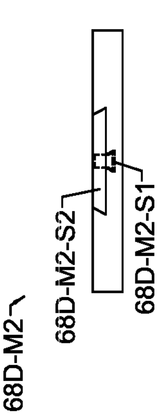

FIG. 173 shows a rear-view of Front Member 68D-M2.

Figure 174:
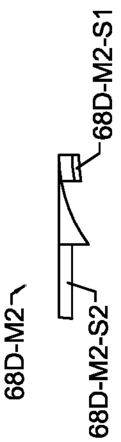

FIG. 174 shows a side-view of Front Member 68D-M2.

Figure 175:
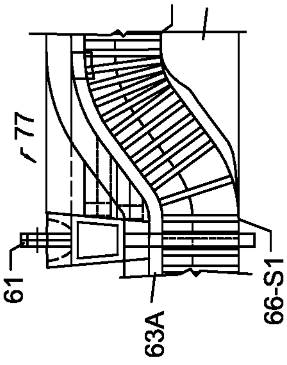

FIG. 175 shows a side-view of a section of a Leveling Extension 63A that is guided from a Base Surface 66-S1 of a Cone 66 to a Raised Surface 66-S2 of said Cone 66; and its Ramp Resting Filler 77, which is attached to its Leading End Torque Transmitting Member Reinforcement Plate (in FIG. 175 a Reinforcement Plate 61 is used as the Leading End Torque Transmitting Member Reinforcement Plate).

Figure 176:
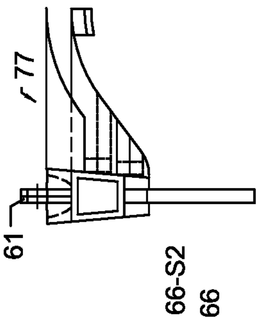

FIG. 176 shows a side-view of Ramp Resting Filler 77 and the Leading End Torque Transmitting Member Reinforcement Plate to which it is attached (in FIG. 176 a Reinforcement Plate 61 is used as the Leading End Torque Transmitting Member Reinforcement Plate)

Figure 177:
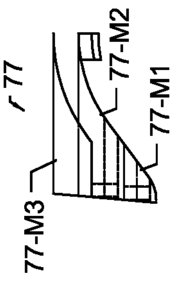

FIG. 177 shows a side-view of Ramp Resting Filler 77

Figure 178:
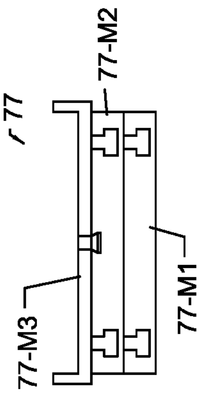

FIG. 178 shows a front-view of Ramp Resting Filler 77.

Figure 179:
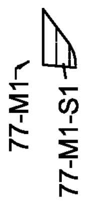

FIG. 179 shows a side-view of Base 77-M1.

Figure 180:
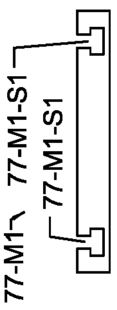

FIG. 180 shows a front-view of Base 77-M1.

Figure 181:
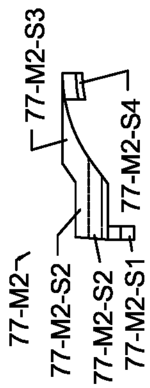

FIG. 181 shows a side-view of Tooth Rest 77-M2.

Figure 182:
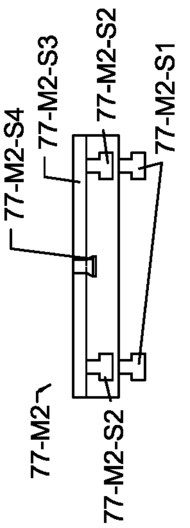

FIG. 182 shows a front-view of Tooth Rest 77-M2.

Figure 183:
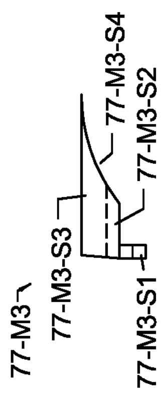

FIG. 183 shows a side-view of Flange Rest 77-M3.

Figure 184:
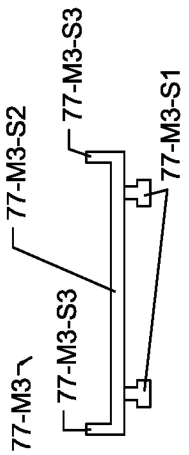

FIG. 184 shows a front-view of Flange Rest 77-M3.

Figure 185:
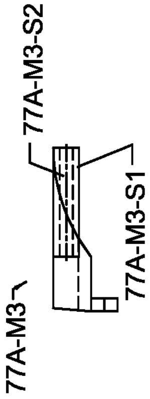

FIG. 185 shows a side-view of Flange Rest 77A-M3.

Figure 186:
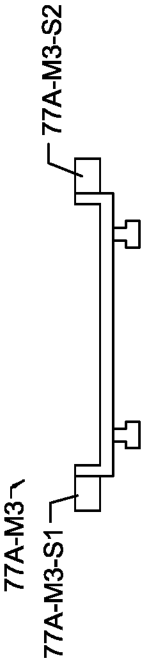

FIG. 186 shows a front-view of Flange Rest 77A-M3.

Figure 187:
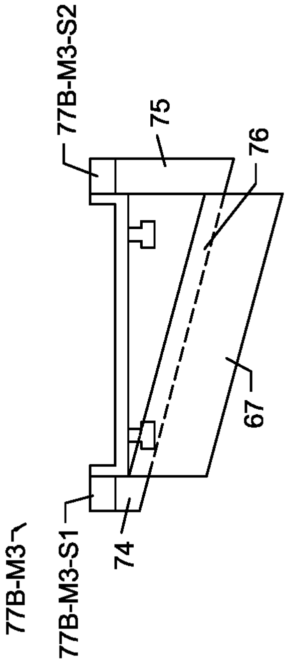

FIG. 187 shows a side-view of Flange Rest 77B-M3.

Figure 188:
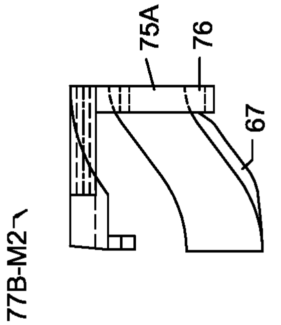

FIG. 188 shows a front-view of Flange Rest 77B-M3.

Figure 189:
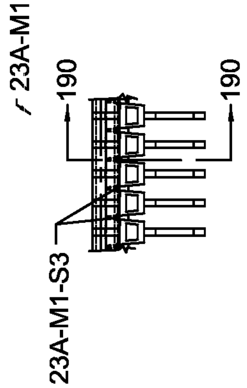

FIG. 189 shows a side-view of a section of a Non-Torque Transmitting Member Section 23A-M1.

Figure 190:
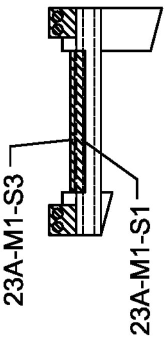

FIG. 190 shows a sectional-view of Non-Torque Transmitting Member Section 23A-M1 as cut per FIG. 189.

Figure 191:
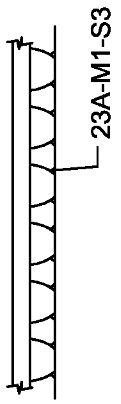

FIG. 191 show as side-view of a section of a Transmission Belt; and its Bumps 23A-M1-S3, which are properly positioned so as to hold the teeth of their Transmission Belt in their ideal circumferential-position.

Figure 192:
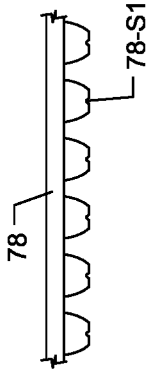

FIG. 192 show as side-view of a section of a Transmission Belt 78, which has Cuts 78-S1 for Bumps 23A-M1-S3.

Figure 193:
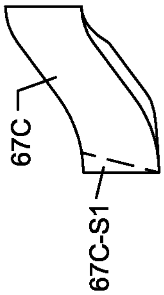

FIG. 193 shows a side-view of Ramp Leveling Base 67C.

Figure 194:
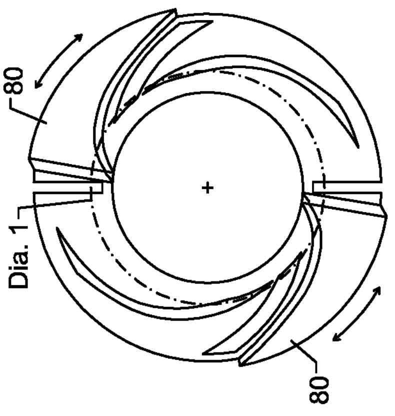

FIG. 194 shows a front-view of a Cone on which two oppositely positioned Raised Surface 80 are placed.

Figure 195:
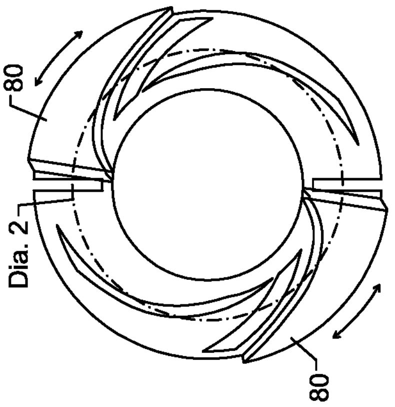

FIG. 195 shows another front-view of a Cone on which two oppositely positioned Raised Surface 80 are placed.

Figure 196:
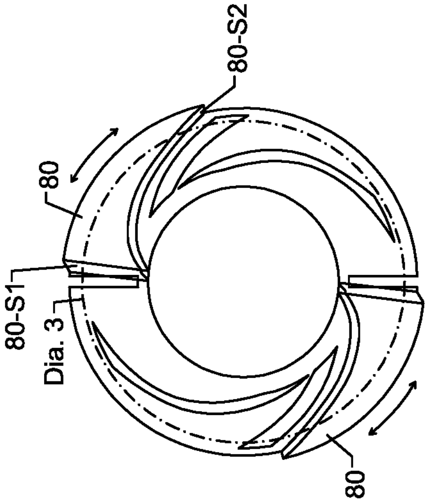

FIG. 196 also shows another front-view of a Cone on which two oppositely positioned Raised Surface 80 are placed.

Figure 197:
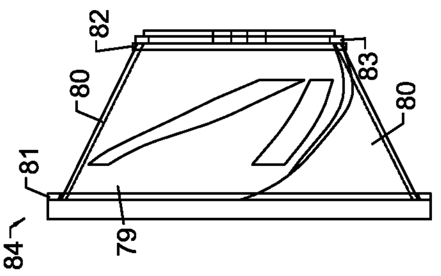

FIG. 197 shows a partial side-view of Cone Assembly 84. Partial, since some hidden lines are not shown.

Figure 198:
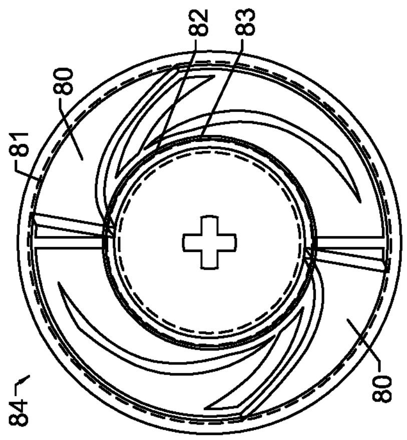

FIG. 198 shows a front-view of Cone Assembly 84.

Figure 199:
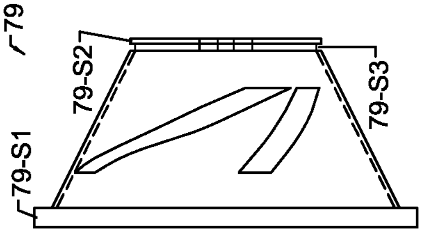

FIG. 199 shows a partial side-view of Cone 79. Partial, since some hidden lines are not shown.

Figure 200:
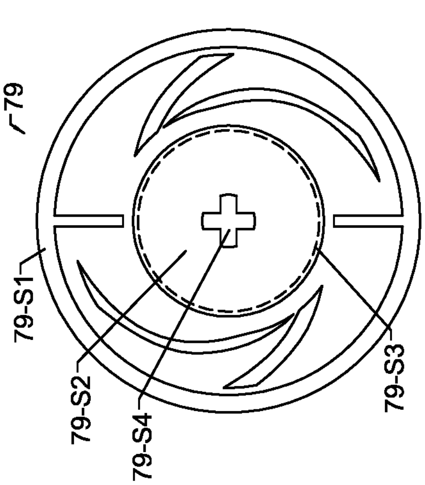

FIG. 200 shows a front-view of Cone 79.

Figure 201:
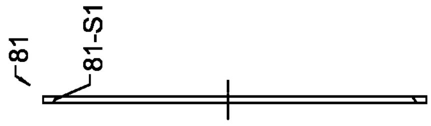

FIG. 201 shows a side-view of Rear Ring 81.

Figure 202:
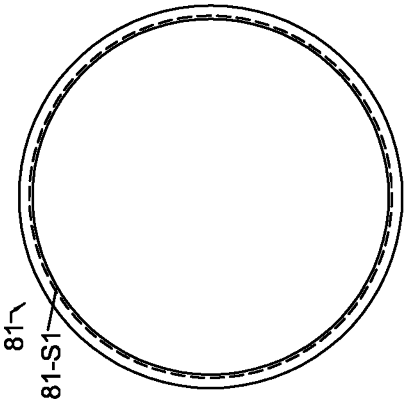

FIG. 202 shows a front-view of Rear Ring 81.

Figure 203:
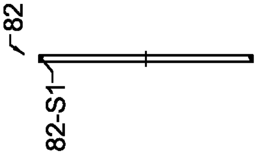

FIG. 203 shows a side-view of Front Ring 82.

Figure 204:
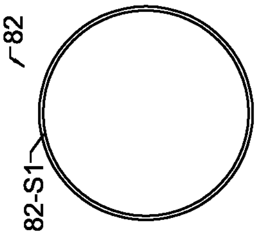

FIG. 204 shows a front-view of Front Ring 82.

Figure 205:
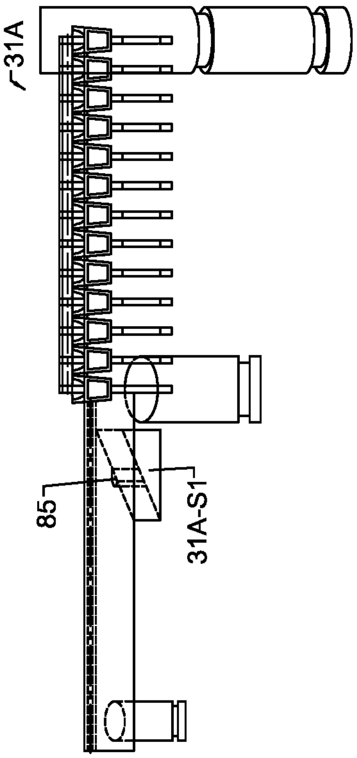

FIG. 205 shows a side-view of Torque Transmitting Member 31A, which has a Bump 85.

Figure 206:
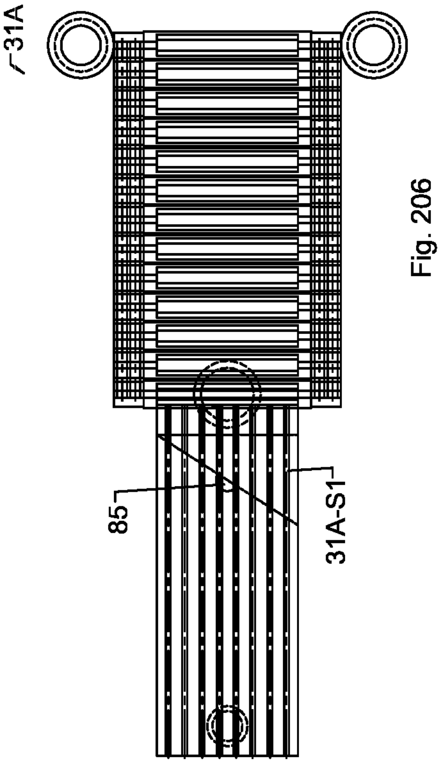

FIG. 206 shows a top-view of Torque Transmitting Member 31A, which has a Bump 85.

Figure 207:
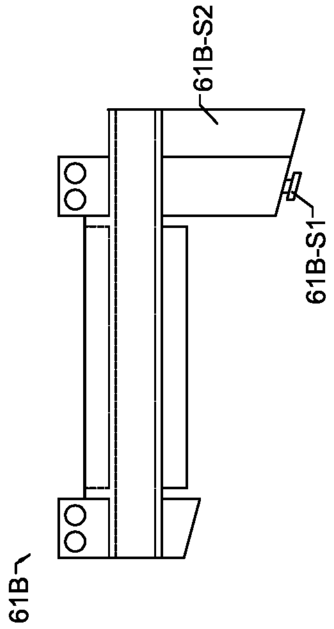

FIG. 207 shows a rear-view of a Reinforcement Plate 61B.

Figure 208:
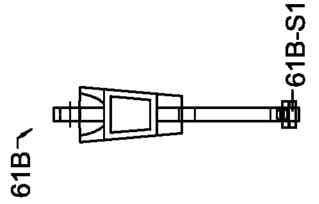

FIG. 208 shows a side-view of a Reinforcement Plate 61B.

Figure 209:
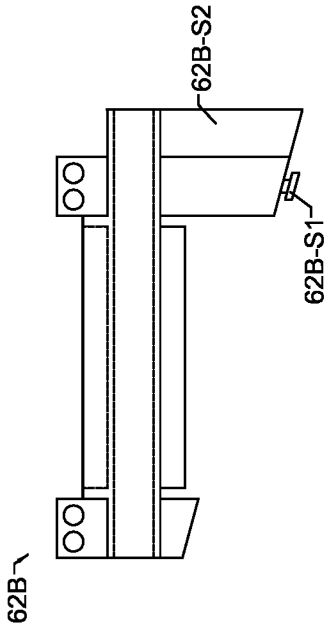

FIG. 209 shows a rear-view of a Reinforcement Plate 62B.

Figure 210:
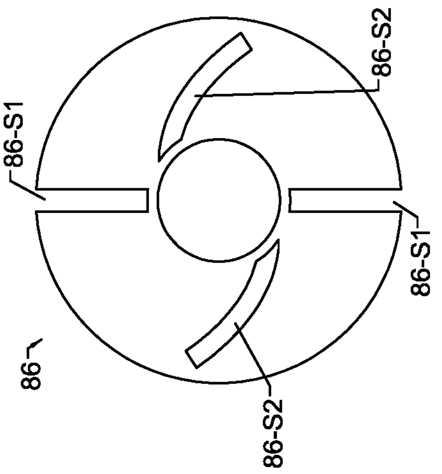

FIG. 210 shows a front-view of a Cone 86.

Figure 211:
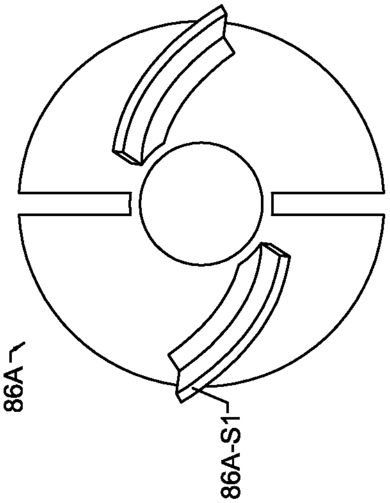

FIG. 211 shows a front-view of a Cone 86A.

Figure 212:
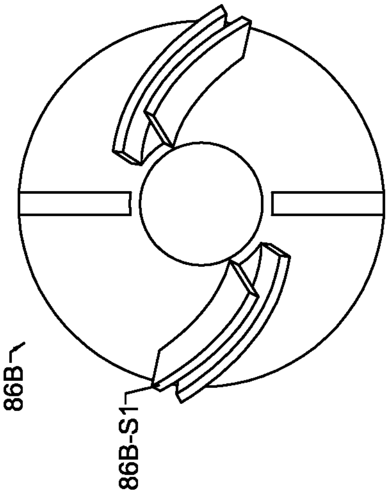

FIG. 212 shows a front-view of a Cone 86B.

Figure 213:
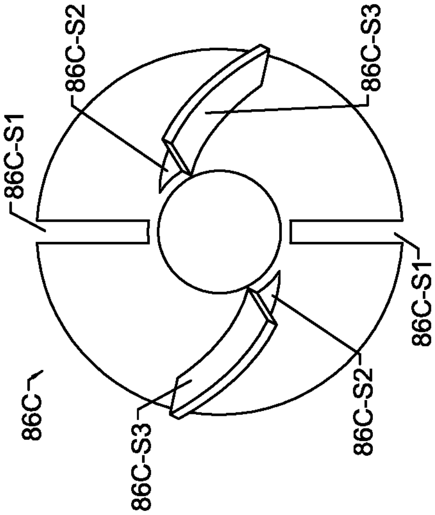

FIG. 213 shows a front-view of a Cone 86C.

Figure 214:
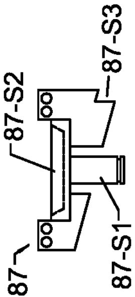

FIG. 214 shows a rear-view of a Trailing End Reinforcement Plate 87.

Figure 215:

FIG. 215 shows a side-view of a Trailing End Reinforcement Plate 87.

Figure 216:
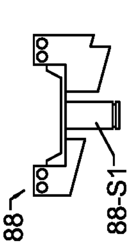

FIG. 216 shows a rear-view of a Trailing End Reinforcement Plate 88.

Figure 217:

FIG. 217 shows a side-view of a Trailing End Reinforcement Plate 88.

Figure 218:
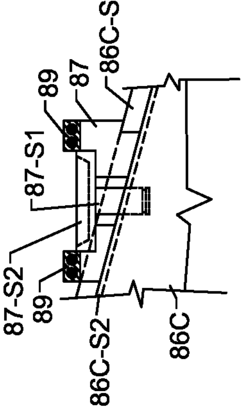

FIG. 218 shows a rear-view of a Trailing End Reinforcement Plate 87 that is mounted on a Cone 86C.

Figure 219:
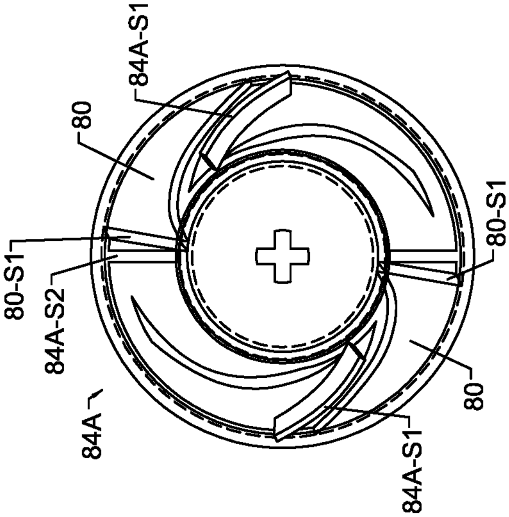

FIG. 219 shows a front-view of a Cone Assembly 84A.

Figure 220:
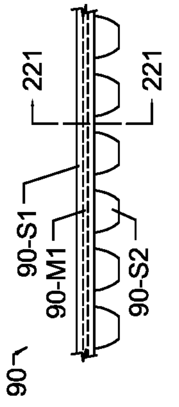

FIG. 220 shows a side-view of Transmission Belt 90.

Figure 221:
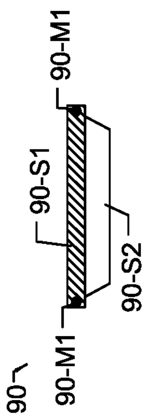

FIG. 221 shows a sectional-view of Transmission Belt 90.

Figure 222:
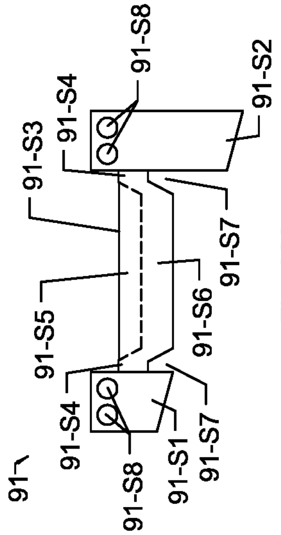

FIG. 222 shows a rear-view of a Reinforcement Plate 91.

Figure 223:
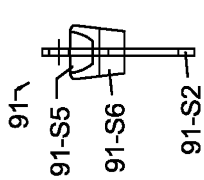

FIG. 223 shows a side-view of a Reinforcement Plate 91.

Figure 224:
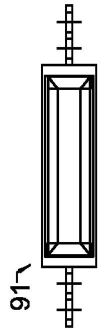

FIG. 224 shows a top-view of a Reinforcement Plate 91.

Figure 225:
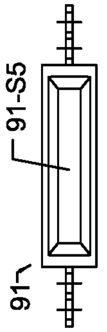

FIG. 225 shows a partial top-view of a Reinforcement Plate 91, for which some hidden-lines are not shown.

Figure 226:
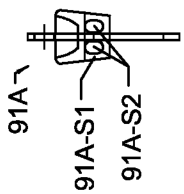

FIG. 226 shows a side-view of a Reinforcement Plate 91A.

Figures 227, 228, 229, 230, 231, 232, 233:
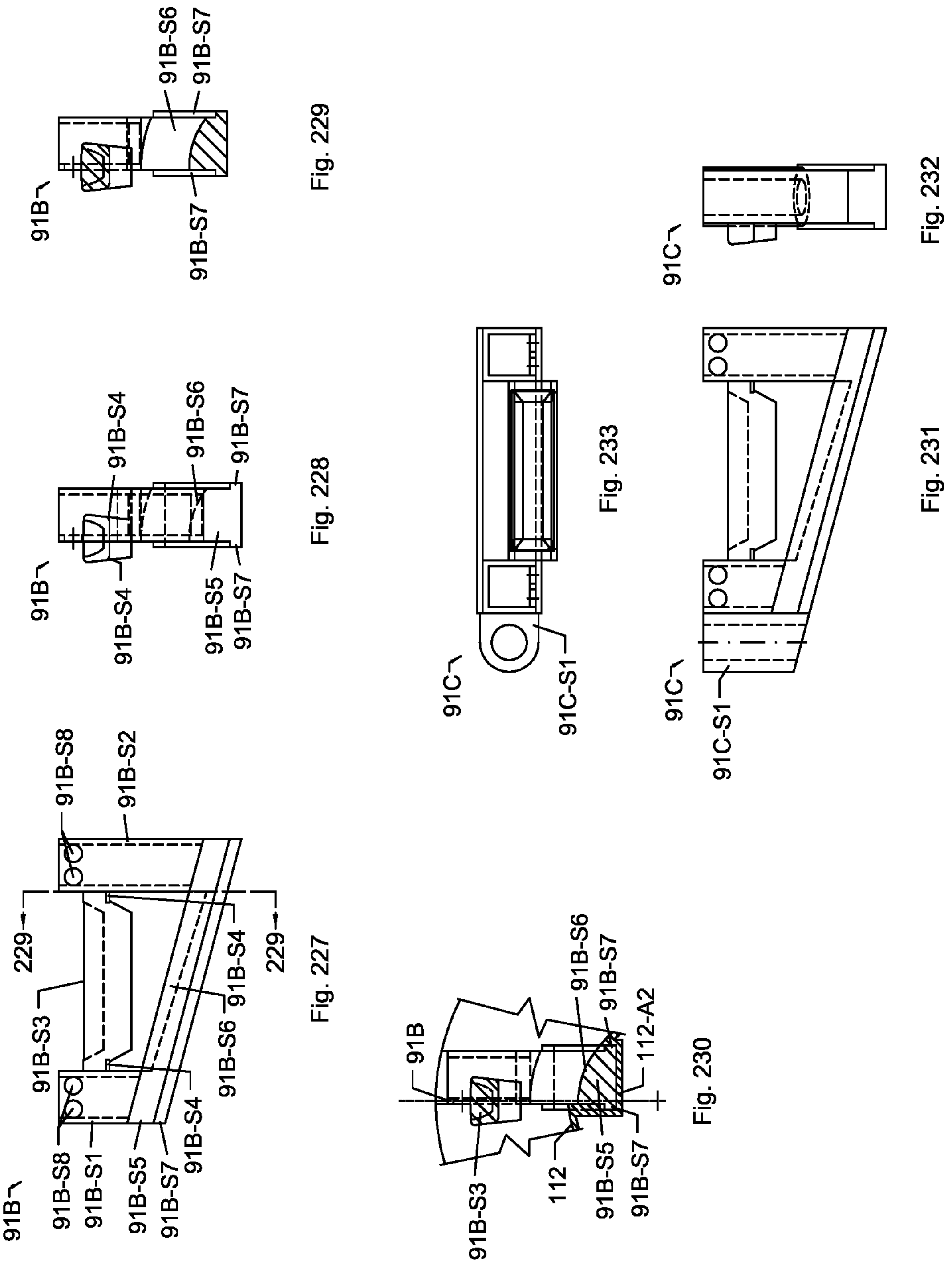

FIG. 227 shows a rear-view of Leading End Reinforcement Plate 91B.

FIG. 228 shows a side-view of Leading End Reinforcement Plate 91B.

FIG. 229 shows a sectional-view of Leading End Reinforcement Plate 91B.

FIG. 230, shows a sectional-view of Torque Transmitting Member Leading End Slot 112-A2 and Slider 91B-S5 that is inserted into it, as cut through a plane that is perpendicular to the axis of rotation of Cone 112.

FIG. 231 shows a rear-view of Leading End Reinforcement Plate 91C.

FIG. 232 shows a partial side-view of Leading End Reinforcement Plate 91C.

FIG. 233 shows a top-view of Leading End Reinforcement Plate 91C.

Figure 234:
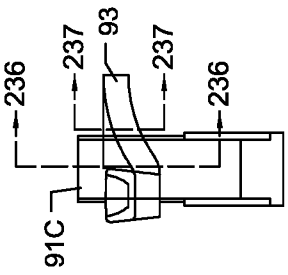

FIG. 234 shows a side-view of Leading End Reinforcement Plate 91C to which a Belt Resting Filler 93 is fixed. For this figure, some hidden-lines are not shown.

Figure 235:
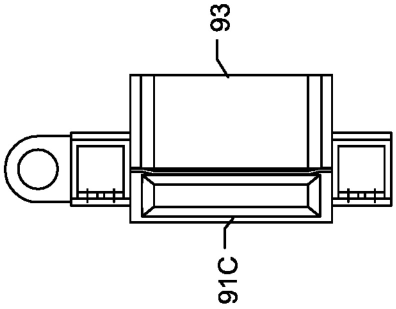

FIG. 235 shows a top-view of Leading End Reinforcement Plate 91C to which a Belt Resting Filler 93 is fixed.

Figure 236:
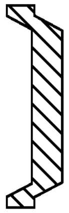

FIG. 236 shows a sectional-view of FIG. 234.

Figure 237:
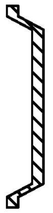

FIG. 237 shows another sectional-view of FIG. 234.

Figure 238:
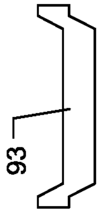

FIG. 238 shows a rear-view of Belt Resting Filler 93.

Figure 239:
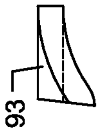

FIG. 239 shows a side-view of Belt Resting Filler 93.

Figure 240:
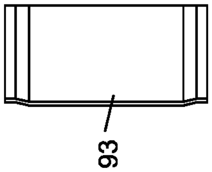

FIG. 240 shows a top-view of Belt Resting Filler 93.

Figure 241:
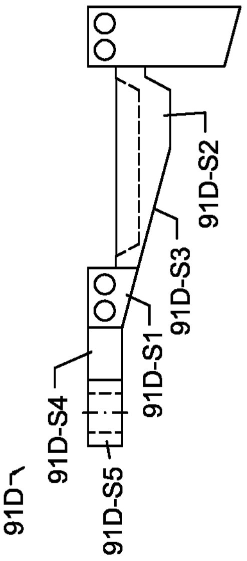

FIG. 241 shows a rear-view of Trailing Sleeve Reinforcement Plate 91D.

Figure 242:
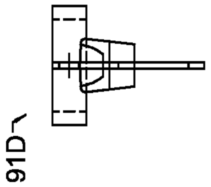

FIG. 242 shows a side-view of Trailing Sleeve Reinforcement Plate 91D.

Figure 243:
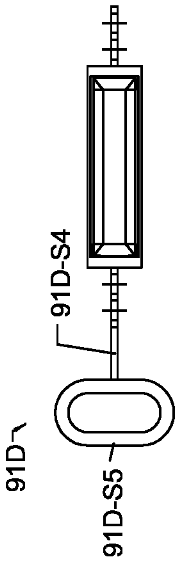

FIG. 243 shows a top-view of Trailing Sleeve Reinforcement Plate 91D.

Figures 244, 245, 246, 247, 248, 249, 250, 251, 252, 253, 254:
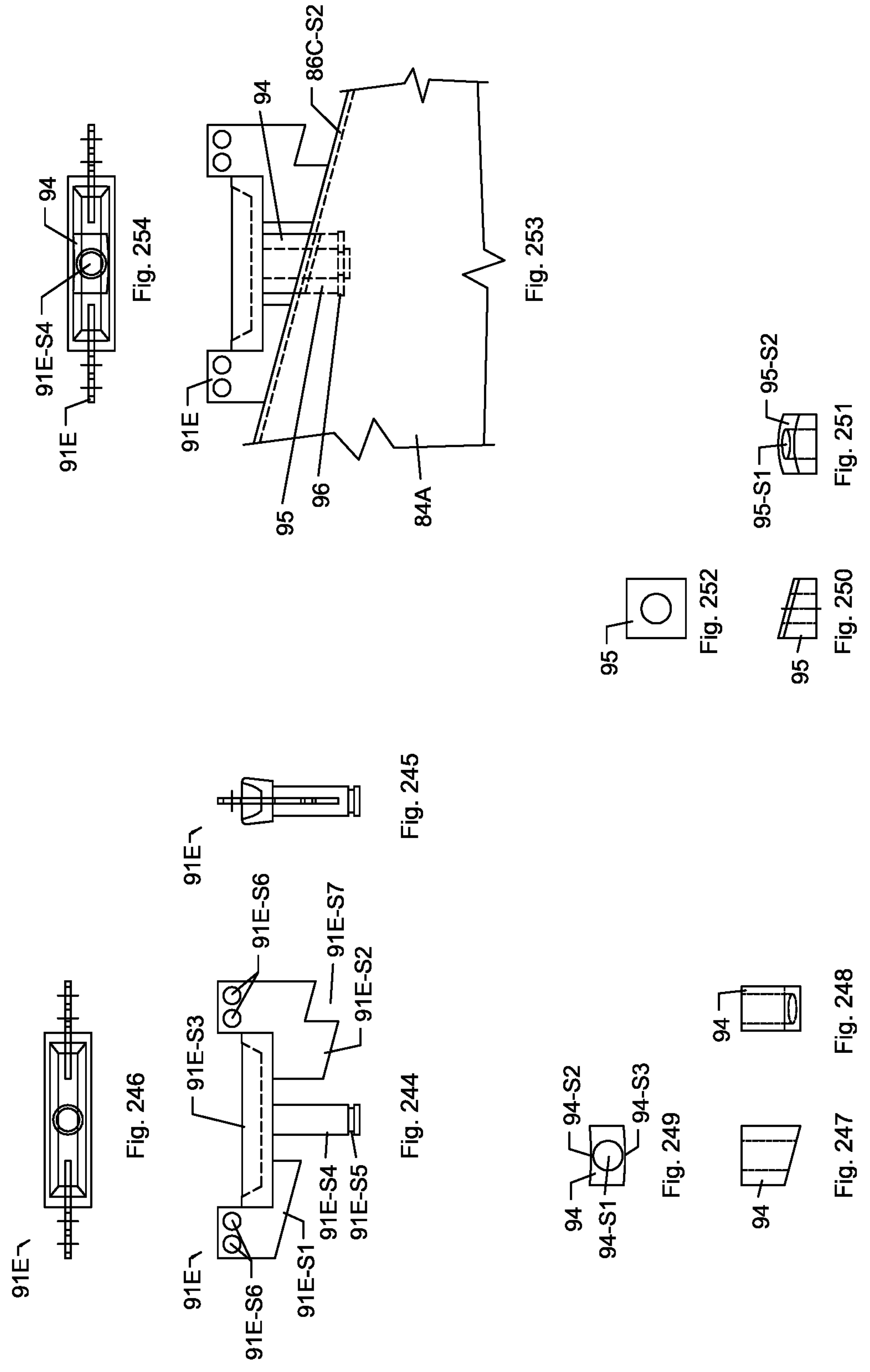

FIG. 244 shows a rear-view of Trailing End Reinforcement Plate 91E.

FIG. 245 shows a side-view of Trailing End Reinforcement Plate 91E.

FIG. 246 shows a top-view of Trailing End Reinforcement Plate 91E.

FIG. 247 shows a rear-view of Wall Engagement Insert 94.

FIG. 248 shows a side-view of Wall Engagement Insert 94.

FIG. 249 shows a top-view of Wall Engagement Insert 94.

FIG. 250 shows a rear-view of Clamping Washer 95.

FIG. 251 shows a side-view of Clamping Washer 95.

FIG. 252 shows a top-view of Clamping Washer 95.

FIG. 253 shows a rear-view of the fully assembled configuration of Trailing End Reinforcement Plate 91E that is secured to Cone Assembly 84A.

FIG. 254 shows a top-view of Trailing End Reinforcement Plate 91E to which its Wall Engagement Insert 94 has been assembled.

Figure 255:
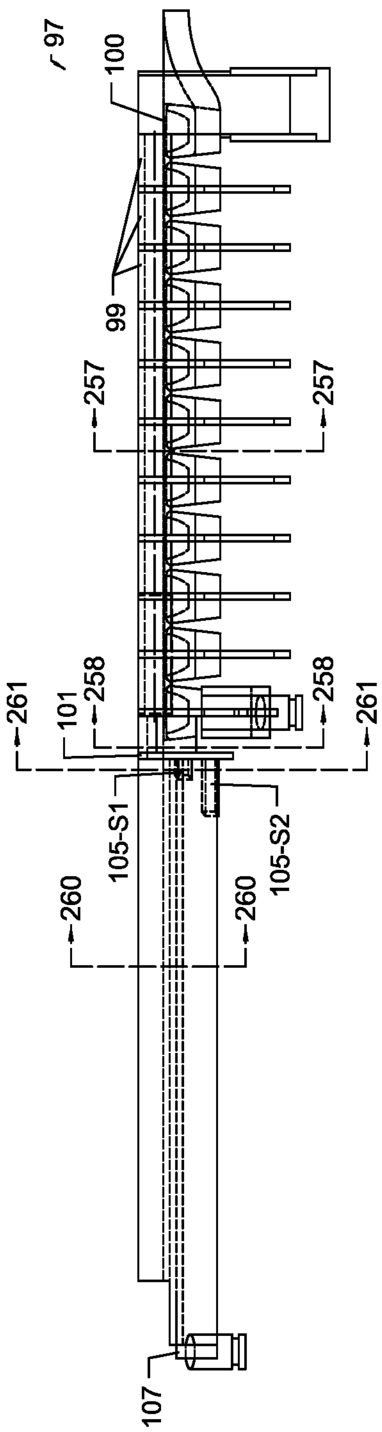

FIG. 255 shows a side-view of Torque Transmitting Member 97.

Figure 256:
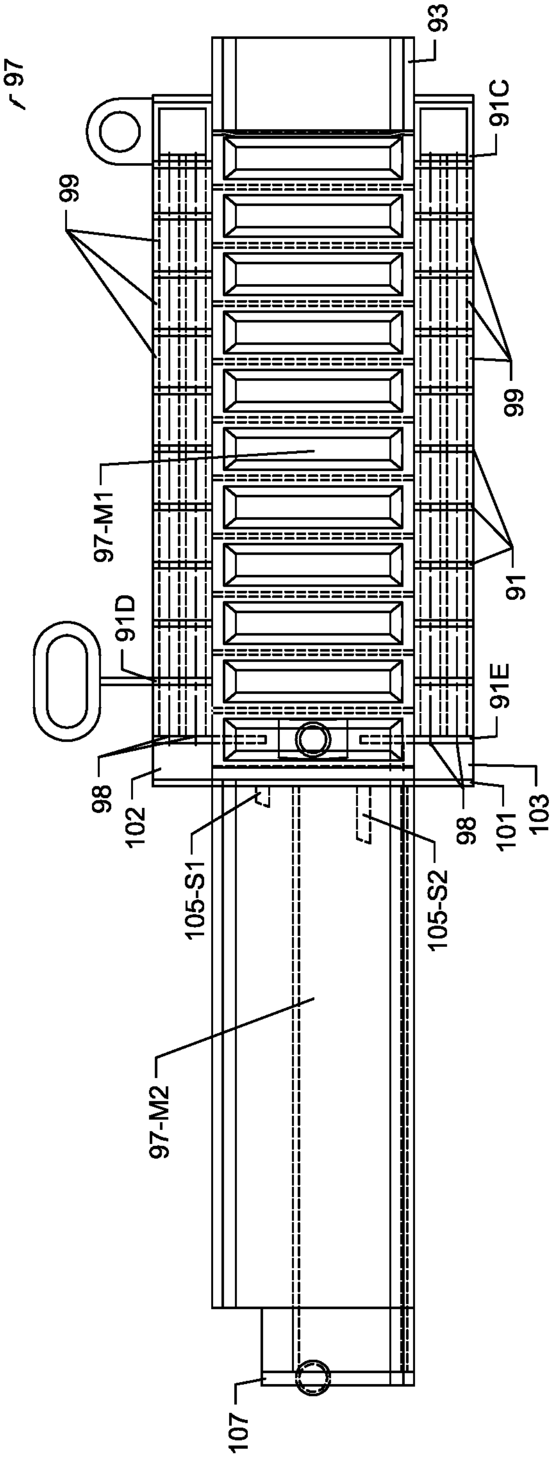

FIG. 256 shows a top-view of Torque Transmitting Member 97.

Figure 257:
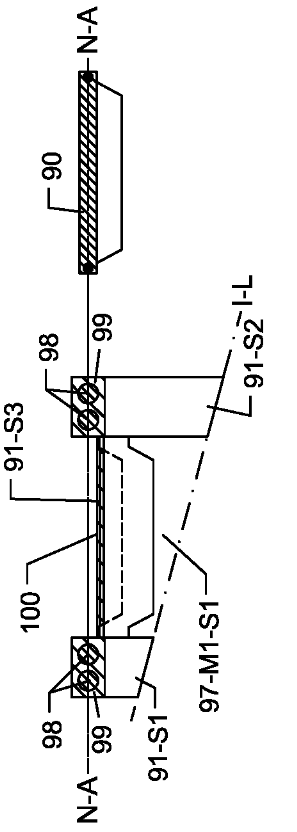

FIG. 257 shows a sectional-view of Torque Transmitting Member 97.

Figure 258:
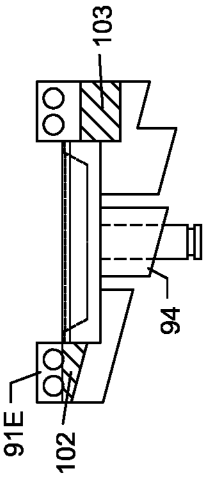

FIG. 258 shows another sectional-view of Torque Transmitting Member 97.

Figure 259:
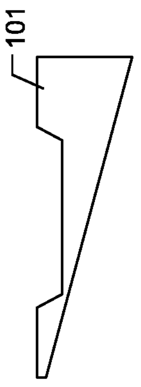

FIG. 259 shows a rear-view of Front Leveling Extension Plate 101

Figure 260:
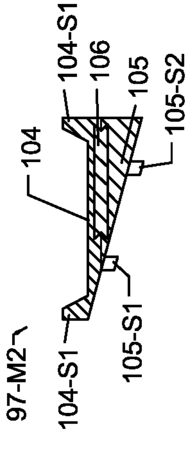

FIG. 260 shows a sectional-view of Torque Transmitting Member Leveling Extension 97-M2.

Figure 261:
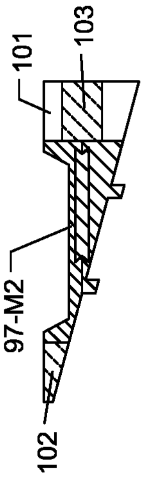

FIG. 261 shows another sectional-view of Torque Transmitting Member Leveling Extension 97-M2.

Figure 262:
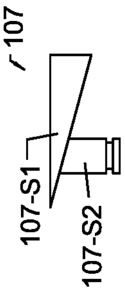

FIG. 262 shows a rear-view of Rear Leveling Extension Plate 107.

Figure 263:

FIG. 263 shows a side-view of Top Surface Elastomer Member 100.

Figure 264:
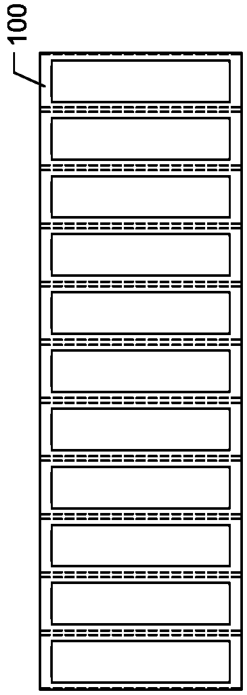

FIG. 264 shows a top-view of Top Surface Elastomer Member 100.

Figure 265:
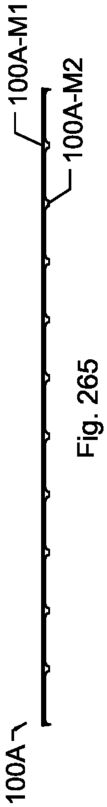

FIG. 265 shows a side-view of Top Surface Elastomer Member 100A.

Figure 266:
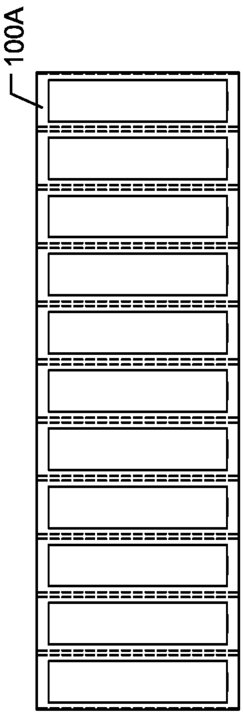

FIG. 266 shows a top-view of Top Surface Elastomer Member 100A.

Figure 267:
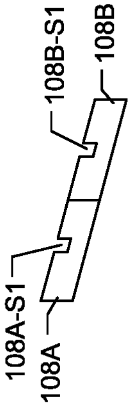

FIG. 267 shows a rear-view of Left Front End Resting Support 108A and Right Front End Resting Support 108B.

Figure 268:
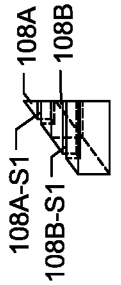

FIG. 268 shows a side-view of Left Front End Resting Support 108A and Right Front End Resting Support 108B.

Figure 269:
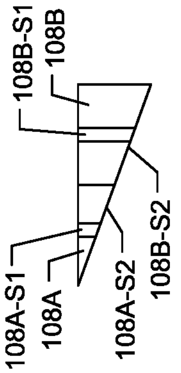

FIG. 269 shows a top-view of Left Front End Resting Support 108A and Right Front End Resting Support 108B.

Figure 270:
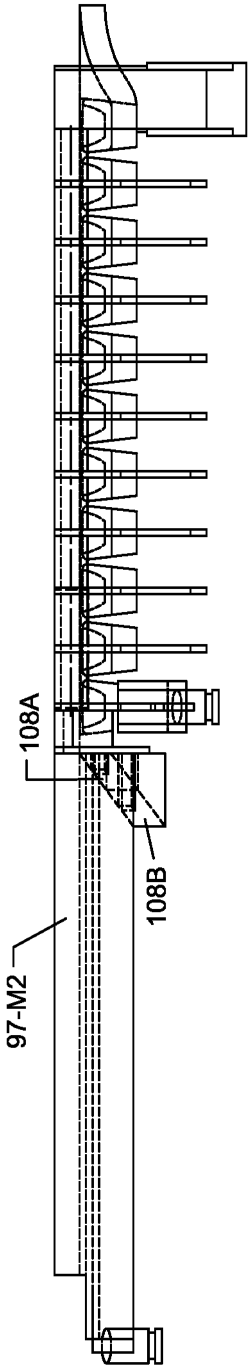

FIG. 270 shows a side-view of Torque Transmitting Member 97 for which the front-end of Torque Transmitting Member Leveling Extension 97-M2 is supported by Left Front End Resting Support 108A and Right Front End Resting Support 108B.

Figure 271:
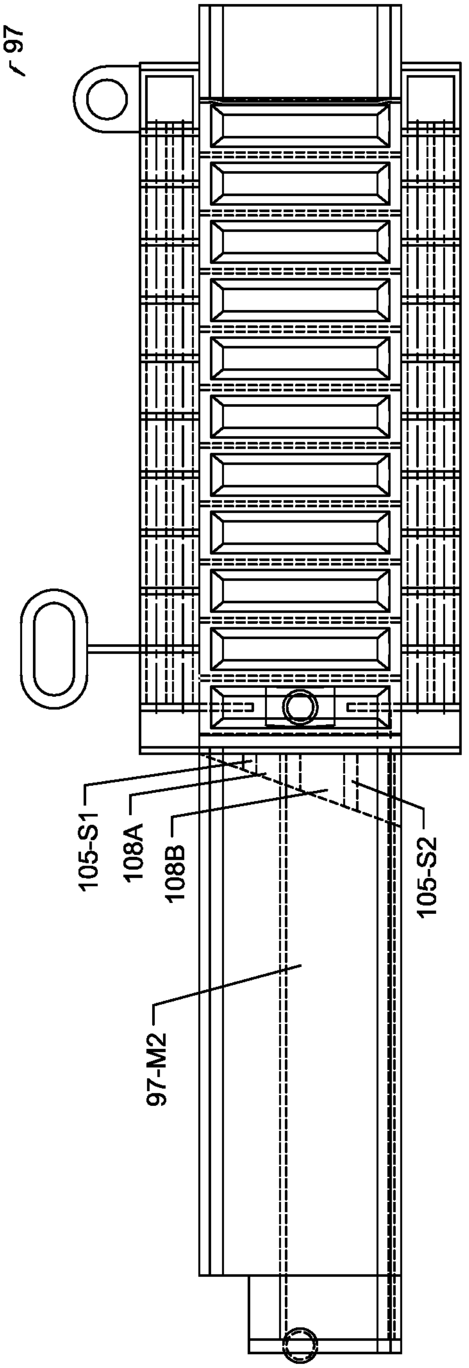

FIG. 271 shows a top-view of Torque Transmitting Member 97 for which the front-end of Torque Transmitting Member Leveling Extension 97-M2 is supported by Left Front End Resting Support 108A and Right Front End Resting Support 108B.

Figure 272:
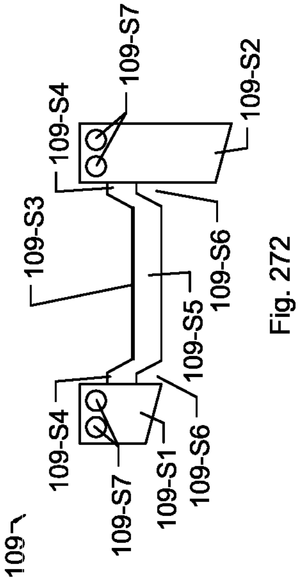

FIG. 272 shows a rear-view of a Reinforcement Plate 109.

Figure 273:
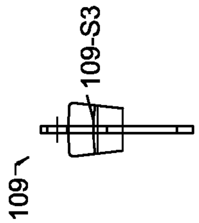

FIG. 273 shows a side-view of a Reinforcement Plate 109.

Figure 274:
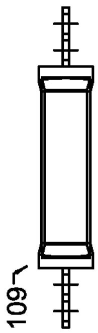

FIG. 274 shows a top-view of a Reinforcement Plate 109.

Figure 275:
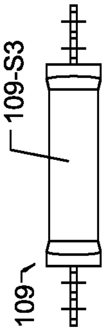

FIG. 275 shows a partial top-view of a Reinforcement Plate 109, for which some hidden-lines are not shown.

Figure 276:
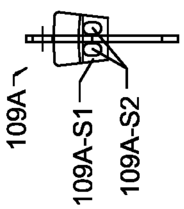

FIG. 276 shows a side-view of a Reinforcement Plate 109A.

Figure 277:
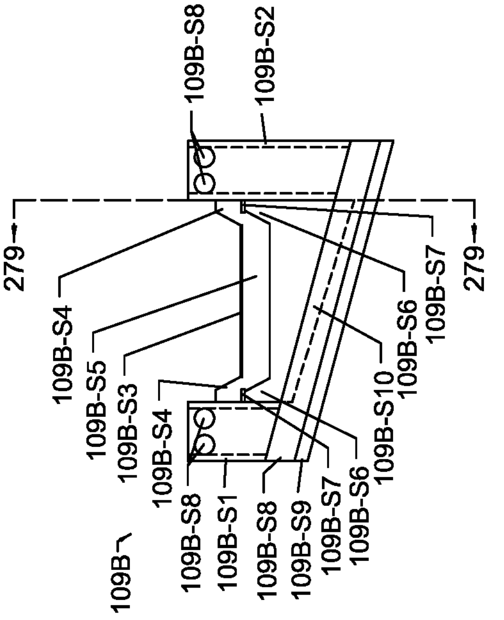

FIG. 277 shows a rear-view of Leading End Reinforcement Plate 109B.

Figure 278:
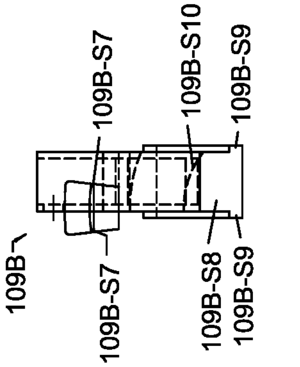

FIG. 278 shows a side-view of Leading End Reinforcement Plate 109B.

Figure 279:
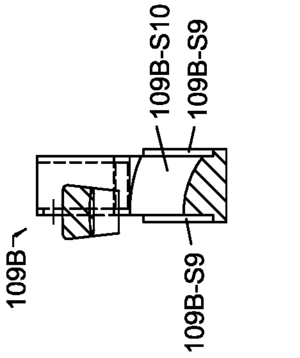

FIG. 279 shows a sectional-view of Leading End Reinforcement Plate 109B.

Figure 280:
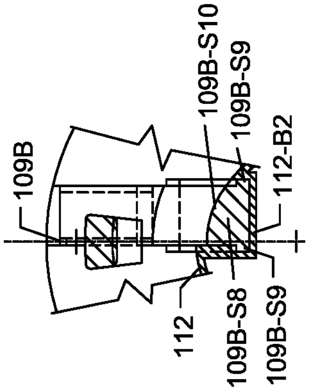

FIG. 280, shows a sectional-view of Non-Torque Transmitting Member Leading End Slot 112-B2 and Slider 109B-S8 that is inserted into it, as cut through a plane that is perpendicular to the axis of rotation of Cone 112.

Figure 281:
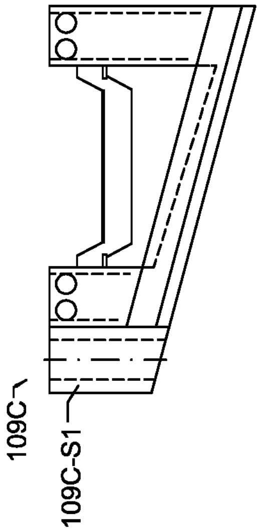

FIG. 281 shows a rear-view of Leading End Reinforcement Plate 109C.

Figure 282:
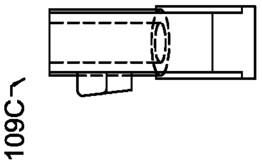

FIG. 282 shows a partial side-view of Leading End Reinforcement Plate 109C.

Figure 283:
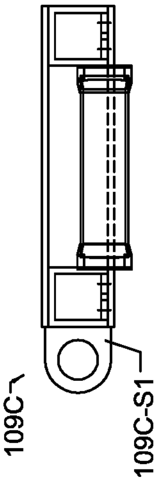

FIG. 283 shows a top-view of Leading End Reinforcement Plate 109C.

Figure 284:
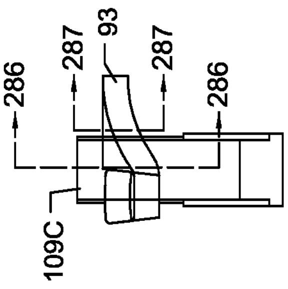

FIG. 284 shows a side-view of Leading End Reinforcement Plate 109C to which a Belt Resting Filler 93 is fixed. For this figure, some hidden-lines are not shown.

Figure 285:
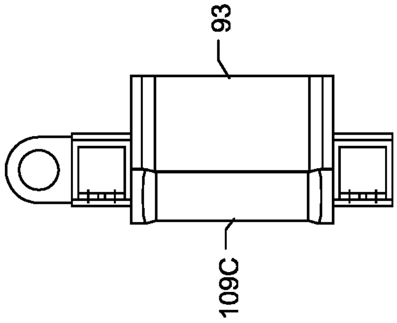

FIG. 285 shows a top-view of Leading End Reinforcement Plate 109C to which a Belt Resting Filler 93 is fixed.

Figure 286:
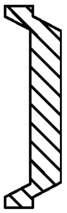

FIG. 286 shows a sectional-view of FIG. 284.

Figure 287:
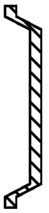

FIG. 287 shows another sectional-view of FIG. 284.

Figure 288:
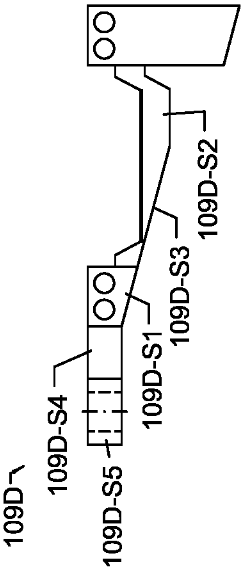

FIG. 288 shows a rear-view of Trailing Sleeve Reinforcement Plate 109D.

Figure 289:
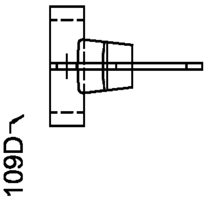

FIG. 289 shows a side-view of Trailing Sleeve Reinforcement Plate 109D.

Figure 290:
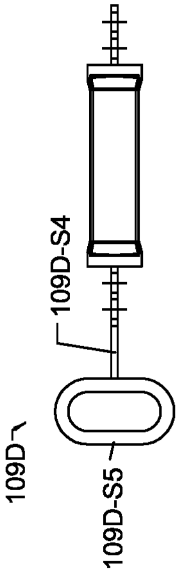

FIG. 290 shows a top-view of Trailing Sleeve Reinforcement Plate 109D.

Figure 291:
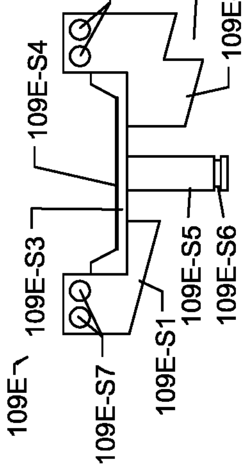

FIG. 291 shows a rear-view of Trailing End Reinforcement Plate 109E.

Figure 292:
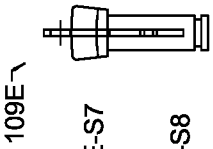

FIG. 292 shows a side-view of Trailing End Reinforcement Plate 109E.

Figure 293:
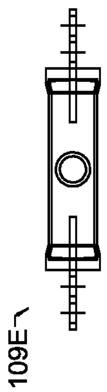

FIG. 293 shows a top-view of Trailing End Reinforcement Plate 109E.

Figure 294:
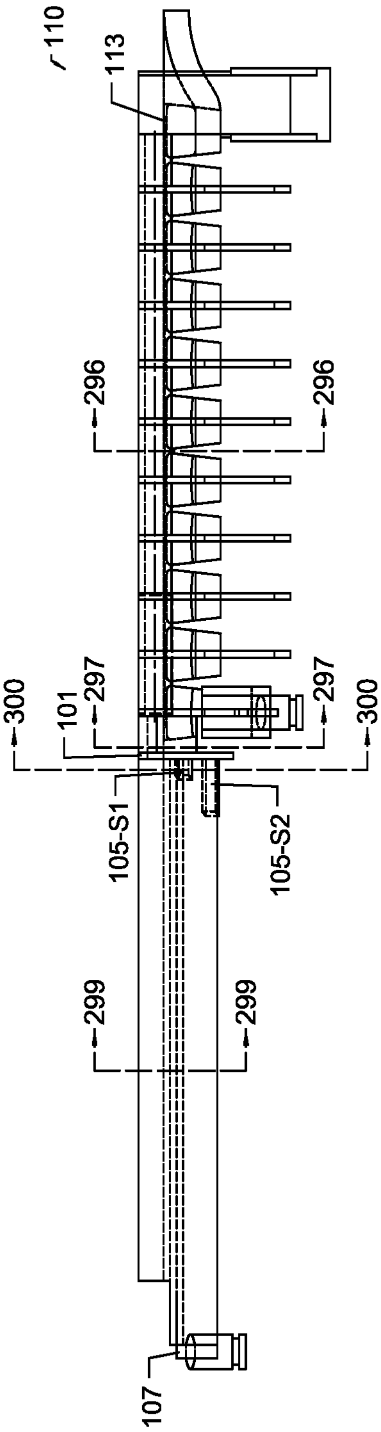

FIG. 294 shows a side-view of Non-Torque Transmitting Member 110.

Figure 295:
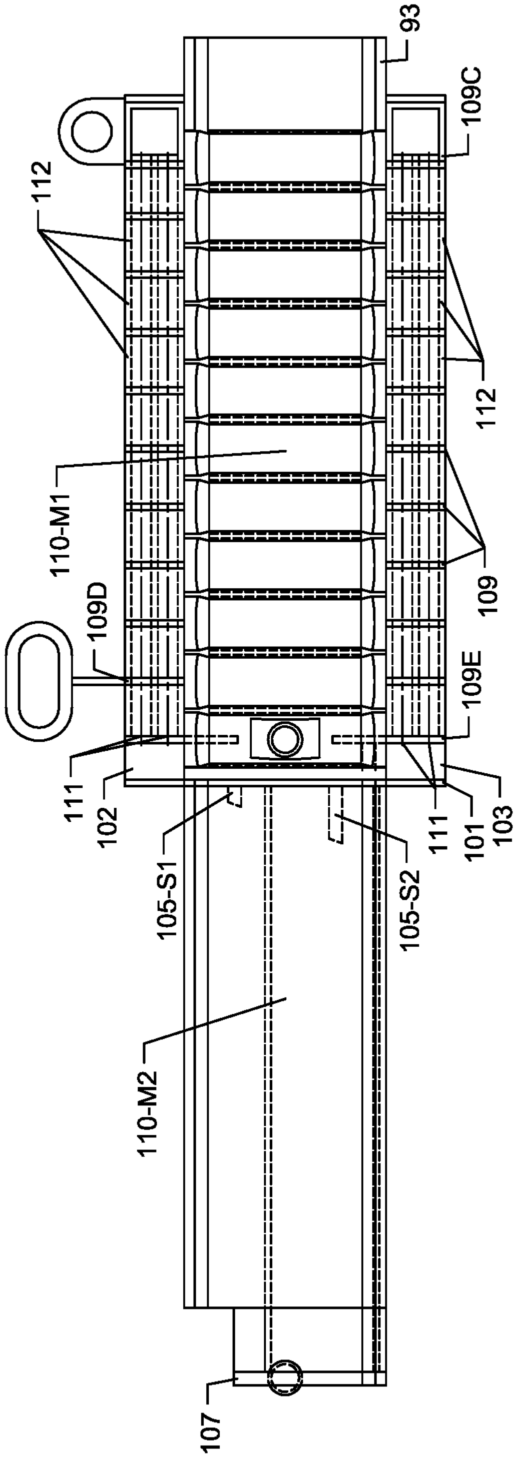

FIG. 295 shows a top-view of Non-Torque Transmitting Member 110.

Figure 296:
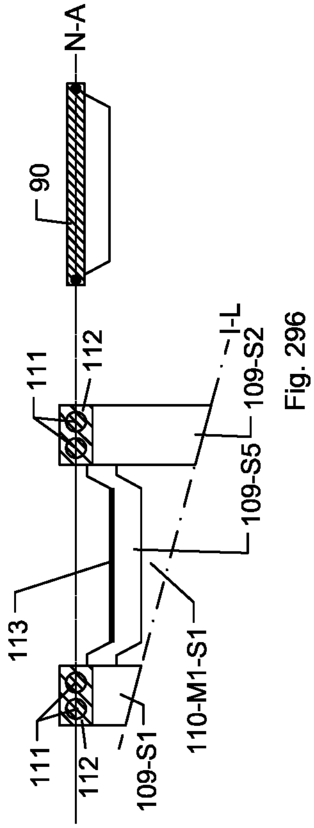

FIG. 296 shows a sectional-view of Non-Torque Transmitting Member 110.

Figure 297:
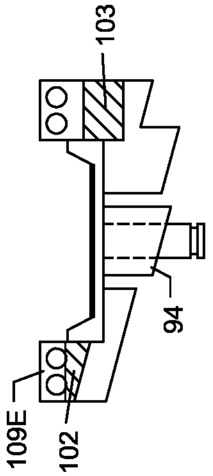

FIG. 297 shows another sectional-view of Non-Torque Transmitting Member 110.

Figure 298:
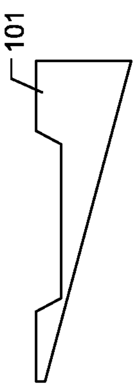

FIG. 298 shows a another rear-view of Front Leveling Extension Plate 101

Figure 299:
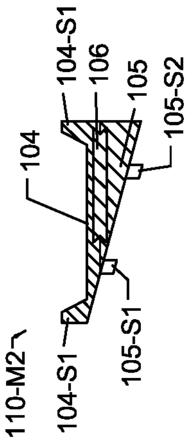

FIG. 299 shows a sectional-view of Non-Torque Transmitting Member Leveling Extension 110-M2.

Figure 300:
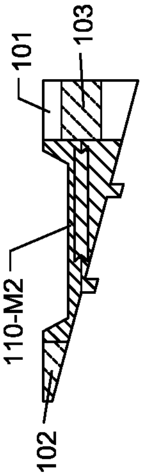

FIG. 300 shows another sectional-view of Non-Torque Transmitting Member Leveling Extension 110-M2.

Figure 301:

FIG. 301 shows a side-view of Top Surface Elastomer Member 113.

Figure 302:
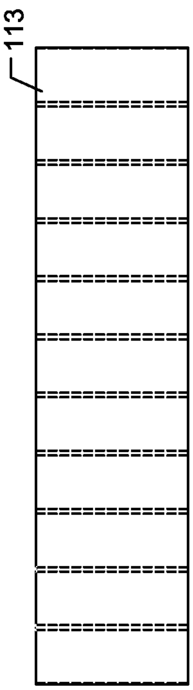

FIG. 302 shows a top-view of Top Surface Elastomer Member 113.

Figure 303:
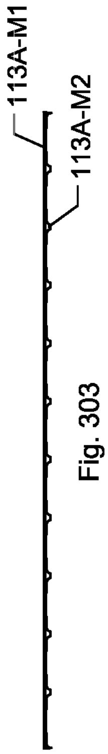

FIG. 303 shows a side-view of Top Surface Elastomer Member 113A.

Figure 304:
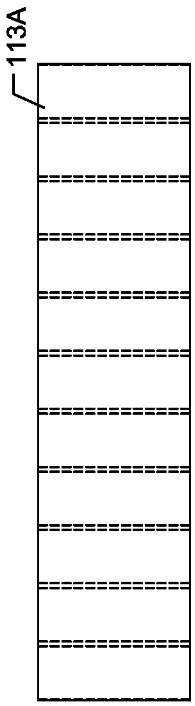

FIG. 304 shows a top-view of Top Surface Elastomer Member 113A.

Figure 305:
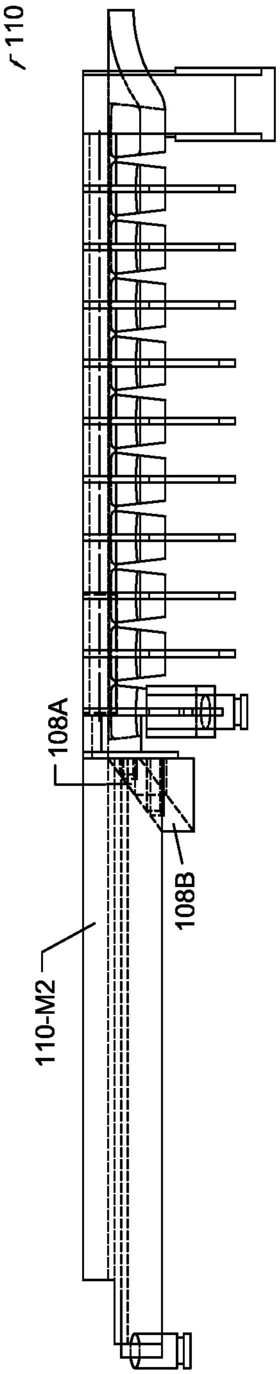

FIG. 305 shows a side-view of Non-Torque Transmitting Member 110 for which the front-end of Non-Torque Transmitting Member Leveling Extension 110-M2 is supported by a Left Front End Resting Support 108A and a Right Front End Resting Support 108B.

Figure 306:
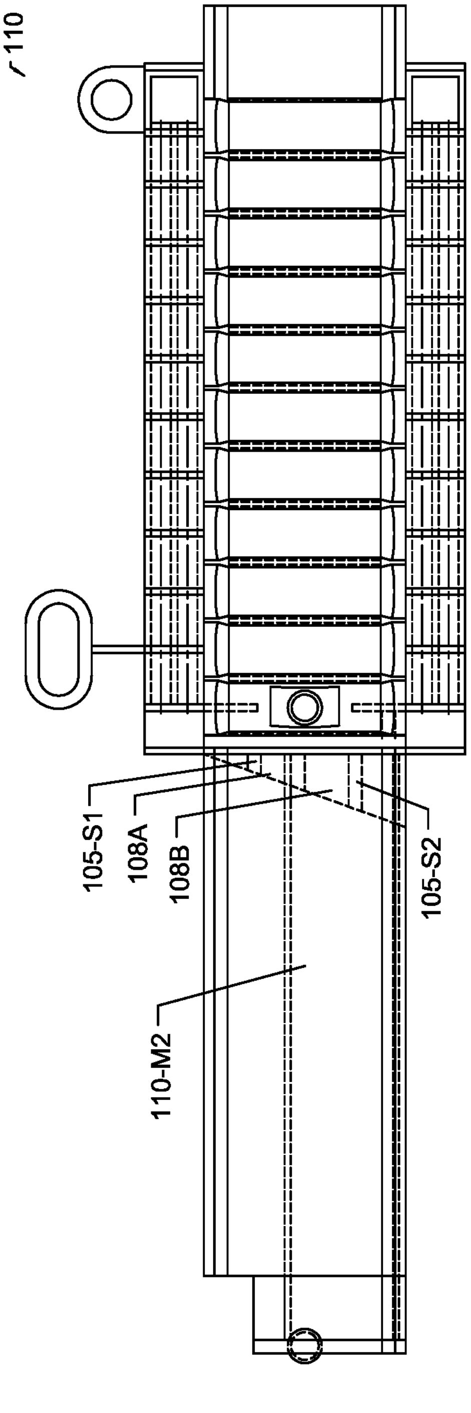

FIG. 306 shows a top-view of Non-Torque Transmitting Member 110 for which the front-end of Non-Torque Transmitting Member Leveling Extension 110-M2 is supported by a Left Front End Resting Support 108A and a Right Front End Resting Support 108B.

Figure 307:
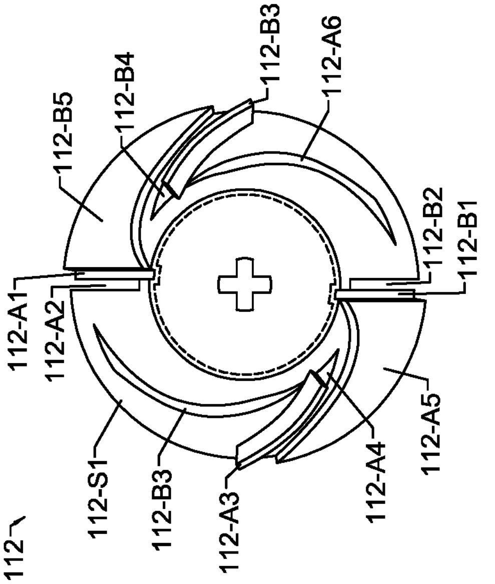

FIG. 307 shows a front-view of a Cone 112.

Figure 308:
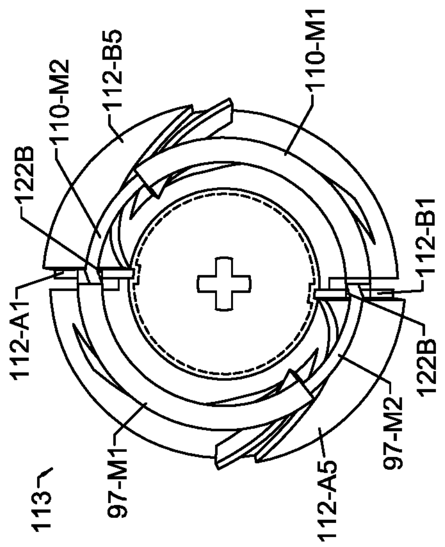

FIG. 308 shows a front-view of a Cone Assembly 113.

Figure 309:
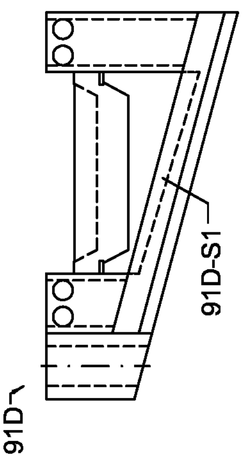

FIG. 309 shows a rear-view of a Leading End Reinforcement Plate 91D.

Figure 310:
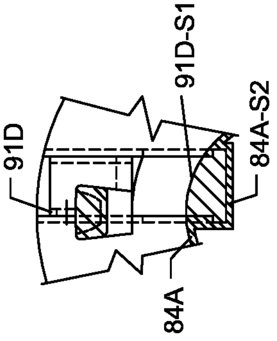

FIG. 310 shows a partial-sectional-view of Leading End Reinforcement Plate 91D and Torque Transmitting Member Leading End Slot 84A-A2 into which it is inserted, as cut through a plane that is perpendicular to the axis of rotation of Cone 84A.

Figure 311:
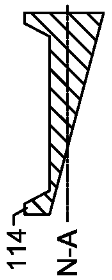

FIG. 311 shows a rear-cross-sectional-view of a Leveling Extension 114.

Figure 312:
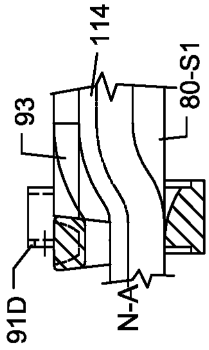

FIG. 312 shows a side-view of a Leveling Extension 114 that is exiting Leading End Reinforcement Plate 91D so that it is partially resting on a Ramp 80-S1 of a Cone Assembly 84A.

Figure 313:
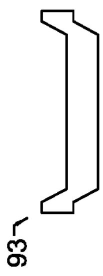

FIG. 313 shows a rear-view of Belt Resting Filler 93.

Figure 314:
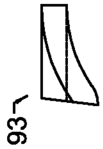

FIG. 314 shows a side-view of Belt Resting Filler 93.

Figure 315:
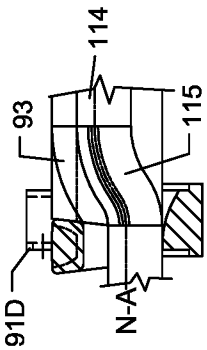

FIG. 315 shows a side-view of a Leveling Extension 114 that is exiting Leading End Reinforcement Plate 91D so that it is partially resting on a Ramp 80-S1 through Ramp Leveling Base 115.

Figure 316:
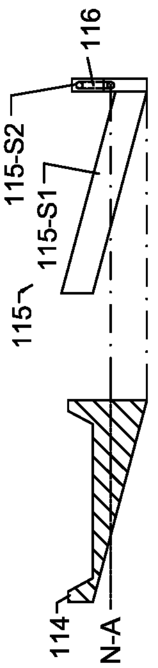

FIG. 316 shows a rear-view of Ramp Leveling Base 115 and rear-cross-sectional-view of Leveling Extension 114.

Figure 317:
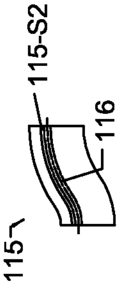

FIG. 317 shows a side-view of Ramp Leveling Base 115.

Figures 318, 319, 320, 321, 322, 323, 324, 325, 326:
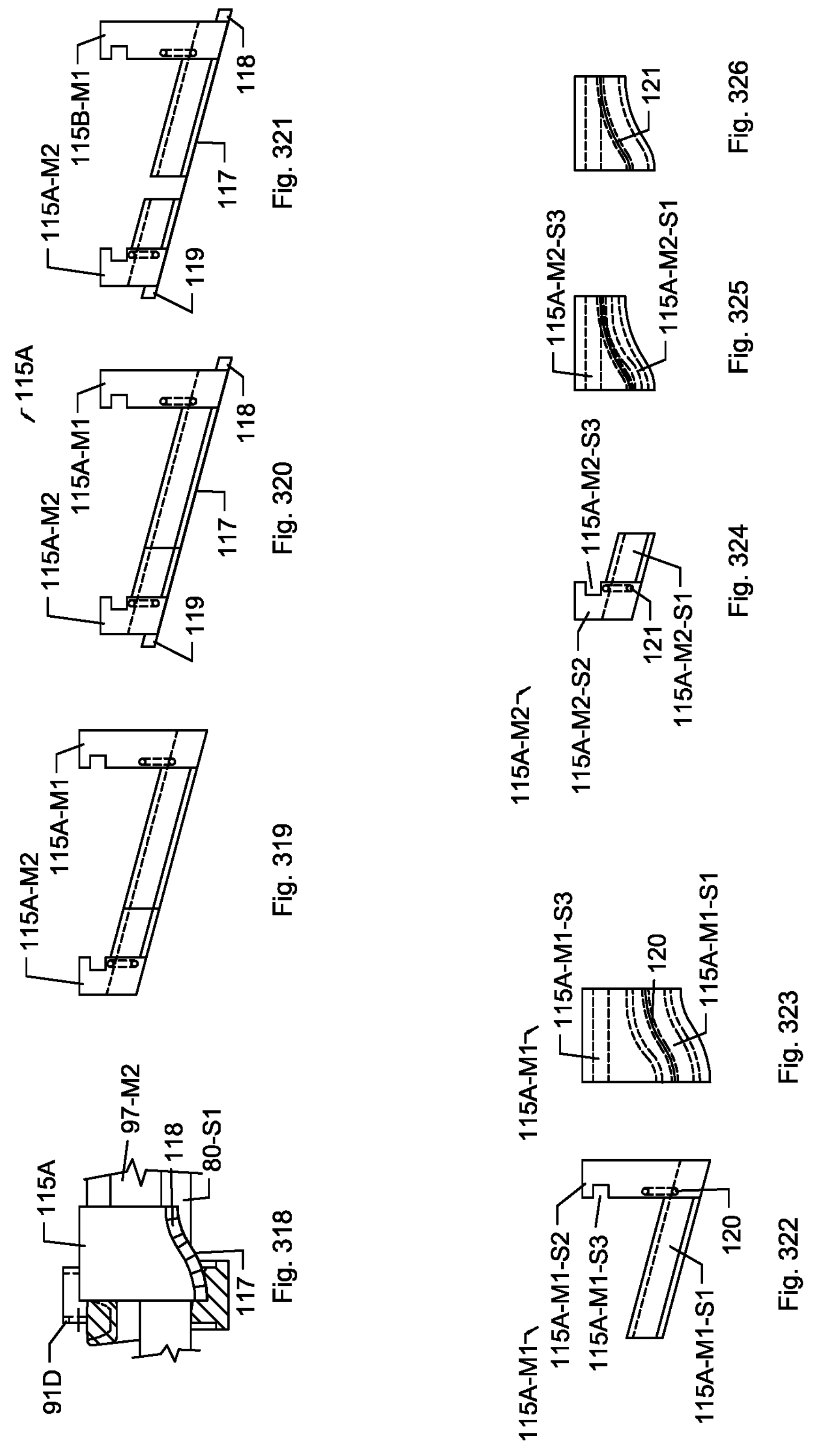

FIG. 318 shows a partial-side-view of a Torque Transmitting Member Leveling Extension 97-M2 that is exiting Leading End Reinforcement Plate 91D so that it is partially resting on Ramp 80A-S1 through a Ramp Leveling Base 115A.

FIG. 319 shows a rear-view of Right Ramp Leveling Base 115A-M1 and Left Ramp Leveling Base 115A-M2 of Ramp Leveling Base 115A.

FIG. 320 shows a rear-view of Right Ramp Leveling Base 115A-M1, Left Ramp Leveling Base 115A-M2, Sheet 117, Right Block 118, and a Left Block 119 of Ramp Leveling Base 115A.

FIG. 321 shows a rear-view of a Right Ramp Leveling Base 115B-M1 and Left Ramp Leveling Base 115A-M2, Sheet 117, Right Block 118, and a Left Block 119.

FIG. 322 shows a rear-view of Right Ramp Leveling Base 115A-M1.

FIG. 323 shows a side-view of Right Ramp Leveling Base 115A-M1.

FIG. 324 shows a rear-view of Left Ramp Leveling Base 115A-M2.

FIG. 325 shows a side-view of Left Ramp Leveling Base 115A-M2.

FIG. 326 shows a partial side-view of Left Ramp Leveling Base 115A-M2, for which some hidden-lines are not shown.

Figure 327:
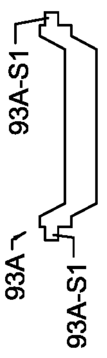

FIG. 327 shows a rear-view of Belt Resting Filler 93A.

Figure 328:
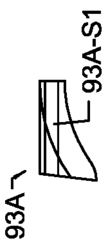

FIG. 328 shows a side-view of Belt Resting Filler 93A.

Figure 329:
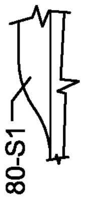

FIG. 329 shows a side-view of Ramp 80-S1 at an infinite diameter (straight surface).

Figure 330:
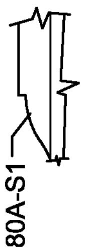

FIG. 330 shows a side-view of Ramp 80A-S1 at an infinite diameter (straight surface).

Figure 331:
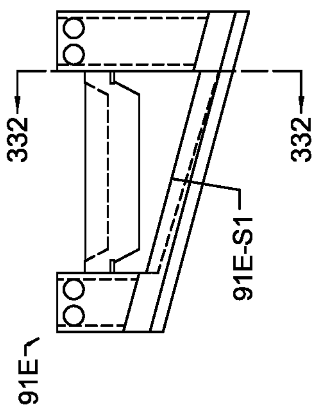

FIG. 331 shows a rear-view of Leading End Reinforcement Plate 91E.

Figure 332:
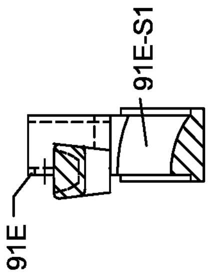

FIG. 332 shows a partial-sectional-view of Leading End Reinforcement Plate 91E.

Figures 333, 334, 335, 336, 337, 338, 339, 340, 341, 342, 343:
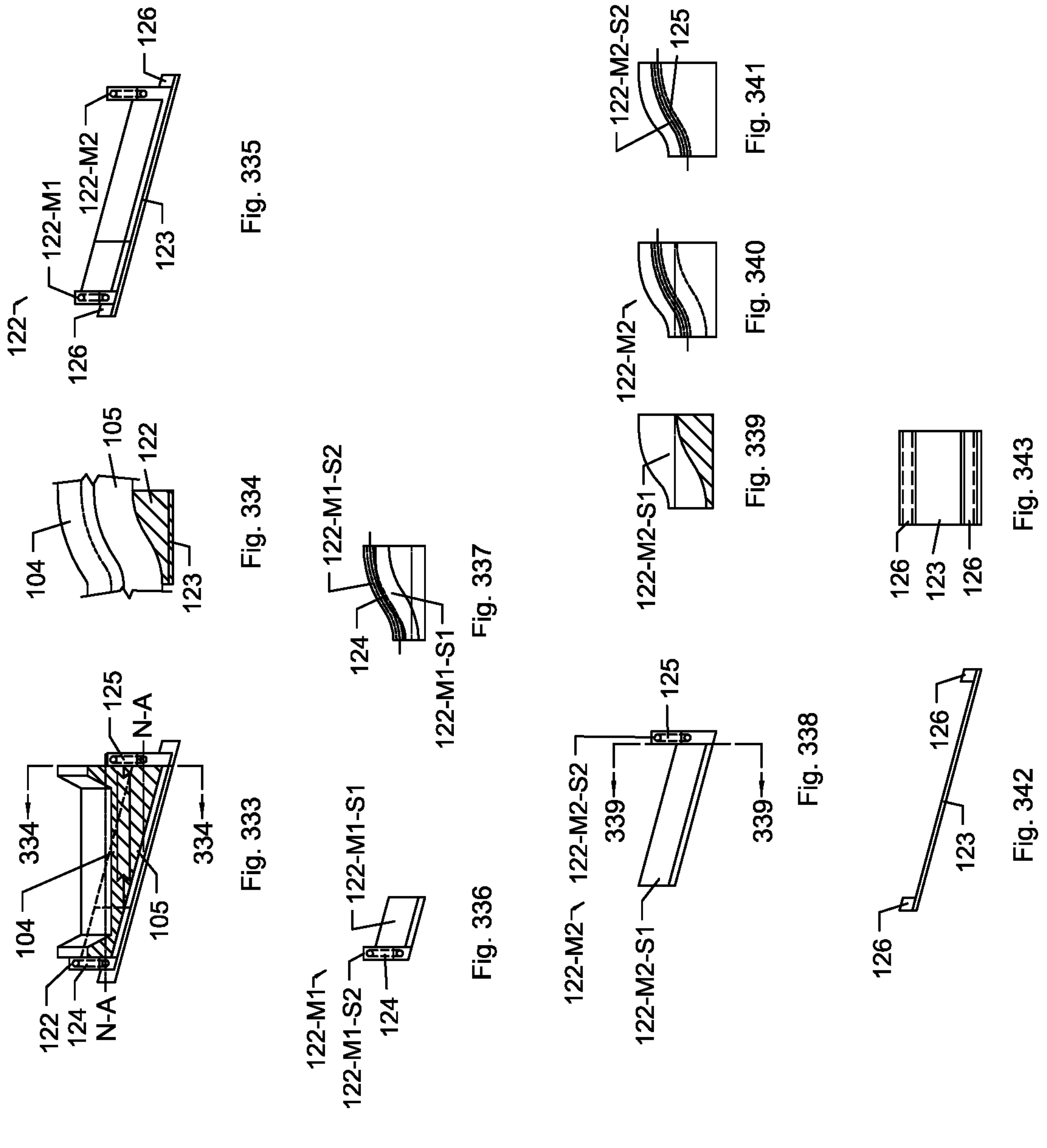

FIG. 333 shows a rear-view of Flexible Ramp 122 and a Torque Transmitting Member Leveling Extension (which comprises of a Top Leveling Extension Half 104 and a Bottom Leveling Extension Half 105) that is resting on top of it.

FIG. 334 shows a sectional-view of Flexible Ramp 122 and a Torque Transmitting Member Leveling Extension (which comprises of a Top Leveling Extension Half 104 and a Bottom Leveling Extension Half 105) that is resting on top of it.

FIG. 335 shows a rear-view of Flexible Ramp 122.

FIG. 336 shows a rear-view of Left Flexible Ramp 122-M1.

FIG. 337 shows a side-view of Left Flexible Ramp 122-M1.

FIG. 338 shows a rear-view of Right Flexible Ramp 122-M2.

FIG. 339 shows a sectional-view of Right Flexible Ramp 122-M2.

FIG. 340 shows a side-view of Right Flexible Ramp 122-M2.

FIG. 341 shows a partial-side-view of Right Flexible Ramp 122-M2, for which the hidden lines for Ramp 122-M2-S1 are not shown.

FIG. 342 shows a rear-view Joining Sheet 123.

FIG. 343 shows a side-view Joining Sheet 123.

Figure 344:
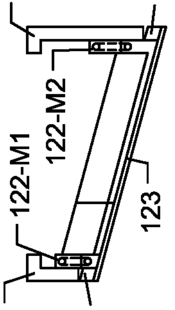

FIG. 344 shows a rear-view of a Flexible Ramp 122 to which a Left Hook 127 and a Right Hook 128 are attached. Note: Only the individual parts of Flexible Ramp 122 are labeled.

Figure 345:
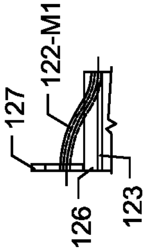

FIG. 345 shows a partial-left-side-view of the Flexible Ramp 122 shown in FIG. 344.

Figure 346:
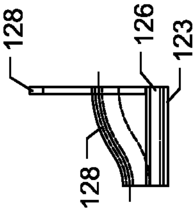

FIG. 346 shows a partial-right-side-view of the Flexible Ramp 122 shown in FIG. 344.

Figure 347:
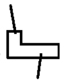

FIG. 347 shows a rear-view of Left Hook 127.

Figure 348:
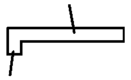

FIG. 348 shows a rear-view of Left Hook 128.

Figure 349:
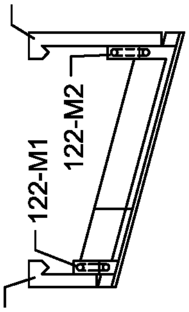

FIG. 349 shows a rear-view of a Flexible Ramp 122 to which a Left Hook 127A and a Right Hook 128A are attached. Note: Only the individual parts of Flexible Ramp 122 are labeled.

Figure 350:
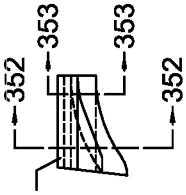

FIG. 350 shows a side-view of Belt Resting Filler 93B.

Figure 351:
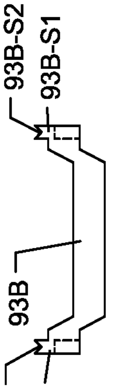

FIG. 351 shows a rear-view of Belt Resting Filler 93B.

Figure 352:
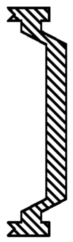

FIG. 352 shows a sectional-view of Belt Resting Filler 93B.

Figure 353:
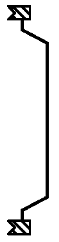

FIG. 353 shows another sectional-view of Belt Resting Filler 93B.

Figure 354:
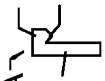

FIG. 354 shows a rear-view of Left Hook 127A.

Figure 355:
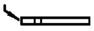

FIG. 355 shows a side-view of Left Hook 127A.

Figure 356:
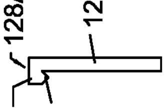

FIG. 356 shows a rear-view of Right Hook 128A.

Figure 357:
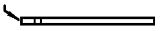

FIG. 357 shows a side-view of Right Hook 128A.

Figure 358:
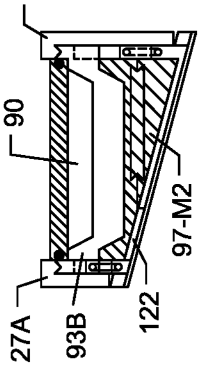

FIG. 358 shows a rear-view of a fully assembled Ramp 122 that uses a Left Hook 127A and a Right Hook 128A, which is used to raise Torque Transmitting Leveling Extension 97-M2. It also shows Belt Resting Filler 93B, which is used to provide a level resting base for Transmission Belt 90 on top of the portion of Torque Transmitting Leveling Extension 97-M2 that is raised by Ramp 122. And it also shows the engagement between Left Hook 127A and a Right Hook 128A with Belt Resting Filler 93B.

Figure 359:
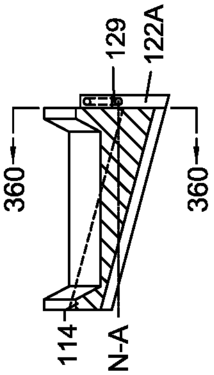

FIG. 359 shows a rear-view of Flexible Ramp 122A and a Leveling Extension 114 that is resting on top of it.

Figure 360:
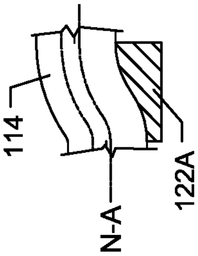

FIG. 360 shows a sectional-view of Flexible Ramp 122A and a Leveling Extension 114 that is resting on top of it.

Figure 361:
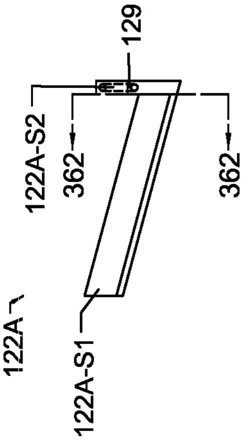

FIG. 361 shows a rear-view of Flexible Ramp 122A.

Figure 362:
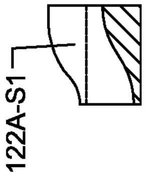

FIG. 362 shows a sectional-view of Flexible Ramp 122A.

Figure 363:
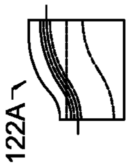

FIG. 363 shows a side-view of Flexible Ramp 122A.

Figure 364:
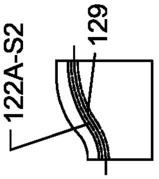

FIG. 364 shows a partial-side-view of Flexible Ramp 122A.

Figure 365:
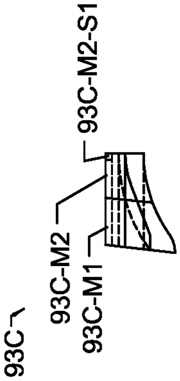

FIG. 365 shows a side-view of Belt Resting Filler 93C.

Figure 366:
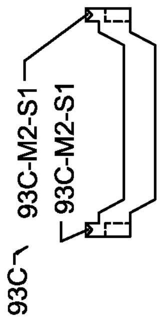

FIG. 366 shows a rear-view of Belt Resting Filler 93C.

Figure 367:
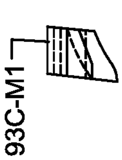

FIG. 367 shows a side-view of Rear Belt Resting Filler 93C-M1.

Figure 368:
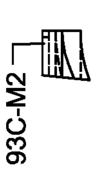

FIG. 368 shows a side-view of Front Belt Resting Filler 93C-M2.

Figures 369, 370, 371, 372, 373, 374, 375, 376, 377:
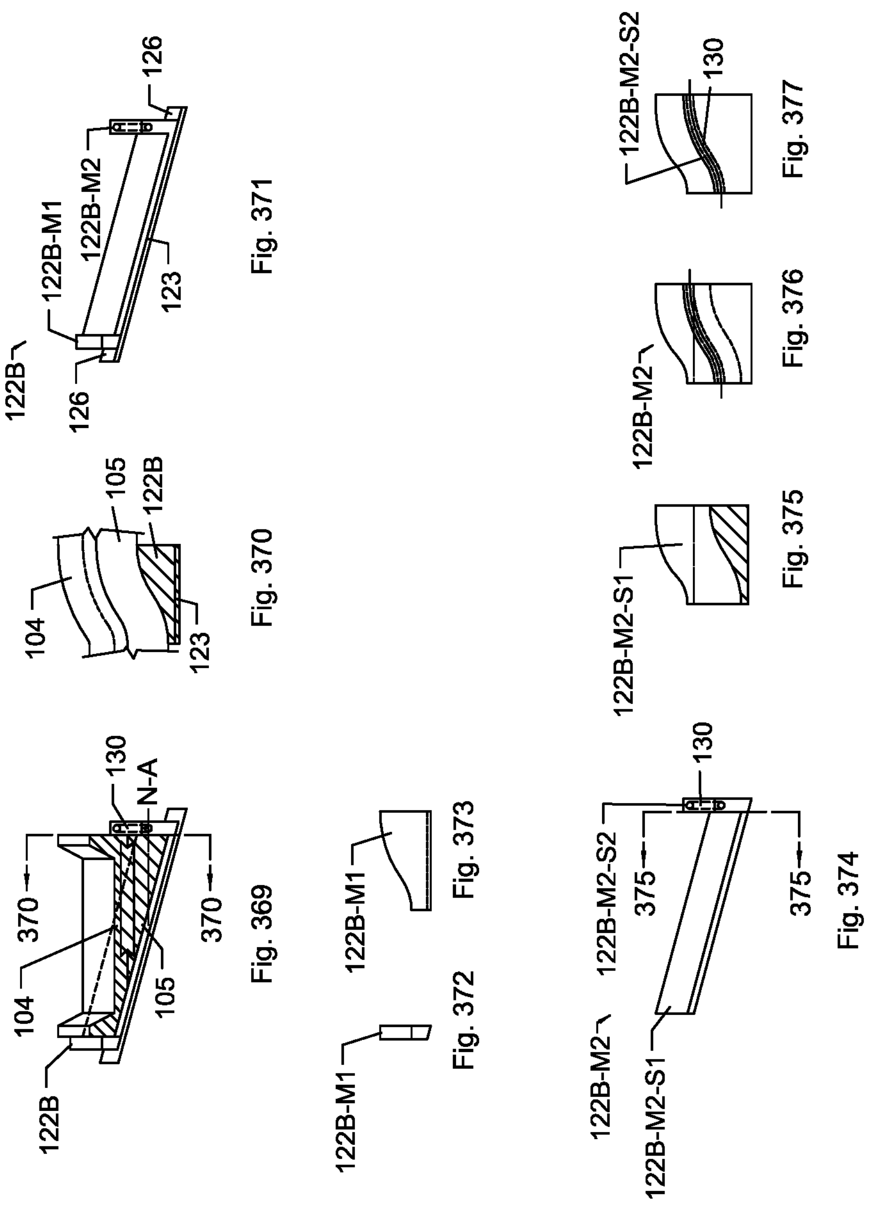

FIG. 369 shows a rear-view of Flexible Ramp 122B and a Leveling Extension (which comprises of a Top Leveling Extension Half 104 and a Bottom Leveling Extension Half 105) that is resting on top of it.

FIG. 370 shows a sectional-view of Flexible Ramp 122B and a Torque Transmitting Member Leveling Extension (which comprises of a Top Leveling Extension Half 104 and a Bottom Leveling Extension Half 105) that is resting on top of it.

FIG. 371 shows a rear-view of Flexible Ramp 122B.

FIG. 372 shows a rear-view of Left Flexible Wall 122B-M1.

FIG. 373 shows a side-view of Left Flexible Wall 122B-M1.

FIG. 374 shows a rear-view of Right Flexible Ramp 122B-M2.

FIG. 375 shows a sectional-view of Right Flexible Ramp 122B-M2.

FIG. 376 shows a side-view of Right Flexible Ramp 122B-M2.

FIG. 377 shows a partial-side-view of Right Flexible Ramp 122B-M2, for which the hidden lines for Ramp 122B-M2-S1 are not shown.

Figure 378:
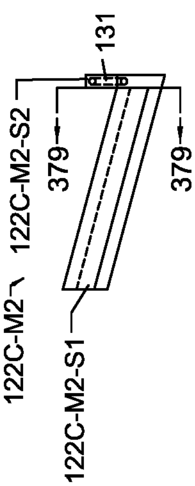

FIG. 378 shows a rear-view of Right Flexible Ramp 122C-M2.

Figure 379:
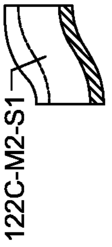

FIG. 379 shows a sectional-view of Right Flexible Ramp 122C-M2.

Figure 380:
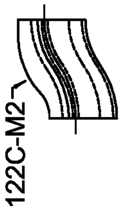

FIG. 380 shows a side-view of Right Flexible Ramp 122C-M2.

Figure 381:
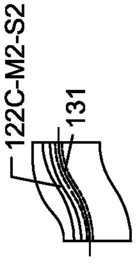

FIG. 381 shows a partial-side-view of Right Flexible Ramp 122C-M2.

Figure 382:
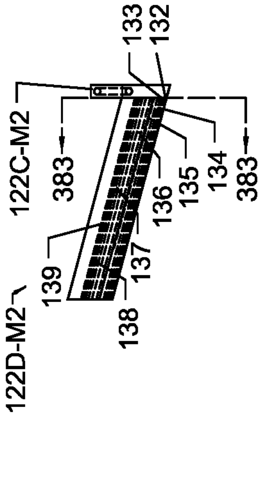

FIG. 382 shows a rear-view of Flexible Ramp 122D-M2.

Figure 383:
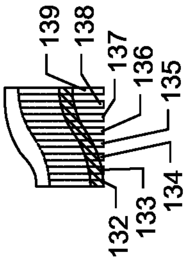

FIG. 383 shows a sectional-view of Flexible Ramp 122D-M2.

Figure 384:
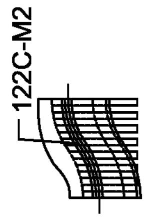

FIG. 384 shows a side-view of Flexible Ramp 122D-M2.

Figure 385:
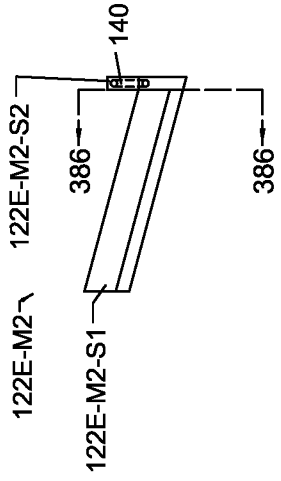

FIG. 385 shows a rear-view of Right Flexible Ramp 122E-M2, for which the hidden lines for the supporting plates are not shown.

Figure 386:
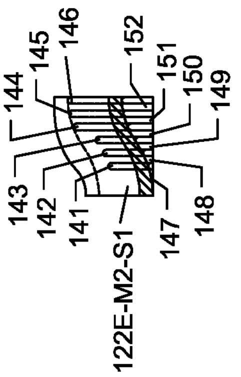

FIG. 386 shows a sectional-view of Right Flexible Ramp 122E-M2.

Figure 387:
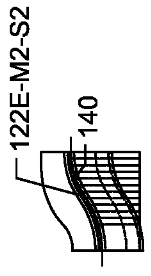

FIG. 387 shows a side-view of Right Flexible Ramp 122E-M2.

Figures 388, 389, 390, 391, 392, 393, 394, 395, 396, 397, 398:
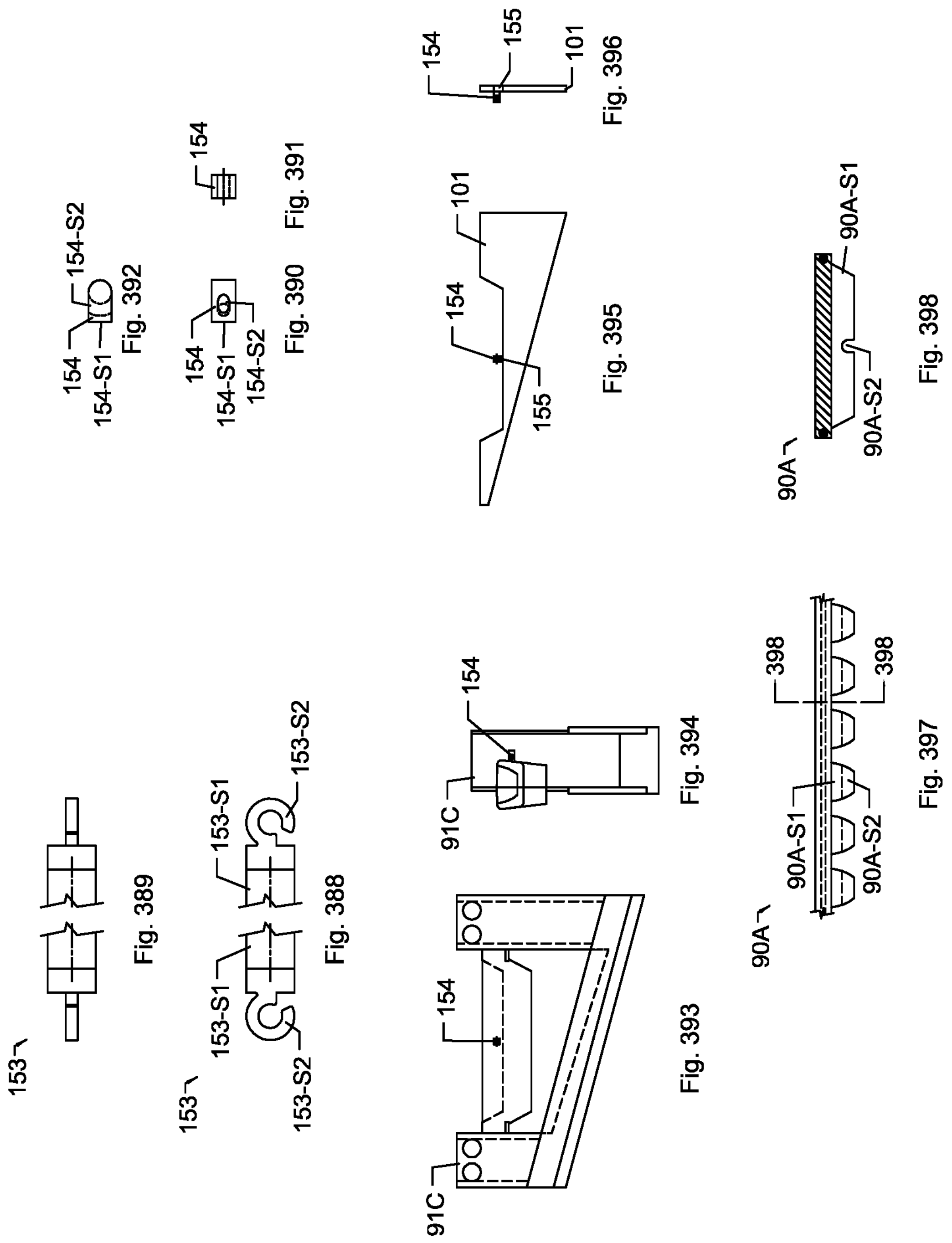

FIG. 388 shows a side-view of Elastic Rope Assembly 153, for which a portion of its mid-length portion is not shown. This figure, as well as FIGS. 389, 390, 391, 392 are shown at a larger scale compared to the other figures.

FIG. 389 shows a top-view of Elastic Rope Assembly 153, for which a portion of its mid-length portion is not shown.

FIG. 390 shows a side-view of Hook Attachment Plate 154.

FIG. 391 shows a front-view of Hook Attachment Plate 154.

FIG. 392 shows a top-view of Hook Attachment Plate 154.

FIG. 393 shows a rear-view of Leading End Reinforcement Plate 91C to which a Hook Attachment Plate 154 is fixed.

FIG. 394 shows a side-view of Leading End Reinforcement Plate 91C to which a Hook Attachment Plate 154 is fixed. For this figure, some hidden-lines are not shown.

FIG. 395 shows a rear-view of Front Leveling Extension Plate 101 to which a Hook Attachment Plate 154 is fixed.

FIG. 396 shows a side-view of Front Leveling Extension Plate 101 to which a Hook Attachment Plate 154 is fixed.

FIG. 397 shows a side-view of Transmission Belt 90A.

FIG. 398 shows a sectional-view of Transmission Belt 90A.

Figure 399:
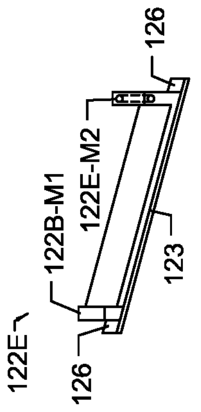

FIG. 399 shows a rear-view of Flexible Ramp 122E, for which the hidden lines for the supporting plates of Right Flexible Ramp 122E-M2 are not shown.

Figure 400:
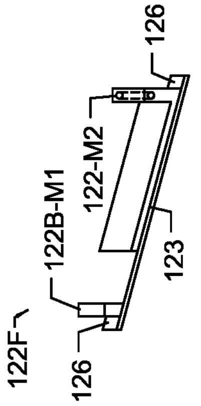

FIG. 400 shows a rear-view of Flexible Ramp 122F.

Figure 401:
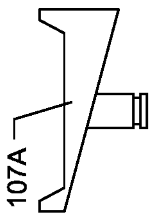

FIG. 401 shows a rear-view of Rear Leveling Extension Plate 107A.

Figure 402:
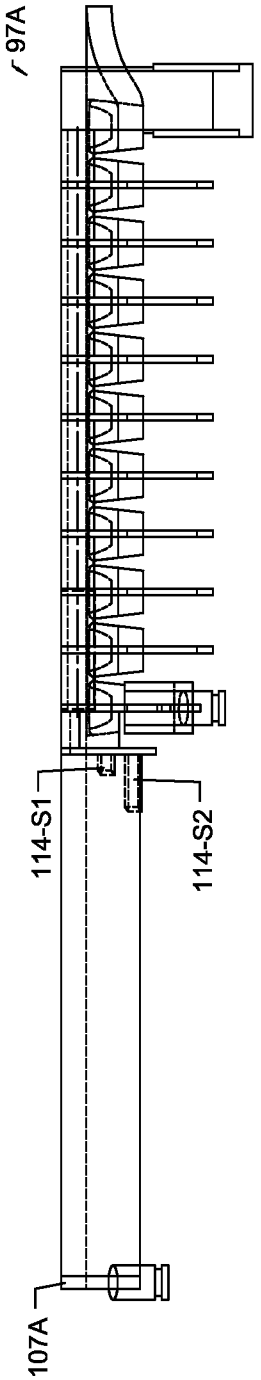

FIG. 402 shows a side-view of Torque Transmitting Member 97A.

Figure 403:
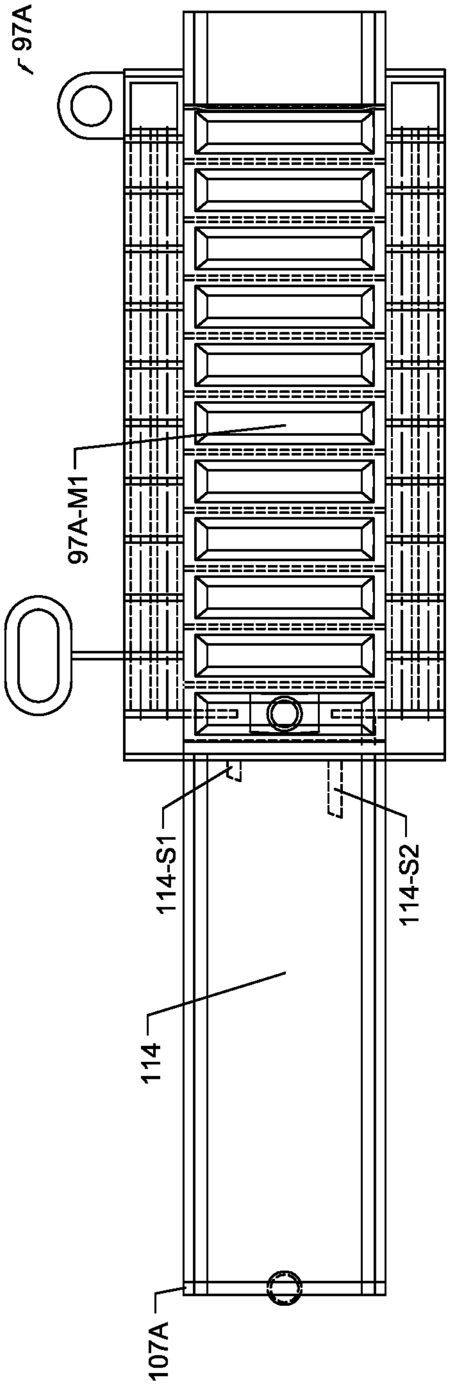

FIG. 403 shows a top-view of Torque Transmitting Member 97A.

Figure 404:
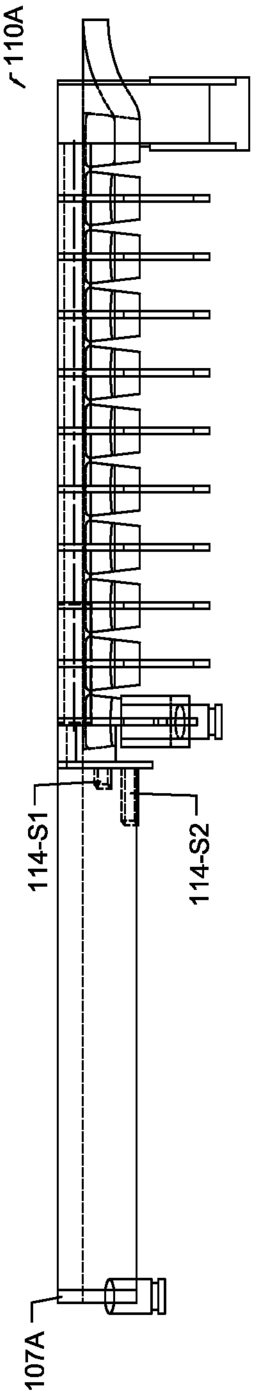

FIG. 404 shows a side-view of Non-Torque Transmitting Member 110A.

Figure 405:
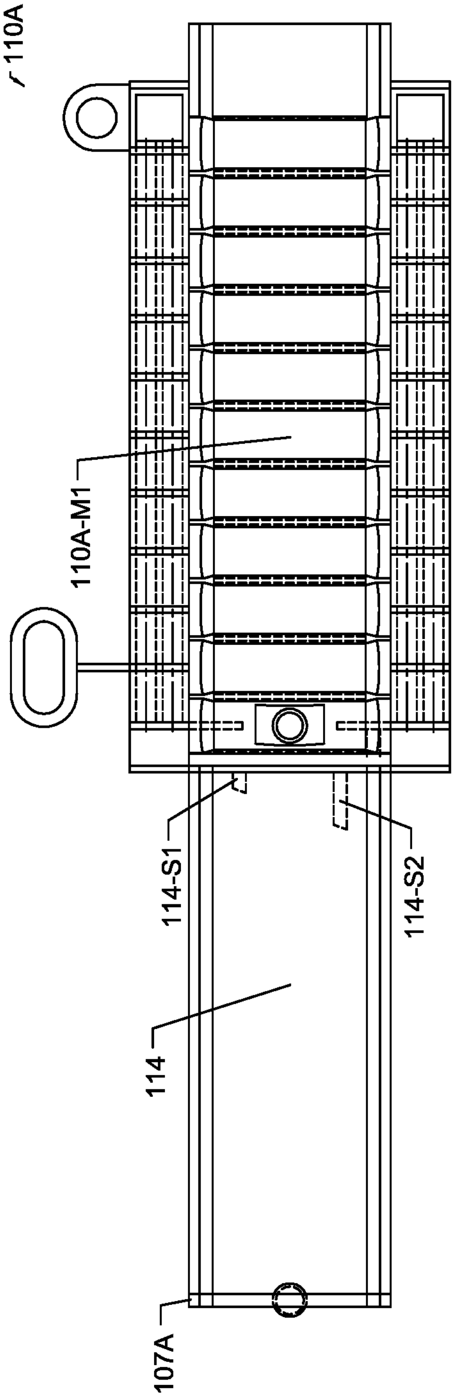

FIG. 405 shows a top-view of Non-Torque Transmitting Member 110A.

REFERENCE NUMERALS IN DRAWINGS

For the reference numerals in this specification, if used, the label M (number) after a labeling, where (number) is a number, such as M2 for example, is used to label different members of a part that is grouped under one label. And if used, the label S (number) after a labeling, where (number) is a number, such as S2 for example, is used to label the different shapes of a part that is grouped under one label.

Furthermore, the same parts that are used in different location might have a different labeling letter after their reference numeral, or a different reference numeral altogether if this is helpful in describing the invention. If two parts have the same reference numeral then they are identical unless otherwise described.

DETAILED DESCRIPTION OF THE INVENTION

Torque Transmitting Member and Non-Torque Transmitting Member for Usage with a Slightly Modified Commercially Available Transmission Belt (FIGS. 5 to 51)

In this section, a Torque Transmitting Member for a "Cone with One Torque Transmitting Member" or a "Cone with Two Oppositely Positioned Torque Transmitting Members", and a Non-Torque Transmitting Member for a "Cone with One Torque Transmitting Member", are described. The items of this section can be used with a slightly modified commercially available Transmission Belt, which is described in this section.

The Torque Transmitting Member and Non-Torque Transmitting Member of this section are for a "Cone with One Torque Transmitting Member" described in U.S. Pat. No. 8,628,439 (which is referred to as front pin belt cone assembly 520A in U.S. Pat. No. 8,628,439); for which the Cone (labeled as pin belt cone 540 in U.S. Pat. No. 8,628,439) of the "Cone with One Torque Transmitting Member" described in U.S. Pat. No. 8,628,439 is replaced with a Cone that has the slots (cuts) of Cone 12 of this specification. The Torque Transmitting Member of this section can also be used to construct a "Cone with Two Opposite Torque Transmitting Members", by replacing the Non-Torque Transmitting Member of a "Cone with One Torque Transmitting Member" with another Torque Transmitting Member.

Figure 2:
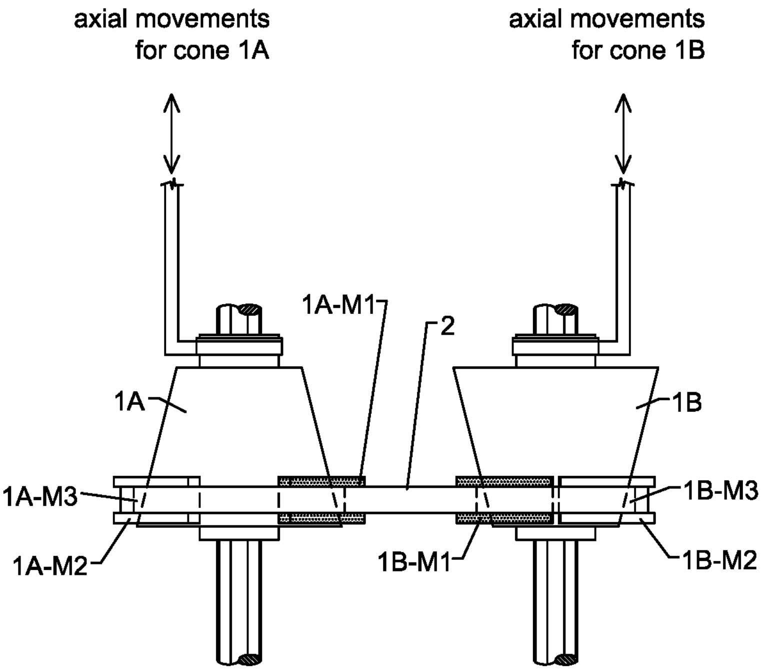
FIG. 2 shows a partial top-view of a CVT that is constructed of out of two "Cone with One Torque Transmitting Member".
Figure 1:
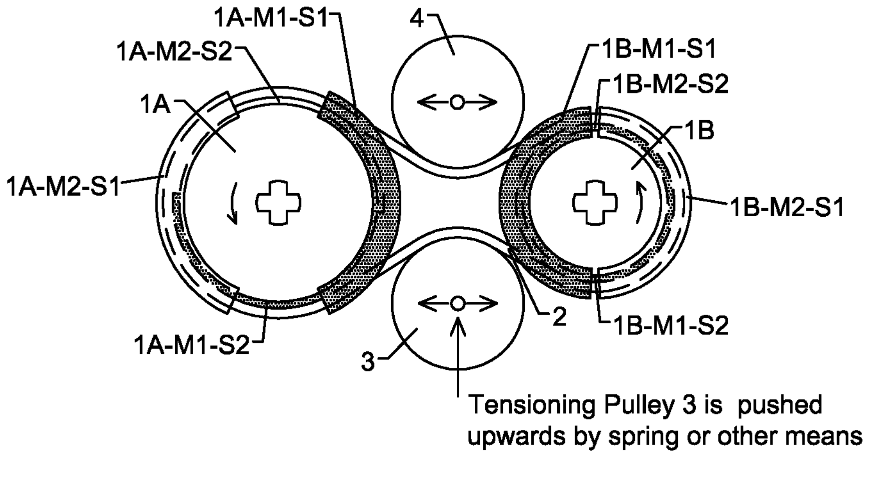
FIG. 1 shows a front-view of a CVT that is constructed of out of two "Cone with One Torque Transmitting Member".
Figure 4:
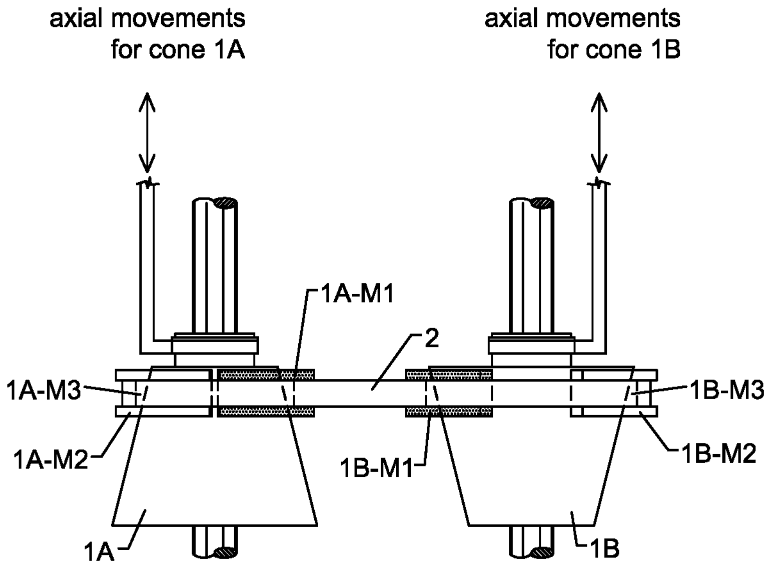
FIG. 4 shows another partial top-view of a CVT that is constructed of out of two "Cone with One Torque Transmitting Member".
Figure 3:
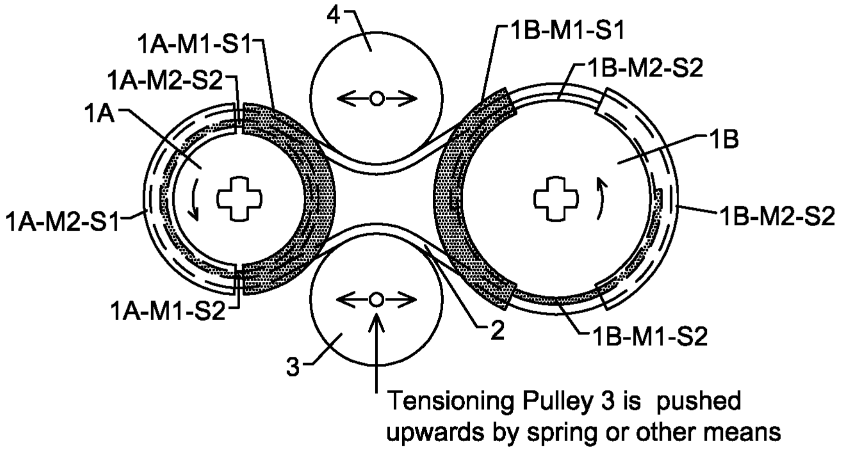
FIG. 3 shows another front-view of a CVT that is constructed of out of two "Cone with One Torque Transmitting Member".
Figure 6:
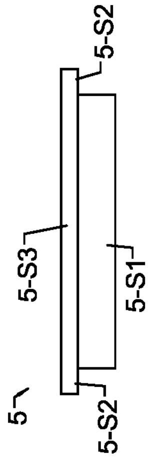
FIG. 6 shows a front-view of Transmission Belt 5.
Figure 5:
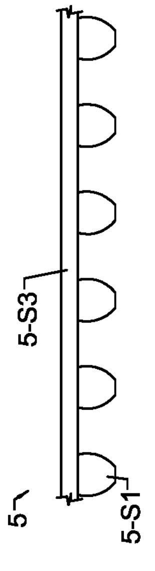
FIG. 5 shows a side-view of Transmission Belt 5.

The Transmission Belt to be used with the items of this section is shown in FIGS. 5 and 6, where it is labeled as Transmission Belt 5. Transmission Belt 5 comprises of Belt 5-S3 on which Teeth 5-S1 are shaped on the bottom surface of Belt 5-S3; in addition said Transmission Belt 5 also has Flanges 5-S2 that extend to the right of the right surface of Teeth 5-S1, and to the left of the left surface of Teeth 5-S1.

Teeth 5-S1 are used for torque transmission; and Flanges 5-S2 are used to support Transmission Belt 5 where necessary. Unlike a Transmission Pulley, a Cone Assembly to be used with the items of this section might provide less resting surfaces for its Transmission Belt; in order to compensate for this, additional strengthening reinforcements (such as shear strength reinforcements, etc.) can be added to Transmission Belt 5 if required.

The Torque Transmitting Member of this section, which is labeled as Torque Transmitting Member 7 (see FIGS. 25 and 26), comprises of a Torque Transmitting Member Section 7-M1 and a Leveling Extension 7-M2 (which is attached to the Trailing End of Torque Transmitting Member Section 7-M1). The incline of the bottom surfaces of Torque Transmitting Member Section 7-M1 and Leveling Extension 7-M2 should match the incline of the cone to which Torque Transmitting Member 7 is attached. Torque Transmitting Member 7 has a Leading End and Trailing End.

Torque Transmitting Member Section 7-M1 has teeth that can engage with the teeth of Transmission Belt 5. The cross-section of Torque Transmitting Member Section 7-M1, except for its Trailing End has a Left Section, a Right Section, and a Top Section, such that an Empty Middle Section is formed. The cross-section of the Trailing End of Torque Transmitting Member Section 7-M1 is solid, so that it does not have an Empty Middle Section; this is because the cross-section of the Trailing End of Torque Transmitting Member Section 7-M1 needs a surface to which Leveling Extension 7-M2 can be attached; as described previously, Leveling Extension 7-M2 is attached to the Trailing End of Torque Transmitting Member Section 7-M1.

Said Top Section is shaped such that it has teeth that can engage with the teeth of Transmission Belt 5, and such that it can support Transmission Belt 5 when it is resting on it. And said Empty Middle Section is used for inserting a Leveling Extension of an oppositely positioned Torque Transmitting Member (another Leveling Extension 7-M2) or an oppositely positioned Non-Torque Transmitting Member (Leveling Extension 10-M2); in a manner such the Leveling Extension of an oppositely positioned Torque Transmitting Member/Non-Torque Transmitting Member is laterally positioned between said Left Section and said Right Section, and vertically positioned between the "surface of the Cone to which it is attached" and the bottom surface of said Top Section.

Note: In this specification the term "Trailing End" is synonymous with the term "Rear End", and the term "Leading End" is synonymous with the term "Front End". But, whether the "Leading End" of a Torque Transmitting Member or Non-Torque Transmitting Member is actually positioned in-front of its "Trailing End" based on the direction its Cone is rotating, depends on whether that Torque Transmitting Member or Non-Torque Transmitting Member is attached to a Driving Cone or to a Driven Cone. When a Torque Transmitting Member or Non-Torque Transmitting Member is attached to a Driven Cone, then the Trailing End of that Torque Transmitting Member or Non-Torque Transmitting Member is preferably positioned in front of its Leading End; in this case, the Torque Transmitting Member or Non-Torque Transmitting Member is simply mounted in-reverse.

Torque Transmitting Member Section 7-M1 comprises of an elongated elastomer part that has reinforcement plates and reinforcement wires.

Figure 9:
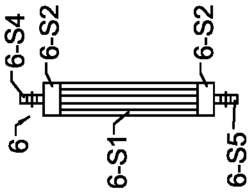
FIG. 9 shows a top-view of Reinforcement Plate 6.
Figure 8:
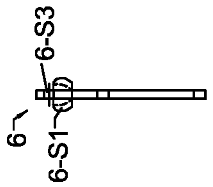
FIG. 8 shows a side-view of Reinforcement Plate 6.
Figure 7:
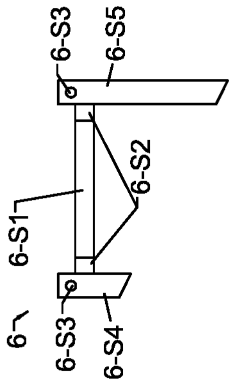
FIG. 7 shows a rear-view of Reinforcement Plate 6.

A reinforcement plate for Torque Transmitting Member Section 7-M1, which is labeled as Reinforcement Plate 6, is shown in FIGS. 7 to 9. Reinforcement Plate 6 is shaped like a flat plate for which its middle-section has been cut-out, so that the flat plate of Reinforcement Plate 6 has two vertical sides, which are Left Vertical Side 6-S4 and Right Vertical Side 6-S5 (see FIG. 7). The bottom surfaces of Left Vertical Side 6-S4 and Right Vertical Side 6-S5 have an incline that preferably matches the incline of their cone.

Left Vertical Side 6-S4 and Right Vertical Side 6-S5 are connected by a Tooth 6-S1 through Tooth Ends 6-S2, which are shaped on the left-end and right-end of Tooth 6-S1.

Tooth 6-S1 is shaped like a beam that has Tooth Shaped Cavity, which does not have a bottom surface (see FIG. 8).

Tooth Ends 6-S2 are basically end-walls that connect Tooth 6-S1 to Left Vertical Side 6-S4 and Right Vertical Side 6-S5; as such, Tooth Ends 6-S2 are solid so that they do not have said Tooth Shaped Cavity. Tooth Ends 6-S2 are used to provide resting surfaces for Flanges 5-S2 of said Transmission Belt 5.

Additionally, Left Vertical Side 6-S4 and Right Vertical Side 6-S5, each have a Hole 6-S3 for a Reinforcement Wire 8; said Holes 6-S3 should be vertically located so that the neutral-axis of Torque Transmitting Member Section 7-M1 vertically coincides with the neutral-axis of its Transmission Belt 5.

In order to attach a Torque Transmitting Member described in this section to a "Cone with One Torque Transmitting Member" of U.S. Pat. No. 8,628,439, which is modified so that its cone has the slots (cuts) of Cone 12 of this specification; a Leading End Reinforcement Plate 6A, a Trailing Sleeve Reinforcement Plate 6B, and a Trailing End Reinforcement Plate 6C are used. A Cone with One Torque Transmitting Member" of U.S. Pat. No. 8,628,439 is referred to as a front pin belt cone assembly 520A in U.S. Pat. No. 8,628,439 (refer to column 90 line 64 to column 99 line 11; and FIGS. 91A, 91B, 92A, 92B, 93 to 101 of U.S. Pat. No. 8,628,439).

Figure 12:
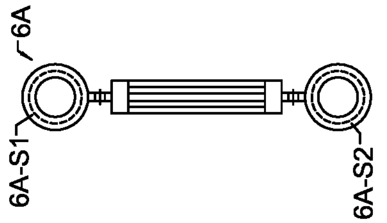
FIG. 12 shows a top-view of Leading End Reinforcement Plate 6A.
Figure 11:
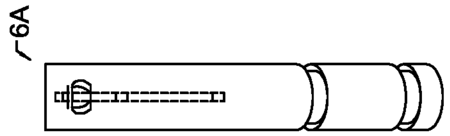
FIG. 11 shows a side-view of Leading End Reinforcement Plate 6A.
Figure 10:
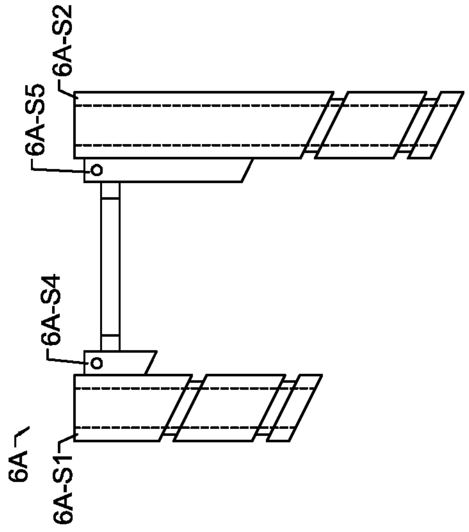
FIG. 10 shows a rear-view of Leading End Reinforcement Plate 6A.

FIGS. 10 to 12 show a Leading End Reinforcement Plate 6A. Leading End Reinforcement Plate 6A is identical to Reinforcement Plate 6, except that Attachment Sleeves are attached to its Left Vertical Side 6A-S4 and Right Vertical Side 6A-S5; these Attachment Sleeves are labeled as Attachment Sleeves 6A-S1 and 6A-S2.

Attachment Sleeves 6A-S1 and 6A-S2 are used to attach the Leading End of Torque Transmitting Member 7 to a torque transmitting member carriage 550A of a front pin belt cone assembly 520A of U.S. Pat. No. 8,628,439; using the same method the sleeves of the leading end of a pin belt torque transmitting member 590 are attached to its torque transmitting member carriage 550A in U.S. Pat. No. 8,628,439 (refer to column 90 line 63 to column 91 line 48 of U.S. Pat. No. 8,628,439).

Figure 15:
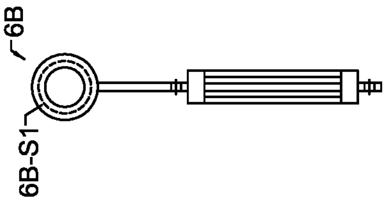
FIG. 15 shows a top-view of Trailing Sleeve Reinforcement Plate 6B.
Figure 14:
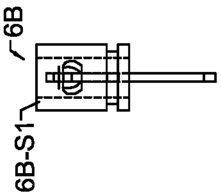
FIG. 14 shows a side-view of Trailing Sleeve Reinforcement Plate 6B.
Figure 13:
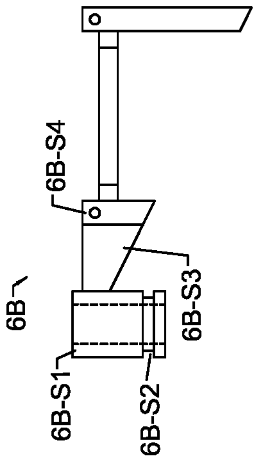
FIG. 13 shows a rear-view of Trailing Sleeve Reinforcement Plate 6B.

FIGS. 13 to 15 show a Trailing Sleeve Reinforcement Plate 6B. Trailing Sleeve Reinforcement Plate 6B is identical to Reinforcement Plate 6, except that an Attachment Sleeve 6B-S1 is attached to its Left Vertical Side 6B-S4, through an Extender 6B-S3. The minimum length of Extender 6B-S3 depends on the amount clearance required between the parts of front pin belt cone assembly 520A of U.S. Pat. No. 8,628,439.

The bottom end of Attachment Sleeve 6B-S1 has a Locking Ring Groove 6B-S2, which is used to secure Attachment Sleeve 6B-S1 to its cone by sliding a fastener such as a Dome Shaped Nut or a Ball Clamp (which is preferred) into Attachment Sleeve 6B-S1, and securing the fastener by inserting a Locking Ring into Locking Ring Groove 6B-S2 (refer to U.S. Pat. No. 8,628,439 for details).

Attachment Sleeve 6B-S1 is used to connect its Torque Transmitting Member to its Trailing End Slide; using the same method as the method used to connect the trailing end of a pin belt torque transmitting member 590 to its trailing end slide 565-S1, described in U.S. Pat. No. 8,628,439 (see FIGS. 91A, 91B, 92A, 92B, 93 to 99 of U.S. Pat. No. 8,628,439).

Figure 18:
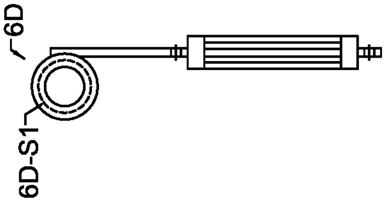
FIG. 18 shows a top-view of Trailing Sleeve Reinforcement Plate 6D.
Figure 17:
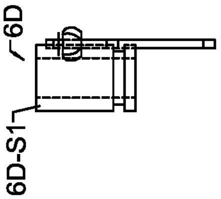
FIG. 17 shows a side-view of Trailing Sleeve Reinforcement Plate 6D.
Figure 16:
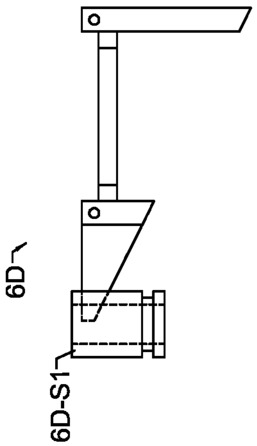
FIG. 16 shows a rear-view of Trailing Sleeve Reinforcement Plate 6D.
Figure 21:
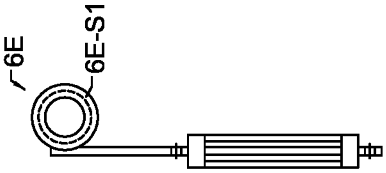
FIG. 21 shows a top-view of Trailing Sleeve Reinforcement Plate 6E.
Figure 20:
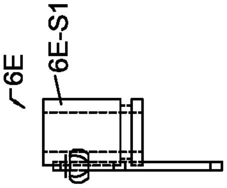
FIG. 20 shows a side-view of Trailing Sleeve Reinforcement Plate 6E.
Figure 19:
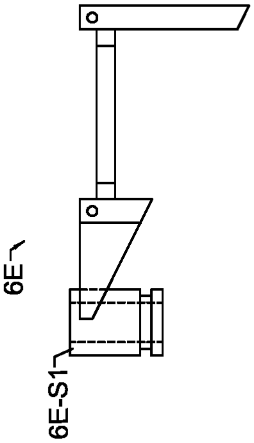
FIG. 19 shows a rear-view of Trailing Sleeve Reinforcement Plate 6E.

If necessary, for proper alignment of Attachment Sleeve 6B-S1 with Locking Ring Pin 6C-S3 in their Trailing End Slot (see paragraphs below for details); Attachment Sleeve 6B-S1 can be positioned behind or in-front of its Reinforcement Plate, or the length of Extender 6B-S3 can be adjusted accordingly. FIGS. 16 to 18 show a Trailing Sleeve Reinforcement Plate 6D for which its Attachment Sleeve 6D-S1 is positioned behind its Reinforcement Plate; and FIGS. 19 to 21 show a Trailing Sleeve Reinforcement Plate 6E for which its Attachment Sleeve 6E-S1 is positioned in-front of its Reinforcement Plate.

Figure 24:
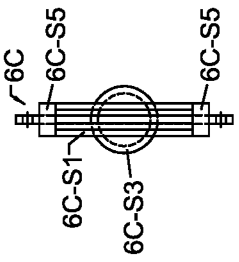
FIG. 24 shows a top-view of Trailing End Reinforcement Plate 6C.
Figure 23:
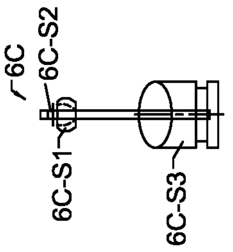
FIG. 23 shows a side-view of Trailing End Reinforcement Plate 6C.
Figure 22:
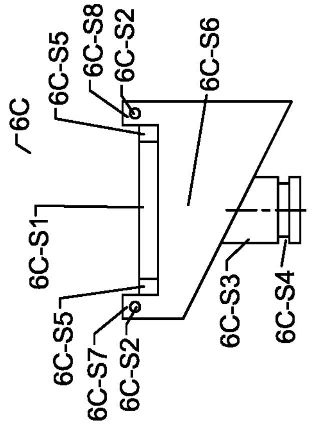
FIG. 22 shows a rear-view of Trailing End Reinforcement Plate 6C.

FIGS. 22 to 24 show a Trailing End Reinforcement Plate 6C. Trailing End Reinforcement Plate 6C has a Flat Plate that comprises of a Solid Middle Section 6C-S6, and a Left Vertical Raise 6C-S7 and a Right Vertical Raise 6C-S8 that extend above Solid Middle Section 6C-S6 (see FIG. 22). The bottom surface of Trailing End Reinforcement Plate 6C has an incline that preferably matches the incline of its cone.

A Tooth 6C-S1, which is shaped identically as Tooth 6-S1 of Reinforcement Plate 6, is fixed on top of Solid Middle Section 6C-S6. Like Tooth 6-S1, Tooth 6C-S1 also has two Tooth Ends, which are labeled as Tooth Ends 6C-S5 and are identical to Tooth Ends 6-S2.

Additionally, Left Vertical Raise 6C-S7 and Right Vertical Raise 6C-S8, each have a Hole 6C-S2 for a Reinforcement Wire 8; said Holes 6C-S2 should be vertically located so that the neutral-axis of Torque Transmitting Member Section 7-M1 vertically coincides with the neutral-axis of its Transmission Belt 5.

In addition, Trailing End Reinforcement Plate 6C also has a Locking Ring Pin 6C-S3, which is fixed to the bottom surface of Trailing End Reinforcement Plate 6C, preferably at the mid-width of the bottom surface of Trailing End Reinforcement Plate 6C. Locking Ring Pin 6C-S3 is used to secure the Trailing End of Transmitting Member Section 7-M1 to its cone by sliding a fastener such as a Dome Shaped Nut or a Ball Clamp (which is preferred) into Locking Ring Pin 6C-S3, and securing said fastener by inserting a Locking Ring into a Locking Ring Groove 6C-S4 of Locking Ring Pin 6C-S3 (refer to U.S. Pat. No. 8,628,439 for details).

Torque Transmitting Member 7 should be designed so that the "Locking Ring Pin 6C-S3 of Trailing End Reinforcement Plate 6C" and the "Attachment Sleeve of its Trailing Sleeve Reinforcement Plate (such as Attachment Sleeve 6B-S1, 6D-S1 or 6E-S1)" can slide in the same Trailing End Slot of their cone; in a manner so that Locking Ring Pin 6C-S3 engages with the front-surface of its Trailing End Slot, which is the surface of its Trailing End Slot that prevents Locking Ring Pin 6C-S3 from moving towards the Leading End of Torque Transmitting Member 7. The engagement of Locking Ring Pin 6C-S3 with the front-surface of its Trailing End Slot can be used to transfer Reverse Torque between Torque Transmitting Member 7 and its Cone. Reverse Torque is torque that pulls the Trailing End of Torque Transmitting Member 7 towards the Leading End of Torque Transmitting Member 7. If necessary, some movement/play between "Attachment Sleeve 6B-S1, 6D-S1 or 6E-S1" and its Trailing End Slot can be allowed. And if there are interferences between the fastener for Locking Ring Pin 6C-S3 and the fastener for "Attachment Sleeve 6B-S1, 6D-S1 or 6E-S1", then it is not necessary to use the fastener for "Attachment Sleeve 6B-S1, 6D-S1 or 6E-S1".

It is also preferable (but not necessarily) that-Locking Ring Pin 6C-S3 can engage with the rear-surface of its Trailing End Slot, which is the surface of its Trailing End Slot that prevents Locking Ring Pin 6C-S3 from moving away from the Leading End of Torque Transmitting Member 7.

Although this is not preferred, but if it is too impractical to place "Attachment Sleeve 6B-S1, 6D-S1 or 6E-S1" and Locking Ring Pin 6C-S3 in the same Trailing End Slot of their cone; then Locking Ring Pin 6C-S3 does not have to be used, so that it can removed from Trailing End Reinforcement Plate 6C. For this configuration, "Attachment Sleeve 6B-S1, 6D-S1 or 6E-S1" should be secured to its Cone using a fastener.

The Trailing End Slots for a cone are shown and labeled as Trailing End Cuts 540-S6 in FIG. 112B of U.S. Pat. No. 8,628,439; and shown and labeled as Torque Transmitting Member Trailing End Slot 12-A2 and Non-Torque Transmitting Member Trailing End Slot 12-B2 in FIGS. 52 and 53 of this specification.

The Leading End Slots for a cone are shown and labeled as Leading End Cuts 540-S1 in FIG. 112B of U.S. Pat. No. 8,628,439; and shown and labeled as Torque Transmitting Member Leading End Slot 12-A1 and Non-Torque Transmitting Member Leading End Slot 12-B1 in FIGS. 52 and 53 of this specification.

If a Cone uses one Torque Transmitting Member 7, then one Leading End Slot of said Cone is used for inserting Attachment Sleeves 6A-S1 and 6A-S2 of Leading End Reinforcement Plate 6A of that Torque Transmitting Member 7. And if a Cone uses two oppositely positioned Torque Transmitting Members 7, then both Leading End Slots of said Cone are used for inserting Attachment Sleeves 6A-S1 and 6A-S2 of a Leading End Reinforcement Plate 6A of a Torque Transmitting Member 7. Here into each Leading End Slot, Attachment Sleeves 6A-S1 and 6A-S2 of a Leading End Reinforcement Plate 6A of a Torque Transmitting Member 7 are inserted.

The proper location of "Attachment Sleeve 6B-S1, 6D-S1 or 6E-S1" relative to Locking Ring Pin 6C-S3, as well as the shape and size of all slots (cuts) of a Cone can be determined through trial-and-error and experimentation (such as tracing for example).

Torque Transmitting Member 7 is shown in FIGS. 25 to 30. It comprises of a Torque Transmitting Member Section 7-M1 and a Leveling Extension 7-M2 (which is attached to the Trailing End of Torque Transmitting Member Section 7-M1). Torque Transmitting Member Section 7-M1 has teeth that can engage with Teeth 5-S1 of Transmission Belt 5 (see FIG. 25). And the bottom surface of Leveling Extension 7-M2 has the same incline as the incline of the surfaces of its Cone; and the top surface of said Leveling Extension 7-M2 is level so that it can provide a level resting place for Teeth 5-S1 of Transmission Belt 5 (see FIG. 30).

The cross-section of Torque Transmitting Member Section 7-M1 except for its Trailing End (also referred to as its rear-end), has a Left Section, a Right Section, and a Top Section, such that an Empty Middle Section 7-M1-S5 is formed (see FIG. 28); this cross-section of Torque Transmitting Member Section 7-M1 is labeled as the Main Cross-Section of Torque Transmitting Member Section 7-M1. Said Top Section is shaped such that it has teeth that can engaged with Teeth 5-S1 of Transmission Belt 5, and such that it can support said Transmission Belt 5 when it is resting on it; and said Left Section and said Right Section are used to support said Top Section above said Empty Middle Section 7-M1-S5.

The cross-section of the Trailing End of Torque Transmitting Member Section 7-M1 is identical to the Main Cross-Section of Torque Transmitting Member Section 7-M1 described in the previous paragraph; except that it does not have an Empty Middle Section 7-M1-S5, so that said Left Section and said Right Section are replaced by a solid surface. This is because the cross-section of the Trailing End of Torque Transmitting Member Section 7-M1 needs a surface to which Leveling Extension 7-M2 can be attached to.

When Torque Transmitting Member 7 is used as the Torque Transmitting Member of a Cone with One Torque Transmitting Member or a Cone with Two Opposite Torque Transmitting Members, an oppositely positioned Torque Transmitting Member/Non-Torque Transmitting Member is attached oppositely of Torque Transmitting Member 7 on its Cone. Empty Middle Section 7-M1-S5 of Torque Transmitting Member 7 is used for inserting a Leveling Extension of said oppositely positioned Torque Transmitting Member/Non-Torque Transmitting Member; in a manner such that said Leveling Extension of said oppositely positioned Torque Transmitting Member/Non-Torque Transmitting Member can enter and exit Torque Transmitting Member 7 as required during pitch-diameter Change of its Cone.

When assembled on its Cone, Leveling Extension 7-M2 is inserted into the Empty Middle Section of said oppositely positioned Torque Transmitting Member/Non-Torque Transmitting Member in a manner such that it can enter and exit said oppositely positioned Torque Transmitting Member/Non-Torque Transmitting Member as required during pitch diameter Change of its Cone.

Figure 50:
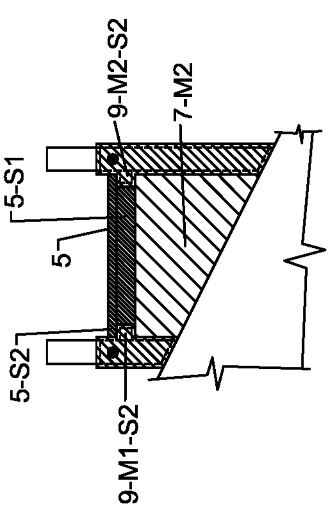
FIG. 50 shows the sectional-view of FIG. 47 in addition with the Leveling Extension of its Torque Transmitting Member (which is labeled as Leveling Extension 7-M2) and its Transmission Belt 5.

Depending on whether Torque Transmitting Member 7 is used as a Torque Transmitting Member of a Cone with One Torque Transmitting Member or a Cone with Two Opposite Torque Transmitting Members, said oppositely positioned Torque Transmitting Member/Non-Torque Transmitting Member is either another Torque Transmitting Member 7 or a Non-Torque Transmitting Member 10. FIG. 50 shows a sectional-rear-view for which Leveling Extension 7-M2 is inserted into the Empty Middle Section of Non-Torque Transmitting Member 10.

Torque Transmitting Member Section 7-M1 comprises of a Leading End Reinforcement Plate 6A, a Trailing Sleeve Reinforcement Plate 6B, a Trailing End Reinforcement Plate 6C, and several Reinforcement Plates 6 that are joined together by two Reinforcement Wires 8 and encased by elastomer members as shown in FIGS. 25 to 30 and as described below.

Figure 26:
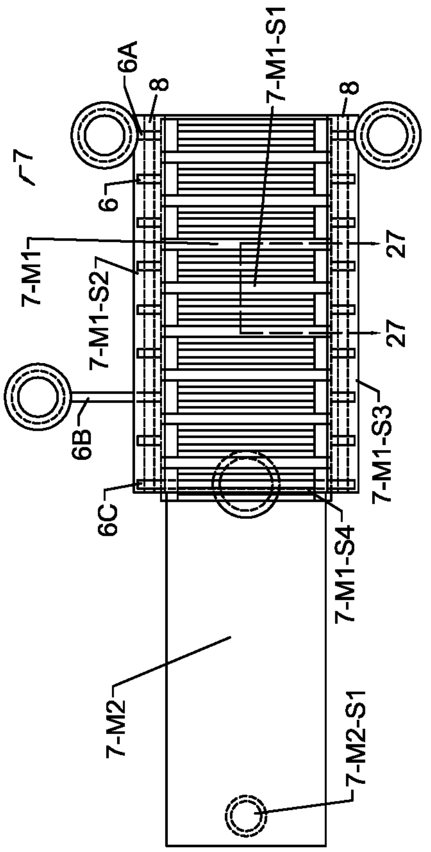
FIG. 26 shows a top-view of Torque Transmitting Member 7.
Figure 27:
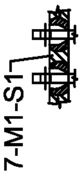
FIG. 27 shows a sectional-view of Torque Transmitting Member Section 7-M1.

Between all teeth of the reinforcement plates (which are Leading End Reinforcement Plate 6A, Trailing Sleeve Reinforcement Plate 6B, Trailing End Reinforcement Plate 6C, and the Reinforcement Plates 6), an elastomer Belt Resting Section 7-M1-S1 is fixed (see FIGS. 26 and 27). Belt Resting Sections 7-M1-S1 are used to provide a resting place for Transmission Belt 5 and its Flanges 5-S2 on Torque Transmitting Member Section 7-M1. And Belt Resting Sections 7-M1-S1 are also used to stiffen and strengthen Torque Transmitting Member Section 7-M1.

It is recommended that Teeth 5-S1 of Transmission Belt 5 can fully enter the teeth their Torque Transmitting Member Section 7-M1 (which are Teeth 6-S1 and 6C-S1). Through this engagement, the teeth of Torque Transmitting Member Section 7-M1 will also support Transmission Belt 5; so that if desired, Belt Resting Sections 7-M1-S1 can be omitted; but this is not preferred, since Belt Resting Sections 7-M1-S1 increase the lateral stiffness of Torque Transmitting Member Section 7-M1. Ideally, Torque Transmitting Member Section 7-M1 should be shaped/dimensioned such that Teeth 5-S1 that can fully enter into the teeth their Torque Transmitting Member Section 7-M1.

Figure 25:
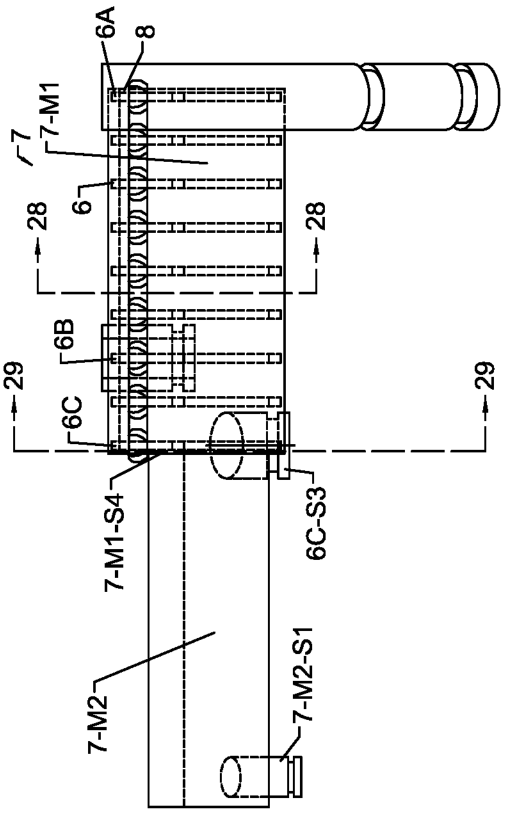
FIG. 25 shows a side-view of Torque Transmitting Member 7.
Figure 28:
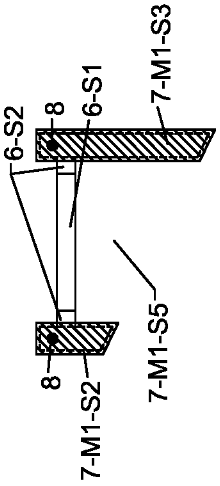
FIG. 28 shows a partial sectional-view of Torque Transmitting Member Section 7-M1.

A partial cross-section of Torque Transmitting Member Section 7-M1 as cut as shown in FIG. 25, is shown in FIG. 28; the only item not shown in FIG. 28 is Belt Resting Section 7-M1-S1, since Belt Resting Sections 7-M1-S1 are not part of a continues elastomer member that joins the reinforcement plates of Torque Transmitting Member Section 7-M1 along its length (from front to rear). The elastomer portions of said cross-section (which are cross-sections of elastomer members) and the Reinforcement Wires 8 are shown in hatching; these left side (labeled as Left Elastomer Member 7-M1-S2) and right side (labeled as Right Elastomer Member 7-M1-S3) elastomer members join the reinforcement plates of Torque Transmitting Member Section 7-S1 along their length.

Here Left Elastomer Member 7-M1-S2 joins the left sides (as seen from the rear) of Leading End Reinforcement Plate 6A, Reinforcement Plates 6, said Trailing Sleeve Reinforcement Plate 6B, and Trailing End Reinforcement Plate 6C along the length of Torque Transmitting Member Section 7-M1; so as to form said Left Section of Torque Transmitting Member Section 7-M1. And Right Elastomer Member 7-M1-S3 joins the right sides of Leading End Reinforcement Plate 6A, Reinforcement Plates 6, said Trailing Sleeve Reinforcement Plate 6B, and Trailing End Reinforcement Plate 6C along the length of Torque Transmitting Member Section 7-M1; so as to form said Right Section of Torque Transmitting Member Section 7-M1.

Left Elastomer Member 7-M1-S2 and Right Elastomer Member 7-M1-S3, which are shown in hatching in FIG. 28, run through the entire length of Torque Transmitting Member Section 7-M1, except for the rear-end (see FIG. 26).

Figure 29:
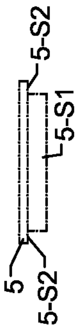
FIG. 29 shows another sectional-view of Torque Transmitting Member Section 7-M1.
Figure 29:
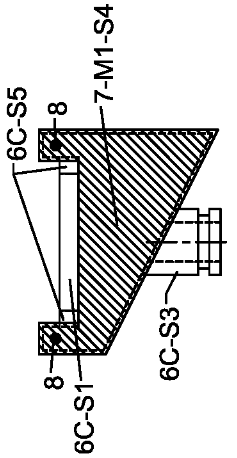

The rear-end (also referred to as the Trailing End) of Torque Transmitting Member Section 7-M1, which is shown as a sectional-view in FIG. 29, has a different cross-section than the rest of Torque Transmitting Member Section 7-M1, this is because Leveling Extension 7-M2 needs to be attached to it. The elastomer portion of this cross-section (which is labeled as Rear Elastomer Member 7-M1-S4) and the Reinforcement Wires 8 are shown in hatching in FIG. 29. Rear Elastomer Member 7-M1-S4 is also shown in FIGS. 25 and 26. Rear Elastomer Member 7-M1-S4 is shaped so that it has a surface to which Leveling Extension 7-M2 can be attached to. If instead of Leveling Extensions, a Leveling Loop that can expand and contract is used, then the cross-section shown in FIG. 29 as well as Leveling Extension 7-M2 are not needed.

FIG. 29 also shows a Transmission Belt 5 which is currently not engaged with its Torque Transmitting Member Section 7-M1. When engaged, the Teeth 5-S1 of Transmission Belt 5 are inside of the teeth of Torque Transmitting Member Section 7-M1. FIG. 29 shows a tooth of Torque Transmitting Member Section 7-M1, which is labeled as Tooth 6C-S1; the other teeth of Torque Transmitting Member Section 7-M1 are labeled as Teeth 6-S1 (see FIG. 28). And Flanges 5-S2 of Transmission Belt 5 are resting on the Tooth Ends of Torque Transmitting Member Section 7-M1. FIG. 29 shows two Tooth Ends of Torque Transmitting Member Section 7-M1, which are labeled as Tooth Ends 6C-S5; the other Tooth Ends of Torque Transmitting Member Section 7-M1 are labeled as Tooth Ends 6-S2 (see FIG. 28). Obviously here, the pitch of the teeth of Transmission Belt 5 should match the pitch of the teeth of Torque Transmitting Member Section 7-M1; and when the teeth of Transmission Belt 5 are engaged with the teeth of Torque Transmitting Member Section 7-M1, the neutral-axis of Transmission Belt 5 should coincide with the neutral-axis of Torque Transmitting Member Section 7-M1.

Figure 30:
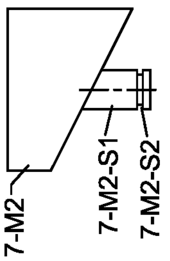
FIG. 30 shows a rear-view of Leveling Extension 7-M2.
Figure 33:
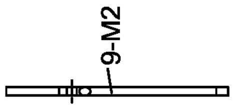
FIG. 33 shows a side-view of Reinforcement Plate 9-M2.

A rear-view of Leveling Extension 7-M2 is shown in FIG. 30. In its assembled state, Leveling Extension 7-M2 will be inserted into a Non-Torque Transmitting Member Section 10-M1 (described in the paragraphs below) or a Torque Transmitting Member Section 7-M1 of the Torque Transmitting Member 7 that is positioned opposite of its Torque Transmitting Member 7.

Leveling Extension 7-M2 has a Locking Ring Pin 7-M2-S1 (see FIGS. 25, 26, and 30). Locking Ring Pin 7-M2-S1 has a Locking Ring Groove 7-M2-S2 (see FIG. 30). Locking Ring Pin 7-M2-S1 is used to secure the rear-end of Leveling Extension 7-M2 to its cone using fasteners such as a Dome Shaped Nut or Ball Clamp (which is preferred) for example, and securing the fastener by inserting a Locking Ring into Locking Ring Groove 7-M2-S2 (refer to U.S. Pat. No. 8,628,439 for details). The shape and size of the slot (cut) for Locking Ring Pin 7-M2-S1 on its cone, as well as all other slots (cuts) of this specification, can be determined through trial-and-error and experimentation (such as tracing for example).

The Non-Torque Transmitting Member of this section, which is labeled as Non-Torque Transmitting Member 10 (see FIGS. 44 and 45), comprises of a Non-Torque Transmitting Member Section 10-M1 and a Leveling Extension 10-M2 (which is attached to the Trailing End of Non-Torque Transmitting Member Section 10-M1). The incline of the bottom surfaces of Non-Torque Transmitting Member Section 10-M1 and Leveling Extension 10-M2 should match the incline of the cone to which Non-Torque Transmitting Member 10.

Figures 44, 45, 46, 47, 48:
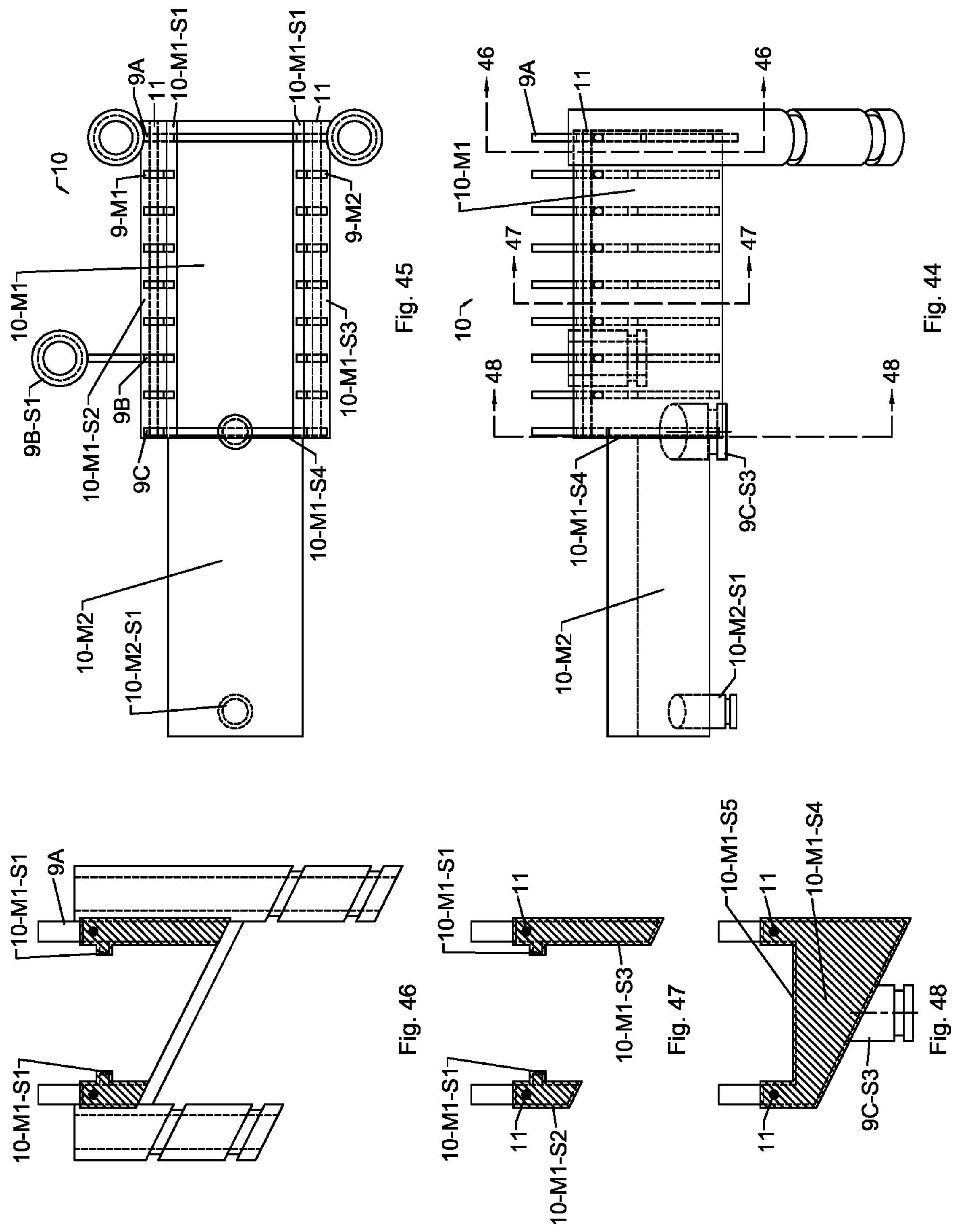
FIG. 44 shows a side-view of Non-Torque Transmitting Member 10.
FIG. 45 shows a top-view of Non-Torque Transmitting Member 10.
FIG. 46 shows a sectional-view of Non-Torque Transmitting Member Section 10-M1.
FIG. 47 shows another sectional-view of Non-Torque Transmitting Member Section 10-M1.
FIG. 48 shows another sectional-view of Non-Torque Transmitting Member Section 10-M1.

Non-Torque Transmitting Member Section 10-M1 has two elastomer side members that are joined at its Leading End and its Trailing End (see FIG. 45 for a top-view and FIG. 47 for a sectional-view of the two elastomer side members). One elastomer side member has Reinforcement Plates 9-M1 and a Trailing Sleeve Reinforcement Plate 9B (see FIG. 45); and the other elastomer side member has Reinforcement Plates 9-M2 (see FIG. 45). The two elastomer side members are then joined at the Leading End and the Trailing End of Non-Torque Transmitting Member Section 10-M1 using Leading End Reinforcement Plate 9A and Trailing End Reinforcement Plate 9C (see FIG. 45).

A Reinforcement Plate 9-M1 and a Reinforcement Plate 9-M2 are shown in FIGS. 31 to 34. The bottom surfaces of Reinforcement Plate 9-M1 and Reinforcement Plate 9-M2 have an incline that preferably matches the incline of their cone.

A Reinforcement Plate 9-M1 has a Hole 9-M1-S1, and a Reinforcement Plate 9-M2 has a Hole 9-M2-S1. These holes are for the reinforcement wires of Non-Torque Transmitting Member 10; and these holes should be located so that the neutral-axis of Non-Torque Transmitting Member 10 coincides with the neutral-axis of its Transmission Belt, which is Transmission Belt 5.

Figure 31:
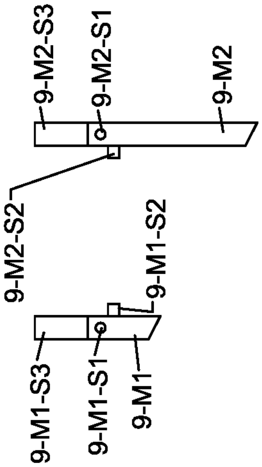
FIG. 31 shows a rear-view of Reinforcement Plate 9-M1 and Reinforcement Plate 9-M2.
Figure 34:
FIG. 34 shows a top-view of Reinforcement Plate 9-M1 and Reinforcement Plate 9-M2.
Figure 32:
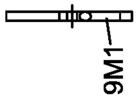
FIG. 32 shows a side-view of Reinforcement Plate 9-M1.

A Reinforcement Plate 9-M1 also has a Rail Reinforcement 9-M1-S2, and a Reinforcement Plate 9-M2 also has a Rail Reinforcement 9-M2-S2 (see FIG. 31). Rail Reinforcements 9-M1-S2 and 9-M2-S2 are used as reinforcements for rails that are: a) used to hold-in-place and guide the Leveling Extension that is inserted into Non-Torque Transmitting Member 10; and b) used to provide resting places for Flanges 5-S2 of their Transmission Belt 5 (see FIG. 50).

In addition, in order to prevent excessive vibration due to centrifugal forces, it is recommended that each "Reinforcement Plate Pair" and each "Reinforcement Plate" of a Non-Torque Transmitting Member 10 has the same weight as its corresponding (oppositely positioned on its cone) Reinforcement Plate of Torque Transmitting Member 7; so that the centrifugal forces of Non-Torque Transmitting Member 10 and Torque Transmitting Member 7 cancel each other out. For this purpose, a Reinforcement Plate 9-M1 also has a Balancing Weight 9-M1-S3, and a Reinforcement Plate 9-M2 also has a Balancing Weight 9-M2-S3 (see FIG. 31). These Balancing Weights are not necessary if other means for balancing the weight of the "Reinforcement Plate Pairs" and "Reinforcement Plates" are used; such as through the selection of material, adjusting the thickness of the plates, etc.

In order to attach Non-Torque Transmitting Member 10 to a "Cone with One Torque Transmitting Member" of U.S. Pat. No. 8,628,439, which is modified so that its cone has the slots (cuts) of Cone 12 of this specification; a Leading End Reinforcement Plate 9A, a Trailing Sleeve Reinforcement Plate 9B, and a Trailing End Reinforcement Plate 9C are used. A Cone with One Torque Transmitting Member" of U.S. Pat. No. 8,628,439 is referred to as a front pin belt cone assembly 520A in U.S. Pat. No. 8,628,439 (refer to column 90 line 64 to column 99 line 11; and FIGS. 91A, 91B, 92A, 92B, 93 to 101 of U.S. Pat. No. 8,628,439).

Figure 37:
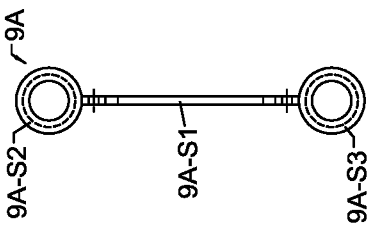
FIG. 37 shows a top-view of Leading End Reinforcement Plate 9A.
Figure 36:
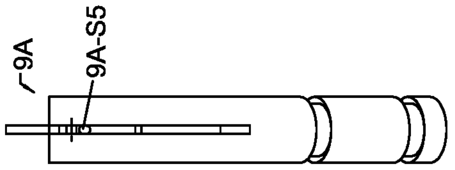
FIG. 36 shows a side-view of Leading End Reinforcement Plate 9A.
Figure 35:
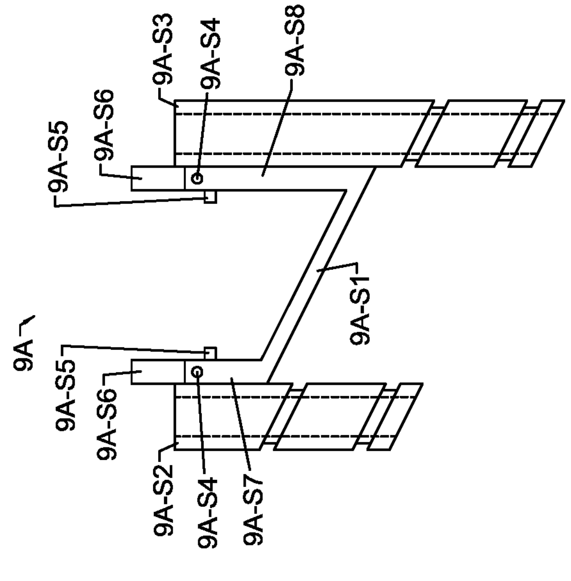
FIG. 35 shows a rear-view of Leading End Reinforcement Plate 9A.

Leading End Reinforcement Plate 9A is shown in FIGS. 35 to 37. It has a Left Vertical Side 9A-S7 and a Right Vertical Side 9A-S8, which are joined at their bases by an angled Base 9A-S1. When attached to its cone, Base 9A-S1 is positioned beneath the surface of its cone so that it is not in the way of the Leveling Extension that is inserted into Non-Torque Transmitting Member 10, which is resting on the surface of its cone. The bottom surface of Leading End Reinforcement Plate 9A has an incline that preferably matches the incline of its cone.

An Attachment Sleeve 9A-S2 is attached to Left Vertical Side 9A-S7; and an Attachment Sleeve 9A-S3 is attached to Right Vertical Side 9A-S8.

Attachment Sleeve 9A-S2 and Attachment Sleeve 9A-S3 are used to attach the Leading End of Non-Torque Transmitting Member 10 to a torque transmitting member carriage 550A of a front pin belt cone assembly 520A of U.S. Pat. No. 8,628,439; using the same method through which the sleeves of the leading end of a pin belt torque transmitting member 590 are attached to its torque transmitting member carriage 550A in U.S. Pat. No. 8,628,439 (refer to column 90 line 63 to column 91 line 48 of U.S. Pat. No. 8,628,439).

Leading End Reinforcement Plate 9A also has two Holes 9A-S4; these holes are for the reinforcement wires of Non-Torque Transmitting Member 10; these holes should be located so that the neutral-axis of Non-Torque Transmitting Member 10 coincides with the neutral-axis of its transmission belt, which is Transmission Belt 5.

Leading End Reinforcement Plate 9A also has two Rail Reinforcements 9A-S5. One Rail Reinforcement 9A-S5 is attached to Left Vertical Side 9A-S7, and the other Rail Reinforcement 9A-S5 is attached to Right Vertical Side 9A-S8. The Rail Reinforcement 9A-S5 that is attached to Left Vertical Side 9A-S7 has the same purpose as Rail Reinforcement 9-M1-S2 of Reinforcement Plate 9-M1; and the Rail Reinforcement 9A-S5 that is attached to Right Vertical Side 9A-S8 has the same purpose as Rail Reinforcement 9-M2-S2 of Reinforcement Plate 9-M2.

In addition, in order to prevent excessive vibration due to centrifugal forces, it is recommended that each "Reinforcement Plate Pair" and each "Reinforcement Plate" of a Non-Torque Transmitting Member 10 has the same weight as its corresponding (oppositely positioned on its cone) Reinforcement Plate of Torque Transmitting Member 7; so that the centrifugal forces of Non-Torque Transmitting Member 10 and Torque Transmitting Member 7 cancel each other out. For this purpose Leading End Reinforcement Plate 9A also has a Balancing Weights 9A-S6. These Balancing Weights are not necessary if other means for balancing the weight of the Reinforcement Plates are used; such as through the selection of material, adjusting the thickness of the plates, etc.

Figure 40:
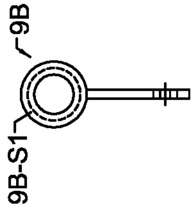
FIG. 40 shows a top-view of Trailing Sleeve Reinforcement Plate 9B.
Figure 39:
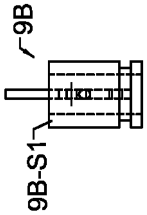
FIG. 39 shows a side-view of Trailing Sleeve Reinforcement Plate 9B.
Figure 38:
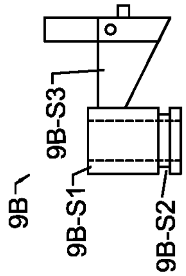
FIG. 38 shows a rear-view of Trailing Sleeve Reinforcement Plate 9B.

FIGS. 38 to 40 show a Trailing Sleeve Reinforcement Plate 9B. Trailing Sleeve Reinforcement Plate 9B is identical to Reinforcement Plate 9-M1; except that it has an Attachment Sleeve, which is labeled as Attachment Sleeve 9B-S1, attached to it through an Extender 9B-S3. The minimum length of Extender 9B-S3 depends on the amount clearance required between the parts of front pin belt cone assembly 520A of U.S. Pat. No. 8,628,439.

The bottom end of Attachment Sleeve 9B-S1 of Trailing Sleeve Reinforcement Plate 9B has a Locking Ring Groove 9B-S2, which is used to secure Attachment Sleeve 9B-S1 to its cone by sliding a fastener such as a Dome Shaped Nut or a Ball Clamp (which is preferred) into Attachment Sleeve 9B-S1, and securing the fastener by inserting a Locking Ring into Locking Ring Groove 9B-S2.

Attachment Sleeve 9B-S1 is used to connect its Non-Torque Transmitting Member to its Trailing End Slide; using the same method as the method used to connect the trailing end of a pin belt torque transmitting member 590 to its trailing end slide 565-S1, described in U.S. Pat. No. 8,628,439 (see FIGS. 91A, 91B, 92A, 92B, 93 to 99 of U.S. Pat. No. 8,628,439).

If necessary, for proper alignment of Attachment Sleeve 9B-S1 with Locking Ring Pin 9C-S3 in their Trailing End Slot (see paragraphs below for details); Attachment Sleeve 9B-S1 can be positioned behind or in-front of its Reinforcement Plate in the same manner as Attachment Sleeve 6B-S1 can be positioned behind or in-front of its Reinforcement Plate (see FIGS. 16 to 21), or the length of Extender 9B-S3 can be adjusted accordingly.

Figure 43:
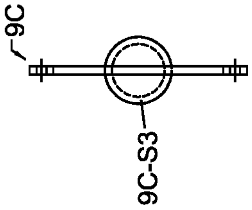
FIG. 43 shows a top-view of Trailing End Reinforcement Plate 9C.
Figure 42:
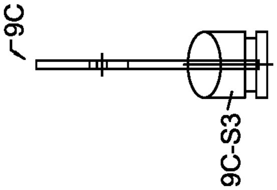
FIG. 42 shows a side-view of Trailing End Reinforcement Plate 9C.
Figure 41:
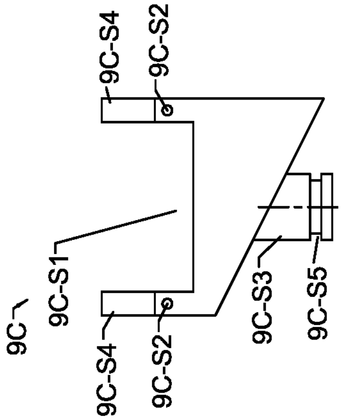
FIG. 41 shows a rear-view of Trailing End Reinforcement Plate 9C.

FIGS. 41 to 43 show a Trailing End Reinforcement Plate 9C. Trailing End Reinforcement Plate 9C is shaped like a flat plate that as a Cut-out Section 9C-S1 shaped on it. When its Non-Torque Transmitting Member Section (which is Non-Torque Transmitting Member Section 10-M1) is encased in elastomer (such as rubber, polyurethane, viton, etc.); then the elastomer portion that is covering the base of Cut-out Section 9C-S1, is used to provide a level resting base for Teeth 5-S1 of Transmission Belt 5; and the elastomer portions that are covering the sides of Cut-out Section 9C-S1 are used to maintain the lateral alignment of Transmission Belt 5 within Trailing End Reinforcement Plate 9C (see FIG. 51). Also, the bottom surface of Trailing End Reinforcement Plate 6C has an incline that preferably matches the incline of its cone.

Trailing End Reinforcement Plate 9C also has two Holes 9C-S2, one on each side of Cut-out Section 90-S1; these holes are for the reinforcement wires of Non-Torque Transmitting Member Section 10-M1; these holes should be located so that the neutral-axis of Non-Torque Transmitting Member Section 10-M1 vertically coincides with the neutral-axis of its Transmission Belt 5.

In addition, Trailing End Reinforcement Plate 9C also has a Locking Ring Pin 9C-S3, which is fixed to the bottom surface of Trailing End Reinforcement Plate 9C, preferably at the mid-width of the bottom surface of Trailing End Reinforcement Plate 9C. Locking Ring Pin 9C-S3 is used to secure the Trailing End of Non-Transmitting Member Section 10-M1 to its cone by sliding a fastener such as a Dome Shaped Nut or a Ball Clamp (which is preferred) into Locking Ring Pin 9C-S3, and securing said fastener by inserting a Locking Ring into a Locking Ring Groove 9C-S6 of Locking Ring Pin 6C-S3 (refer to U.S. Pat. No. 8,628,439 for details).

In addition, in order to prevent excessive vibration due to centrifugal forces, it is recommended that each "Reinforcement Plate Pair" and each "Reinforcement Plate" of a Non-Torque Transmitting Member 10 has the same weight as its corresponding (oppositely positioned on its cone) Reinforcement Plate of Torque Transmitting Member 7; so that the centrifugal forces of Non-Torque Transmitting Member 10 and Torque Transmitting Member 7 cancel each other out. For this purpose Trailing End Reinforcement Plate 9C also has a two Balancing Weights 9C-S4, one on each side of Cut-out Section 9C-S1. These Balancing Weights are not necessary if other means for balancing the weight of the Reinforcement Plates are used; such as through the selection of material, adjusting the thickness of the plates, etc.

Preferably, in order to keep Non-Torque Transmitting Member 10 tightly secured to its cone; Non-Torque Transmitting Member 10 is designed so that "Locking Ring Pin 9C-S3 of Trailing End Reinforcement Plate 9C" and "Attachment Sleeve 9B-S1 of Trailing Sleeve Reinforcement Plate 9B" can slide in the same Trailing End Slot of their cone, in a manner so that Locking Ring Pin 9C-S3 engages with the front-surface of its Trailing End Slot, which is the surface of its Trailing End Slot that prevents Locking Ring Pin 9C-S3 from moving towards the Leading End of Non-Torque Transmitting Member 10. And if there are interferences between the fastener for Locking Ring Pin 9C-S3 and the fastener for Attachment Sleeve 9B-S1, then it is not necessary to use the fastener for Attachment Sleeve 9B-S1.

It is also preferable (but not necessarily) that-Locking Ring Pin 9C-S3 can engage with the rear-surface of its Trailing End Slot, which is the surface of its Trailing End Slot that prevents Locking Ring Pin 9C-S3 from moving away from the Leading End of Non-Torque Transmitting Member 10.

Although this is not preferred, but if it is too impractical to place Attachment Sleeve 9B-S1 and Locking Ring Pin 9C-S3 in the same Trailing End Slot of their cone; then Locking Ring Pin 9C-S3 does not have to be used, so that it can removed from Trailing End Reinforcement Plate 9C. For this configuration, Attachment Sleeve 9B-S1 should be secured to its cone using a fastener.

The proper location of Attachment Sleeve 9B-S1 relative to Locking Ring Pin 9C-S3 as well as the shape and size of all slots (cuts) of their cone can be determined through trial-and-error and experimentation (such as tracing for example).

Non-Torque Transmitting Member 10 is shown in FIGS. 44 to 51 It comprises of a Non-Torque Transmitting Member Section 10-M1 and a Leveling Extension 10-M2 (which is attached to the Trailing End of Non-Torque Transmitting Member Section 10-M1). The bottom surface of Leveling Extension 7-M2 has the same incline as the incline of the surfaces of its Cone; and the top surface of said Leveling Extension 7-M2 is level so that it can provide a level resting place for Teeth 5-S1 of Transmission Belt 5 (see FIG. 49).

In its assembled state, Leveling Extension 10-M2 is inserted into the Empty Middle Section 7-M1-S5 of Torque Transmitting Member Section 7-M1 (see FIG. 28), in a manner such that it can enter and exit Torque Transmitting Member Section 7-M1 as required during pitch diameter Change of its Cone.

Non-Torque Transmitting Member Section 10-M1 has two elastomer side members that are joined at its Leading End and its Trailing End (see FIG. 45 for a top-view and FIG. 47 for a sectional-view of the two elastomer side members). One elastomer side member has Reinforcement Plates 9-M1 and a Trailing Sleeve Reinforcement Plate 9B (see FIG. 45); and the other elastomer side member has Reinforcement Plates 9-M2 (see FIG. 45). The two elastomer side members are then joined at the Leading End and the Trailing End of Non-Torque Transmitting Member Section 10-M1 using Leading End Reinforcement Plate 9A and Trailing End Reinforcement Plate 9C (see FIG. 45). Each elastomer side member has a Reinforcement Wire 11.

A cross-section of Non-Torque Transmitting Member Section 10-M1 as cut per FIG. 44 is shown in FIG. 47; this cross-section of Non-Torque Transmitting Member Section 10-M1 runs through the entire length of Non-Torque Transmitting Member Section 10-M1, except for its rear-end. In FIG. 47, the elastomer portions of said cross-section (which are sections of elastomer members) and the Reinforcement Wires 11 are shown in hatching. The left side elastomer member, which is labeled as Left Elastomer Member 10-M1-S2 (see FIGS. 45 and 47), "encases in elastomer", and as such joins, the left side of Leading End Reinforcement Plate 9A, Reinforcement Plates 9-M1, Trailing Sleeve Reinforcement Plate 9B, and the left side of Trailing End Reinforcement Plate 9C (see FIG. 45). The right side elastomer member, which labeled as Right Elastomer Member 10-M1-S3 (see FIGS. 45 and 47), "encases in elastomer", and as such joins, the right side of Leading End Reinforcement Plate 9A, Reinforcement Plates 9-M2, and the right side of Trailing End Reinforcement Plate 9C (see FIG. 45).

The cross-section of Non-Torque Transmitting Member Section 10-M1 shown in FIG. 47 also has two Male Rails 10-M1-S1, which are shown in hatching, and as such are encased in elastomer. The bottom surfaces of Male Rails 10-M1-S1 are used to guide Leveling Extension 7-M2 of Torque Transmitting Member 7 into Non-Torque Transmitting Member Section 10-M1. And the top surfaces of Male Rails 10-M1-S1 are used to provide a resting place for Flanges 5-S2 of Transmission Belt 5. FIG. 50, which clarifies the purpose of Male Rails 10-M1-S1 according to the previous sentence through a drawing, shows the cross-section of Non-Torque Transmitting Member Section 10-M1 shown in FIG. 47, with Leveling Extension 7-M2 and Transmission Belt 5.

The cross-section shown in FIG. 47 (which is used to provide support for Flanges 5-S2 of Transmission Belt 5 and guide Leveling Extension 7-M2 into Non-Torque Transmitting Member Section 10-M1) runs through the entire length of Non-Torque Transmitting Member Section 10-M1, except for its rear-end. Although the cross-section of Non-Torque Transmitting Member Section 10-M1 cut-through Leading End Reinforcement Plate 9A is also not identical, the "elastomer in-cased portions" of this cross-section (which are used to provide support for Flanges 5-S2 of Transmission Belt 5 and guide Leveling Extension 7-M2 into Non-Torque Transmitting Member Section 10-M1) are identical. FIG. 46, shows a cross-section of Non-Torque Transmitting Member Section 10-M1 that is cut near Leading End Reinforcement Plate 9A.

The rear-end of Non-Torque Transmitting Member Section 10-M1, which is shown in FIG. 48, has a different cross-section than the rest of Non-Torque Transmitting Member Section 10-M1, this is because Leveling Extension 10-M2 needs to be attached to it. The elastomer portion of this cross-section (which is labeled as Rear Elastomer Member 10-M1-S4) and the Reinforcement Wires 11 are shown in hatching in FIG. 48. Rear Elastomer Member 10-M1-S4 is also shown in FIGS. 44 and 45. Rear Elastomer Member 10-M1-S4 is shaped so that it has a surface to which Leveling Extension 10-M2 can be attached to.

Figure 51:
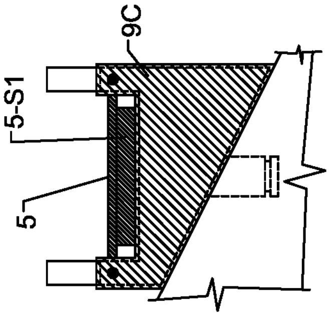
FIG. 51 shows the sectional-view of FIG. 48 in addition with its Transmission Belt 5.

Rear Elastomer Member 10-M1-S4, shown in FIG. 48, has a Transmission Belt Base 10-M1-S5, which is used to provide a base for Teeth 5-S1 of Transmission Belt 5. FIG. 51, which clarifies the purpose of Transmission Belt Base 10-M1-S5 according to the previous sentence through a drawing, shows the cross-section of Rear Elastomer Member 10-M1-S4 shown in FIG. 47, on which a Tooth 5-S1 of Transmission Belt 5 is resting on. If instead of Leveling Extensions, a Leveling Loop that can expand and contract is used, then the cross-section shown in FIG. 48 as well as Leveling Extension 10-M2 are not needed.

Figure 49:
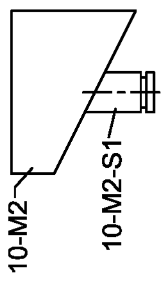
FIG. 49 shows a rear-view of Leveling Extension 10-M2.

A rear-view of Leveling Extension 10-M2 is shown in FIG. 49. In its assembled state, Leveling Extension 10-M2 will be inserted into Torque Transmitting Member Section 7-M1.

Leveling Extension 10-M2 has a Locking Ring Pin 10-M2-S1 (see FIGS. 44, 45, and 49). Locking Ring Pin 7-M2-S1 has a Locking Ring Groove 10-M2-S2 (see FIG. 49). Locking Ring Pin 10-M2-S1 is used to secure the rear-end of Leveling Extension 10-M2 to its cone using fasteners such as a Dome Shaped Nut or Ball Clamp (which is preferred) for example, and securing the fastener by inserting a Locking Ring into Locking Ring Groove 10-M2-S2 (refer to U.S. Pat. No. 8,628,439 for details). The shape and size of the slot (cut) for Locking Ring Pin 10-M2-S1 on its cone can be determined through trial-and-error and experimentation (such as tracing for example).

Figure 53:
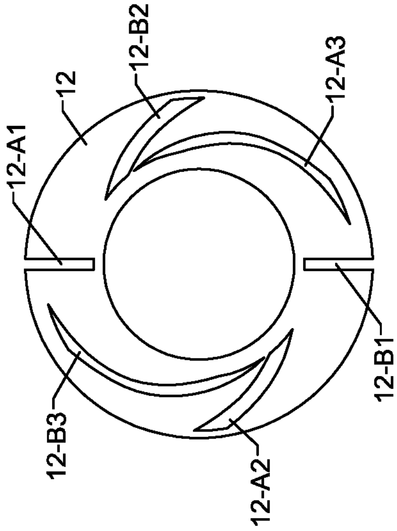
FIG. 53 shows a front-view of a Cone 12.
Figure 52:
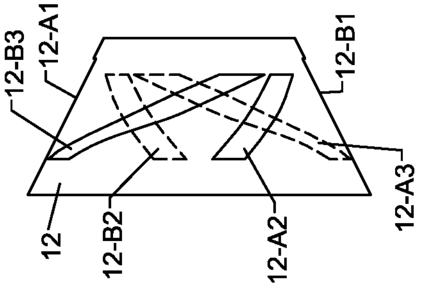
FIG. 52 shows a side-view of a Cone 12.

Cone for Usage with Torque Transmitting Member 7 and Non-Torque Transmitting Member 10 (FIGS. 52 and 53)

Since Torque Transmitting Member 7 and Non-Torque Transmitting Member 10 are to be used with the parts for pin belt cone assembly 520A of U.S. Pat. No. 8,628,439; the cone to be used for Torque Transmitting Member 7 and Non-Torque Transmitting Member 10 is identical to the cone of pin belt cone assembly 520A of U.S. Pat. No. 8,628,439, which is pin belt cone 540 of U.S. Pat. No. 8,628,439; except for having additional slots (cuts) for the Locking Ring Pins of the Leveling Extensions of Torque Transmitting Member 7 and Non-Torque Transmitting Member 10 (since pin belt cone assembly 520A does not have Leveling Extensions). All slots (cuts) for the cone to be used with Torque Transmitting Member 7 and Non-Torque Transmitting Member 10 are shown in FIGS. 52 and 53 (which shows a Cone 12) and described below.

For Torque Transmitting Member 7, Cone 12 has the following slots (cuts) (see FIGS. 52 and 53): a) Torque Transmitting Member Leading End Slot 12-A1, into which the sleeves of Leading End Reinforcement Plate 6A are inserted; b) Torque Transmitting Member Trailing End Slot 12-A2 (into which Locking Ring Pin 6C-S3; and Attachment Sleeve 6B-S1, 6D-S1, or 6E-S1 are inserted; and c) Torque Transmitting Member Leveling Extension Slot 12-A3, into which Locking Ring Pin 7-M2-S1 is inserted.

For Non-Torque Transmitting Member 10, Cone 12 (see FIGS. 52 and 53) has the following slots: a) Non-Torque Transmitting Member Leading End Slot 12-B1, into which the sleeves of Leading End Reinforcement Plate 9A are inserted; b) Non-Torque Transmitting Member Trailing End Slot 12-B2 (into which Locking Ring Pin 9C-S3 and Attachment Sleeve 9B-S1 are inserted); and c) Non-Torque Transmitting Member Leveling Extension Slot 12-B3, into which Locking Ring Pin 10-M2-S1 is inserted.

The slots shown in FIGS. 52 and 53 are not to scale and are not accurately drawn, but they represent the actual relative positions (between slots) where they should be located. Somebody skilled in the art should be able to determine the accurate shape of the slots through tracing, mathematics, etc.

Torque Transmitting Member with Teeth have a Bottom Surface (Base) (FIGS. 54 to 69)

In this section, a Torque Transmitting Member for a "Cone with One Torque Transmitting Member" or a "Cone with Two Oppositely Positioned Torque Transmitting Members", for which its Teeth have a bottom surface (Base) is described. The Torque Transmitting Member of this section, which is labeled as Torque Transmitting Member 19 is basically identical to Torque Transmitting Member 7, except that its Teeth have a bottom surface or Base.

Torque Transmitting Member 19 is for a "Cone with One Torque Transmitting Member" described in U.S. Pat. No. 8,628,439 (which is referred to as front pin belt cone assembly 520A in U.S. Pat. No. 8,628,439); for which the Cone (labeled as pin belt cone 540 in U.S. Pat. No. 8,628,439) of the "Cone with One Torque Transmitting Member" described in U.S. Pat. No. 8,628,439 is replaced with a Cone that has the slots and additional features of Cone 26 described in the "Cone with Leveling Extension Raising Sheets" section below. The Torque Transmitting Member of this section can also be used to construct a "Cone with Two Opposite Torque Transmitting Members", by replacing the Non-Torque Transmitting Member of a "Cone with One Torque Transmitting Member" with another Torque Transmitting Member.

Figure 57:
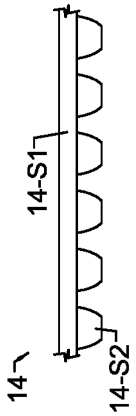
FIG. 57 shows a side-view Transmission Belt 14.
Figure 58:
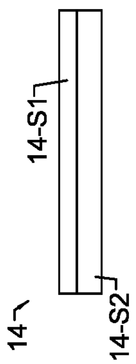
FIG. 58 shows a front-view Transmission Belt 14.

Torque Transmitting Member 19 can be used with a regular commercially available Transmission Belt, such as Transmission Belt 14. Transmission Belt 14, which comprises of Belt 14-S1 on which Teeth 14-S2 are shaped on the bottom surface of Belt 14-S1, is shown in FIGS. 57 and 58. If desired, the Torque Transmitting Member 19 can also be used with Transmission Belt that has side flanges, such as Transmission Belt 5; which is preferred because of the additional support the side flanges provide.

Figures 64, 65, 66, 67, 68, 69:
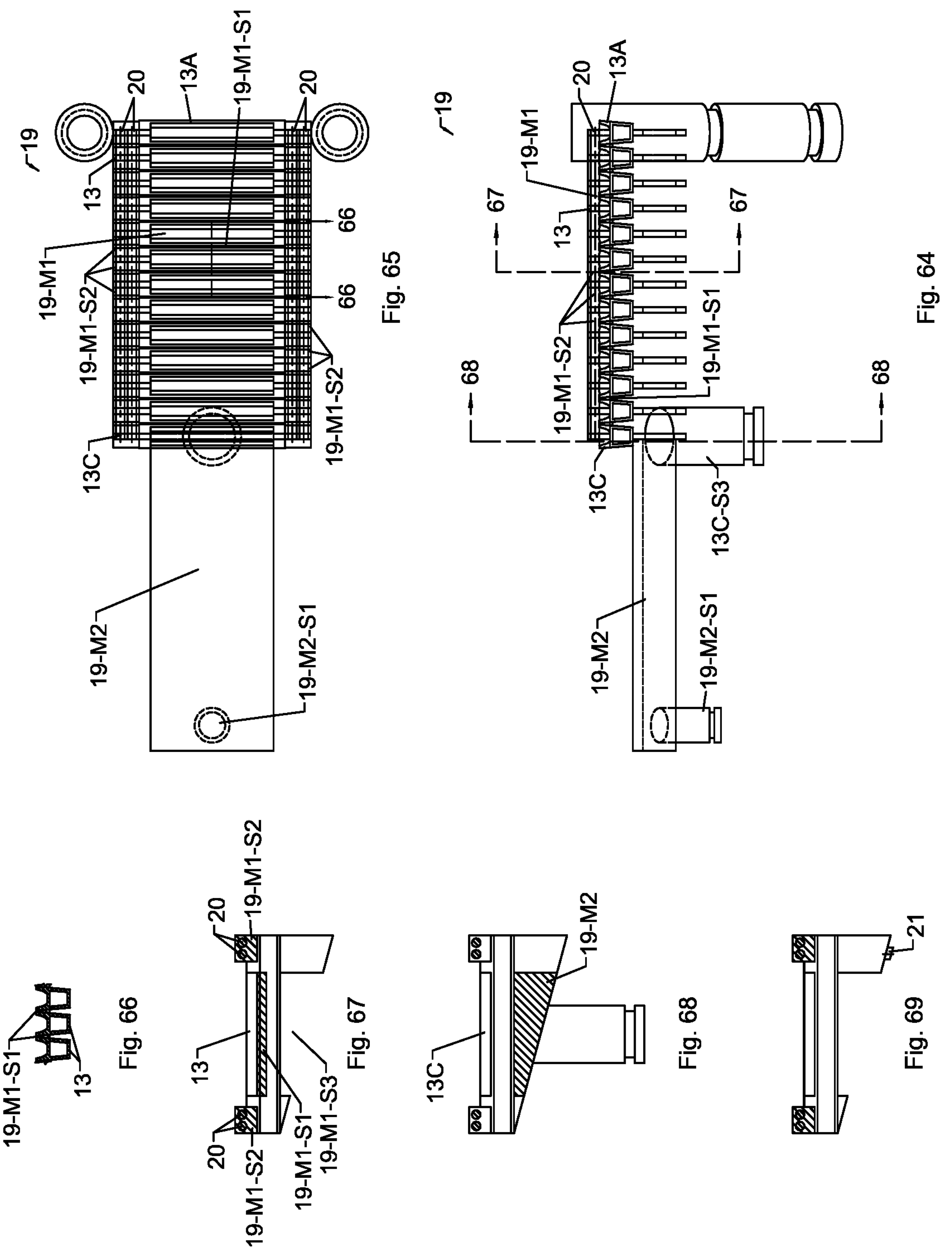
FIG. 64 shows a side-view of Torque Transmitting Member 19.
FIG. 65 shows a top-view of Torque Transmitting Member 19.
FIG. 66 shows a sectional-view of Torque Transmitting Member 19.
FIG. 67 shows another sectional-view of Torque Transmitting Member 19.
FIG. 68 shows another sectional-view of Torque Transmitting Member 19.
FIG. 69 shows a rear-view of a Reinforcement Plate that has an Alignment Pin 21.

Torque Transmitting Member 19 is shown in FIGS. 64 and 65. It comprises of a Torque Transmitting Member Section 19-M1 and a Leveling Extension 19-M2 (which is attached to the Trailing End of Torque Transmitting Member Section 19-M1). The incline of the bottom surfaces of Torque Transmitting Member Section 19-M1 and Leveling Extension 19-M2 should match the incline of the cone to which Torque Transmitting Member 19 is attached. Torque Transmitting Member 19 has a Leading End and Trailing End.

Torque Transmitting Member Section 19-M1 has teeth that can engage with the teeth of its Transmission Belt. The cross-section of Torque Transmitting Member Section 19-M1, except for its Trailing End has a Left Section, a Right Section, and a Top Section, such that an Empty Middle Section is formed. The cross-section of the Trailing End of Torque Transmitting Member Section 19-M1 is solid, so that it does not have an Empty Middle Section; this is because the cross-section of the Trailing End of Torque Transmitting Member Section 19-M1 needs a surface to which Leveling Extension 19-M2 can be attached; as described previously, Leveling Extension 19-M2 is attached to the Trailing End of Torque Transmitting Member Section 19-M1.

Said Top Section is shaped such that it has teeth that can engage with the teeth of its Transmission Belt, and such that it can support its Transmission Belt 14 when it is resting on it. And said Empty Middle Section is used for inserting a Leveling Extension of an oppositely positioned Torque Transmitting Member (another Leveling Extension 19-M2) or an oppositely positioned Non-Torque Transmitting Member (Leveling Extension 23-M2); in a manner such the Leveling Extension of an oppositely positioned Torque Transmitting Member/Non-Torque Transmitting Member is laterally positioned between said Left Section and said Right Section, and vertically positioned between the "surface of the Cone to which it is attached" and the bottom surface of said Top Section.

Torque Transmitting Member Section 19-M1 comprises of reinforcement plates that are held together by reinforcement wires and elastomer members.

Figure 54:
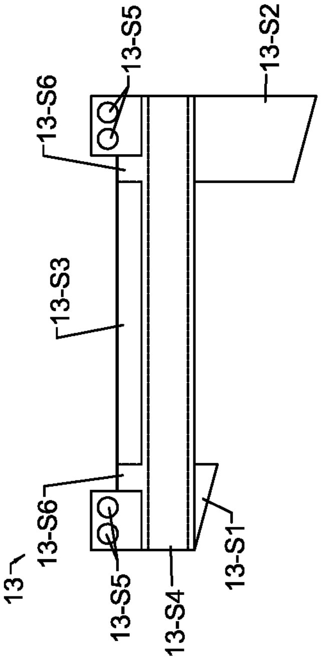
FIG. 54 shows a rear-view of Reinforcement Plate 13.
Figure 55:
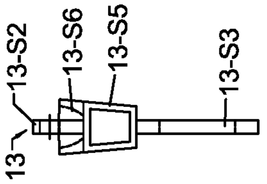
FIG. 55 shows a side-view of Reinforcement Plate 13.
Figure 56:
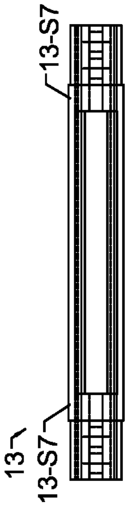
FIG. 56 shows a top-view of Reinforcement Plate 13.

A Reinforcement Plate for Torque Transmitting Member 19 is shown in FIGS. 54 to 56, where it is labeled as Reinforcement Plate 13.

Reinforcement Plate 13 is basically identical to Reinforcement Plate 6 of Torque Transmitting Member 7, except that it has a Base. Reinforcement Plate 13 is preferred over Reinforcement Plate 6, since its Base will increase the strength of its tooth considerably.

The problem with having a Base is that because the Base has some thickness, "the top surface of its Leveling Extension (which is positioned beneath said Base)" and "the bottom surface of the tooth of its Reinforcement Plate" will have different heights. And since both surfaces are used to provide a resting base for the bottom surfaces of the teeth of their Transmission Belt, here the bottom surfaces of the teeth of their Transmission Belt will be resting on surfaces of different heights. This problem is addressed in the "Cone with Leveling Extension Raising Sheets" and "Cone with Leveling Extension Raising Surfaces" sections below.

Reinforcement Plate 13 is shown in FIGS. 54 to 56. It comprises of two vertical legs, which are a Left Leg 13-S1 and a Right Leg 13-S2, that are connected by a Tooth 13-S3 and its Base 13-S4, which is shaped beneath Tooth 13-S6. Left Leg 13-S1 and Right Leg 13-S2 each have two Holes 13-S5; each Hole 13-S5 is for a Reinforcement Wire 20. Holes 13-S5 should be vertically located so that the neutral-axis of Torque Transmitting Member 19-M1 vertically coincides with the neutral-axis of its Transmission Belt.

Shaped to the left and right of Tooth 13-S3 are Tooth Ends 13-S6. Tooth Ends 13-S6 can be used to provide a resting base for the flanges of a Transmission Belt that has flanges, such as Transmission Belt 5.

The empty space between Left Leg 13-S1 and Right Leg 13-S2 (which is located below Base 13-S4) forms the Empty Middle Section of Torque Transmitting Member 19-M1; it is used for the insertion of a Leveling Extension of an opposite positioned Torque Transmitting Member/Non-Torque Torque Transmitting Member.

In order to attach Torque Transmitting Member 19 to a "Cone with One Torque Transmitting Member" of U.S. Pat. No. 8,628,439, which is modified so that its cone has the slots (cuts) and additional features of Cone 26 of this specification; a Leading End Reinforcement Plate 25A, a Trailing Sleeve Reinforcement Plate 25B, and a Trailing End Reinforcement Plate 25C are used. A Cone with One Torque Transmitting Member" of U.S. Pat. No. 8,628,439 is referred to as a front pin belt cone assembly 520A in U.S. Pat. No. 8,628,439 (refer to column 90 line 64 to column 99 line 11; and FIGS. 91A, 91B, 92A, 92B, 93 to 101 of U.S. Pat. No. 8,628,439).

Figure 59:
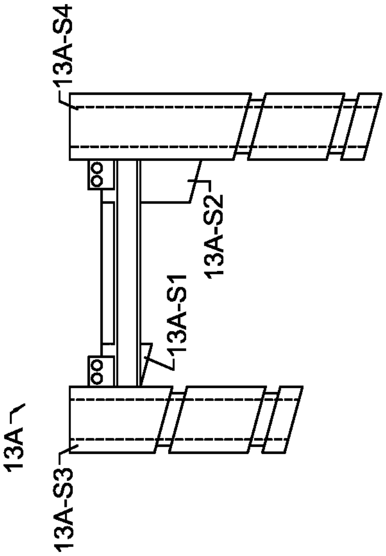
FIG. 59 shows a rear-view of Leading End Reinforcement Plate 13A.

FIG. 59 show a Leading End Reinforcement Plate 13A. Leading End Reinforcement Plate 13A is identical to Reinforcement Plate 13, except that Attachment Sleeves are attached to its Left Leg 13A-S1 and its Right Leg 13A-S2; these Attachment Sleeves are labeled as Attachment Sleeve 13A-S3 and Attachment Sleeve 13A-S4.

Attachment Sleeves 13A-S3 and 13A-S4 are used to attach the Leading End of Torque Transmitting Member 19 to a torque transmitting member carriage 550A of a front pin belt cone assembly 520A of U.S. Pat. No. 8,628,439; using the same method the sleeves of the leading end of a pin belt torque transmitting member 590 are attached to its torque transmitting member carriage 550A in U.S. Pat. No. 8,628,439 (refer to column 90 line 63 to column 91 line 48 of U.S. Pat. No. 8,628,439).

Figure 60:
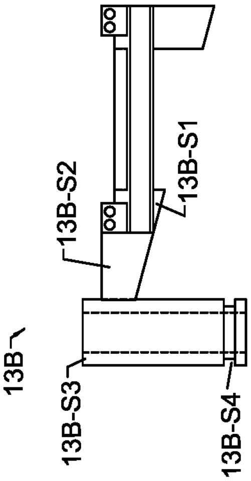
FIG. 60 shows a rear-view of Trailing Sleeve Reinforcement Plate 13B.

FIG. 60 shows a Trailing Sleeve Reinforcement Plate 13B. Trailing Sleeve Reinforcement Plate 13B is identical to Reinforcement Plate 13, except that an Attachment Sleeve 13B-S3 is attached to its Left Leg 13B-S1, through an Extender 13B-S2. The minimum length of Extender 13B-S2 depends on the amount clearance required between the parts of front pin belt cone assembly 520A of U.S. Pat. No. 8,628,439.

The bottom end of Attachment Sleeve 13B-S3 has a Locking Ring Groove 13B-S4, which is used to secure Attachment Sleeve 13B-S3 to its cone by sliding a fastener such as a Dome Shaped Nut or a Ball Clamp (which is preferred) into Attachment Sleeve 13B-S3, and securing the fastener by inserting a Locking Ring into Locking Ring Groove 13B-S4 (refer to U.S. Pat. No. 8,628,439 for details).

Attachment Sleeve 13B-S3 is used to connect Torque Transmitting Member 19 to its Trailing End Slide; using the same method as the method used to connect the trailing end of a pin belt torque transmitting member 590 to its trailing end slide 565-S1, described in U.S. Pat. No. 8,628,439 (see FIGS. 91A, 91B, 92A, 92B, 93 to 99 of U.S. Pat. No. 8,628,439).

Figure 62:
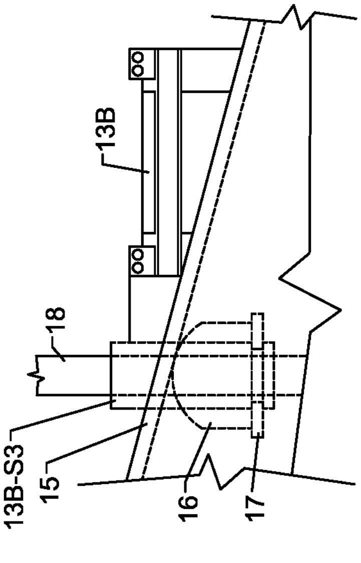
FIG. 62 shows a rear-view of a Trailing Sleeve Reinforcement Plate 13B that is attached to its Cone 15 using a Dome Shaped Nut 16 and Locking Ring 17.

FIG. 62 shows how Trailing Sleeve Reinforcement Plate 13B is attached to its Cone 15. Here Attachment Sleeve 13B-S3 is first slid onto Trailing End Slide 18, and then secured from beneath the surface of its Cone 15 by sliding a Dome Shaped Nut 16 into Attachment Sleeve 13B-S3, and securing Dome Shaped Nut 16 by inserting a Locking Ring 17 into Locking Ring Groove 13B-S4 (see FIG. 60).

Figure 61:
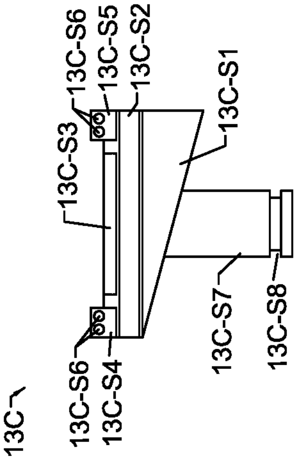
FIG. 61 shows a rear-view of Trailing End Reinforcement Plate 13C.

FIG. 61 shows a Trailing End Reinforcement Plate 13C. Trailing End Reinforcement Plate 13C comprise of a Flat Plate 13C-S1 on which a Tooth 13C-S3 and its Base 13C-S2 are shaped on top of it. Tooth 13C-S3 and Base 13C-S2 are shaped exactly like Tooth 13-S3 and Base 13-S4 of Reinforcement Plate 13.

Additionally, Trailing End Reinforcement Plate 13C also has Left Reinforcement Plate 13C-S4 that is shaped to the left of Tooth 13C-S3; and a Right Reinforcement Plat 13C-S5 that is shaped to the right of Tooth 13C-S3. Left Reinforcement Plat 13C-S4 and Right Reinforcement Plat 13C-S5 each have two Holes 13C-S6 for a Reinforcement Wire 20 each. Holes 13C-S6 should be vertically located so that the neutral-axis of Torque Transmitting Member Section 19-M1 vertically coincides with the neutral-axis of its Transmission Belt. And Holes 13C-S6 should align with Holes 13-S5 of Reinforcement Plate 13.

In addition, Trailing End Reinforcement Plate 13C also has a Locking Ring Pin 13C-S7. Locking Ring Pin 13C-S7 is used to secure the Trailing End of Torque Transmitting Member 19 to its Cone by sliding a fastener such as a Dome Shaped Nut or a Ball Clamp (which is preferred) into Locking Ring Pin 13C-S7, and securing the fastener by inserting a Locking Ring into Locking Ring Groove 13C-S8 of Locking Ring Pin 13C-S7.

Figure 63:
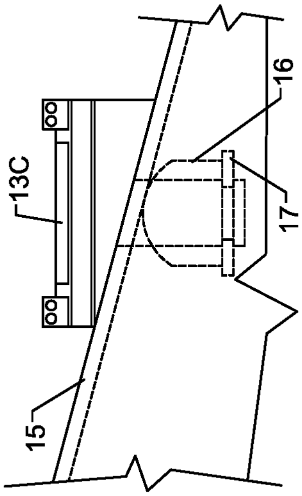
FIG. 63 shows a rear-view of a Trailing End Reinforcement Plate 13C that is attached to its Cone 15 using a Dome Shaped Nut 16 and Locking Ring 17.

FIG. 63 shows how Trailing End Reinforcement Plate 13C is attached to its Cone 15 by sliding a Dome Shaped Nut 16 into Locking Ring Pin 13C-S7 (see FIG. 61), and securing Dome Shaped Nut 16 by inserting a Locking Ring 17 into Locking Ring Groove 13C-S8 (see FIG. 61).

Torque Transmitting Member 19 should be designed so that "Locking Ring Pin 13C-S7 of Trailing End Reinforcement Plate 13C" and "Attachment Sleeve 13B-S3 of Trailing Sleeve Reinforcement Plate 13B" can slide in the same Trailing End Slot of their cone; in a manner so that Locking Ring Pin 13C-S7 engages with the front-surface of its Trailing End Slot, which is the surface of its Trailing End Slot that prevents Locking Ring Pin 13C-S7 from moving towards the Leading End of Torque Transmitting Member 19. The engagement of Locking Ring Pin 13C-S7 with the front-surface of its Trailing End Slot can be used to transfer Reverse Torque between Torque Transmitting Member 19 and its Cone. Reverse Torque is torque that pulls the Trailing End of Torque Transmitting Member 19 towards the Leading End of Torque Transmitting Member 19. If necessary, some movement/play between Attachment Sleeve 13B-S3 and its Trailing End Slot can be allowed. And if there are interferences between the fastener for Locking Ring Pin 13C-S7 and the fastener for Attachment Sleeve 13B-S3, then it is not necessary to use the fastener for Attachment Sleeve 13B-S3.

It is also preferable (but not necessarily) that Locking Ring Pin 13C-S7 can engage with the rear-surface of its Trailing End Slot, which is the surface of its Trailing End Slot that prevents Locking Ring Pin 13C-S7 from moving away from the Leading End of Torque Transmitting Member 19.

The Trailing End Slots for a cone are shown and labeled as Trailing End Cuts 540-S6 in FIG. 112B of U.S. Pat. No. 8,628,439; and shown and labeled as Torque Transmitting Member Trailing End Slot 12-A2 and Non-Torque Transmitting Member Trailing End Slot 12-B2 in FIGS. 52 and 53 of this specification.

The Leading End Slots for a cone are shown and labeled as Leading End Cuts 540-S1 in FIG. 112B of U.S. Pat. No. 8,628,439; and shown and labeled as Torque Transmitting Member Leading End Slot 12-A1 and Non-Torque Transmitting Member Leading End Slot 12-B1 in FIGS. 52 and 53 of this specification.

If a Cone uses one Torque Transmitting Member 19, then one Leading End Slot of said Cone is used for inserting Attachment Sleeves 13A-S3 and 13A-S4 of Leading End Reinforcement Plate 13A of that Torque Transmitting Member 19. And if a Cone uses two oppositely positioned Torque Transmitting Members 19, then both Leading End Slots of said Cone are used for inserting Attachment Sleeves 13A-S3 and 13A-S4 of a Leading End Reinforcement Plate 13A of a Torque Transmitting Member 19. Here into each Leading End Slot, Attachment Sleeves 13A-S3 and 13A-S4 of a Leading End Reinforcement Plate 6A of a Torque Transmitting Member 19 are inserted.

Torque Transmitting Member 19 is shown in FIGS. 64 to 69. It comprises of a Torque Transmitting Member Section 19-M1 and a Leveling Extension 19-M2 (which is attached to the Trailing End of Torque Transmitting Member Section 19-M1). Torque Transmitting Member Section 19-M1 has teeth that can engage with the teeth of its Transmission Belt. And the bottom surface of Leveling Extension 19-M2 has the same incline as the incline of the surfaces of its Cone; and the top surface of said Leveling Extension 19-M2 is level so that it can provide a level resting place for the teeth of its Transmission Belt (see FIG. 68).

Torque Transmitting Member Section 19-M1 comprises of the following previously described Reinforcement Plates for Torque Transmitting Member Section 19-M1: Leading End Reinforcement Plate 13A, Trailing End Reinforcement Plate 13C, and Reinforcement Plates 13, that are joined together by four Reinforcement Wires 20, Longitudinal Elastomer Members 19-M1-S2, and Lateral Elastomer Member 19-M1-S1. Trailing Sleeve Reinforcement Plate 13B will not be used.

Trailing Sleeve Reinforcement Plate 13B, which if used, will perform the same purpose as Trailing Sleeve Reinforcement Plate 6B. Torque Transmitting Member Section 19-M1 does not use Trailing Sleeve Reinforcement Plate 13B because here in order to control and maintain and the axial alignment of the rear-end of Torque Transmitting Member Section 19-M1, the axial alignment of Locking Ring Pin 13C-S3 is controlled and maintained by using a Telescope of the "Telescopes for maintaining the normality and the axial position of two oppositely positioned Locking Ring Pins" section below.

Positioned between all Reinforcement Plates of Torque Transmitting Member Section 19-M1 are two Longitudinal Elastomer Members 19-M1-S2, one Longitudinal Elastomer Member 19-M1-S2 encases the Reinforcement Wires 20 that are positioned to the left of the teeth of its Reinforcement Plates and the other Longitudinal Elastomer Members 19-M1-S2 encases the Reinforcement Wires 20 that are positioned to the right of the teeth of its Reinforcement Plates (see FIGS. 64, 65, and 67). The purpose of Longitudinal Elastomer Members 19-M1-S2 is to maintain the proper distance and alignment of the teeth of Torque Transmitting Member Section 19-M1.

Also positioned between all Reinforcement Plates of Torque Transmitting Member Section 19-M1 is a Lateral Elastomer Member 19-M1-S1 (see FIGS. 64, 65, and 66). Lateral Elastomer Members 19-M1-S1 are used to provide additional resting places for its Transmission Belt. Since its Transmission Belt can also rests on the teeth of Torque Transmitting Member Section 19-M1; Lateral Elastomer Members 19-M1-S1 are not absolutely necessary, but are recommended since they increase the lateral stiffness of Torque Transmitting Member Section 19-M1.

The cross-section of Torque Transmitting Member Section 19-M1 except for its Trailing End, has a Left Section, a Right Section, and a Top Section, such that an Empty Middle Section 19-M1-S3 is formed (see FIG. 67); this cross-section of Torque Transmitting Member Section 19-M1 is referred to as the Main Cross-Section of Torque Transmitting Member Section 19-M1. Said Top Section is shaped such that it has teeth that can engaged with the teeth of its Transmission Belt, and such that it can support its Transmission Belt when it is resting on it; and said Left Section and said Right Section are used to support said Top Section above Empty Middle Section 19-M1-S3.

The cross-section of the rear-end (also referred to as the Trailing End) of Torque Transmitting Member Section 19-M1 is identical to the Main Cross-Section of Torque Transmitting Member Section 19-M1 described in the previous paragraph; except that it does not have an Empty Middle Section 19-M1-S3, so that said Left Section, said Right Section and Empty Middle Section 19-M1-S3 are replaced by a solid surface. This is because the cross-section of the rear-end of Torque Transmitting Member Section 19-M1 needs a surface to which Leveling Extension 19-M2 can be attached to.

The rear-end (also referred to as the Trailing End) of Torque Transmitting Member Section 19-M1 is shown in FIG. 68. Unlike the rest of Torque Transmitting Member Section 19-M1, the rear-end of Torque Transmitting Member Section 19-M1 does not have an Empty Middle Section 19-M1-S3, since it needs a surface to which Leveling Extension 19-M2 can be attached. The rear-end of Torque Transmitting Member Section 19-M1 is formed by Trailing End Reinforcement Plate 13C.

The front-end of Leveling Extension 19-M2 is fixed/bonded to Trailing End Reinforcement Plate 13C (see FIG. 68). Leveling Extension 19-M2 has a Locking Ring Pin 19-M2-S1 (see FIG. 64). Locking Ring Pin 19-M2-S1 is used to secure the rear-end of Leveling Extension 19-M2 to its cone by using fasteners such as a Dome Shaped Nut or Ball Clamp (which is preferred) for example, and a Locking Ring.

When Torque Transmitting Member 19 is used as the Torque Transmitting Member of a Cone with One Torque Transmitting Member or a Cone with Two Opposite Torque Transmitting Members, an oppositely positioned Torque Transmitting Member/Non-Torque Transmitting Member is attached oppositely of Torque Transmitting Member 19 on its Cone. Empty Middle Section 19-M1-S3 of Torque Transmitting Member 19 is used for inserting a Leveling Extension of said oppositely positioned Torque Transmitting Member/Non-Torque Transmitting Member; in a manner such that said Leveling Extension of said oppositely positioned Torque Transmitting Member/Non-Torque Transmitting Member can enter and exit Torque Transmitting Member 19 as required during pitch diameter Change of its Cone.

When assembled on its Cone, Leveling Extension 19-M2 is inserted into the Empty Middle Section of said oppositely positioned Torque Transmitting Member/Non-Torque Transmitting Member in a manner such that it can enter and exit said oppositely positioned Torque Transmitting Member/Non-Torque Transmitting Member as required during pitch diameter Change of its Cone.

Depending on whether Torque Transmitting Member 19 is used as a Torque Transmitting Member of a Cone with One Torque Transmitting Member or a Cone with Two Opposite Torque Transmitting Members, said oppositely positioned Torque Transmitting Member/Non-Torque Transmitting Member is either another Torque Transmitting Member 19 or a Non-Torque Transmitting Member 23, which is described below.

In order to help maintain the proper alignment/normality of a Reinforcement Plate; a Reinforcement Plate can have an Alignment Pin 21 (see FIG. 69), which slides in a slot (preferably non-penetrating) of its cone. The proper shape and dimension of said slot can be obtained through tracing, mathematics, etc.

Non-Torque Transmitting Member that has a Bottom Surface for Teeth (Base) (FIGS. 70 to 80)

The Non-Torque Transmitting Member described in this section, which is labeled as Non-Torque Transmitting Member 23, is to be used with Torque Transmitting Member 19 described in the previous section. In order to prevent excessive vibration due to centrifugal forces, it preferably has the same weight as its Torque Transmitting Member.

Non-Torque Transmitting Member 23 is similar to Non-Torque Transmitting Member 10, described previously, except that it has a surface on which the bottom surfaces of the teeth of its Transmission Belt can rest.

Figure 77:
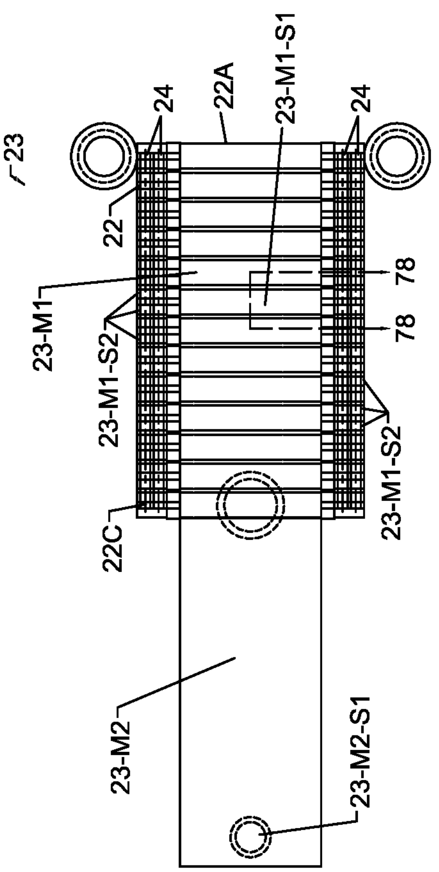
FIG. 77 shows a top-view of Non-Torque Transmitting Member 23.
Figure 76:
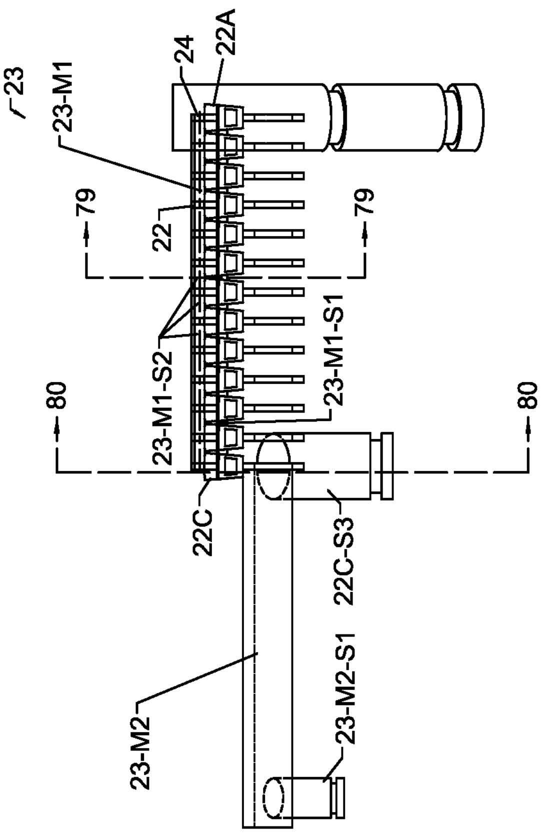
FIG. 76 shows a side-view of Non-Torque Transmitting Member 23.

Non-Torque Transmitting Member 23 is shown in FIGS. 76 and 77. It comprises of a Non-Torque Transmitting Member Section 23-M1 and a Leveling Extension 23-M2 (which is attached to the Trailing End of Non-Torque Transmitting Member Section 23-M1). The incline of the bottom surfaces of Non-Torque Transmitting Member Section 23-M1 and Leveling Extension 23-M2 should match the incline of the cone to which Non-Torque Transmitting Member 23 is attached. Non-Torque Transmitting Member 23 has a Leading End and Trailing End.

Non-Torque Transmitting Member Section 23-M1 has a surface on which the bottom surfaces of the teeth of its Transmission Belt can rest. The cross-section of Non-Torque Transmitting Member Section 23-M1, except for its Trailing End has a Left Section, a Right Section, and a Top Section, such that an Empty Middle Section is formed. The cross-section of the Trailing End of Non-Torque Transmitting Member Section 23-M1 is solid, so that it does not have an Empty Middle Section; this is because the cross-section of the Trailing End of Non-Torque Transmitting Member Section 23-M1 needs a surface to which Leveling Extension 23-M2 can be attached; as described previously, Leveling Extension 23-M2 is attached to the Trailing End of Non-Torque Transmitting Member Section 23-M1.

Said Top Section is shaped such that it has a surface on which the bottom surfaces of the teeth of its Transmission Belt can rest. And said Empty Middle Section is used for inserting a Leveling Extension of its Torque Transmitting Member (which is oppositely positioned relative to Non-Torque Transmitting Member 23 on the conical surface of their cone); in a manner such the Leveling Extension of its Torque Transmitting Member is laterally positioned between said Left Section and said Right Section, and vertically positioned between the "surface (which is the conical surface) of the cone to which it is attached" and the bottom surface of said Top Section.

Non-Torque Transmitting Member Section 23-M1 comprises of reinforcement plates that are held together by reinforcement wires and elastomer members.

Figure 72:
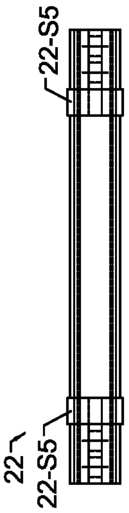
FIG. 72 shows a top-view of Reinforcement Plate 22.
Figure 70:
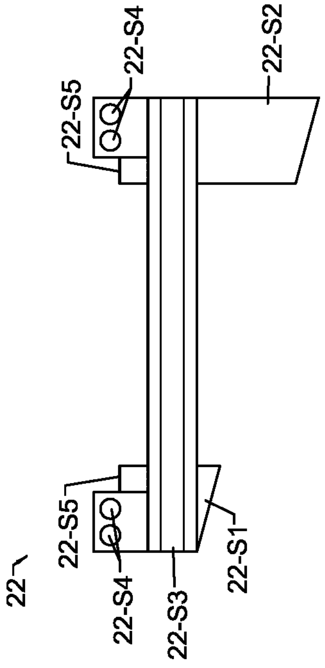
FIG. 70 shows a rear-view of Reinforcement Plate 22.
Figure 71:
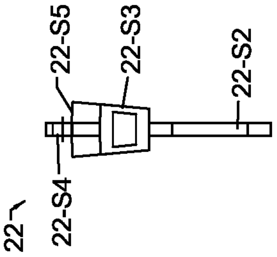
FIG. 71 shows a side-view of Reinforcement Plate 22.

A Reinforcement Plate for Non-Torque Transmitting Member 23 is shown in FIGS. 70 to 72, where it is labeled as Reinforcement Plate 22.

Reinforcement Plate 22 is basically identical to Reinforcement Plates 9-M1 and 9-M2 of Non-Torque Transmitting Member 10, except that it has a Base, which joins the two Reinforcement Plate Pairs (comprising of Reinforcement Plates 9-M1 and 9-M2) into one Reinforcement Plate.

Reinforcement Plate 22 is shown in FIGS. 70 to 72. It comprises of two vertical legs, which are a Left Leg 22-S1 and a Right Leg 22-S2, that are connected by a Base 22-S3. Left Leg 22-S1 and Right Leg 22-S2 each have two Holes 22-S4; each Hole 22-S4 is for a Reinforcement Wire 24. Holes 22-S4 should be vertically located so that the neutral-axis of Non-Torque Transmitting Member 23 vertically coincides with the neutral-axis of its Transmission Belt.

Shaped on top of Base 22-S3 are Belt Flange Rests 22-S5. Like Tooth Ends 13-S6, Belt Flange Rests 22-S5 can be used to provide resting bases for the flanges of a Transmission Belt that has flanges, such as Transmission Belt 5. If used with a Transmission Belt that does not have flanges, then Belt Flange Rests 22-S5 are not needed.

The empty space between Left Leg 22-S1 and Right Leg 22-S2 (which is located below Base 22-S3) forms the Empty Middle Section of Non-Torque Transmitting Member 23; it is used for the insertion of the Leveling Extension of Torque Transmitting Member 19.

In order to attach Non-Torque Transmitting Member 23 to a "Cone with One Torque Transmitting Member" of U.S. Pat. No. 8,628,439, which is modified so that its cone has the slots (cuts) and additional features of Cone 26 of this specification; a Leading End Reinforcement Plate 22A, a Trailing Sleeve Reinforcement Plate 22B, and a Trailing End Reinforcement Plate 22C are used. A Cone with One Torque Transmitting Member" of U.S. Pat. No. 8,628,439 is referred to as a front pin belt cone assembly 520A in U.S. Pat. No. 8,628,439 (refer to column 90 line 64 to column 99 line 11; and FIGS. 91A, 91B, 92A, 92B, 93 to 101 of U.S. Pat. No. 8,628,439).

Figure 73:
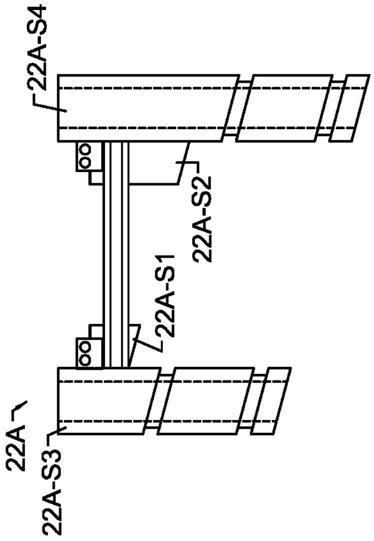
FIG. 73 shows a rear-view of Leading End Reinforcement Plate 22A.

FIG. 73 show a Leading End Reinforcement Plate 22A. Leading End Reinforcement Plate 22A is identical to Reinforcement Plate 22, except that Attachment Sleeves are attached to its Left Leg 22A-S1 and its Right Leg 22A-S2; these Attachment Sleeves are labeled as Attachment Sleeve 22A-S3 and Attachment Sleeve 22A-S4.

Attachment Sleeves 22A-S3 and 22A-S4 are used to attach the Leading End of Non-Torque Transmitting Member 23 to a torque transmitting member carriage 550A of a front pin belt cone assembly 520A of U.S. Pat. No. 8,628, 439; using the same method the sleeves of the leading end of a pin belt torque transmitting member 590 are attached to its torque transmitting member carriage 550A in U.S. Pat. No. 8,628,439 (refer to column 90 line 63 to column 91 line 48 of U.S. Pat. No. 8,628,439).

Figure 74:
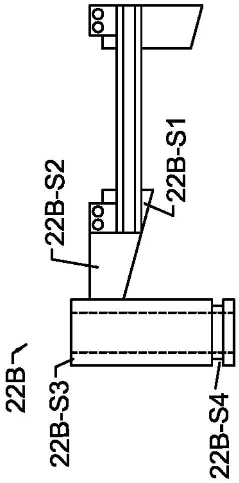
FIG. 74 shows a rear-view of Trailing Sleeve Reinforcement Plate 22B.

FIG. 74 shows a Trailing Sleeve Reinforcement Plate 22B. Trailing Sleeve Reinforcement Plate 22B is identical to Reinforcement Plate 22, except that an Attachment Sleeve 22B-S3 is attached to its Left Leg 22B-S1, through an Extender 22B-S2. The minimum length of Extender 22B-S2 depends on the amount clearance required between the parts of front pin belt cone assembly 520A of U.S. Pat. No. 8,628,439.

The bottom end of Attachment Sleeve 22B-S3 has a Locking Ring Groove 22B-S4, which is used to secure Attachment Sleeve 22B-S3 to its cone by sliding a fastener such as a Dome Shaped Nut or a Ball Clamp (which is preferred) into Attachment Sleeve 22B-S3, and securing the fastener by inserting a Locking Ring into Locking Ring Groove 22B-S4 (refer to U.S. Pat. No. 8,628,439 for details).

Attachment Sleeve 22B-S3 is used to connect Non-Torque Transmitting Member 23 to its Trailing End Slide; using the same method as the method used to connect the trailing end of a pin belt torque transmitting member 590 to its trailing end slide 565-S1, described in U.S. Pat. No. 8,628,439 (see FIGS. 91A, 91B, 92A, 92B, 93 to 99 of U.S. Pat. No. 8,628,439).

Figure 75:
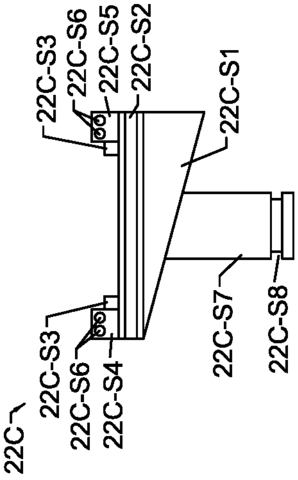
FIG. 75 shows a rear-view of Trailing End Reinforcement Plate 22C.

FIG. 75 shows a Trailing End Reinforcement Plate 22C. Trailing End Reinforcement Plate 22C comprise of a Flat Plate 22C-S1 on which a Base 22C-S2 is shaped on top of it. And shaped on top of Base 22C-S2 are Belt Flange Rests 22C-S3. Base 22C-S2 and Belt Flange Rests 22C-S3 are shaped exactly like Base 22-S3 and Belt Flange Rests 22-S5 of Reinforcement Plate 22.

Additionally, Trailing End Reinforcement Plate 22C also has Left Reinforcement Plate 22C-S4 and a Right Reinforcement Plat 22C-S5. Left Reinforcement Plat 22C-S4 and Right Reinforcement Plat 22C-S5 each have two Holes 22C-S6; each Hole 22C-S6 is for a Reinforcement Wire 24. Holes 22C-S6 should be vertically located so that the neutral-axis of Non-Torque Transmitting Member Section 23-M1 vertically coincides with the neutral-axis of its Transmission Belt. And Holes 22C-S6 should align with Holes 22-S4 of Reinforcement Plate 22.

In addition, Trailing End Reinforcement Plate 22C also has a Locking Ring Pin 22C-S7. Locking Ring Pin 22C-S7 is used to secure the Trailing End of Non-Torque Transmitting Member 23 to its Cone by sliding a fastener such as a Dome Shaped Nut or a Ball Clamp (which is preferred) into Locking Ring Pin 22C-S7, and securing the fastener by inserting a Locking Ring into Locking Ring Groove 22C-S8 of Locking Ring Pin 22C-S7.

Non-Torque Transmitting Member 23 should be designed so that "Locking Ring Pin 22C-S7 of Trailing End Reinforcement Plate 22C" and "Attachment Sleeve 22B-S3 of Trailing Sleeve Reinforcement Plate 22B" can slide in the same Trailing End Slot of their cone; in a manner so that Locking Ring Pin 22C-S7 engages with the front-surface of its Trailing End Slot, which is the surface of its Trailing End Slot that prevents Locking Ring Pin 22C-S7 from moving towards the Leading End of Non-Torque Transmitting Member 23. The engagement of Locking Ring Pin 22C-S7 with the front-surface of its Trailing End Slot can be used to transfer Reverse Torque between Non-Torque Transmitting Member 23 and its Cone. Reverse Torque is torque that pulls the Trailing End of Non-Torque Transmitting Member 23 towards the Leading End of Non-Torque Transmitting Member 23. If necessary, some movement/play between Attachment Sleeve 22B-S3 and its Trailing End Slot can be allowed. And if there are interferences between the fastener for Locking Ring Pin 22C-S7 and the fastener for Attachment Sleeve 22B-S3, then it is not necessary to use the fastener for Attachment Sleeve 22B-S3.

It is also preferable (but not necessarily) that Locking Ring Pin 22C-S7 can engage with the rear-surface of its Trailing End Slot, which is the surface of its Trailing End Slot that prevents Locking Ring Pin 22C-S7 from moving away from the Leading End of Non-Torque Transmitting Member 23.

The Trailing End Slots for a cone are shown and labeled as Trailing End Cuts 540-S6 in FIG. 112B of U.S. Pat. No. 8,628,439; and shown and labeled as Torque Transmitting Member Trailing End Slot 12-A2 and Non-Torque Transmitting Member Trailing End Slot 12-B2 in FIGS. 52 and 53 of this specification.

The Leading End Slots for a cone are shown and labeled as Leading End Cuts 540-S1 in FIG. 112B of U.S. Pat. No. 8,628,439; and shown and labeled as Torque Transmitting Member Leading End Slot 12-A1 and Non-Torque Transmitting Member Leading End Slot 12-B1 in FIGS. 52 and 53 of this specification.

Non-Torque Transmitting Member Leading End Slot 12-B1 is used for inserting Attachment Sleeves 22A-S3 and 22A-S4 of Leading End Reinforcement Plate 22A of Non-Torque Transmitting Member 23.

Non-Torque Transmitting Member 23 is shown in FIGS. 76 to 80. It comprises of a Non-Torque Transmitting Member Section 23-M1 and a Leveling Extension 23-M2 (which is attached to the Trailing End of Non-Torque Transmitting Member Section 23-M1). Non-Torque Transmitting Member Section 23-M1 has a surface on which the bottom surfaces of the teeth of its Transmission Belt can rest. And the bottom surface of Leveling Extension 23-M2 has the same incline as the incline of the surfaces of its Cone; and the top surface of said Leveling Extension 23-M2 is level so that it can provide a level resting place for the teeth of its Transmission Belt (see FIG. 80).

Non-Torque Transmitting Member Section 23-M1 comprises of the following previously described Reinforcement Plates for Non-Torque Transmitting Member Section 23-M1: Leading End Reinforcement Plate 22A, Trailing End Reinforcement Plate 22C, and Reinforcement Plates 22, that are joined together by four Reinforcement Wires 24, Longitudinal Elastomer Members 23-M1-S2, and Lateral Elastomer Member 23-M1-S1. Trailing Sleeve Reinforcement Plate 22B will not be used.

Non-Torque Transmitting Member Section 23-M1 does not use Trailing Sleeve Reinforcement Plate 22B, because here in order to control and maintain and the axial alignment of the rear-end of Non-Torque Transmitting Member Section 23-M1, the axial alignment of Locking Ring Pin 22C-S3 is controlled and maintained by using a Telescope of the "Telescopes for maintaining the normality and the axial position of two oppositely positioned Locking Ring Pins" section below.

Figure 79:
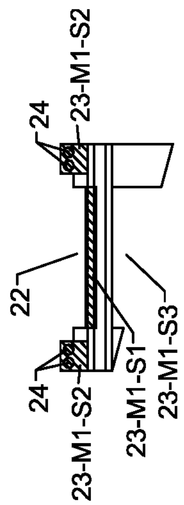
FIG. 79 shows another sectional-view of Non-Torque Transmitting Member 23.

Positioned between all Reinforcement Plates of Non-Torque Transmitting Member Section 23-M1 are two Longitudinal Elastomer Members 23-M1-S2, one Longitudinal Elastomer Member 23-M1-S2 encases the Reinforcement Wires 24 that are positioned to the left of the tooth bases of its Reinforcement Plates; and the other Longitudinal Elastomer Member 23-M1-S2 encases the Reinforcement Wires 24 that are positioned to the right of the tooth bases of its Reinforcement Plates (see FIGS. 76, 77, and 79). The purpose of Longitudinal Elastomer Members 23-M1-S2 is to maintain the proper distance and alignment of the Reinforcement Plates of Non-Torque Transmitting Member Section 23-M1.

Figure 78:
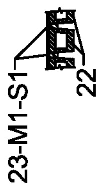
FIG. 78 shows a sectional-view of Non-Torque Transmitting Member 23.

On top of the Bases of the Reinforcement Plates of Non-Torque Transmitting Member 23, a Resting Surface 23-M1-S1, which is made out an elastomer (flexible material), is fixed (see FIGS. 76, 77, and 78). Resting Surface 23-M1-S1 has a Top Surface Shape that extends from the Leading End to the Trailing End of Non-Torque Transmitting Member Section 23-M1. Beneath the Top Surface Shape, Gap Filler Shapes, which are positioned between the gaps of the Bases of the Reinforcement Plates, are shaped (see FIG. 78). Resting Surface 23-M1-S1 is used to provide a resting surface for the teeth of the Transmission Belt used with Non-Torque Transmitting Member 23.

The cross-section of Non-Torque Transmitting Member Section 23-M1 except for its Trailing End, has a Left Section, a Right Section, and a Top Section, such that an Empty Middle Section 23-M1-S3 is formed (see FIG. 79); this cross-section of Non-Torque Transmitting Member Section 23-M1 is referred to as the Main Cross-Section of Non-Torque Transmitting Member Section 23-M1. Said Top Section is shaped such that it can support its Transmission Belt when it is resting on it; and said Left Section and said Right Section are used to support said Top Section above Empty Middle Section 23-M1-S3.

The cross-section of the rear-end (also referred to as the Trailing End) of Non-Torque Transmitting Member Section 23-M1 is identical to the Main Cross-Section of Non-Torque Transmitting Member Section 23-M1 described in the previous paragraph; except that it does not have an Empty Middle Section 23-M1-S3, so that said Left Section, said Right Section and Empty Middle Section 23-M1-S3 are replaced by a solid surface. This is because the cross-section of the rear-end of Non-Torque Transmitting Member Section 23-M1 needs a surface to which Leveling Extension 23-M2 can be attached to.

Figure 80:
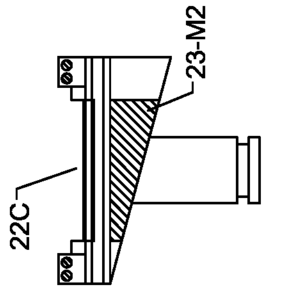
FIG. 80 shows another sectional-view of Non-Torque Transmitting Member 23.

The rear-end (also referred to as the Trailing End) of Non-Torque Transmitting Member Section 23-M1 is shown in FIG. 80. Unlike the rest of Non-Torque Transmitting Member Section 23-M1, the rear-end of Non-Torque Transmitting Member Section 23-M1 does not have an Empty Middle Section 23-M1-S3, since it needs a surface to which Leveling Extension 23-M2 can be attached. The rear-end of Non-Torque Transmitting Member Section 23-M1 is formed by Trailing End Reinforcement Plate 22C.

The front-end of Leveling Extension 23-M2 is fixed/bonded to Trailing End Reinforcement Plate 22C (see FIG. 80). Leveling Extension 23-M2 has a Locking Ring Pin 23-M2-S1 (see FIG. 76). Locking Ring Pin 23-M2-S1 is used to secure the rear-end of Leveling Extension 23-M2 to its cone by using fasteners such as a Dome Shaped Nut or Ball Clamp (which is preferred) for example, and a Locking Ring.

When the Cone Assembly of Non-Torque Transmitting Member 23 is fully assembled, Torque Transmitting Member 19 is attached oppositely of Non-Torque Transmitting Member 23 on their Cone. Empty Middle Section 23-M1-S3 of Non-Torque Transmitting Member 23 is used for inserting the Leveling Extension of Torque Transmitting Member 19; in a manner such that the Leveling Extension of Torque Transmitting Member 19 can enter and exit Non-Torque Transmitting Member 23 as required during pitch diameter Change of their Cone.

When the Cone Assembly of Non-Torque Transmitting Member 23 is fully assembled, Leveling Extension 23-M2 is inserted into the Empty Middle Section of Torque Transmitting Member 19 in a manner such that it can enter and exit Torque Transmitting Member 19 as required during pitch diameter Change of its Cone.

Elastomer Inserts for Replacing Longitudinal Elastomer Members (FIGS. 81 to 87)

Described in this section are Elastomer Inserts that can be used to replace the Longitudinal Elastomer Members 19-M1-S2 of Torque Transmitting Member 19, and the Longitudinal Elastomer Members 23-M1-S2 of Non-Torque Transmitting Member 23.

Figure 82:
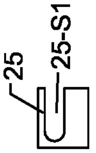
FIG. 82 shows a front-view of Elastomer Insert 25.
Figure 81:
FIG. 81 shows a side-view of Elastomer Insert 25.

An Elastomer Insert 25 is shown in FIGS. 81 and 82, it is shaped like an elastomer block that has a Slot 25-S1 for the Reinforcement Wires of its Torque Transmitting Member 19 or Non-Torque Transmitting Member 23.

Figure 83:
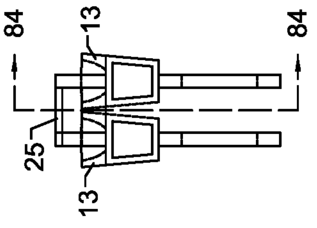
FIG. 83 shows a side-view of two Reinforcement Plates 13, for which an Elastomer Insert 25 is placed between them.
Figure 84:
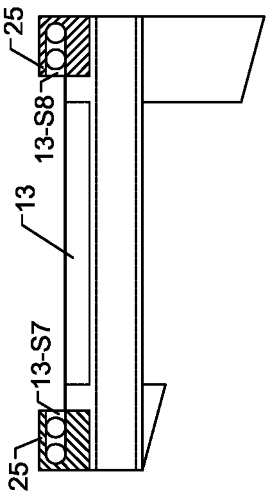
FIG. 84 shows a sectional-view of FIG. 83.

FIG. 83 shows a pair of Elastomers Insert 25 (only one Elastomer Insert 25 is visible) that are positioned between two Reinforcement Plates 13; and FIG. 84 shows a sectional-view of FIG. 84, showing both Elastomers Inserts 25. Here the surfaces of the Reinforcement Plates 13 on which Elastomers Insert 25 are bonded are labeled as Left Leg Reinforcement Plate 13-S7 and Right Leg Reinforcement Plate 13-S8 (see FIG. 84).

Figure 86:
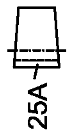
FIG. 86 shows a top-view of Elastomer Insert 25A.
Figure 85:
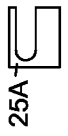
FIG. 85 shows a front-view of Elastomer Insert 25A.

FIGS. 85 and 86 show an alternate Elastomer Insert 25A. Elastomer Insert 25A is identical to Elastomer Insert 25, except that it has tapered side surfaces (see FIG. 86, which shows a top-view of FIG. 85). Elastomer Inserts 25A are to be used with Reinforcement Plates that have Left Leg Reinforcement Plates 13-S7 and Right Leg Reinforcement Plates 13-S8 that are modified to have tapered back surfaces and a tapered front surfaces.

Figure 87:
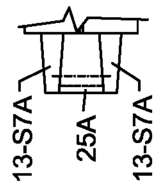
FIG. 87 shows a partial top-view of an Elastomer Insert 25A that is positioned between two Reinforcement Plates that each have a Left Leg Reinforcement Plate 13-S7A.

FIG. 87 shows a partial top-view of an Elastomer Insert 25A that is positioned between two Reinforcement Plates that each have a Left Leg Reinforcement Plate 13-S7A. Left Leg Reinforcement Plate 13-S7A is identical to a Left Leg Reinforcement Plate 13-S7 except for being modified so that it has a tapered back surface and a tapered front surface, instead of a flat back surface and a flat front surfaces; this modification allows for the usage Elastomers Inserts 25A. Right Leg Reinforcement Plates 13-S8 can be modified in the same manner.

Elastomer Inserts 25A are preferred over Elastomer Inserts 25, since it is easier to remove undesirable space (looseness) between the Elastomer Inserts and their Reinforcement Plates using Elastomer Inserts 25A. In addition, by using Elastomer Inserts 25A, the Elastomer Inserts can be placed under pre-compression, so that they can resist some tension applied to their Torque Transmitting Member.

Also for Torque Transmitting Member 19 and Non-Torque Transmitting Member 23, it is preferable that the Reinforcement Wires are bonded to their Reinforcement Plates (such as by soldering, clamping, etc.), so that the force on the Reinforcement Plates are transferred directly to their Reinforcement Wires. And it is also preferable that the Elastomer Members used with Torque Transmitting Member 19 and Non-Torque Transmitting Member 23 are bonded to their Reinforcement Plates; this will allow them to resist shear and tensile forces.

Figure 88:
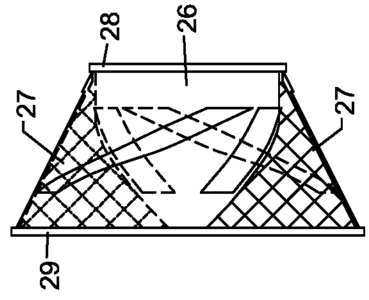
FIG. 88 shows a side-view of a Cone 26, which uses two oppositely positioned Leveling Extension Raising Sheets 27.

Cone with Leveling Extension Raising Sheets (FIG. 88)

In order to be able to use a Torque Transmitting Member 19 and a Non-Torque Transmitting Member 23, which use Reinforcement Plates that have a Base; a Cone 26 on which two oppositely positioned Leveling Extension Raising Sheets 27 are attached to its conical surface can be used.

FIG. 88 shows a Cone 26, which is identical to Cone 12 except for using two Leveling Extension Raising Sheets 27 (which are shown in hatching), a Sheet Attachment Disk 28, and a Sheet Attachment Disk 29. Note, the hatching of the upper positioned Leveling Extension Raising Sheet 27 is in hidden-lines; since for the current-view, this Leveling Extension Raising Sheet 27 is hidden behind the current front surface of Cone 26. While the hatching of the lower positioned Leveling Extension Raising Sheet 27 is not in hidden-lines; since for the current-view; the lower positioned Leveling Extension Raising Sheet 27 is positioned in-front of the current front surface of Cone 26.

When Torque Transmitting Member 19 and a Non-Torque Transmitting Member 23 are assembled on Cone 26, then one Leveling Extension Raising Sheet 27 is wrapping around Cone 26 in a manner such that it is resting on top of the Leveling Extension of Torque Transmitting Member 19, for all pitch diameters of Cone 26. So that the thickness of this Leveling Extension Raising Sheet 27 can compensate for the height of the Bases of the Reinforcement Plates of Torque Transmitting Member 19. In a manner such that the height of the Bases of the Reinforcement Plates of Torque Transmitting Member 19, and the height of the surface of the Leveling Extension Raising Sheet 27 that is resting on top of the Leveling Extension of Torque Transmitting Member 19, is equal or almost equal.

And when Torque Transmitting Member 19 and a Non-Torque Transmitting Member 23 are assembled on Cone 26, then the other Leveling Extension Raising Sheet 27 is wrapping around Cone 26 in a manner such that it is resting on top of the Leveling Extension of Non-Torque Transmitting Member 23, for all pitch diameters of Cone 26. So that the thickness of this Leveling Extension Raising Sheet 27 can compensate for the height of the Bases of the Reinforcement Plates of Non-Torque Transmitting Member 23. In a manner such that the height of the Bases of the Reinforcement Plates of Non-Torque Transmitting Member 23, and the height of the surface of the Leveling Extension Raising Sheet 27 that is resting on top of the Leveling Extension of Non-Torque Transmitting Member 23, is equal or almost equal. This will provide level or almost level resting surfaces for the teeth of the Transmission Belt used with Torque Transmitting Member 19 and a Non-Torque Transmitting Member 23.

Leveling Extension Raising Sheets 27 should be able to flex so that they can rests level on top of their Leveling Extension. And for all pitch diameters of their Cone 26, Leveling Extension Raising Sheets 27 should never cover their respective Torque Transmitting Member 19 or Non-Torque Transmitting Member 23; so that Leveling Extension Raising Sheets 27 will never interfere with Torque Transmitting Member 19 and Non-Torque Transmitting Member 23.

In order to attach Leveling Extension Raising Sheets 27 to Cone 26, Cone 26 has a Sheet Attachment Disk 28, and a Sheet Attachment Disk 29 fixed to it. To Sheet Attachment Disk 28, the right-ends of the Leveling Extension Raising Sheets 27 are attached by gluing, clamping, etc.; and to Sheet Attachment Disk 29, the left-ends of the Leveling Extension Raising Sheets 27 are attached by gluing, clamping, etc.

Figure 89:
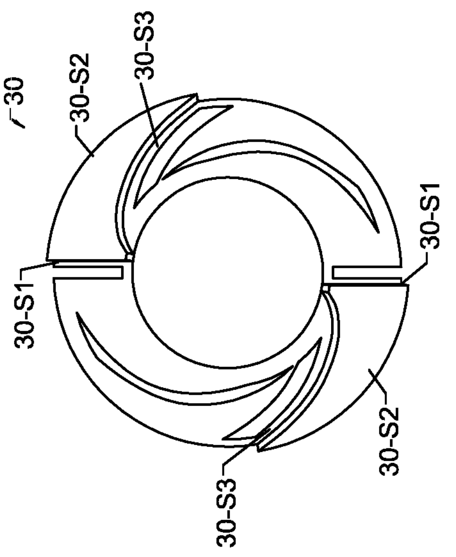
FIG. 89 shows a front-view of a Cone 30, which has two oppositely positioned Leveling Extension Raising Surfaces 30-S2.

Cone with Leveling Extension Raising Surfaces (FIG. 89)

In order to be able to use a Torque Transmitting Member and a Non-Torque Transmitting Member, which use Reinforcement Plates that have a Base; a Cone 30 on which two oppositely positioned Leveling Extension Raising Surfaces are shaped can be used. Cone 30, which is described in this section, can be used with Torque Transmitting Member(s) 31 and Non-Torque Transmitting Member 34 described in the section below.

Cone 30 is shown in FIG. 89; it is identical to Cone 12 except that it has two oppositely positioned Leveling Extension Raising Surfaces 30-S2. Leveling Extension Raising Surfaces 30-S2 are raised surfaces on the surfaces of Cone 30. Ideally, Leveling Extension Raising Surfaces 30-S2 are shaped so that they can raise the maximum lengths of their respective Leveling Extensions, while not interfering with their respective Torque Transmitting Member(s) or Non-Torque Transmitting Member. For this trial-and-error or geometry can be used.

The height of Leveling Extension Raising Surfaces 30-S2 should be selected so that the "resting surfaces for the Transmission Belt Teeth" of its Torque Transmitting Member Section 31-M1 and its Non-Torque Transmitting Member Section 34-M1 (see section below), matches or almost matches "the height of the top-surface of Leveling Extensions 31-M2 and 34-M2, which are resting on Leveling Extension Raising Surfaces 30-S2".

Each Leveling Extension Raising Surface 30-S2 has a Leveling Extension Ramp Clearance 30-S1 and a Member Width Clearance 30-S3.

Each Leveling Extension Ramp Clearance 30-S1 is located between the location where its Leveling Extension enters- and exits its Torque Transmitting Member 31 or its Non-Torque Transmitting Member 34 and the adjacent edge of its Leveling Extension Raising Surface 30-S2. Leveling Extension Ramp Clearance 30-S1 is for a Leveling Extension Ramp 32 described in the section below.

A Member Width Clearance 30-S3 is located between the Trailing End of Torque Transmitting Member 31 and the edge of the Leveling Extension Raising Surface 30-S2 located at to the rear of the Trailing End of Torque Transmitting Member 31; and between the Trailing End of Non-Torque Transmitting Member 34 and the edge of the Leveling Extension Raising Surface 30-S2 located at to the rear of the Trailing End of Non-Torque Transmitting Member 34.

The purpose of Member Width Clearance 30-S3 is to ensure that the width of Torque Transmitting Member 31 and Non-Torque Transmitting Member 34 will not cause the Trailing Ends of Torque Transmitting Member 31 and Non-Torque Transmitting Member 34 to interfere with the Leveling Extension Raising Surfaces 30-S2 located to the rear of them.

Torque Transmitting Member and Non-Torque Transmitting Member for Cone with Leveling Extension Raising Surfaces (FIGS. 90 to 98)

Described in this section is a Torque Transmitting Member 31 and Non-Torque Transmitting Member 34 that can be used with a Cone 30 described in the previous section.

Figure 91:
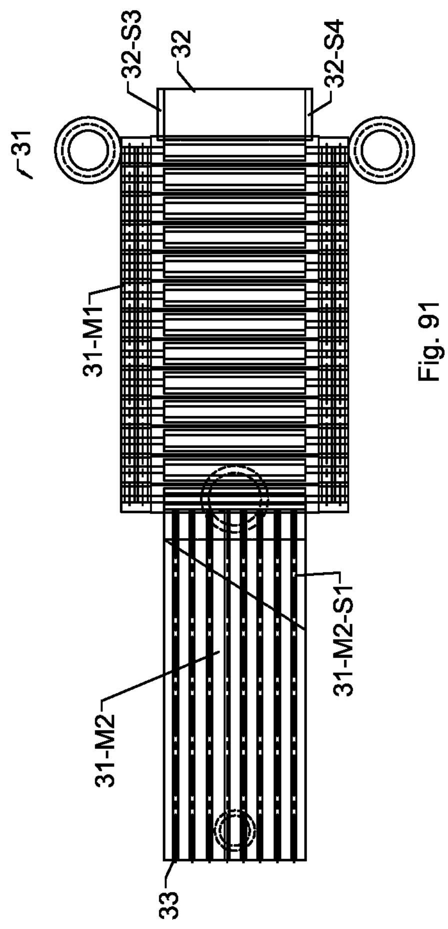
FIG. 91 shows a top-view of Torque Transmitting Member 31.
Figure 90:
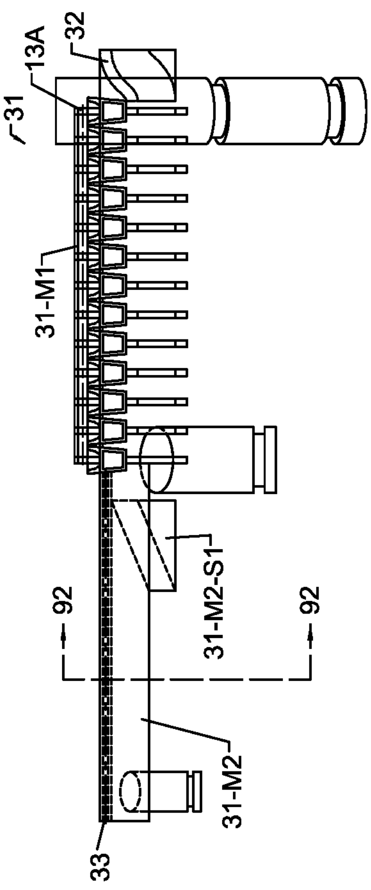
FIG. 90 shows a side-view of Torque Transmitting Member 31.
Figure 92:
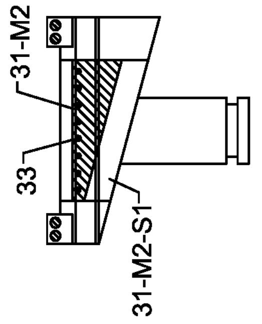
FIG. 92 shows a sectional-view of Torque Transmitting Member 31.

Torque Transmitting Member 31 is shown in FIGS. 90 to 92; it is identical to Torque Transmitting Member 19 described previously, except for the features described in the following paragraph; and all details for Torque Transmitting Member 19 are also applicable to Torque Transmitting Member 31 unless otherwise stated.

Torque Transmitting Member 31 is identical to Torque Transmitting Member 19 described previously, except for the following features: a) a Leveling Extension Ramp 32 is fixed to its Leading Reinforcement Plate 13A (which is the Reinforcement Plate through which a Leveling Extension enters and exits Torque Transmitting Member 31); b) its Leveling Extension (which here is labeled as Leveling Extension 31-M2) is attached so that its top-surface is level with the "resting surfaces for the Transmission Belt Teeth of its Torque Transmitting Member Section (which here is labeled as Torque Transmitting Member Section 31-M1)"; c) its Leveling Extension has Reinforcement Wires 33; and d) its Leveling Extension has a Member Width Clearance Support 31-M2-S1.

Figure 95:
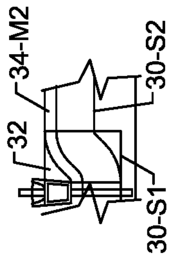
FIG. 95 shows a side-view of a Leveling Extension Ramp 32 that is positioned on Leveling Extension Ramp Clearance 30-S1.
Figure 94:
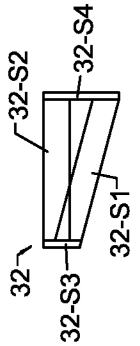
FIG. 94 shows a rear-view of Leveling Extension Ramp 32.
Figure 93:
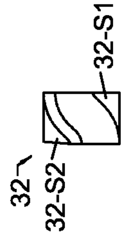
FIG. 93 shows a side-view of Leveling Extension Ramp 32.

Regarding item a), Leveling Extension Ramp 32 (which is shown in detail in FIGS. 93 to 95) has a Ramp 32-S1, which is used to guide the "Leveling Extension inserted into Torque Transmitting Member 31" to Leveling Extension Raising Surface 30-S2 (see FIG. 95). In addition, Leveling Extension Ramp 32 also has a Leveling Extension Gap Filler 32-S2, which is used to fill the gap that is formed due to the bending of the "Leveling Extension inserted into Torque Transmitting Member 31" as it exists Torque Transmitting Member 31. Ramp 32-S1 and Leveling Extension Gap Filler 32-S2 are held together by Sidewall 32-S3 and Sidewall 32-S4. The shape of Ramp 32-S1 and Leveling Extension Gap Filler 32-S2 can be determined through experimentation, by bending and inserting a Leveling Extension into Torque Transmitting Member 31.

FIG. 95 shows how Leveling Extension Ramp 32 is positioned on Leveling Extension Ramp Clearance 30-S1 of its Cone 30, and how it guides the "Leveling Extension inserted into Torque Transmitting Member 31 (which here is Leveling Extension 34-M2)" from an unraised surface of its Cone 30 (of which Leveling Extension Ramp Clearance 30-S1 is a part of) to Leveling Extension Raising Surface 30-S2.

Leveling Extension Ramp 32 should be able to bend/flex as required (workable but not necessary perfect) as the diameter of the conical surface where it is positioned is changed. In FIG. 95, Leveling Extension Ramp 32 is positioned on a conical surface of infinite diameter (straight surface), because of time limitations in drawing the items of FIG. 95 in a conical surface.

Regarding item c), its Leveling Extension has Reinforcement Wires 33. This can be omitted if the strength of Reinforcement Wires 33 are not necessary.

Regarding item d), Member Width Clearance Support 31-M2-S1 (which is shown in FIGS. 90 to 92) is shaped on the bottom surface of Leveling Extension 31-M2. Ideally, Member Width Clearance Support 31-M2-S1 should be shaped so that it can support its Leveling Extension 31-M2 as much as possible on the surface of Cone 30 that is not covered by the Leveling Extension Raising Surface 30-S2 that positioned to the rear of Member Width Clearance Support 31-M2-S1 without interfering with adjacent edge of the Leveling Extension Raising Surface 30-S2 that positioned to the rear of Member Width Clearance Support 31-M2-S1, for all pitch diameters of Cone 30. The ideal shape of Member Width Clearance Support 31-M2-S1 can be determined through experimentation.

Member Width Clearance Support 31-M2-S1 is useful because of the required Member Width Clearances 30-S3 of Cone 30. Without a Member Width Clearance 30-S3, the rear-end of Torque Transmitting Member Section 31-M1 will interfere with the Leveling Extension Raising Surface 30-S2 that positioned to the rear of Member Width Clearance Support 31-M2-S1.

Figure 96:
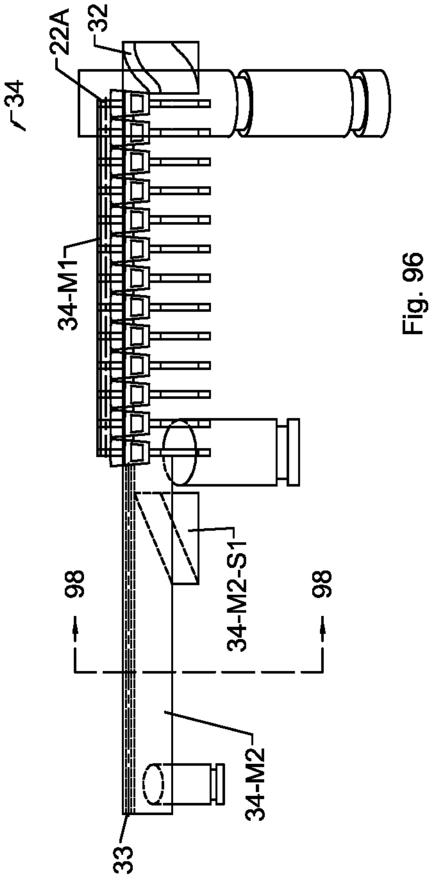
FIG. 96 shows a side-view of Non-Torque Transmitting Member 34.
Figure 98:
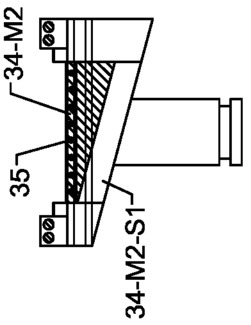
FIG. 98 shows a sectional-view of Non-Torque Transmitting Member 34.

Non-Torque Transmitting Member 34 is shown in FIGS. 96 and 98; it is identical to Non-Torque Transmitting Member 23 described previously, except for the features described in the following paragraph; and all details for Non-Torque Transmitting Member 23 are also applicable to Non-Torque Transmitting Member 34 unless otherwise stated.

Non-Torque Transmitting Member 34 is identical to Non-Torque Transmitting Member 23 described previously, except for the following features: a) a Leveling Extension Ramp 32 is fixed to its Leading Reinforcement Plate 22A (which is the Reinforcement Plate through which a Leveling Extension enters and exits Non-Torque Transmitting Member 23); b) its Leveling Extension (which here is labeled as Leveling Extension 34-M2) is attached so that its top-surface is level with the "resting surfaces for the Transmission Belt Teeth of its Non-Torque Transmitting Member Section (which here is labeled as Non-Torque Transmitting Member Section 34-M1)"; c) its Leveling Extension has Reinforcement Wires 35; and d) its Leveling Extension has a Member Width Clearance Support 34-M2-S1.

The purposes of modifications a) to d) of the previous paragraph are identical to the purposes of modifications a) to d) for Torque Transmitting Member 31; as such details regarding modifications a) to d) provided previously for Torque Transmitting Member 31, are also applicable for Non-Torque Transmitting Member 34.

Telescopes for Controlling and Maintaining the Axial Position of the Trailing Ends of a Torque Transmitting Member and a Non-Torque Transmitting Member (FIGS. 99 to 109)

A method to control and maintain the axial position of the Trailing Ends of Torque Transmitting Member 19 and Non-Torque Transmitting Member 23 relative to their Cone; is by connecting the Locking Ring Pins of the Trailing End Reinforcement Plates of Torque Transmitting Member 19 and Non-Torque Transmitting Member 23 to a Spline Sleeve 40 (which axial position relative to the Spline of Torque Transmitting Member 19 and Non-Torque Transmitting Member 23 is fixed), through two oppositely positioned telescopes. These two oppositely positioned telescopes will fix the axial positions of the Trailing End Reinforcement Plates of Torque Transmitting Member 19 and Non-Torque Transmitting Member 23 relative to Spline Sleeve 40.

Figure 99:
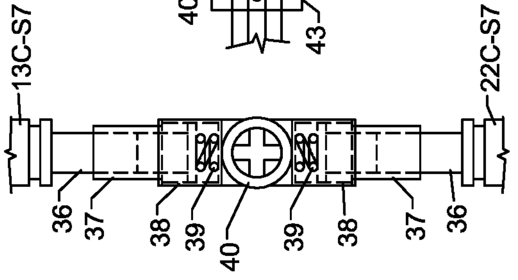
FIG. 99 shows a partial side-view of a two oppositely positioned Locking Ring Pins (which are Locking Ring Pin 13C-S7 and Locking Ring Pin 22C-S7) that are connected through Telescopes to a Spline Sleeve 40.
Figure 100:
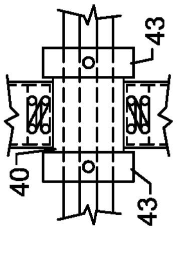
FIG. 100 shows a front-view of Spline Sleeve 40, which axially position relative to the Spline into which it is inserted is fixed by two Shaft Collars 43.
Figure 101:
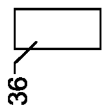
FIG. 101 shows a side-view of a Top Member 36.
Figure 102:
FIG. 102 shows a top-view of a Top Member 36.

FIG. 99 shows the method of this section, here each telescope has of a Top Member 36, which is shaped like slender rod (see FIGS. 101 and 102). One Top Member 36 is fixed to Locking Ring Pin 13C-S7 of Torque Transmitting Member 19, and the other Top Member 36 is fixed to Locking Ring Pin 22C-S7 of Non-Torque Transmitting Member 23.

Figure 103:
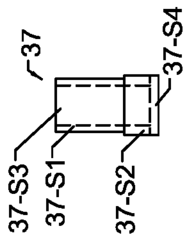
FIG. 103 shows a side-view of an Intermediate Member 37.
Figure 104:
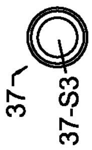
FIG. 104 shows a top-view of an Intermediate Member 37.

Each Top Member 36 is inserted into an Intermediate Member 37, which is shown in detail in FIGS. 103 and 104. Intermediate Member 37 has a cylindrical Top Shape 37-S1; and a cylindrical Bottom Shape 37-S2, which has a larger diameter than Top Shape 37-S1. Additionally, Intermediate Member 37 also has a centric Hole 37-S3 into which Top Member 36 can be inserted, and a Bottom End 37-S4, which has a solid surface.

Figure 105:
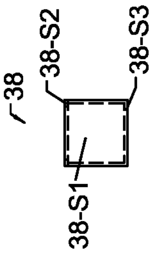
FIG. 105 shows a side-view of a Bottom Member 38.
Figure 106:
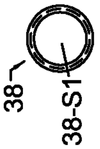
FIG. 106 shows a top-view of a Bottom Member 38.

Each Intermediate Member 37 is inserted into a Bottom Member 38, which is shown in detail in FIGS. 105 and 106. Bottom Member 38 is shaped like a cylinder that has a centric Hole 38-S1, into which the Bottom Shape 37-S2 of Intermediate Member 37 can be inserted.

Additionally, Bottom Member 38 has Cover 38-S2, which has a hole that is large enough to allow Top Shape 37-S1 of Intermediate Member 37 to slide through it, but small enough to prevent Bottom Shape 37-S2 of Intermediate Member 37 from exiting Bottom Member 38. Cover 38-S2 is fixed to the top of Bottom Member 38 after the Bottom Shape 37-S2 of Intermediate Member 37 has been inserted into Hole 38-S1 of Bottom Member 38. Cover 38-S2 can be fixed to the top of Bottom Member 38 through gluing or other means. Bottom Member 38 also has a Bottom End 38-S3, which has a solid surface.

In order to ensure that Intermediate Member 37 does not move towards and away from Bottom Member 38 during the rotation of its Cone; a Spring 39, which is not absolutely required but preferred, pushes Intermediate Member 37 towards Cover 38-S1 of Bottom Member 38 (see FIG. 99).

If more than one Intermediate Member are used, then all additional Intermediate Members can be shaped like Intermediate Member 37, by having a Top Shape, a Bottom Shape, a Hole into which the "Top Member or Intermediate Member above it" can be inserted, and a Bottom End; but here, the Top Shapes of these additional Intermediate Members should have a Cover which has a hole that is large enough to allow the Top Shape of the "Intermediate Member above it" to slide through it, but small enough to prevent the Bottom Shape of the "Intermediate Member above it" from exiting the additional Intermediate Member into which it is inserted.

Figure 107:
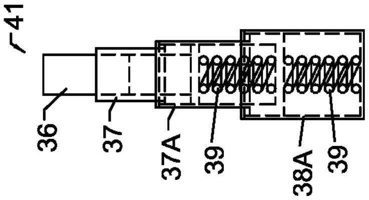
FIG. 107 shows a Telescope 41, which uses two Intermediate Members, one Intermediate Member 37 and one Intermediate Member 37A.
Figure 108:
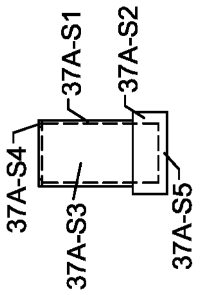
FIG. 108 shows a side-view of an Intermediate Member 37A.
Figure 109:
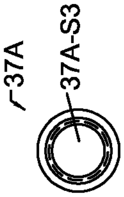
FIG. 109 shows a top-view of an Intermediate Member 37A.

FIG. 107 shows a Telescope 41, which uses two Intermediate Members; one Intermediate Member 37 (which has been described previously), and one Intermediate Member 37A (which is shown in detail in FIGS. 108 and 109). Intermediate Member 37A is an additional Intermediate Member to Intermediate Member 37; as such as according to the previous paragraph: Intermediate Member 37A has a Top Shape 37A-S1, a Bottom Shape 37A-S2, a Hole 37A-S3, and a Bottom End 37A-S5; and additionally, Top Shape 37A-S1 of Intermediate Member 37A has a Cover 37A-S4.

Cover 37A-S2 can be fixed (through gluing, etc.) to the top of Intermediate Member 37A after the Bottom Shape 37-S2 of Intermediate Member 37 has been inserted into Hole 37A-S3 of Intermediate Member 37A.

All additional Intermediate Members can be shaped identically as Intermediate Member 37A; and the Top Member and the Bottom Member of a Telescope can also have the same shape regardless of how many Intermediate Members are used. But obviously the dimensions of these Members have to be revised so that they can perform their function (such as: allow for insertion of the Member above it, prevent the Member inserted into it from exiting, etc.). Accordingly, Telescope 41 uses a Bottom Member 38A, which has the same shape but revised dimension compared to Bottom Member 38, instead of Bottom Member 38.

Figure 110:
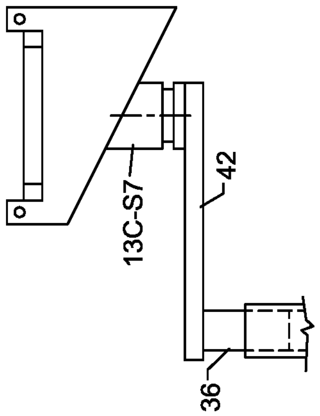
FIG. 110 shows a rear-view of a Locking Ring Pin 13C-S7 that is connected to a Top Member 36 of a Telescope through the use of an Offset Bar 42.

FIG. 110 shows a Locking Ring Pin 13C-S7 that is connected to a Top Member 36 of a Telescope through the use of an Offset Bar 42 (which can be through gluing, etc). Offset Bar 42 can be used to avoid any interferences between the various Spline Sleeves, Shaft Collars (see below), etc. used with the Cone of said Telescope.

The axial position of Spline Sleeve 40 relative to the Spline into which it is inserted (see FIG. 99), is fixed through two sandwiching Shaft Collars 43. Each Shaft Collar 43 has a set-screw for axially fixing it to said Spline (see FIG. 100).

The method to control and maintain the axial position of the Trailing Ends of Torque Transmitting Member 19 and Non-Torque Transmitting Member 23 relative to their Cone of this section, can also be used with other Torque Transmitting Member(s) and Non-Torque Transmitting Member (s); such as with Torque Transmitting Member 31 and Non-Torque Transmitting Member 34, for example.

The Telescopes of this section can also be used to maintain the normality of the Locking Ring Pins of the Leveling Extensions. But since the axial position of the "Trailing Ends of the Leveling Extensions" are maintained by the Torque Transmitting Member or Non-Torque Transmitting Member into which they are inserted; Shaft Collars for maintaining the axial position of the Spline Sleeve of the Telescopes for the "Trailing Ends of the Leveling Extensions" are unnecessary.

"Leading End Torque Transmitting Member Reinforcement Plate 44" and "Leading End Non-Torque Transmitting Member Reinforcement Plate 48" (FIGS. 111 to 119)

Figure 113:
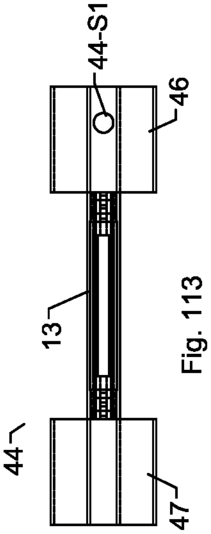
FIG. 113 shows a top-view of "Leading End Torque Transmitting Member Reinforcement Plate 44".
Figure 111:
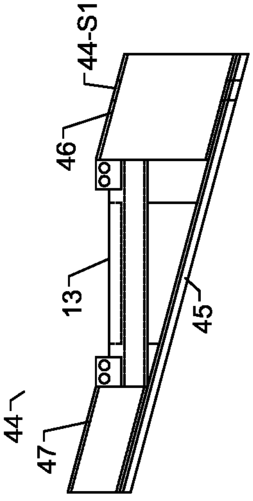
FIG. 111 shows a rear-view of "Leading End Torque Transmitting Member Reinforcement Plate 44".
Figure 112:
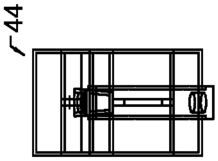
FIG. 112 shows a side-view of "Leading End Torque Transmitting Member Reinforcement Plate 44".

A "Leading End Torque Transmitting Member Reinforcement Plate 44" is shown in FIGS. 111 to 113, it comprises of a "Reinforcement Plate 13" to which a Slider Base 45 is attached to the bases of its Left Leg 13-S1 and Right Leg 13-S2 (see FIG. 54).

Figure 117:
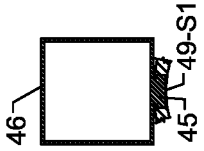
FIG. 117 shows a sectional-view of FIG. 116.
Figure 116:
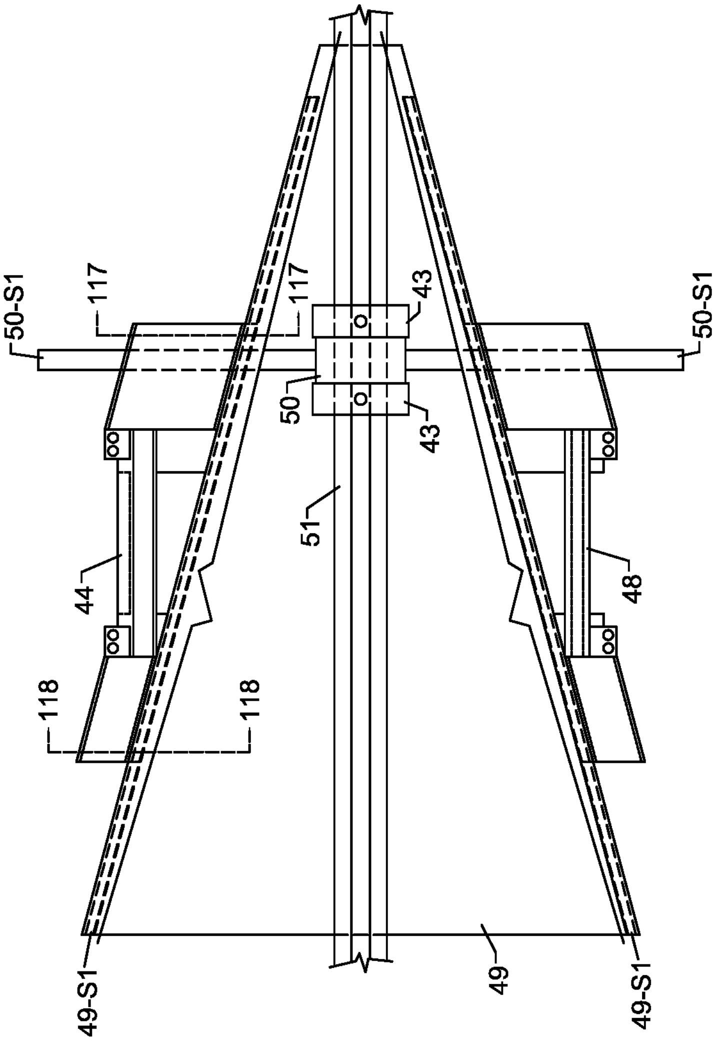
FIG. 116 shows a side-view of a Cone 49 to which "Leading End Torque Transmitting Member Reinforcement Plate 44" and "Leading End Non-Torque Transmitting Member Reinforcement Plate 48" are assembled.
Figure 118:
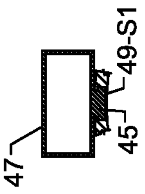
FIG. 118 shows another sectional-view of FIG. 116.

In order to secure "Leading End Torque Transmitting Member Reinforcement Plate 44" to its Cone 49, Slider Base 45 of "Leading End Torque Transmitting Member Reinforcement Plate 44" is slideably inserted into a Leading End Slot 49-S1 (see FIGS. 116 to 118). "Leading End Torque Transmitting Member Reinforcement Plate 44" can be attached in the same manner to any other cones that use a Leading End Slot 49-S1.

And the engagement between Slider Base 45 and Torque Transmitting Member Leading End Slot 49-S1 is used to transfer torque from "Leading End Torque Transmitting Member Reinforcement Plate 44" to Cone 49, or Cone 26, or any other cones that use a Leading End Slot 49-S1.

And in order to increase the "rotational resistance" to supplement the "bending resistance" of Slider Base 45 to resist the moment due to the torque transmitted by its Transmission Belt, Slider Base 45 extends to the right and to the left of its Reinforcement Plate 13. Because of the incline of its Cone 49, increasing the length of Slider Base 45 will also increase the height difference between the lowest point and highest point of Slider Base 45, which in turn will increase the "rotational resistance" of Slider Base 45. A Reinforcement Tube 47 is used to strengthen the extension of Slider Base 45 to the left of "Reinforcement Plate 13"; and a Reinforcement Tube 46 is used to strengthen the extension of Slider Base 45 to the right of "Reinforcement Plate 13".

And in order to control and maintain the axial position of "Leading End Torque Transmitting Member Reinforcement Plate 44" relative to its Spline 51 (see FIG. 116), "Leading End Torque Transmitting Member Reinforcement Plate 44" has a Hole 44-S1, which extends all the way through from the top-surface of its Reinforcement Tube 46 to the bottom surface of its Slider Base 45 (see FIGS. 111 and 113).

Figure 114:
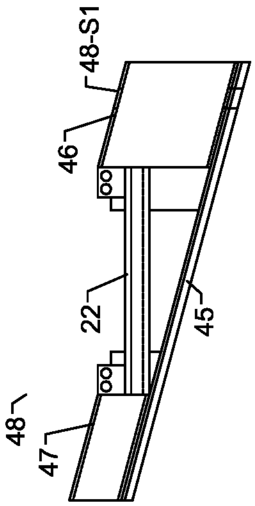
FIG. 114 shows a rear-view of "Leading End Non-Torque Transmitting Member Reinforcement Plate 48".
Figure 115:
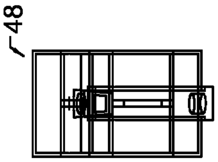
FIG. 115 shows a side-view of "Leading End Non-Torque Transmitting Member Reinforcement Plate 48".

A "Leading End Non-Torque Transmitting Member Reinforcement Plate 48" is shown in FIGS. 114 to 115, it comprises of a "Reinforcement Plate 22" to which a Slider Base 45 is attached to the bases of its Left Leg 22-S1 and Right Leg 22-S2 (see FIG. 70).

In order to secure "Leading End Non-Torque Transmitting Member Reinforcement Plate 48" to its Cone 49, Slider Base 45 of "Leading End Non-Torque Transmitting Member Reinforcement Plate 48" is slideably inserted into a Leading End Slot 49-S1 (see FIGS. 116 to 118). "Leading End Non-Torque Transmitting Member Reinforcement Plate 48" can be attached in the same manner to any other cones that use a Leading End Slot 49-S1.

And like for "Leading End Torque Transmitting Member Reinforcement Plate 44"; for "Leading End Non-Torque Transmitting Member Reinforcement Plate 48", a Reinforcement Tube 47 is also used to strengthen the extension of Slider Base 45 to the left of "Reinforcement Plate 22"; and a Reinforcement Tube 46 is also used to strengthen the extension of Slider Base 45 to the right of "Reinforcement Plate 22".

And like for "Leading End Torque Transmitting Member Reinforcement Plate 44", in order to control and maintain the axial position of "Leading End Non-Torque Transmitting Member Reinforcement Plate 48" relative to its Spline 51 (see FIG. 116), "Leading End Non-Torque Transmitting Member Reinforcement Plate 48" has a Hole 48-S1, which extends all the way through from the top-surface of its Reinforcement Tube 46 to the bottom surface of its Slider Base 45 (see FIG. 114).

Figure 119:
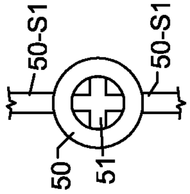
FIG. 119 show a partial rear-view of Spline Sleeve 50.

FIGS. 116 and 119 show a Spline Sleeve 50, which is used to control and maintain the axial position of "Leading End Torque Transmitting Member Reinforcement Plate 44" and "Leading End Non-Torque Transmitting Member Reinforcement Plate 48" relative to their Spline, which in FIGS. 116 and 119 is labeled as Spline 51. Spline Sleeve 50 has two oppositely positioned Rods 50-S1. One Rod 50-S1 is inserted into Hole 44-S1 of "Leading End Torque Transmitting Member Reinforcement Plate 44", so that it can control the axial position of "Leading End Torque Transmitting Member Reinforcement Plate 44". And the other Rod 50-S1 is inserted into Hole 48-S1 of "Leading End Non-Torque Transmitting Member Reinforcement Plate 48", so that it can control the axial position of "Leading End Non-Torque Transmitting Member Reinforcement Plate 48".

The axial position of Spline Sleeve 50 relative to the Spline into which it is inserted (which is Spline 51), is fixed through two sandwiching Shaft Collars 43. Each Shaft Collar 43 has a set-screw for axially fixing it to Spline 51 (see FIG. 116).

Figure 122:
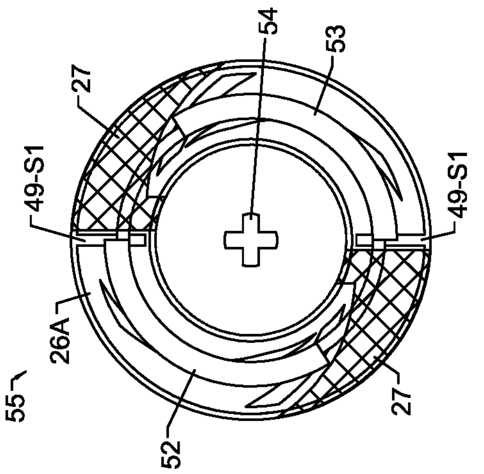
Figure 120:
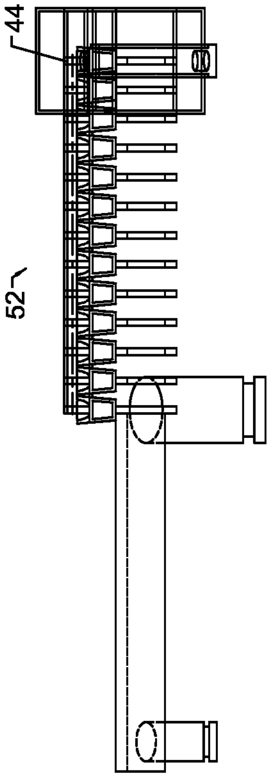
Figure 121:
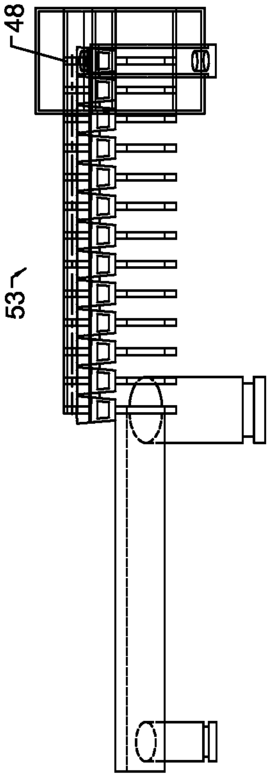

Cone Assembly Using Cone with Leveling Extension Raising Sheets (FIGS. 120 to 122)

Described in this section is a Cone Assembly 55, which uses a Cone 26A that has Leveling Extension Raising Sheets 27, see FIG. 122.

Cone Assembly 55 uses a Cone 26A, which is identical to Cone 26 (see FIG. 88), except that: a) its Torque Transmitting Member Leading End Slot 12-A1 and its Non-Torque Transmitting Member Leading End Slot 12-B1 (see FIG. 53) are each replaced with a Leading End Slot 49-S1 (see FIGS. 116 to 118); and that b) Cone 26A has a Spline Profile 54, which is used to transfer torque from Cone 26A to its Spline.

Attached to Cone Assembly 55 are a Torque Transmitting Member 52 and a Non-Torque Transmitting Member 53. Torque Transmitting Member 52 is identical to Torque Transmitting Member 19; except that for Torque Transmitting Member 52, Leading End Reinforcement Plate 13A is replaced with "Leading End Torque Transmitting Member Reinforcement Plate 44" (see FIG. 120).

And Non-Torque Transmitting Member 53 is identical to Non-Torque Transmitting Member 23; except that for Non-Torque Transmitting Member 53, Leading End Reinforcement Plate 22A is replaced with "Leading End Non-Torque Transmitting Member Reinforcement Plate 48" (see FIG. 121).

"Leading End Torque Transmitting Member Reinforcement Plate 44" of Torque Transmitting Member 52, and "Leading End Non-Torque Transmitting Member Reinforcement Plate 48" of Non-Torque Transmitting Member 53 are each inserted into a Leading End Slot 49-S1 of their Cone 26A. And the axial position of "Leading End Torque Transmitting Member Reinforcement Plate 44" of Torque Transmitting Member 52 and "Leading End Non-Torque Transmitting Member Reinforcement Plate 48" of Non-Torque Transmitting Member 53, relative to their Spline, are controlled and maintained by Spline Sleeve 50 and sandwiching Shaft Collars 43 (see FIG. 116).

And the axial position of the Trailing End Locking Ring Pins of Torque Transmitting Member 52 and Non-Torque Transmitting Member 53 relative to their Spline, are controlled and maintained by using Telescopes, Slider Sleeves, and sandwiching Shaft Collars as described in the "Telescopes for controlling and maintaining the axial position of the Trailing Ends of a Torque Transmitting Member and a Non-Torque Transmitting Member (FIGS. 99 to 109)" section above.

The pitch diameter of Cone Assembly 55 is changed by changing the axial position of its Cone 26A relative to its Spline, since this also changes the axial position of Cone 26A relative to its Torque Transmitting Member 52 and Non-Torque Transmitting Member 53.

Figure 125:
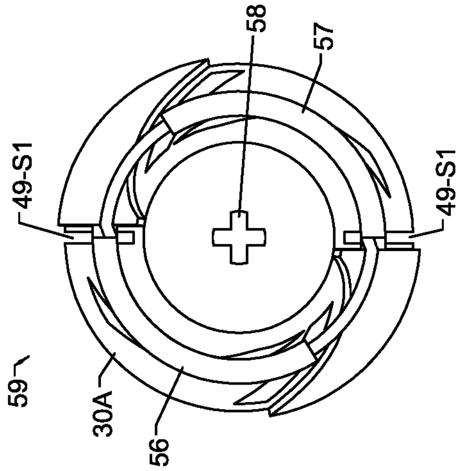
Figure 123:
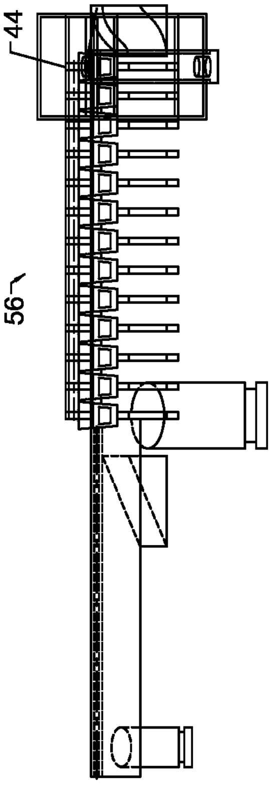
Figure 124:
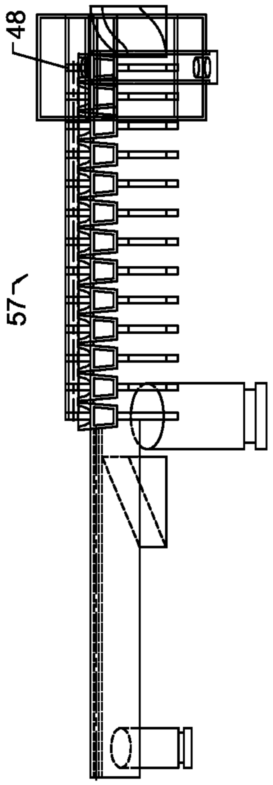

Cone Assembly Using Cone with Leveling Extension Raising Surfaces (FIGS. 123 to 125)

Described in this section is a Cone Assembly 59, which uses a Cone 30A that has Leveling Extension Raising Surfaces, see FIG. 125.

Cone Assembly 59 uses a Cone 30A, which is identical to Cone 30 (see FIG. 89), except that: a) its Torque Transmitting Member Leading End Slot 12-A1 and its Non-Torque Transmitting Member Leading End Slot 12-B1 (see FIG. 53) are each replaced with a Leading End Slot 49-S1 (see FIGS. 116 to 118); and that b) Cone 30A has a Spline Profile 58, which is used to transfer torque from Cone 30A to its Spline.

Attached to Cone Assembly 59 are a Torque Transmitting Member 56 and a Non-Torque Transmitting Member 57. Torque Transmitting Member 56 is identical to Torque Transmitting Member 31; except that for Torque Transmitting Member 56, Leading End Reinforcement Plate 13A is replaced with "Leading End Torque Transmitting Member Reinforcement Plate 44" (see FIG. 123).

And Non-Torque Transmitting Member 57 is identical to Non-Torque Transmitting Member 34; except that for Non-Torque Transmitting Member 57, Leading End Reinforcement Plate 22A is replaced with "Leading End Non-Torque Transmitting Member Reinforcement Plate 48" (see FIG. 124).

"Leading End Torque Transmitting Member Reinforcement Plate 44" of Torque Transmitting Member 56, and "Leading End Non-Torque Transmitting Member Reinforcement Plate 48" of Non-Torque Transmitting Member 57 are each inserted into a Leading End Slot 49-S1 of their Cone 30A. And the axial position of "Leading End Torque Transmitting Member Reinforcement Plate 44" of Torque Transmitting Member 56 and "Leading End Non-Torque Transmitting Member Reinforcement Plate 48" of Non-Torque Transmitting Member 57, relative to their Spline, are controlled and maintained by Spline Sleeve 50 and sandwiching Shaft Collars 43 (see FIG. 116).

And the axial position of the Trailing End Locking Ring Pins of Torque Transmitting Member 56 and Non-Torque Transmitting Member 57 relative to their Spline, are controlled and maintained by using Telescopes, Slider Sleeves, and sandwiching Shaft Collars as described in the "Telescopes for controlling and maintaining the axial position of the Trailing Ends of a Torque Transmitting Member and a Non-Torque Transmitting Member (FIGS. 99 to 109)" section above.

The pitch diameter of Cone Assembly 59 is changed by changing the axial position of its Cone 30A relative to its Spline, since this also changes the axial position of Cone 30A relative to its Torque Transmitting Member 56 and Non-Torque Transmitting Member 57.

Reinforcement Plates for a Flanged Leveling Extension (FIGS. 126 to 130)

Figure 126:
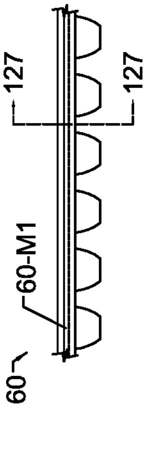
Figure 127:
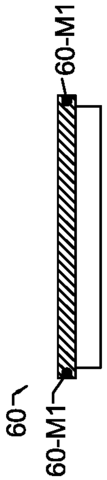

Described in this section are Reinforcement Plate 61 and Reinforcement Plate 62 that can be used with a Leveling Extension 63, which has flanges that can provide additional resting support for a Flanged Transmission Belt. Here bending of the flanges of a Flanged Transmission Belt is resisted by the longitudinal-tension in the flanges of said Flanged Transmission Belt, since bending of said flanges will increase the diameter of said flanges relative to the diameter of the other portion of said Flanged Transmission Belt. As such, it is recommended that the flanges of a Flanged Transmission Belt have Reinforcement Wires. FIGS. 126 and 127 show a Flanged Transmission Belt 60, for which its flanges each have a Reinforcement Wire 60-M1.

Figure 128:
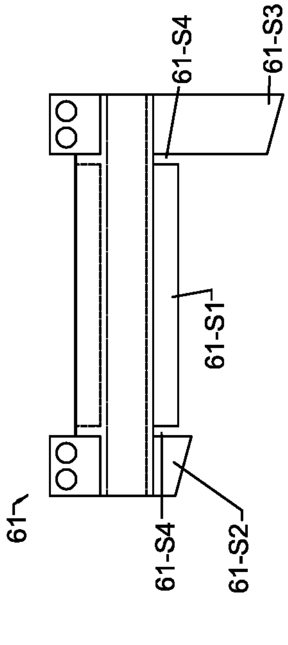
Figure 129:
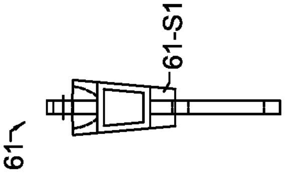

FIGS. 128 and 129 show a Reinforcement Plate 61, which is identical to Reinforcement Plate 13 described earlier, except that it has a Bottom Extension 61-S1, and its Left Leg and its Right Leg (which are labeled as Left Leg 61-S2 and Right Leg 61-S3) are longer. These modification are made so that two Side Channels 61-S4 are shaped as shown. Side Channels 61-S4 are used for the insertion of Leveling Extension Flange Supports 65-S2 of Leveling Extension 63, described below. Additionally, some features of Reinforcement Plate 61 are re-dimensioned so that Reinforcement Plate 61 can accommodate its Transmission Belt 60.

Figure 130:
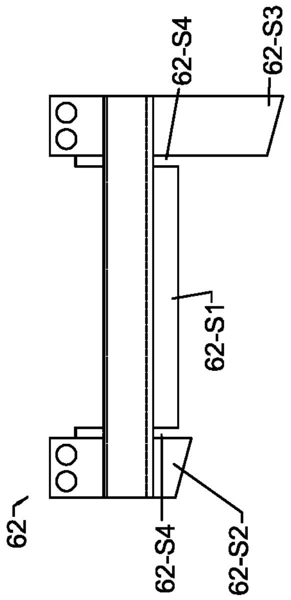

FIG. 130 shows a Reinforcement Plate 62, which is identical to Reinforcement Plate 22 described earlier, except that it has a Bottom Extension 62-S1, its Left Leg and Right Leg (which are labeled as Left Leg 62-S2 and Right Leg 62-S3) are longer. These modification are made so that two Side Channels 62-S4 are shaped as shown. Side Channels 62-S4 are used for the insertion of Leveling Extension Flange Supports 65-S2 of Leveling Extension 63, described below. Additionally, some features of Reinforcement Plate 62 are re-dimensioned so that Reinforcement Plate 62 can accommodate its Transmission Belt 60.

Flanged Leveling Extension-Leveling Extension 63 (FIGS. 131 to 138)

Figure 131:
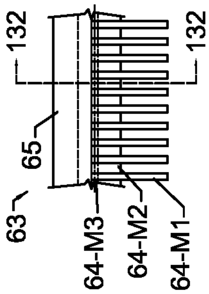

A Leveling Extension 63 that can be used with Reinforcement Plates 61 and Reinforcement Plates 62 is shown in FIGS. 131 to 133. It comprises of a Leveling Extension Base 64, which sits on the surface of its Cone; and Transmission Belt Rest 65, which sits on top of Leveling Extension Base 64.

Leveling Extension Base 64 comprises of Supporting Plates 64-M1 that are joined along the length of Leveling Extension Base 64 by Elastomer Members 64-M2, which are bonded to Supporting Plates 64-M1. Supporting Plates 64-M1 are also joined together by Reinforcement Wires 64-M3, which are also bonded to Supporting Plates 64-M1. This setup is selected so that some sufficient resistance that "maintains the substantial normality of Supporting Plates 64-M1 relative to their Leveling Extension Base 64" is provided when an axial-bending-moment is applied to the Supporting Plates 64-M1.

A Supporting Plate 64-M1 is shown in FIGS. 134 and 135. The bottom surface of a Supporting Plate 64-M1 is rounded (refer to "Dia." label in FIG. 135); this is so that the Supporting Plates 64-M1 can smoothly slide up their Ramp Surface 66-S3 (see FIG. 139), which has a section that has a concave surface. Ideally the diameter of the bottom surface of Supporting Plates 64-M1 should be smaller than the diameter of the concave surface of Ramp Surface 66-S3, but as large as possible in order to minimize Hertzian contact stresses.

Transmission Belt Rest 65 of Leveling Extension 63, which is also shown separately in FIGS. 136 to 138, should be made out of a flexible elastomer. It has two Leveling Extension Flange Supports 65-S2 that are joined by a Base 65-S1 (see FIGS. 136 to 138).

And in order to maintain the alignment of Leveling Extension Base 64 relative to Transmission Belt Rest 65, and prevent Transmission Belt Rest 65 from separating from Leveling Extension Base 64, Base 65-S1 of Transmission Belt Rest 65 has Protrusions 65-S3 that are inserted into matching Indentations 64-S1 of Leveling Extension Base 64. Indentations 64-S1 are shaped into both, Supporting Plates 64-M1 and Elastomer Members 64-M2 of Leveling Extension Base 64.

Cone for Usage with Leveling Extension Ramp Guide 71 (FIG. 139)

Described in this section is a Cone 66 that can be used with a Leveling Extension Ramp Guide 71 described in the next section. Cone 66 is shown in FIG. 139.

Cone 66 is identical to Cone 30 described previously, except that each Leveling Extension Ramp Clearance 30-S1 is replaced with a Ramp Surface 66-S3. Like Cone 30, Cone 66 has unraised surfaces, which here are labeled as Base Surfaces 66-S1; and raised surfaces, which here are labeled as Raised Surfaces 66-S2 (these surfaces were labeled as Leveling Extension Raising Surfaces 30-S2 for Cone 30).

The purpose of Ramp Surface 66-S3 is to guide a Leveling Extension 63 from Base Surfaces 66-S1 to Raised Surfaces 66-S2 (see FIG. 140). Ramp Surface 66-S3 is preferably shaped so that its Leveling Extension 63 will not raise above the surface of its Cone 66 due to the tension in its Leveling Extension 63; for this reason, it is recommended that Ramp Surface 66-S3 has a straight or a slightly convex surface, while a convex surface for Ramp Surface 66-S3 is not recommended.

Leveling Extension Ramp Guide 71 (FIGS. 140 to 161)

Described in in this section is a Leveling Extension Ramp Guide 71 that guides a Leveling Extension from a Base Surface 66-S1 of a Cone 66 to a Raised Surface 66-S2 of said Cone 66. Between said Base Surface 66-S1 and said Raised Surface 66-S2, a Ramp Surface 66-S3 is shaped. In FIG. 140, vertical dash-dot lines are used to show the partition between the said surfaces of Cone 66. And in FIG. 140, the said surfaces of Cone 66 have an infinite diameter (straight surface), because of time limitations.

Cone 66 and Leveling Extension Ramp Guide 71 can be used with a Torque Transmitting Member 31 and a Non-Torque Transmitting Member 34, for which each their Leveling Extension Ramp 32 have been removed.

Leveling Extension Ramp Guide 71 comprises of the following parts: a Ramp Leveling Base 67, a Ramp Tooth Resting Filler 68, a Left Flange Filler 69, and a Right Flange Filler 70. All parts of said Leveling Extension Ramp Guide 71 should be made out of a flexible elastomer. Note for clarity, Ramp Tooth Resting Filler 68, Left Flange Filler 69, and Right Flange Filler 70 are not shown in FIG. 140; but these parts, as well as all other parts of Leveling Extension Ramp Guide 71 are shown in FIGS. 142 and 143.

Leveling Extension Ramp Guide 71 guides a Leveling Extension 63 from a Base Surface 66-S1 to a Ramp Surface 66-S3, and then to a Raised Surface 66-S2. Transmission Belt resting surfaces for a Base Surface 66-S1 are provided by the Torque Transmitting Member/Non-Torque Transmitting Member that is resting on said Base Surface 66-S1; and a Transmission Belt resting surface for a Raised Surface 66-S2 is provided by the top surface of the portion of a Leveling Extension 63 that is resting on said Raised Surface 66-S2.

And in order to provide Transmission Belt resting surfaces for a Ramp Surface 66-S3, a Ramp Tooth Resting Filler 68, a Left Flange Filler 69, and a Right Flange Filler 70 are used. In order to achieve this, the bottom surfaces of Ramp Tooth Resting Filler 68, Left Flange Filler 69, and Right Flange Filler 70 are resting on top of the portion of a Leveling Extension 63 that is resting on said Ramp Surface 66-S3 (see FIGS. 142, 143 and 161), while the top surfaces of Ramp Tooth Resting Filler 68, Left Flange Filler 69, and Right Flange Filler 70 provide resting surfaces for their Transmission Belt.

Ramp Tooth Resting Filler 68 (see FIGS. 142 to 145) is bonded/glued to the front end of its Leading End Torque Transmitting Member Reinforcement Plate. Note, in the figures of this section, a Reinforcement Plate 61 is used as the Leading End Torque Transmitting Member Reinforcement Plate; here, in order to be able to transmit torque, and in order to maintain and control its axial position, the relevant items of Leading End Torque Transmitting Member Reinforcement Plate 44 can be added to Reinforcement Plate 61.

Ramp Tooth Resting Filler 68 (see FIGS. 144 and 145) is an elastomer/flexible member that is shaped so that its top surface provides a proper resting place for the teeth of its Transmission Belt, while its bottom surface is resting on top of the portion of Leveling Extension 63 that is resting on Ramp Surface 66-S3. The ideal/acceptable shape of Ramp Tooth Resting Filler 68 can be easily determined by experimentation and/or mathematics.

The rear-end of Ramp Tooth Resting Filler 68 has some considerable thickness, which affects the bending flexibility of Ramp Tooth Resting Filler 68. It is desirable to use a stiff elastomer for Ramp Tooth Resting Filler 68, in order to minimize the deflection of the surface of Ramp Tooth Resting Filler 68 that is supporting the teeth of its Transmission Belt due to the load applied by the teeth of its Transmission Belt. A thinner Ramp Tooth Resting Filler 68 will allow for the usage of a stiffer elastomer, since a thinner Ramp Tooth Resting Filler 68 has more bending flexibility than a thicker elastomer.

In order to allow for the usage of stiffer elastomer, a Ramp Tooth Resting Filler 68A (see FIGS. 146 and 147) can be used instead of Ramp Tooth Resting Filler 68. Ramp Tooth Resting Filler 68A has the same shape as Ramp Tooth Resting Filler 68, but is vertically divided into a Top Ramp Tooth Resting Filler Member 68A-M1 and a Bottom Ramp Tooth Resting Filler Member 68A-M2. Top Ramp Tooth Resting Filler Member 68A-M1 and Bottom Ramp Tooth Resting Filler Member 68A-M2 are each thinner than Ramp Tooth Resting Filler 68, and can bend independently.

FIGS. 148 and 149 show a Ramp Tooth Resting Filler 68B, which like Ramp Tooth Resting Filler 68A can also be used instead of Ramp Tooth Resting Filler 68. Ramp Tooth Resting Filler 68B is divided vertically into a Top Ramp Tooth Resting Filler Member 68B-M1 and Bottom Ramp Tooth Resting Filler Member 68B-M2. The only difference between Ramp Tooth Resting Filler 68A and Ramp Tooth Resting Filler 68B is that Bottom Ramp Tooth Resting Filler Member 68B-M2 is slightly shorter than Bottom Ramp Tooth Resting Filler Member 68A-M2. This modification might give a better fit, since the bottom half of a Ramp Tooth Resting Filler 68 has to compress (and shorten) as Ramp Tooth Resting Filler 68 is bend; and dividing Ramp Tooth Resting Filler 68 vertically and allowing each division to bend independently, will force less compression on bottom said division. The ideal shapes of Top Ramp Tooth Resting Filler Member 68B-M1 and Bottom Ramp Tooth Resting Filler Member 68B-M2 can be obtained through experimentation.

FIGS. 150 and 151 show a Ramp Tooth Resting Filler 68C. Ramp Tooth Resting Filler 68C is divided vertically into a Top Ramp Tooth Resting Filler Member 68C-M1 and Bottom Ramp Tooth Resting Filler Member 68C-M2.

Ramp Tooth Resting Filler 68C is identical to Ramp Tooth Resting Filler 68B, except that it has a Hook 68C-M1-S1 at the front-end of its Top Ramp Tooth Resting Filler Member 68C-M1. Hook 68C-M1-S1 is inserted into a Groove 63A-S1 of its Leveling Extension 63A (see FIG. 152); so that the front-end of Ramp Tooth Resting Filler 68C is radially fixed relative to its Leveling Extension 63A. This is necessary so that the front-end of Ramp Tooth Resting Filler 68C will not interfere with the teeth of its Transmission Belt during re-engagement; due to the centrifugal forces that force the front-end of Ramp Tooth Resting Filler 68C away from the surface of its cone.

Leveling Extension 63A of the previous paragraph is shown in FIGS. 152 and 153. It is identical to Leveling Extension 63, except that it has a Groove 63A-S1. In order to shape Groove 63A-S1 into Leveling Extension 63A, Leveling Extension 63A has the following modification over Leveling Extension 63: a) Transmission Belt Rest 65 is divided into a Left Transmission Belt Rest 65A-M1 and a Right Transmission Belt Rest 65A-M2; the inner-lateral-ends of the Left Transmission Belt Rest 65A-M1 and Right Transmission Belt Rest 65A-M2 form Groove 63A-S1 (see FIG. 153); and in order to prevent said inner-lateral-ends from separating from their Leveling Extension Base 64A, Left Transmission Belt Rest 65A-M1 has a Hook 65A-M1-S1 and Right Transmission Belt Rest 65A-M2 has a Hook 65A-M2-S1; and b) Leveling Extension Base 64A has an additional groove, which is Groove 64A-S2, over Leveling Extension Base 64. Groove 64A-S2 is shaped so that Hook 65A-M1-S1 and Hook 65A-M2-S1 can be inserted into it; and Groove 64A-S2 is shaped so that it has surfaces that prevent Hook 65A-M1-S1 and Hook 65A-M2-S1 from separating from Leveling Extension Base 64A (see FIG. 153).

Left Flange Filler 69 and a Right Flange Filler 70 are bonded/glued to the front end of their Leading End Torque Transmitting Member Reinforcement Plate, see FIGS. 142 and 143. Note: in FIG. 142, a Reinforcement Plate 61 is used as the Leading End Torque Transmitting Member Reinforcement Plate. Since the teeth of a Transmission Belt can rest on Ramp Tooth Resting Filler 68, Left Flange Filler 69 and a Right Flange Filler 70 are optional; and can be omitted if it is impractical to design them so that they have sufficient stiffness to sufficiently resist the centrifugal forces applied to them.

Left Flange Filler 69 (shown by itself in FIGS. 154 and 155) is an elastomer/flexible member that has Filler Shape 69-S1, which is shaped so that its top surface provides a proper/adequate resting place for a flange of its Transmission Belt, while its bottom surface is resting on top of a Leveling Extension Flange Support 65-S2 of its Leveling Extension 63 or Leveling Extension 63A. The shape of Filler Shape 69-S1 can be easily determined by experimentation and/or mathematics.

In order to provide sufficient lateral and vertical stiffness to Filler Shape 69-S1, a Stiffener Shape 69-S2 is shaped to the left (when viewed from the front) of Filler Shape 69-S1. Stiffener Shape 69-S2 has two Reinforcement Wires 69-M1, which can be omitted if Stiffener Shape 69-S2 can be made sufficiently stiff without said Reinforcement Wires 69-M1.

Right Flange Filler 70 (shown by itself in FIGS. 156 and 157) is identical to Left Flange Filler 69, except that its Stiffener Shape 70-S2 is shaped to the right (when viewed from the front), instead of to the left, of its Filler Shape 70-S1.

Ramp Leveling Base 67 of Leveling Extension Ramp Guide 71 (see FIGS. 158 and 159) is used to provide a level (or almost level) resting surface for the Supporting Plates 64-M1 of Leveling Extension 63 that are positioned on Ramp Surface 66-S3. The Supporting Plates 64-M1 that are positioned on Ramp Surface 66-S3 are resting at an angle that is not Normal to the conical surfaces of Cone 66. All conical surfaces of Cone 66 (which are Base Surface 66-S1, Raised Surface 66-S2, and Ramp Surface 66-S3) should have the same incline.

When a Supporting Plate 64-M1 is resting at an angle that is not Normal to the conical surfaces of Cone 66, as required for the Supporting Plates 64-M1 that are positioned on Ramp Surface 66-S3 (see FIG. 158), then the incline of the bottom surface of said Supporting Plate 64-M1 does not match the incline of the conical surface of Cone 66 on which it is resting.

In order to compensate for the difference in incline between “the bottom surfaces of the Supporting Plates 64-M1 that are resting on Ramp Surface 66-S3” and “the surface of Ramp Surface 66-S3 they are resting on”, Ramp Leveling Base 67 is positioned between the bottom surfaces of these Supporting Plates 64-M1 and the surface of Ramp Surface 66-S3 (see FIGS. 158 and 159).

Ramp Leveling Base 67 is a flexible elastomer layer that is resting on Ramp Surface 66-S3 and provides a level (or almost level) resting surface for all Supporting Plates 64-M1 that are resting on Ramp Surface 66-S3. Additionally, Ramp Leveling Base 67 should preferably also be shaped so as to compensate for changes of curvature of Ramp Surface 66-S3, which is due to changes in the diameter of Cone 66 along the width Ramp Leveling Base 67. The ideal/acceptable shape of Ramp Leveling Base 67 can be easily determined by experimentation and/or mathematics.

The rotational position and rotational alignment of Ramp Leveling Base 67 relative to its Cone 66 are constraint by the ends of Ramp Surface 66-S3 (see vertical dash-dot lines of FIG. 140). The axial alignment of Ramp Leveling Base 67 relative to the bottom surfaces of its Supporting Plates 64-M1 can be constrained by the friction between “the engaging surfaces of Ramp Leveling Base 67” and “the bottom surfaces of its Supporting Plates 64-M1”; or alternately and preferably through the engagement of a Protrusion 67A-S1 of a Ramp Leveling Base 67A with complementary indentations of Supporting Plates 64A-M1 (see FIG. 160).

Leveling Extension Ramp Guide 72 (FIGS. 162 to 167)

A preferable alternate to Leveling Extension Ramp Guide 71, which is labeled as Leveling Extension Ramp Guide 72, is shown in FIG. 162. Leveling Extension Ramp Guide 72 is identical to the Leveling Extension Ramp Guide 71 described in the previous section, except that here Ramp Leveling Base 67, Left Flange Filler 69, and a Right Flange Filler 70 are replaced with a Guiding Member 73 (see FIGS. 163 to 165).

Guiding Member 73 comprises of a Ramp Leveling Base 67 that is connect by “a Left Strap 74 to a Left Flange Filler 69A”, and by “a Right Strap 75 to Right Flange Filler 70A”;

and a Strap Connector 76, which connects Left Strap 74 to Right Strap 75, and to which the front-end of Ramp Leveling Base 67 is fixed.

Left Flange Filler 69A is basically identical to Right Flange Filler 70; and Right Flange Filler 70A is basically identical to Left Flange Filler 69. The reason for the "right-to-left swap" is because in FIG. 163, Guiding Member 73 is viewed from the rear; and in FIG. 143, Reinforcement Plate 61 is viewed from the front.

For Leveling Extension Ramp Guide 72, the front-ends of Left Flange Filler 69A and Right Flange Filler 70A are connected to Strap Connector 76 through either Left Strap 74 or Right Strap 75 respectively. And since Strap Connector 76 is held in place radially by its Leveling Extension 63 (see FIG. 162), this will also hold in place radially the front-ends of Left Flange Filler 69A and Right Flange Filler 70A; so that they will not interfere with their Transmission Belt during re-engagement, due to the centrifugal forces that force the front-ends of Left Flange Filler 69A and Right Flange Filler 70A away from the surface of their cone.

In order to account for Strap Connectors 76, Ramp Surfaces 66-S3 of Cone 66 have to be slightly modified. Shown in FIG. 166 are all unique surfaces (unique in terms of distance from cone-center to cone-surface) of Cone 66, which are: Base Surface 66-S1, Raised Surface 66-S2, and Ramp Surface 66-S3. A Cone 66A, for which a section at an infinite diameter (straight surface) is shown in FIG. 167, is a slightly modified Cone 66 that accounts for Strap Connectors 76, so that it can be used with Leveling Extension Ramp Guides 72.

Cone 66A is identical to Cone 66; except that between each Ramp Surface 66A-S3 and Raised Surface 66A-S2, an Indentation 66A-S4 is shaped (see FIG. 167). A Cone 66A, like a Cone 66, has two opposite sets of Base Surfaces 66A-S1, Raised Surface 66A-S2, and Ramp Surface 66A-S3; and as such, it also has two oppositely positioned Indentations 66A-S4.

Each Indentation 66A-S4 of a Cone 66A, is for the insertion of a Strap Connector 76 of a Leveling Extension Ramp Guide 72. Each Strap Connector 76 will be loosely inserted into its Indentation 66A-S4, since there has to be some play between Indentations 66A-S4 and their Strap Connectors 76, to account for the changes in curvature of their Cone 66 as the Strap Connectors 76 are moved axially; but preferably Indentations 66A-S4 are as narrow as allowable, in order to minimize losses in supporting surfaces of Cone 66A. The acceptable shape for Indentations 66A-S4 can be easily obtained through simple experimentation.

Ramp Tooth Resting Filler 68D (FIGS. 168 to 174)

Ramp Surface 66-S3 (see FIG. 140) is used to "raise the surface of a conical surface from a Base Surface to a Raised Surface" for different conical diameters (from the smallest pitch diameter to the largest pitch diameter); note: in FIG. 140 a straight surface is shown for simplicity. In order to provide the same raising height for all conical diameters, the length of Ramp Surface 66-S3 should be the same or substantially the same for all conical diameters.

Since the length of Ramp Surface 66-S3 (on which the bottom surface of Ramp Tooth Resting Filler 68 is resting) is the same for all conical diameters, the top surface of Ramp Tooth Resting Filler 68 has to "stretch lengthwise" more-and-more as the conical diameter where it is positioned is decreased. Since decreasing the conical diameter where Ramp Surface 66-S3 is positioned, results in more bending of Ramp Surface 66-S3. And more bending of Ramp Surface 66-S3 results in a larger length difference between the bottom surface and the top surface of a Ramp Surface 66-S3. In order to avoid having to stretch the top surface of Ramp Tooth Resting Filler 68 as the conical diameter where it is positioned is decreased, Ramp Tooth Resting Filler 68D can be used.

Ramp Tooth Resting Filler 68D is shown in FIGS. 168 and 169. It comprises of a Rear Member 68D-M1 (which is shown by itself in FIGS. 171 and 172) and a Front Member 68D-M2 (which is shown by itself in FIGS. 173 and 174). Rear Member 68D-M1 and Front Member 68D-M2 can be separated lengthwise as required.

Rear Member 68D-M1 has a bottom-surface that is shaped so that it can rest on top of its Leveling Extension 63A, a top-surface that is shaped so that it can provide a resting surfaces for the teeth of its Transmission Belt, a rear-surface for fixing it to its Leading End Torque Transmitting Member Reinforcement Plate (in FIG. 170, a Reinforcement Plate 61 is used as the Leading End Torque Transmitting Member Reinforcement Plate), and a front-surface that is facing the rear-surface of Front Member 68D-M2 (see FIGS. 171, 172, and 169).

Additionally, the front-end of the bottom-surface of Rear Member 68D-M1 has a Hook 68D-M1-S1 (see FIGS. 171 and 172). Hook 68D-M1-S1 is used to hold in place the front-end of Rear Member 68D-M1; through the engagement of Hook 68D-M1-S1 with Groove 63A-S1 of its Leveling Extension 63A (see FIGS. 170, 152, and 153).

And Rear Member 68D-M1 also has a Groove 68D-M1-S2 (see FIGS. 171 and 172). Into Groove 68D-M1-S2, a Tongue 68D-M2-S2 of Front Member 68D-M2 can be slideably inserted; in a manner such that Tongue 68D-M2-S2 can move lengthwise relative to Groove 68D-M1-S2, but cannot separate radially from Groove 68D-M1-S2 (see FIGS. 168 to 169).

Front Member 68D-M2 has a bottom-surface that is shaped so that it can rest on top of its Leveling Extension 63A, a top-surface that is shaped so that it can provide a resting surface for the teeth of its Transmission Belt, and a rear-surface that is facing the front-surface of Rear Member 68D-M1 (see FIGS. 173, 174, and 169).

Additionally, the front-end of the bottom-surface of Front Member 68D-M2 has a Hook 68D-M2-S1 (see FIGS. 173 and 174). Hook 68D-M2-S1 is used to hold in place the front-end of Front Member 68D-M2; through the engagement of Hook 68D-M2-S1 with Groove 63A-S1 of its Leveling Extension 63A (see FIGS. 170, 152, and 153).

And the rear-end of Front Member 68D-M2 has a Tongue 68D-M2-S2 (see FIGS. 173 and 174). Tongue 68D-M2-S2 can slide lengthwise relative to Groove 68D-M1-S2 of Rear Member 68D-M1, but cannot separate radially from Groove 68D-M1-S2 (see FIGS. 168 to 169). In addition, the top-surface of Tongue 68D-M2-S2 is shaped so that it can provide a resting surface for the teeth of its Transmission Belt.

Ramp Resting Filler 77 (FIGS. 175 to 188)

Described in in this section is a Ramp Resting Filler 77 that can be used to replace Ramp Tooth Resting Filler 68, Left Flange Filler 69, and Right Flange Filler 70 of a Leveling Extension Ramp Guide 71 described previously.

Top surfaces of Ramp Resting Filler 77 provide level resting surfaces for its Transmission Belt, while the bottom surfaces of Ramp Resting Filler 77 are resting on top of a Leveling Extension 63A (see FIGS. 152 and 153) that is guided from a Base Surface 66-S1 of a Cone 66 to a Raised Surface 66-S2 of said Cone 66 (see FIGS. 139 and 175). Because of time limitations, the surfaces of Cone 66 are shown to have an infinite diameter (straight surface).

The rear-end of Ramp Resting Filler 77 is bonded/glued to the front end of its Leading End Torque Transmitting Member Reinforcement Plate (in FIG. 175, a Reinforcement Plate 61 is used as the Leading End Torque Transmitting Member Reinforcement Plate). For clarity, FIG. 176 shows only Ramp Resting Filler 77 and Reinforcement Plate 61 to which it is bonded/glued.

FIGS. 177 and 178 show Ramp Resting Filler 77 by itself. Ramp Resting Filler 77 comprises of a Base 77-M1, a Tooth Rest 77-M2, and a Flange Rest 77-M3; which are stacked on top of each other and held together by Hooks and Grooves, which allow them to slide longitudinally relative to each other, while restricting any other relative movement between them.

The longitudinal sliding of the layers of Ramp Resting Filler 77 is used to replace the required stretching of the upper sections of Tooth Resting Filler 68, Left Flange Filler 69, and Right Flange Filler 70; due to the bending at different diameters of Tooth Resting Filler 68, Left Flange Filler 69, and Right Flange Filler 70.

Base 77-M1 is shown in FIGS. 179 and 180. The rear-end of Base 77-M1 is fixed to its Leading End Torque Transmitting Member Reinforcement Plate (in FIGS. 175 and 176, a Reinforcement Plate 61 is used as the Leading End Torque Transmitting Member Reinforcement Plate). Base 77-M1 has two parallel Grooves 77-M1-S1 that cut through the entire length of Base 77-M1; so as not to limit the forward movements of Hooks 77-M2-S1 of Tooth Rest 77-M2, which are inserted into them.

Tooth Rest 77-M2 is shown in FIGS. 181 and 182. It has two parallel Hooks 77-M2-S1 that each slide inside a Groove 77-M1-S1 of Base 77-M1. The engagement between Hooks 77-M2-S1 with their Grooves 77-M1-S1 allows Tooth Rest 77-M2 to slide longitudinally relative to Base 77-M1, as required during bending of Ramp Resting Filler 77; but will prevent Tooth Rest 77-M2 from moving sideways or vertically relative to Base 77-M1.

Tooth Rest 77-M2 also has two parallel Grooves 77-M2-S2 that cut through the entire length of Tooth Rest 77-M2; so as not to limit the forward movements of Hooks 77-M3-S1 of Flange Rest 77-M3, which are inserted into them.

Tooth Rest 77-M2 also has a Shelf 77-M2-S3 (see FIG. 181). Shelf 77-M2-S3 is used to provide a resting surface for the teeth of its Transmission Belt. The resting surface for the teeth of its Transmission Belt to the rear of Shelf 77-M2-S3 is provided by Base 77-M3-S2 of Flange Rest 77-M3.

Shelf 77-M2-S3 is used to replace the resting surface of Base 77-M3-S2 that is discontinued (see FIG. 183). The reason Base 77-M3-S2 is discontinued is because if Base 77-M3-S2 was to be continued further lengthwise, it will eventual interference with Leveling Extension 63A as it is ramping-up from Base Surface 66-S1 to Raised Surface 66-S2 (see FIG. 175).

Tooth Rest 77-M2 also has a Front Hook 77-M2-S4, which is inserted into Groove 63A-S1 of its Leveling Extension 63A (see FIG. 153); so that the front-end of Tooth Rest 77-M2 is radially fixed relative to its Leveling Extension 63A. This is necessary so that the front-end of Tooth Rest 77-M2 will not interfere with the teeth of its Transmission Belt during re-engagement; due to the centrifugal forces that force the front-end of Tooth Rest 77-M2 away from the surface of its cone.

Flange Rest 77-M3 is shown in FIGS. 183 and 184. It has two parallel Hooks 77-M3-S1 that each slide inside a Groove 77-M2-S2 (see FIGS. 181 and 182). The engagement between Hooks 77-M3-S1 with their Grooves 77-M2-S2 allows Flange Rest 77-M3 to slide longitudinally relative to Tooth Rest 77-M2, as required during bending of Ramp Resting Filler 77; but will prevent Flange Rest 77-M3 from moving sideways or vertically relative Tooth Rest 77-M2.

The rear portion of Flange Rest 77-M3 is shaped so that it has two Flange Supports 77-M3-S3 that are joined by a Base 77-M3-S2 (see FIG. 184). A cut across the width of Flange Rest 77-M3, which is labeled as Cut 77-M3-S4, will remove surfaces of said rear portion of Flange Rest 77-M3, in order to avoid interference between Flange Rest 77-M3 and Leveling Extension 63A as it is ramping-up from Base Surface 66-S1 to Raised Surface 66-S2 (see FIG. 175). Specifically, Cut 77-M3-S4 removes the surfaces of Flange Supports 77-M3-S3 and Base 77-M3-S2 that interfere with Leveling Extension 63A as it is ramping-up.

FIGS. 185 and 186 show a Flange Rest 77A-M3. Flange Rest 77A-M3 is identical to Flange Rest 77-M3, except that a Left Stiffener Shape (labeled as Left Stiffener Shape 77A-M3-S1) is shaped to the left of the left Flange Support of Flange Rest 77A-M3, and a Right Stiffener Shape (labeled as Right Stiffener Shape 77A-M3-S2) is shaped to the right of the right Flange Support of Flange Rest 77A-M3. The Flange Supports of Flange Rest 77A-M3 are identical to Flange Supports 77-M3-S3 of Flange Rest 77-M3.

FIGS. 187 and 188 show a Flange Rest 77B-M3. Flange Rest 77B-M3 is identical to Flange Rest 77A-M3, except that Left Strap 74, Right Strap 75, Strap Connector 76, and Ramp Leveling Base 67 of Guiding Member 73 (see FIGS. 163 to 165) are fixed to it.

Here the front-end of Ramp Leveling Base 67 is connected by Left Strap 74 to the front-end of the Left Stiffener Shape of Flange Rest 77B-M3 (which here is labeled as Left Stiffener Shape 77B-M3-S1), and is connected by Right Strap 75 to the front-end of the Right Stiffener Shape of Flange Rest 77B-M3 (which here is labeled as Right Stiffener Shape 77B-M3-S2).

And like for Guiding Member 73; for Flange Rest 77B-M3, Strap Connector 76 connects Left Strap 74 to Right Strap 75; and the front-end of Ramp Leveling Base 67 is fixed to Strap Connector 76.

Non-Torque Transmitting Member with Bumps (FIGS. 189 to 192)

FIG. 189 shows a section of a Non-Torque Transmitting Member Section 23A-M1, and FIG. 190 shows a sectional-view of FIG. 189. Non-Torque Transmitting Member Section 23A-M1 is identical to Non-Torque Transmitting Member Section 23-M1 described earlier, except that it has Bumps 23A-M1-S3. Bumps 23A-M1-S3 are shaped and positioned on the surface of their Non-Torque Transmitting Member Section so as to hold the teeth of their Transmission Belt in their ideal circumferential-position on their Non-Torque Transmitting Member Section (see FIG. 191). And Bumps 23A-M1-S3 are also shaped so that the teeth of their Transmission Belt can jump over them during pitch diameter Change of their Cone. If desired, Bumps 23A-M1-S3 can be used with a Transmission Belt for which the shape of the bottom surfaces of its teeth are reshaped, in a manner so as to improve/optimize the performance of Bumps 23A-M1-S3 with which said Transmission Belt is used with.

Bumps 23A-M1-S3 can be used to minimize engagement inaccuracies due to stretching of its Transmission Belt, and can be used to transmit some torque so as to supplement the torque transmitted by its Torque Transmitting Member.

If Bumps 23A-M1-S3 are used with a regular Transmission Belt than the pitch diameter of their Cone has to be changed in "2-teeth steps" in order to ensure that Bumps 23A-M1-S3 are properly positioned so as to hold the teeth of their Transmission Belt in their ideal circumferential-position, as shown in FIG. 191. This because if the pitch diameter of its Cone is only changed in "1-tooth steps", then there are instances where the width of the spaces between their Torque Transmitting Member and their Non-Torque Transmitting Member, each are "an integer of a full-tooth and a residue of half-a-tooth". So that Bumps 23A-M1-S3, which are positioned adjacent to said spaces, are positioned half-a-tooth off relative to the teeth of their Transmission Belt.

If it is desired to change the pitch diameter of a Cone in only "1-tooth steps", then a Transmission Belt 78 (shown in FIG. 192) can be used with a Non-Torque Transmitting Member that has Bumps 23A-M1-S3. Transmission Belt 78 is identical to regular toothed Transmission Belt, except that it has Cuts 78-S1 for Bumps 23A-M1-S3. Cuts 78-S1 are positioned at bottom surfaces of all of the teeth of Transmission Belt 78, in a manner such that Cuts 78-S1 are width-wise positioned at the mid-width of their teeth. Cuts 78-S1 are shaped so that Bumps 23A-M1-S3 can enter them and engage them. The engagement of Cuts 78-S1 with Bumps 23A-M1-S3 can be used to resist relative circumferential-movements between them. And Cuts 78-S1 are also shaped so that they can jump over Bumps 23A-M1-S3 during pitch diameter Change of their Cone.

Non-Torque Transmitting Member Section 23A-M1 is preferably only used in a CVT for which the tension in their Transmission Belts are reduced during pitch diameter change, such as a CVT 6 of U.S. Pat. No. 9,651,123.

Improved Ramp Leveling Base for a Leveling Extension Ramp Guide (FIG. 193)

Described in this section is a Ramp Leveling Base 67C that can be used to a replace the Ramp Leveling Base 67 of a Leveling Extension Ramp Guide 71, a Leveling Extension Ramp Guide 72, or any other part that uses a Ramp Leveling Base 67.

FIG. 139 is not accurately drawn, since the distance between the "Leading End Slot of a Torque Transmitting Member (which is labeled as Leading End Slot 12-A1 in FIG. 53)" and the "base of its Ramp Surface 66-S3 (see FIG. 139)" changes as the pitch diameter of their Cone is changed.

This is because: a) the "Leading End Slot of a Torque Transmitting Member" and the "base of its Ramp Surface 66-S3" each are aligned/"almost aligned" with a radial line of their Cone; b) the "Leading End Slot of a Torque Transmitting Member" and the "base of its Ramp Surface 66-S3" are aligned/"almost aligned" with different radial lines of their Cone; and c) the space between two different radial lines increases as the diameter of their Cone is increased.

But ideally, the distance between the "Leading End Slot of a Torque Transmitting Member" and the "base of its Ramp Surface 66-S3" should remain constant as the pitch diameter of their Cone is changed, so that a Leveling Extension Ramp Guide (refer to Leveling Extension Ramp Guide 71 or Leveling Extension Ramp Guide 72 described earlier) is always ideally position relative to its Ramp Surface 66-S3 for all pitch diameters of its Cone.

Additionally, while the "Leading End Slot of a Torque Transmitting Member" and the "Leading End Slot of a Non-Torque Transmitting Member" should be aligned with a radial line of their Cone; for a Ramp Surface 66-S3, it is recommended that only its top-edge or its bottom-edge is aligned with a radial line of its Cone. This is because the length of a Ramp Surface 66-S3 preferably remains constant as the pitch diameter of its Cone is changed, since the length of a Ramp Leveling Base 67 (see FIG. 158) is fixed; and this requires a slight angle between the top-edge of a Ramp Surface 66-S3 and the bottom edge of a Ramp Surface 66-S3 because of the change of curvature of the Cone of said Ramp Surface 66-S3.

Preferably, the top-edge of a Ramp Surface 66-S3 is aligned with a radial line of its Cone; so that the bottom edge of a Ramp Surface 66-S3 will be slightly angled relative to a radial line of its Cone, since this can be compensated for by a Ramp Leveling Base.

Ideally the bottom edge of a Ramp Surface 66-S3 should also be aligned with a radial line of its Cone, so that the bottom edge of a Ramp Surface 66-S3 can support the entire width of its Leveling Extension 63 (see FIG. 140), but as per the previous paragraph, it is not.

In order to compensate for the surface of the Cone of a Ramp Surface 66-S3 that does not provide support for its Leveling Extension 63 (or Leveling Extension 63A) because of the angle between the bottom edge of said Ramp Surfaces 66-S3 with a radial line of said Cone, a Ramp Leveling Base 67C that has Filler Surface 67C-S1 can be used (see FIG. 193).

The left-edge of Filler Surface 67C-S1 should be straight so that it is aligned with a radial line of its Cone, while the right-edge of Filler Surface 67C-S1 (shown in hidden-lines) should be shaped so as to minimizes the space between it and the bottom edge of its Ramp Surface 66-S3 without interfering with the bottom edge of its Ramp Surface 66-S3 for all pitch diameters of their Cone. The bottom surface and the top surface of Filler Surface 67C-S1 should be shaped so that Ramp Leveling Base 67C can smoothly support its Leveling Extension 63, this should also account for twisting of Ramp Surface 66-S3 due to the fact that the bottom edge of a Ramp Surface 66-S3 will be slightly angled relative to a radial line of its Cone. The ideal shape of Filler Surface 67C-S1 can be obtained through basic math, tracing, experimentation, etc.

Cone 66 shown in FIG. 139 is the only item of this specification that is not accurately drawn, and as such should not be used. But, somebody skilled in the art should be able to use all other items of this specification based on the description provided.

"Cone with Rotatable Raised Surfaces" for Replacing Cone 66 (FIGS. 194 to 206)

Described in this section is a Cone Assembly 84, which is a cone that has rotatable Raised Surfaces 80. Cone Assembly 84 should be used instead of Cone 66 for all previously described items that use Cone 66.

Cone Assembly 84 is basically identical to Cone 12 (see FIG. 53), except that it has two oppositely positioned Raised Surface 80 placed on the top surface of its Cone. Each Raised Surface 80 has a Ramp 80-S1; a Raised Surface, which is not labeled; and a Rear Surface 80-S2 (see FIG. 196).

The purpose of Raised Surfaces 80 is to raise their Leveling Extension 63 from a Base Surface to a Raised Surface, just like the purpose of Raised Surfaces 66-S2 and Ramp Surfaces 66-S3 of Cone 66.

The difference is that while Raised Surfaces 66-S2 and Ramp Surfaces 66-S3 are fixed to their Cone, Raised Surfaces 80 can rotate relative to their Cone. FIGS. 194 to 196 show how Raised Surfaces 80 can rotate relative to their Cone so that they are always ideally positioned relative to the rear-edge of their Ramp Leveling Base 67 (see FIG. 158), regardless of the diameter at which the front-surface of the rear-edge of their Ramp Leveling Base 67 is positioned. In FIGS. 194 to 196, the labeling Dia. 1, Dia. 2, or Dia. 3, indicate the diameter at which the front-surface of the rear-edge of their Ramp Leveling Base 67 is positioned.

An assembled Cone Assembly 84 is shown in FIGS. 197 and 198. It has a Cone 79 on which Raised Surfaces 80 are placed. Raised Surfaces 80 are held in place by a Rear Ring 81 (which is shown by itself in FIGS. 201 and 202), and a Front Ring 82 (which is shown by itself in FIGS. 203 and 204).

Rear Ring 81 is shaped like a ring that has a Conical Inner Surface 81-S1 (see FIGS. 201 and 202). The purpose of Conical Inner Surface 81-S1 is to engage with the rear-sections of the top-surfaces of Raised Surfaces 80, so as to radially fix the rear-ends of Raised Surfaces 80 to Cone 79 (see FIG. 197).

Front Ring 82 is shaped like a ring that has a Conical Inner Surface 82-S1 (see FIGS. 203 and 204). The purpose of Conical Inner Surface 82-S1 is to engage with a front-sections of the top-surfaces of Raised Surfaces 80; so as to radially fix the front-ends of Raised Surfaces 80 to Cone 79, and so as to prevent any axial-forward movements of Raised Surfaces 80 relative to Cone 79.

Cone 79 is shown by itself in FIGS. 199 and 200. In order to be able to secure Raised Surfaces 80 to Cone 79, Cone 79 has a Rear Flange 79-S1 and Front Extension 79-S2. Front Extension 79-S2 also has Locking Ring Groove 79-S3. The purpose of Rear Flange 79-S1 is to provide a surface to which Rear Ring 81 can be fixed; and to engage with the back surfaces of Raised Surfaces 80, so as to prevent any axial-rearward movements of Raised Surfaces 80 relative to Cone 79. The purpose of Front Extension 79-S2 is to provide a means for fixing a Locking Ring 83 to Cone 79; the purpose of Locking Ring 83 is to fix Front Ring 82 to Cone 79.

Additionally, Cone 79 also has a Spline Profile 79-S4 for a Spline to be used with Cone 79. Obviously, each cone of this specification should have a "means for coupling said cone to a means for transmitting rotation". Wherein "means for transmitting rotation" can be a shaft, spline, etc.; and "means for coupling said cone to a means for transmitting rotation" can be a spline profile, keyed shaft hole, torque transmitting shaft collar, etc.

Once Raised Surfaces 80 are positioned on Cone 79, they are secured to Cone 79 by fixing Rear Ring 81 to Rear Flange 79-S1 through gluing, through the use of fasteners, etc.; and by sliding Front Ring 82 onto Front Extension 79-S2, and then securing it to Front Extension 79-S2 through the use of Locking Ring 83.

Each Ramp 80-S1 of each Raised Surface 80 is used to guide a Leveling Extension from "the surface of Cone 79 on which Raised Surfaces 80 are resting" to "its Raised Surface". Preferably, the top-edge of each Ramp 80-S1 is aligned with a radial line of Cone 79; and ideally Ramp 80-S1 is shaped so as to follow the Ramp outline of its Ramp Leveling Base for each resting diameter of its Ramp Leveling Base. The shape of Ramps 80-S1 do not have to be perfect; although if so, Cone Assembly 84 will not provide a perfectly round resting surface for its Transmission Belt, it will still work. A sprocket does not provide a perfectly round resting surface for its chain either, but it works.

The rotational position of a Raised Surface 80 when that Raised Surface 80 needs to be rotated towards its leading end slot (for Cone 12 the leading end slots are labeled as Torque Transmitting Member Leading End Slot 12-A1 and Non-Torque Transmitting Member Leading End Slot 12-B1) is controlled through the engagement of the Rear Surface 80-S2 of that Raised Surface 80 (see FIG. 196) with a Bump 85 that is positioned adjacent to that Rear Surface 80-S2. A Bump 85 is fixed to each, the Torque Transmitting Member and the Non-Torque Transmitting Member that are used with Cone Assembly 84.

Figure 97:
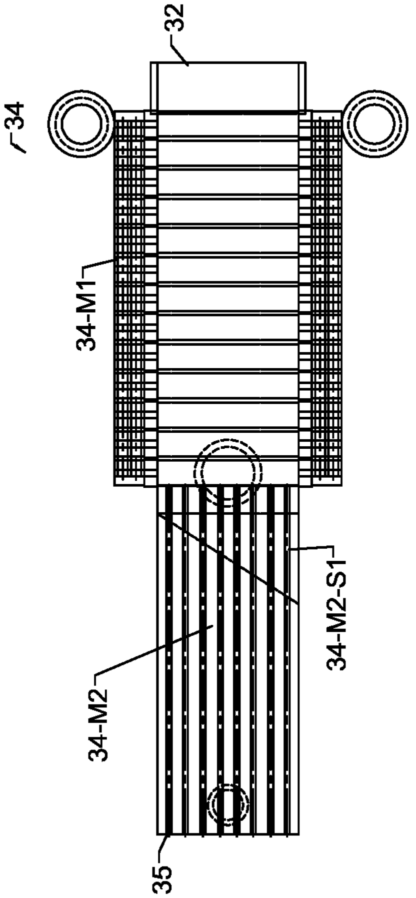
FIG. 97 shows a top-view of Non-Torque Transmitting Member 34.

A Bump 85 should be positioned on the "rear surface of the Member Width Clearance Support" of each Torque Transmitting Member and each Non-Torque Transmitting Member used with Cone Assembly 84. The item "Member Width Clearance Support" was previously described in this specification, and a Member Width Clearance Support 31-M2-S1 is shown in FIGS. 90 to 92; and Member Width Clearance Support 34-M2-S1 is shown in FIGS. 96 to 98.

An example of a Torque Transmitting Member that has a Bump 85 is shown in FIGS. 205 and 206, which show a Torque Transmitting Member 31A. Torque Transmitting Member 31A is identical to Torque Transmitting Member 31 described earlier; except that it has a Bump 85 fixed to its Member Width Clearance Support (which labeled as Member Width Clearance Support 31A-S1).

A Bump 85 should be positioned and dimensioned so that when it is assembled on its Cone Assembly 84, it is the only surface of its Torque Transmitting Member or its Non-Torque Transmitting Member that engages with the Rear Surface 80-S2 of the Raised Surface 80 that is used to support the Leveling Extension of its Torque Transmitting Member or its Non-Torque Transmitting Member. This engagement of Bump 85 with said Rear Surface 80-S2 is used to control the rotational position of said Raised Surface 80.

And the rotational position of a Raised Surface 80 when that Raised Surface 80 needs to be rotated away from its leading end slot (for Cone 12 the leading end slots are labeled as Torque Transmitting Member Leading End Slot 12-A1 and Non-Torque Transmitting Member Leading End Slot 12-B1) is controlled through the engagement of its Ramp 80-S1 with the parts that are fixed to the Leading End Reinforcement Plate that is adjacent to its Ramp 80-S1.

Reinforcement Plates with Centrifugal Force Resisting Pins (FIGS. 207 to 209)

Described in this section are Reinforcement Plates that have Pins for radially connecting said Reinforcement Plates to their Cones; so that the centrifugal forces on said Reinforcement Plates are resisted by said Pins, and not by the elastomers and reinforcement wires of their Torque Transmitting Member/Non-Torque Transmitting Member.

Shown in FIGS. 207 and 208 is a Reinforcement Plate 61B. A Reinforcement Plate 61B is identical to a Reinforcement Plate 61 (see FIGS. 128 and 129), except that it has a Pin 61B-S1 and a Cantilever Support Extension 61B-S2. The purpose of a Pin 61B-S1 is to attach its Reinforcement Plate 61B to its Cone, so that the centrifugal force of its Reinforcement Plate 61B is resisted by the engagement of that Pin 61B-S1 with the surfaces of the slot of its Cone into which that Pin 61B-S1 is inserted. And the purpose of a Cantilever Support Extension 61B-S2 is to resist the moment due to the "centrifugal force of its Reinforcement Plate 61B" and "the resulting counteracting force on its Pin 61B-S1".

In order to ensure that Pins 61B-S1 are always engaged with a surface of their Cone, which can be achieved by inserting them each into an unbroken (uninterrupted) slot; the "slot for the Locking Ring Pin of the Leveling Extension of their Torque Transmitting Member" can be replaced with a slot that does not penetrate the surface of its Cone. This is necessary since said "slot for the Locking Ring Pin of the Leveling Extension of their Torque Transmitting Member" will intersect with the slots for Pins 61B-S1.

Shown in FIG. 209 is a Reinforcement Plate 62B. The "modifications to Reinforcement Plate 62 to obtain Reinforcement Plate 62B" are identical to the "modifications to Reinforcement Plate 61 to obtain Reinforcement Plate 61B". As such, Reinforcement Plate 62B is identical to Reinforcement Plate 62, except that it has a Pin 62B-S1 and Cantilever Support Extension 62B-S2.

Reinforcement Plates 61B and Reinforcement Plates 62B are not preferred, but optional. They will reduce the tension in their Torque Transmitting Member or Non-Torque Transmitting Member, but they will increase the cost and complexity of their Cone Assembly. Based on calculations, the tension in a Torque Transmitting Member or a Non-Torque Transmitting Member due to the centrifugal forces of their Reinforcement Plates can be kept at a reasonable level.

And not using Reinforcement Plates 61B and Reinforcement Plates 62B will not cause vibration, since: a) the force in the direction of the centrifugal force of a Reinforcement Plate has to be resisted no matter how it is attached; and b) the net force on Cone is always equal, the centrifugal forces of the Reinforcement Plates that are covered by their Transmission Belt will reduce the compression force on their Cone due to the tension in their Transmission Belt, so that there will be no variation in the force on their Cone due to Reinforcement Plates coming iNeutrnd-out of contact with their Transmission Belt.

If Reinforcement Plates 61B and Reinforcement Plates 62B are used, then it is recommended that all Reinforcement Plates of their Torque Transmitting Member are Reinforcement Plates 61B, and all Reinforcement Plates of their Non-Torque Transmitting Member are Reinforcement Plates 62B. Since otherwise there would only be only a small benefit in using them.

Since although using them intermittently will reduce the centrifugal load on a "Torque Transmitting Member/Non-Torque Transmitting Member", it will reduce the arc length of the section which centrifugal force has to be resisted by the tension forces at the ends of that section. And this will give a shallower angle for the tension forces at the ends of that section, so as to reduce the component of said tension forces that counteract the centrifugal force.

The maximum tension in a "Torque Transmitting Member/Non-Torque Transmitting Member" due to the centrifugal forces of all of its Reinforcement Plates can be obtained from the equation (which is based on a 180° section) that species that: 2 times the Tension has to be equal to the total centrifugal force of all said Reinforcement Plates.

Cone with Trailing End Torque Transfer Walls (FIGS. 210 to 214)

Described in this section is a Cone with Trailing End Torque Transfer Walls. The purpose of the Trailing End Torque Transfer Walls is to transfer the torque from a Trailing End Reinforcement Plate 87 to its Cone.

The Trailing End Torque Transfer Walls will reduce the moment on a Trailing End Reinforcement Plate due to the height difference between "where the Torque Transmitting Force on said Trailing End Reinforcement Plate is applied" and "the location where the reaction force to said Torque Transmitting Force is applied".

FIG. 210 shows a front-view of Cone 86 for the use with a Torque Transmitting Member and a Non-Torque Transmitting Member. Cone 86 has two oppositely positioned Leading End Slots 86-S1, which serve the same purpose as Torque Transmitting Member Leading End Slot 12-A1 and Non-Torque Transmitting Member Leading End Slot 12-B1 of Cone 12 (see FIG. 53). And two oppositely positioned Trailing End Slots 86-S2, which serve the same purpose as Torque Transmitting Member Trailing End Slot 12-A2 and Non-Torque Transmitting Member Trailing End Slot 12-B2 of Cone 12.

FIG. 211 shows a front-view of Cone 86A; Cone 86A is identical to Cone 86 except that each of its Trailing End Slots 86-S2 have a Trailing End Rear Wall 86A-S1.

And FIG. 212 shows a front-view of Cone 86B. Cone 86B is identical to Cone 86A except that each of its Trailing End Slots also have a Trailing End Front Wall 86B-S1.

The purpose of a Trailing End Rear Wall 86A-S1 and a Trailing End Front Wall 86B-S1 of a Trailing End Slot 86-S2 is to engage with a Pin of its Trailing End Reinforcement Plate. This engagement will be used to transfer torque from said Trailing End Reinforcement Plate to its Cone 86B.

FIGS. 214 and 215 show a "Trailing End Reinforcement Plate with a Pin" for a Torque Transmitting Member. This Trailing End Reinforcement Plate is labeled as Trailing End Reinforcement Plate 87, its Pin is labeled as Pin 87-S1, and its tooth is labeled as Tooth 87-S2. And FIGS. 216 and 217 show a "Trailing End Reinforcement Plate with a Pin" for a Non-Torque Transmitting Member. This Trailing End Reinforcement Plate is labeled as Trailing End Reinforcement Plate 88, and its Pin is labeled as Pin 88-S1.

Trailing End Reinforcement Plate 87 serves the same purpose as Trailing End Reinforcement Plate 13C, and can be attached to its Cone 86, 86A, 86B, or 86C in the same manner Trailing End Reinforcement Plate 13C is attached to its Cone. And Trailing End Reinforcement Plate 88 serves the same purpose as Trailing End Reinforcement Plate 22C, and can be attached to its Cone 86, 86A, 86B, or 86C in the same manner Trailing End Reinforcement Plate 22C is attached to its Cone.

The main purpose of Trailing End Rear Walls 86A-S1 and Trailing End Front Walls 86B-S1 is to engage with the Pins (which are Pin 87-S1 and Pin 88-S1) of their Trailing End Reinforcement Plates (which are Trailing End Reinforcement Plate 87 and Trailing End Reinforcement Plate 88), for the purpose of transferring reverse torque. For this purpose, Trailing End Front Walls 86B-S1 provide the most advantages; since they resist the Force applied on the Trailing End Reinforcement Plates, while Trailing End Rear Walls 86A-S1 are mainly only used to resist the moment due to the height difference between "where said Force is applied" and "the top-end of Trailing End Front Walls 86B-S1".

As such it is preferred that Trailing End Rear Walls 86A-S1 are omitted, since: a) the side surfaces of Trailing End Slots 86-S2 can also engage with Pins 87-S1 and 88-S1, and this engagement will not increase the moment applied on the Trailing End Reinforcement Plates of said Pins; and b) without a re-design that can introduce disadvantages, Trailing End Rear Walls 86A-S1 will interfere with Raised Surfaces 80 and the Leveling Extensions of their Torque Transmitting Member and Non-Torque Transmitting Member.

FIG. 213 shows a Cone 86C, which is identical to Cone 86B, except for having its Trailing End Rear Walls 86A-S1 removed. As such, Cone 86C comprises of a two oppositely positioned Leading End Slots 86C-S1, two oppositely positioned Trailing End Slots 86C-S2, and two oppositely positioned Trailing End Front Walls 86C-S3, which each are shaped on top of the front-end of a Trailing End Slot 86-S2.

Trailing End Front Walls 86C-S3 are aligned relative to the surface of their Cone so that their rear surfaces are parallel to the "Pins with which they engage" for all diameters of their Cone. Since Trailing End Front Walls 86C-S3 slightly wrap around the surface of their Cone, Trailing End Front Walls 86C-S3 slightly twist lengthwise.

The height of Trailing End Front Walls 86C-S3 should be as high as possible without them interfering with the Longitudinal Elastomer Members of their Torque Transmitting Member or Non-Torque Transmitting Member, and without them interfering with the teeth of their Transmission Belt.

Regarding the previous paragraph, FIG. 218 shows: a) a rear-view of a Trailing End Reinforcement Plate 87 that is mounted on a Cone 86C; b) it shows a Trailing End Front Wall 86C-S3 that engages with Pin 87-S1 of said Trailing End Reinforcement Plate 87; c) it shows the side surfaces of a Trailing End Slot 86C-S2 of said Cone 86C, one of which also engages with Pin 87-S1 of said Trailing End Reinforcement Plate 87; and d) it shows that the height of said Trailing End Front Wall 86C-S3 is limited, such that said Trailing End Front Wall 86C-S3 will not interfere with Longitudinal Elastomer Members 89 and Tooth 87-S2 of said Trailing End Reinforcement Plate 87. Since said Trailing End Front Wall 86C-S3 will not interfere with the Tooth 87-S2 of said Trailing End Reinforcement Plate 87, it will also not interfere with the teeth of its Transmission Belt.

In FIG. 218, the portion of Trailing End Front Wall 86C-S3 that is positioned in front of Trailing End Reinforcement Plate 87 is shown in hidden-lines; while the portion of Trailing End Front Wall 86C-S3 that is positioned to the rear of Trailing End Reinforcement Plate 87 is shown in solid-lines.

And in order to avoid interference between Trailing End Front Wall 86C-S3 with Trailing End Reinforcement Plate 87 because of the curvature of Trailing End Front Wall 86C-S3 (see FIG. 213), Trailing End Reinforcement Plate 87 has a Cut 87-S3 (see FIG. 214).

Also, FIG. 218 is not drawn to scale, since it does not accurately show the "height variation of Trailing End Front Wall 86C-S3 when viewed from the rear" due to the curvature of Trailing End Front Wall 86C-S3.

It is recommended that the incline of Cone 86C is small enough such that only the "Reinforcement Plates in front of the Trailing End Reinforcement Plates" interfere with Trailing End Front Walls 86C-S3, in a manner such that they have to be partially supported by Trailing End Front Walls 86C-S3. Since for this design, the height and top-surface of Trailing End Front Walls 86C-S3 can easily be shaped so that they can support the surfaces of the "Reinforcement Plates in front of the Trailing End Reinforcement Plates".

Cone 86C is preferred over a Cone that does not have Trailing End Front Walls 86C-S3. As such, it is the preferred that a Cone Assembly 84 is modified so that it also has Trailing End Front Walls. FIG. 219 shows a Cone Assembly 84A, which is identical to a Cone Assembly 84 except for having Trailing End Front Walls 84A-S1.

Like Cone Assembly 84, Cone Assembly 84A has two oppositely positioned Raised Surfaces 80, which each have ramp (which in FIG. 219 is labeled as Ramp 80-S1). And the Torque Transmitting Member Leading End Slot of Cone Assembly 84A (which has been described earlier for Cone 12 where it is labeled as Torque Transmitting Member Leading End Slot 12-A1) is labeled as Torque Transmitting Member Leading End Slots 84A-S2 in FIG. 219.

Preferred Torque Transmitting Member

In this section, the preferred Torque Transmitting Member for a "Cone with One Torque Transmitting Member" or a "Cone with Two Oppositely Positioned Torque Transmitting Members" is described. The Torque Transmitting Member of this section is labeled as Torque Transmitting Member 97.

Torque Transmitting Member 97 can be used with "Cone with rotatable raised surfaces" that has "Trailing End Torque Transfer Walls", such as a Cone Assembly 84A. But it is preferably used with "Cone with Leveling Extension Raising Surfaces" that has "Trailing End Torque Transfer Walls", such as Cone 112. For the description of this section, Torque Transmitting Member 97 is used with Cone 112 to form a Cone Assembly 113.

The Transmission Belt to be used with Torque Transmitting Member 97, which is labeled as Transmission Belt 90, is shown in FIGS. 220 and 221. Transmission Belt 90 comprises of Belt 90-S1 on which Teeth 90-S2 are shaped on the bottom surface of Belt 90-S1. The side-surfaces of Teeth 90-S2 are tapered.

The removed material of Teeth 90-S2 of Transmission Belt 90 due to the tapers of its side surfaces will allow additional material for the teeth of the Reinforcement Plates used with Transmission Belt 90, so that the bases of the teeth of said Reinforcement Plates can be made thinner. Additionally, the tapers of the side surfaces of Transmission Belt 90 can help align said Reinforcement Plates during engagement between said Reinforcement Plates and Transmission Belt 90.

Additionally, Belt 90-S1 of Transmission Belt 90 has flanges that can provide additional resting support for Transmission Belt 90. Here bending of the flanges of a Belt 90-S1 is resisted by the longitudinal-tension in the flanges of Belt 90-S1, since bending of said flanges will increase the diameter of said flanges relative to the diameter of the other portion of Belt 90-S1. As such, in order to increase the longitudinal-tension resistance of the flanges of Belt 90-S1, the flanges of Belt 90-S1 each have a Reinforcement Cable 90-M1.

Torque Transmitting Member 97 is shown in FIGS. 255 and 256. It comprises of a Torque Transmitting Member Section 97-M1, a Torque Transmitting Member Leveling Extension 97-M2, and parts to connect Torque Transmitting Member Leveling Extension 97-M2 to the Trailing End of Torque Transmitting Member Section 97-M1.

The incline of the bottom surfaces of Torque Transmitting Member Section 97-M1 and Torque Transmitting Member Leveling Extension 97-M2 should match the incline of Cone 112. Torque Transmitting Member 97 has a Leading End and Trailing End.

The cross-section of Torque Transmitting Member Section 97-M1, except for its Trailing End has a Left Section, a Right Section, and a Top Section, such that an Empty Middle Section is formed. The Empty Middle Section of Torque Transmitting Member Section 97-M1 is labeled as Empty Middle Section 97-M1-S1 and is shown in FIG. 257. Note, in FIG. 257 an imaginary line (I-L) is shown to represent the "surface of the cone to which Torque Transmitting Member Section 97-M1 is attached".

Said Top Section is shaped such that it has teeth that can engage with the teeth of Transmission Belt 90, and such that it can support Transmission Belt 90 when it is resting on it. And Empty Middle Section 97-M1-S1 is used for inserting the Leveling Extension of its oppositely positioned Torque Transmitting Member or its oppositely positioned Non-Torque Transmitting Member. In this section, Empty Middle Section 97-M1-S1 is used for inserting a Non-Torque Transmitting Member Leveling Extension 110-M2 of a Non-Torque Transmitting Member 110 (see FIGS. 294 and 295). When inserted into Empty Middle Section 97-M1-S1, Non-Torque Transmitting Member Leveling Extension 110-M2 will be laterally positioned between said Left Section and said Right Section, and vertically positioned between the "surface of the cone to which it is attached" and the bottom surface of said Top Section.

The cross-section of the Trailing End of Torque Transmitting Member Section 97-M1 does not have an Empty Middle Section (see FIG. 258).

Torque Transmitting Member Section 97-M1 comprises of reinforcement plates that are held together by Reinforcement Cables 98 and Longitudinal Elastomer Members 99.

The basic reinforcement plate for Torque Transmitting Member Section 97-M1, which is labeled as Reinforcement Plate 91, is shown in FIGS. 222 to 225. Reinforcement Plate 91 comprises of a Tooth 91-S3 that is supported at its sides by a Left Plate 91-S1 and a Right Plate 91-S2, in a manner so that an empty space is formed between Left Plate 91-S1 and Right Plate 91-S2 beneath Tooth 91-S3 (see FIG. 222). This empty space will be part of the Empty Middle Section of Torque Transmitting Member Section 97-M1 (which is labeled as Empty Middle Section 97-M1-S1 in FIG. 257). Tooth 91-S3 is shaped such that it can engage with the teeth of Transmission Belt 90.

The bottom surfaces of Left Plate 91-S1 and Right Plate 91-S2 have an incline that matches the incline of Cone 112, so that Tooth 91-S3 is horizontally aligned when Reinforcement Plate 91 is resting on the surface of Cone 112.

Left Plate 91-S1 and Right Plate 91-S2 are connected by Tooth 91-S3 through Tooth Ends 91-S4, which are shaped on the left-end and right-end of Tooth 91-S3 (see FIG. 222).

Tooth 91-S3 is shaped like a beam that in addition to Tooth Ends 91-S4, has a Tooth Cavity 91-S5 and a Base 91-S6. Base 91-S6 has two Side Channels 91-S7, which are used for the insertion of Leveling Extension Flange Supports 104-S1 of Non-Torque Transmitting Member Leveling Extension 110-M2 (see FIG. 299).

Additionally, Left Plate 91-S1 and Right Plate 91-S2, each have two Holes 91-S8 for a Reinforcement Cable 98, which are shown in FIG. 256; Holes 91-S8 should be vertically located so that the neutral-axis of Torque Transmitting Member Section 97-M1 vertically coincides with the neutral-axis of Transmission Belt 90 (see FIG. 257). Obviously, if desired Left Plate 91-S1 and Right Plate 91-S2 can also have only one reinforcement cable hole each, instead of two reinforcement cable holes as described.

FIG. 226 shows a Reinforcement Plate 91A. Reinforcement Plate 91A is identical to Reinforcement Plate 91, except that its Base 91-S6 (which for Reinforcement Plate 91A is labeled as Base 91A-S1) has two Slotted Holes 91A-S2. The purpose of Slotted Holes 91A-S2 is to reduce the weight of Reinforcement Plate 91A, which is preferred.

In order to attach Torque Transmitting Member 97 to a Cone 112; a Leading End Reinforcement Plate 91C, a Trailing Sleeve Reinforcement Plate 91D, and a Trailing End Reinforcement Plate 91E are used.

FIGS. 227 to 229 show a Leading End Reinforcement Plate 91B, from which a Leading End Reinforcement Plate 91C will be derived as described later. Leading End Reinforcement Plate 91B is basically identical to Reinforcement Plate 91, except that: a) Left Plate 91-S1 and Right Plate 91-S2 are replaced with Left Tube 91B-S1 and Right Tube 91B-S2; b) its Tooth 91B-S3 has Fillets 91B-S4; and c) and the bottom ends of Left Tube 91B-S1 and Right Tube 91B-S2 are connected by a Slider 91B-S5.

As outlined previously, Leading End Reinforcement Plate 91B comprises of a Tooth 91B-S3 that is supported at its sides by Left Tube 91B-S1 and Right Tube 91B-S2, in a manner so that an empty space is formed between Left Tube 91B-S1 and Right Tube 91B-S2 beneath Tooth 91B-S3 (see FIG. 227). This empty space will be part of the Empty Middle Section of Torque Transmitting Member 97-M1 (which is labeled as Empty Middle Section 97-M1-S1 in FIG. 257).

And Tooth 91B-S3 of Leading End Reinforcement Plate 91B is identical to Tooth 91-S3 of Reinforcement Plate 91, except that it has Fillets 91B-S4. When Torque Transmitting Member 97 and Non-Torque Transmitting Member 110 are assembled on Cone 112; Non-Torque Transmitting Member Leveling Extension 110-M2 of Non-Torque Transmitting Member 110 is inserted into the front-end of Leading End Reinforcement Plate 91B. And as Non-Torque Transmitting Member Leveling Extension 110-M2 is inserted into Leading End Reinforcement Plate 91B, it bends down as it descends from Leveling Extension Raising Surface 112-B5 (see FIG. 307 for Leveling Extension Raising Surface 112-B5 and FIG. 308 for an assembled Cone 112, which labeled as Cone Assembly 113). Fillets 91B-S4 are shaped so as to remove the surfaces of Tooth 91B-S3 that will interfere with the Flanges of Non-Torque Transmitting Member Leveling Extension 110-M2 as it is inserted Leading End Reinforcement Plate 91B.

Additionally, the bottom surfaces of Left Tube 91B-S1 and Right Tube 91B-S2 are fixed to a Slider 91B-S5. During assembly, Slider 91B-S5 is slide-ably inserted into the Torque Transmitting Member Leading End Slot 112-A2 of Cone 112 (see FIG. 307); in a manner so that Slider 91B-S5 can slide along the length of Torque Transmitting Member Leading End Slot 112-A2. The cross-sectional shape of Torque Transmitting Member Leading End Slot 112-A2 and Slider 91B-S5 that is inserted into it, as cut through a plane that is perpendicular to the axis of rotation of Cone 112 is shown in FIG. 230.

The engagement between Slider 91B-S5 and Transmitting Member Leading End Slot 112-A2 are used to: a) transfer torque from Leading End Reinforcement Plate 91B to its Cone 112; and b) radially fix Leading End Reinforcement Plate 91B to its Cone 112. In order to radially fix Leading End Reinforcement Plate 91B to its Cone 112, the bottom portion of Slider 91B-S5 has two Protrusions 91B-S7 (see FIGS. 227 to 229) that each slide in a matching indentation of Transmitting Member Leading End Slot 112-A2 (see FIG. 230).

The top-surface of Slider 91B-S5 is labeled as Slider Top Surface 91B-S6 (see FIGS. 227 to 230). Slider Top Surface 91B-S6 is used to provide a resting base for Leveling Extension Ramp 122B.

Leveling Extension Ramp 122B is partially resting on Cone 112; as such for a good fit, the bottom surface of Leveling Extension Ramp 122B is conically shaped with the same incline as the incline of Cone 112. And since Leveling Extension Ramp 122B is also partially resting on Slider Top Surface 91B-S6, Slider Top Surface 91B-S6 is also conically shaped with the same incline as the incline of Cone 112.

Additionally, Leveling Extension Ramp 122B, which will be resting on Slider Top Surface 91B-S6, has some base thickness (see FIG. 399), but ideally the starting edge of the ramping surface of Leveling Extension Ramp 122B is level with the base surface of Cone 112. As such, in order to compensate for the overall base thickness of Leveling Extension Ramp 122B, the diameter of Slider Top Surface 91B-S6 at its small-diameter-end is the "smallest diameter Leveling Extension resting surface" of Cone 112 that is reduced by the overall base thickness of Leveling Extension Ramp 122B (see FIG. 230).

The "smallest diameter Leveling Extension resting surface" of Cone 112 that is reduced by the overall base thickness of Leveling Extension Ramp 122B is used as the diameter for the small-diameter-end of Slider Top Surface 91B-S6; because if larger diameter is used, then at the smallest pitch diameter of Cone Assembly 113, Leveling Extension Ramp 122B will have surfaces that rises above the top-surface of Cone 112.

Also, the radial-center of Slider Top Surface 91B-S6 and the mid-width of Tooth 91B-S3 (as well as the mid-width of all other teeth of Torque Transmitting Member 97), should all align with a radial-line of Cone 112 (see FIG. 230).

FIGS. 231 to 233 show a Leading End Reinforcement Plate 91C. Leading End Reinforcement Plate 91C is identical to Leading End Reinforcement Plate 91B, except that an Attachment Sleeve 91C-S1 is fixed to its Left Tube (which is labeled as Left Tube 91B-S1 for Leading End Reinforcement Plate 91B).

Like Hole 44-S1 of "Leading End Torque Transmitting Member Reinforcement Plate 44" (see FIGS. 111, 112, 113, and 116); Attachment Sleeve 91C-S1 has a hole that can be used to insert a Rod 50-S1 of a Spline Sleeve 50 (see FIG. 116), for the purpose of controlling and maintaining the axial position of its plate (which is Leading End Reinforcement Plate 91C).

Also if desired, Attachment Sleeve 91C-S1 can be fixed to its Right Tube (which is labeled as Right Tube 91B-S2 for Leading End Reinforcement Plate 91B), instead of its Left Tube.

A Belt Resting Filler 93 is fixed (bonded/glued/etc.) to the front end of Leading End Reinforcement Plate 91C (see FIGS. 234 to 237). Belt Resting Filler 93 is fixed and shaped such that: a) its bottom surfaces are resting on "the top surface of the portion of Non-Torque Transmitting Member Leveling Extension 110-M2 that it is resting on a Leveling Extension Ramp 122B"; in a manner and such that its bottom surfaces fully or almost fully engage with "the top surfaces of the portion of Non-Torque Transmitting Member Leveling Extension 110-M2 that it is resting on a Leveling Extension Ramp 122B". And such that, b) its top surfaces provide resting surfaces for Transmission Belt 90; which is accomplished by having its top surfaces, like all other Transmission Belt 90 resting surfaces of Cone Assembly 113, have a constant diameter.

In other words Belt Resting Filler 93 is shaped so as to fill in the gap between "the top surfaces of the portion of Non-Torque Transmitting Member Leveling Extension 110-M2 that it is resting on a Leveling Extension Ramp 122B" and the ideal resting surfaces for Transmission Belt 90 of Cone Assembly 113; an example of said ideal resting surfaces are the Transmission Belt 90 resting surfaces provided by Non-Torque Transmitting Member Section 110-M1 and the Transmission Belt 90 resting surfaces provided by the portion of Non-Torque Transmitting Member Leveling Extension 110-M2 that is resting on Leveling Extension Raising Surface 112-B5.

Belt Resting Filler 93 is shown by itself in FIGS. 239 to 240. The ideal/acceptable shape of Belt Resting Filler 93 can be easily determined by experimentation and/or mathematics. And although not shown as such, it is preferred that Belt Resting Filler 93 is pre-bend to the largest diameter for which it will be used.

FIGS. 241 to 243 show a Trailing Sleeve Reinforcement Plate 91D. Trailing Sleeve Reinforcement Plate 91D is identical to Reinforcement Plate 91, except that: a) an Attachment Sleeve 91D-S5 is attached to its Left Plate 91D-S1 through an Extender 91D-S4; and b) material from its Left Plate 91D-S1 and its Base 91D-S2 are removed by a Cut 91D-S3.

Regarding item a), Attachment Sleeve 91D-S5, like Attachment Sleeve 6B-S1 (see FIG. 13), is used for the insertion of a Trailing End Slide; with which the axial position of Trailing Sleeve Reinforcement Plate 91D, and as such also the axial position of the trailing end of Torque Transmitting Member 97 is controlled and maintained. Rods 50-S1 (see FIG. 116) can be used as Trailing End Slides.

The Trailing End Slide (or preferably Rod 50-S1) inserted into Attachment Sleeve 91D-S5 slides in the Torque Transmitting Member Trailing End Slot 112-A4 of Cone 112 (see FIG. 307).

A Pin 91E-S4 of a Trailing End Reinforcement Plate 91E, like said Trailing End Slide, also slides in the Torque Transmitting Member Trailing End Slot 112-A4. Said Torque Transmitting Member Trailing End Slot 112-A4 is shaped based on the required rotational positions of Pin 91E-S4 for each pitch diameter. As such, in order to ensure that said Trailing End Slide can properly engage with Attachment Sleeve 91D-S5 for each pitch diameter, Attachment Sleeve 91D-S5 is connected to Left Plate 91D-S1 through an Extender 91D-S4, which length can be adjusted as required; and Attachment Sleeve 91D-S5 has a slotted hole that allows for some relative rotational movements between Attachment Sleeve 91D-S5 and its Trailing End Slide.

Regarding item b), the inclined bottom surface of Trailing Sleeve Reinforcement Plate 91D due to Cut 91D-S3, is necessary so that Trailing Sleeve Reinforcement Plate 91D will not interfere with Trailing End Front Wall 112-A3.

The inclined bottom surface of Trailing Sleeve Reinforcement Plate 91D due to Cut 91D-S3 is shaped so that it can rest on the top surface of Trailing End Front Wall 112-A3 (see FIG. 307). The top surface of Trailing End Front Wall 112-A3 should be an extension of the surface of Cone 112 that is at a larger conical diameter, which is due to the height of Trailing End Front Wall 112-A3. As such, the incline of Cut 91D-S3 should be the same as the incline of Cone 112; but it is offset by the height of Trailing End Front Wall 112-A3.

For the incline of Cone 112 shown, only the bottom surface of Trailing Sleeve Reinforcement Plate 91D needs to rest on the top surface of its Trailing End Front Wall 112-A3. This might not be the case for a different incline of Cone 112; since the incline of Cone 112 determines the shape of Trailing End Front Wall 112-A3 and how it will interfere with the reinforcement plates of Torque Transmitting Member 97. If additional reinforcement plates have to rest on the top surface of Trailing End Front Wall 112-A3; then they should have similar cuts like Cut 91D-S3, which ideal shape(s) can be easily obtained through simple geometry or experimentation.

FIGS. 244 to 246 show a Trailing End Reinforcement Plate 91E. Trailing End Reinforcement Plate 91E is mounted on Cone 112 so that it slides axially within a constrained curved as set by "Trailing End Front Wall 112-A3 and Torque Transmitting Member Trailing End Slot 112-A4" as the pitch diameter of Cone 112 is changed. The "engagement between Trailing End Front Wall 112-A3 with Wall Engagement Insert 94 of Trailing End Reinforcement Plate 91E" is used to transfer torque from Trailing End Reinforcement Plate 91E to Trailing End Front Wall 112-A3, and from Trailing End Front Wall 112-A3 to Cone 112.

Trailing End Reinforcement Plate 91E comprises of a Tooth 91E-S3 that is supported at its sides by a Left Plate 91E-S1 and a Right Plate 91E-S2. The portions of Left Plate 91E-S1 and a Right Plate 91E-S2 beneath Tooth 91E-S3 extend towards the middle of Trailing End Reinforcement Plate 91E so as to partially support Tooth 91E-S3, while leaving a gap for a Wall Engagement Insert 94.

Also, the surfaces of Right Plate 91E-S2 that will interfere with its Trailing End Front Wall 112-A3 are removed by a Cut 91E-S7. Cut 91E-S7 is preferably shaped so that it can rest on Trailing End Front Wall 112-A3.

A Rod 91E-S4 is shaped at the center of the bottom surface of Tooth 91E-S3. Rod 91E-S4 is used for the insertion of Wall Engagement Insert 94. And the bottom-end of Rod 91E-S4 has a Locking Ring Groove 91E-S5.

Additionally, Left Plate 91E-S1 and Right Plate 91E-S2, each have two Holes 91E-S6 for a Reinforcement Cable 98 each (see FIG. 256); Holes 91E-S6 should be vertically located so that the neutral-axis of Torque Transmitting Member Section 97-M1 vertically coincides with the neutral-axis of Transmission Belt 90. Obviously, if desired Left Plate 91E-S1 and Right Plate 91E-S2 can also have only one reinforcement wire hole each, instead of two reinforcement wire holes as described.

Wall Engagement Insert 94 is shown in FIGS. 247 to 249. It is shaped like a rectangle that has a centric Hole 94-S1, a concave Front Surface 94-S2, and a convex Rear Surface 94-S3. The diameter of Front Surface 94-S2 should be as small as possible without being smaller than the maximum diameter of the curve of Trailing End Front Wall 112-A3, so as to minimize Hertzian Contact Stresses while also avoiding engagement of only the end-side-edges of Front Surface 94-S2 with Trailing End Front Wall 112-A3.

And the diameter of Rear Surface 94-S3 (which engages Torque Transmitting Member Trailing End Slot 112-A4) should be as large as possible without exceeding the minimum diameter of the curve of Torque Transmitting Member Trailing End Slot 112-A4, so as to minimize Hertzian Contact Stresses while also avoiding engagement of only the end-side-edges of Rear Surface 94-S3 with Torque Transmitting Member Trailing End Slot 112-A4.

Additionally, if applicable any surfaces of Front Surface 94-S2 and Rear Surface 94-S3 that interfere with Torque Transmitting Member Trailing End Slot 112-A4, as Trailing End Reinforcement Plate 91E is slid from the smaller end to the larger end of Cone 112 should be removed.

In order to secure Trailing End Reinforcement Plate 91E to its cone, a Clamping Washer 95 is used (see FIGS. 250 to 252). Clamping Washer 95 has a Top Surface 95-S2, which is the surface that engages with the inner surface of its cone. Top Surface 95-S2 has the same incline as the incline of the inner surface of its cone; and the surface of Top Surface 95-S2 is rounded so that it can smoothly engage with the inner surface of its cone. In order to minimize Hertzian Contact Stresses while also avoiding engagement of only the end-side-edges of Top Surface 95-S2 with the inner surfaces of its cone; Top Surface 95-S2 should have a diameter that is as large as possible without exceeding the minimum diameter of the inner surface of its cone it engages with.

Clamping Washer 95 also has a Hole 95-S1. During assembly, first Wall Engagement Insert 94 is inserted into Rod 91E-S4 of Trailing End Reinforcement Plate 91E (see FIG. 254); then and Rod 91E-S4 is inserted into Torque Transmitting Member Trailing End Slot 112-A4 by placing Trailing End Reinforcement Plate 91E on top of the surface of Cone 112; and then Trailing End Reinforcement Plate 91E is secured from the beneath the surface of Cone 112 by inserting Hole 95-S1 of Clamping Washer 95 into Rod 91E-S4; and then securing Clamping Washer 95 to Rod 91E-S4 using a Locking Ring 96, which is inserted into Locking Ring Groove 91E-S5 of Rod 91E-S4 (see FIGS. 244 and 253).

Clamping Washer 95 has to rotate relative to Rod 91E-S4 as the axial position of Trailing End Reinforcement Plate 91E is changed; as such, it is recommended that friction between Hole 95-S1 and Rod 91E-S4 is minimized. Also, here the bottom surface of Wall Engagement Insert 94 is resting on Top Surface 95-S2 of Clamping Washer 95.

Torque Transmitting Member 97 is shown in FIGS. 255 and 261. It comprises of a Torque Transmitting Member Section 97-M1, a Torque Transmitting Member Leveling Extension 97-M2, and parts to connect Torque Transmitting Member Leveling Extension 97-M2 to the Trailing End of Torque Transmitting Member Section 97-M1

Torque Transmitting Member Section 97-M1 has teeth that can engage with the teeth of Transmission Belt 90. And the bottom surface of Torque Transmitting Member Leveling Extension 97-M2 has the same incline as the incline of the surfaces of its Cone (which is a Cone 112); and the top surface of Torque Transmitting Member Leveling Extension 97-M2 is level so that it can provide a level resting place for the teeth of Transmission Belt 90 (see FIG. 260).

Torque Transmitting Member Section 97-M1 comprises of the following previously described Reinforcement Plates for Torque Transmitting Member Section 97-M1: Leading End Reinforcement Plate 91C, Trailing Sleeve Reinforcement Plate 91D, Trailing End Reinforcement Plate 91E, and Reinforcement Plates 91. These Reinforcement Plate are joined together by four Reinforcement Cables 98, Longitudinal Elastomer Members 99, and a Top Surface Elastomer Member 100 (see FIGS. 255 and 256).

Two Longitudinal Elastomer Members 99 are positioned between all adjacent Reinforcement Plates of Torque Transmitting Member Section 97-M1; one Longitudinal Elastomer Member 99 encases the Reinforcement Cables 98 that are positioned to the left of the teeth of its Reinforcement Plates and the other Longitudinal Elastomer Member 99 encases the Reinforcement Cables 98 that are positioned to the right of the teeth of its Reinforcement Plates (see FIGS. 255, 256, and 257). The purpose of Longitudinal Elastomer Members 99 is to maintain the proper distance and alignment of the teeth of Torque Transmitting Member Section 97-M1. Longitudinal Elastomer Members 99 should be strongly bonded to Reinforcement Cables 98, so that the forces on the Reinforcement Plates of Torque Transmitting Member Section 97-M1 are mainly transmitted by Reinforcement Cables 98, and not the tension or compression of Longitudinal Elastomer Members 99.

And placed on top of the teeth of the Reinforcement Plates of Torque Transmitting Member Section 97-M1 is a Top Surface Elastomer Member 100 (see FIGS. 255 and 257). Top Surface Elastomer Member 100 is shown by itself in FIGS. 262 and 263. Top Surface Elastomer Member 100 is optional but it is preferred; its main purpose is to provide lateral stiffness to Torque Transmitting Member Section 97-M1. And although not show that way, Torque Transmitting Member Section 97-M1 and Top Surface Elastomer Member 100 are preferably pre-bend to the largest pitch diameter that they are used for; so as to minimize the amount of compression of Top Surface Elastomer Member 100 that is required due to the bending of Torque Transmitting Member Section 97-M1.

In order to increase the lateral stiffness of Top Surface Elastomer Member 100, fibers/reinforcements or a kevlar sheet/carbon fiber sheet that is placed on top of rubber filler(s) shapes can be used. FIGS. 264 and 265 show a Top Surface Elastomer Member 100A. Top Surface Elastomer Member 100A is identical to Top Surface Elastomer Member 100, except that instead of being shape out of one piece of elastomer, it comprises of a Sheet 100A-M1 (which can be a kevlar sheet or carbon fiber sheet) and an Elastomer Filler 100A-M2. Elastomer Filler 100A-M2 is shaped so that its bottom surface rest on the curved surfaces of the Reinforcement Plates of Torque Transmitting Member 97 (see FIG. 255), while its top surface is even/smooth. And Sheet 100A-M1 is bonded to the top surface of Elastomer Filler 100A-M2.

The cross-section of Torque Transmitting Member Section 97-M1, except for its Trailing End Section (which starts with the front-surface of Trailing End Reinforcement Plate 91E and ends with rear-surface of Trailing End Reinforcement Plate 91E), has a Left Section, a Right Section, and a Top Section, such that an Empty Middle Section 97-M1-S1 is formed (see FIG. 257). This cross-section of Torque Transmitting Member Section 97-M1 is referred to as the Main Cross-Section of Torque Transmitting Member Section 97-M1.

The Main Cross-Section of Torque Transmitting Member Section 97-M1, starts with the front-surface of Leading End Reinforcement Plate 91C and ends with the front-surface of Trailing End Reinforcement Plate 91E (see FIG. 256). The definition for front and rear of said front-surface and said rear-surface, as well as all other usage in this section; use the following reference: Leading End Reinforcement Plate 91C is positioned in front of Trailing End Reinforcement Plate 91E (see FIG. 256); or in other words, Trailing End Reinforcement Plate 91E is positioned to the rear of Leading End Reinforcement Plate 91C.

Regarding the Main Cross-Section of Torque Transmitting Member Section 97-M1 (see FIG. 257), said Top Section is shaped such that it has teeth that can engaged with the teeth of its Transmission Belt, and such that it can support its Transmission Belt when it is resting on it. It is shaped by the Teeth of the reinforcement plates of Torque Transmitting Member Section 97-M1 (such as Teeth 91-S3 of Reinforcement Plates 91) and Top Surface Elastomer Member 100 (see FIG. 257).

And said Left Section and said Right Section are used to support said Top Section above Empty Middle Section 97-M1-S1. Said Left Section is shaped by the Left Plates of the reinforcement plates of Torque Transmitting Member Section 97-M1, such as Left Plates 91-S1 of Reinforcement Plates 91 (see FIG. 257). And said Right Section is shaped by the Right Plates of the reinforcement plates of Torque Transmitting Member Section 97-M1, such as Right Plates 91-S2 of Reinforcement Plates 91 (see FIG. 257).

In order to attach Torque Transmitting Member Leveling Extension 97-M2 to Torque Transmitting Member Section 97-M1, a Front Leveling Extension Plate 101 is used (see FIGS. 255 and 256). Front Leveling Extension Plate 101, which is shown by itself in FIG. 259, is connected to Trailing End Reinforcement Plate 91E through a Left Connector Elastomer 102 and a Right Connector Elastomer 103, which are bonded to the rear surfaces of Trailing End Reinforcement Plate 91E and to the front surface of Front Leveling Extension Plate 101 (see FIGS. 256, 258, and 261). And to the rear surface of Front Leveling Extension Plate 101, all parts of the front-end of Torque Transmitting Member Leveling Extension 97-M2 are bonded (fixed), see FIGS. 255, 256, and 261.

FIG. 260 shows a sectional-view that shows a cross-section of Torque Transmitting Member Leveling Extension 97-M2. Torque Transmitting Member Leveling Extension 97-M2 comprises of Top Leveling Extension Half 104 that is joined to a Bottom Leveling Extension Half 105 by a Leveling Extension Joiner 106. The purpose of splitting Torque Transmitting Member Leveling Extension 97-M2 into a top-half and bottom-half is to reduce the bending resistance of Torque Transmitting Member Leveling Extension 97-M2; so that a stiffer elastomer can be used.

Additionally, on the bottom surface of Bottom Leveling Extension Half 105, a Left Protrusion 105-S1 and a Right Protrusion 105-S2 are shaped (see FIGS. 260, 255, and 256). Left Protrusion 105-S1 is used to maintain the alignment of a Left Front End Resting Support 108A (see FIGS. 267 to 271). And Right Protrusion 105-S2 is used to maintain the alignment of a Right Front End Resting Support 108B (see FIGS. 267 to 271).

In order to attach the rear-end of Torque Transmitting Member Leveling Extension 97-M2 to Cone 112, the rear-end of Bottom Leveling Extension Half 105 is fixed to a Rear Leveling Extension Plate 107 (see FIGS. 255 and 256). Rear Leveling Extension Plate 107 is shown by itself in FIG. 261; it has a Locking Ring Pin 107-S2, which is used to secure the rear-end of Torque Transmitting Member Leveling Extension 97-M2 to Cone 112 by first inserting it into a Torque Transmitting Member Leveling Extension Slot 112-A6 of Cone 112 and then securing it to Cone 112 using a Clamping Washer 95 and a Locking Ring.

Top Leveling Extension Half 104 is not attached to Rear Leveling Extension Plate 107, so that the stretching of Top Leveling Extension Half 104 and the compression of Bottom Leveling Extension Half 105 are not constrained relative to each other; so as to increase the bending flexibility of Torque Transmitting Member Leveling Extension 97-M2. Stretching of Top Leveling Extension Half 104 and compression of Bottom Leveling Extension Half 105 is required due to the bending of Torque Transmitting Member Leveling Extension 97-M2.

Additionally, Top Leveling Extension Half 104 is shorter than Bottom Leveling Extension Half 105. This is so, in order to avoid interference between the rear-end of Top Leveling Extension Half 104 and Trailing End Front Wall 112-B3.

Torque Transmitting Member Leveling Extension 97-M2 rests on Leveling Extension Raising Surface 112-A5, which is a raised surface of Cone 112. The rear-edge of Leveling Extension Raising Surface 112-A5, which is the edge on which the front-end of Torque Transmitting Member Leveling Extension 97-M2 rests, is slanted at an angle; so that at the rear-edge of Leveling Extension Raising Surface 112-A5 will not support the entire width of Torque Transmitting Member Leveling Extension 97-M2. In order to provide additional support for Torque Transmitting Member Leveling Extension 97-M2 at its front-end, a Left Front End Resting Support 108A-S1 and a Right Front End Resting Support 108B-S1 are used (see FIGS. 270 and 271).

The purpose of Left Front End Resting Support 108A-S1 and Right Front End Resting Support 108B-S1 is the same as the purpose of Member Width Clearance Support 31-M2-S1 described previously.

Left Front End Resting Support 108A and Right Front End Resting Support 108B are shown by themselves in FIGS. 267 to 269. Left Front End Resting Support 108A and Right Front End Resting Support 108B have a bottom-surface and a top-surface that are inclined (see FIG. 267). A portion of the front-end of Torque Transmitting Member Leveling Extension 97-M2 rests on said top-surface (see FIGS. 270 and 271). The incline of said bottom-surface and said top-surface is the same as the incline of Cone 112, and the "height difference between said bottom-surface and said top-surface" is the same as the "height difference between an unraised surface of Cone 112 and a raised surface of Cone 112 (such as Leveling Extension Raising Surface 112-A5)".

When viewed from the top, Left Front End Resting Support 108A and Right Front End Resting Support 108B form a triangular shape due to Cuts 108A-S2 and 108B-S2 (see FIGS. 269 and 271). The angle of Cuts 108A-S2 and 108B-S2 correspond to the angle of the rear-edge of Leveling Extension Raising Surface 112-A5. Ideally, the angle of Cuts 108A-S2 and 108B-S2 is selected such that it can support Torque Transmitting Member Leveling Extension 97-M2 as much as possible on the surface of Cone 112 that is not covered by the rear-edge of Leveling Extension Raising Surface 112-A5 without interfering with the rear-edge of Leveling Extension Raising Surface 112-A5, for all pitch-diameters of Cone 112. The ideal angle for the angle of Cuts 108A-S2 and 108B-S2 can be determined through experimentation.

Also, instead of a straight-angled cut, Cuts 108A-S2 and 108B-S2 can also have a curved-angled cut instead. This should provide better support for Torque Transmitting Member Leveling Extension 97-M2, since "the rear-edge of the raised surface on which Torque Transmitting Member Leveling Extension 97-M2 rests" has a curved-angled profile.

Instead of supporting the front-edge of Torque Transmitting Member Leveling Extension 97-M2 through one resting surface, two separate resting surfaces (which are Left Front End Resting Support 108A and Right Front End Resting Support 108B) are used. This is done because Left Front End Resting Support 108A and Right Front End Resting Support 108B will each have a smaller overall height than the height of "one resting surface that has the shape of Left Front End Resting Support 108A and Right Front End Resting Support 108B combined"; since the overall height of the resting surfaces depend on their width, due to their inclined bottom and top surfaces. And because of this, the bending stiffness of Left Front End Resting Support 108A and Right Front End Resting Support 108B will lower compared to the bending stiffness of said one resting surface, so that a stiffer elastomer can be used. If desired, one resting surface instead of two separate resting surfaces can be used.

And in order to maintain the lateral alignment of Left Front End Resting Support 108A and Right Front End Resting Support 108B relative to the front-edge of Torque Transmitting Member Leveling Extension 97-M2, Left Front End Resting Support 108A has an Indentation 108A-S1 into which Left Protrusion 105-S1 of Torque Transmitting Member Leveling Extension 97-M2 (see FIGS. 255 and 256) is inserted; and Right Front End Resting Support 108B has an Indentation 108B-S1 into which Right Protrusion 105-S2 of Torque Transmitting Member Leveling Extension 97-M2 (see FIGS. 255 and 256) is inserted.

When Torque Transmitting Member 97 is assembled on Cone 112, a Non-Torque Transmitting Member 110 is attached circumferentially-opposite of Torque Transmitting Member 97 (see FIG. 308). A Cone Assembly comprising of Cone 112 on which Torque Transmitting Member 97 and all its parts, and Non-Torque Transmitting Member 110 and all its parts are assembled; is labeled as Cone Assembly 113 (see FIG. 308).

On a fully assembled Cone Assembly 113, Non-Torque Transmitting Member Leveling Extension 110-M2 of Non-Torque Transmitting Member 110 is positioned inside of Empty Middle Section 97-M1-S1 of Torque Transmitting Member 97. From which Non-Torque Transmitting Member Leveling Extension 110-M2 can move-out and move-in of Torque Transmitting Member 97 as required during as the pitch-diameter of Cone 113 is increased or decreased.

And likewise, Torque Transmitting Member Leveling Extension 97-M2 of Torque Transmitting Member 97 is positioned inside of Empty Middle Section 110-M1-S1 of Non-Torque Transmitting Member 110. From which Torque Transmitting Member Leveling Extension 97-M2 can move-out and move-in of Non-Torque Transmitting Member 110 as required during as the pitch-diameter of Cone 113 is increased or decreased.

Preferred Non-Torque Transmitting Member

In this section, the preferred Non-Torque Transmitting Member for a "Cone with One Torque Transmitting Member" is described. The Non-Torque Transmitting Member of this section is labeled as Non-Torque Transmitting Member 110; and it is to be used with Torque Transmitting Member 97 and Cone 112 to form a "Cone with One Torque Transmitting Member". Like Torque Transmitting Member 97, Non-Torque Transmitting Member 110 is to be used with a Transmission Belt 90.

Non-Torque Transmitting Member 110 is shown in FIGS. 294 and 300. It comprises of a Non-Torque Transmitting Member Section 110-M1, a Non-Torque Transmitting Member Leveling Extension 110-M2, and parts to connect Non-Torque Transmitting Member Leveling Extension 110-M2 to the Trailing End of Non-Torque Transmitting Member Section 110-M1. The incline of the bottom surfaces of Non-Torque Transmitting Member Section 110-M1 and Non-Torque Transmitting Member Leveling Extension 110-M2 should match the incline of Cone 112. Non-Torque Transmitting Member 110 has a Leading End and Trailing End.

The cross-section of Non-Torque Transmitting Member Section 110-M1, except for its Trailing End has a Left Section, a Right Section, and a Top Section, such that an Empty Middle Section is formed. The Empty Middle Section of Non-Torque Transmitting Member Section 110-M1 is labeled as Empty Middle Section 110-M1-S1 and is shown in FIG. 292. Note, in FIG. 292 an imaginary line (I-L) is shown to represent the "surface of the cone to which Non-Torque Transmitting Member Section 110-M1 is attached".

Said Top Section is used for supporting Transmission Belt 90. And Empty Middle Section 110-M1-S1 is used for inserting Torque Transmitting Member Leveling Extension 97-M2 of Torque Transmitting Member 97. When inserted into Empty Middle Section 110-M1-S1, Torque Transmitting Member Leveling Extension 97-M2 will be laterally positioned between said Left Section and said Right Section, and vertically positioned between the "surface of the cone to which it is attached" and the bottom surface of said Top Section.

The cross-section of the Trailing End of Non-Torque Transmitting Member Section 110-M1 does not have an Empty Middle Section (see FIG. 293).

Non-Torque Transmitting Member Section 110-M1 comprises of reinforcement plates that are held together by Reinforcement Cables 111 and Longitudinal Elastomer Members 112.

The basic reinforcement plate for Non-Torque Transmitting Member Section 110-M1, which is labeled as Reinforcement Plate 109, is shown in FIGS. 272 to 275. Reinforcement Plate 109 comprises of a Base 109-S5, which has a Resting Surface 109-S3 shaped on top of it, that is supported at its sides by a Left Plate 109-S1 and a Right Plate 109-S2, in a manner so that an empty space is formed between Left Plate 109-S1 and Right Plate 109-S2 beneath Base 109-S5 (see FIG. 272). This empty space will be part of the Empty Middle Section of Non-Torque Transmitting Member Section 110-M1; and it is used for the insertion of a Leveling Extension of an opposite positioned Torque Transmitting Member/Non-Torque Torque Transmitting Member.

The bottom surfaces of Left Plate 109-S1 and Right Plate 109-S2 have an incline that matches the incline of their cone, so that Resting Surface 109-S3 is horizontally aligned when Reinforcement Plate 109 is resting on the surface of its cone.

Left Plate 91-S1 and Right Plate 91-S2 are connected by Base 109-S5 through Base Ends 109-S4, which are shaped to the left and to the right of Resting Surface 109-S3 (see FIG. 272).

A Side Channel 109-S6 is shaped at each, the left-end and at the right-end of Base 109-S5. Side Channels 109-S6 are used for the insertion of Leveling Extension Flange Supports 104-S1 of Torque Transmitting Member Leveling Extension 97-M2 (see FIG. 260).

Additionally, Left Plate 109-S1 and Right Plate 109-S2, each have two Holes 109-S7 for a Reinforcement Cable 111, which are shown in FIG. 295; Holes 109-S7 should be vertically located so that the neutral-axis of Non-Torque Transmitting Member Section 110-M1 vertically coincides with the neutral-axis of Transmission Belt 90 (see FIG. 257). Obviously, if desired Left Plate 109-S1 and Right Plate 109-S2 can also have only one reinforcement cable hole each, instead of two reinforcement cable holes as described.

FIG. 276 shows a Reinforcement Plate 109A. Reinforcement Plate 109A is identical to Reinforcement Plate 109, except that its Base 109-S5 (which for Reinforcement Plate 109A is labeled as Base 109A-S1) has two Slotted Holes 109A-S2. The purpose of Slotted Holes 109A-S2 is to reduce the weight of Reinforcement Plate 109A, which is preferred.

In order to attach Non-Torque Transmitting Member 110 to a Cone 112; a Leading End Reinforcement Plate 109C, a Trailing Sleeve Reinforcement Plate 109D, and a Trailing End Reinforcement Plate 109E are used.

FIGS. 227 to 229 show a Leading End Reinforcement Plate 109B, from which a Leading End Reinforcement Plate 109C will be derived as described later. Leading End Reinforcement Plate 109B is basically identical to Reinforcement Plate 109, except that: a) Left Plate 109-S1 and Right Plate 109-S2 are replaced with Left Tube 109B-S1 and Right Tube 109B-S2; b) its Base 109B-S5 has Fillets 109B-S4; and c) and the bottom ends of Left Tube 109B-S1 and Right Tube 109B-S2 are connected by a Slider 109B-S5.

As outlined previously, Leading End Reinforcement Plate 109B comprises of a Base 109B-S5, which has a Resting Surface 109B-S3 shaped on top of it, that is supported at its sides by a Left Tube 109B-S1 and Right Tube 109B-S2, in a manner so that an empty space is formed between Left Tube 109B-S1 and Right Tube 109B-S2 beneath Base 109B-S5 (see FIG. 277). This empty space will be part of the Empty Middle Section of Non-Torque Transmitting Member 110-M1 (which is labeled as Empty Middle Section 110-M1-S1 in FIG. 292).

Left Tube 109B-S1 and Right Tube 109B-S2 are connected by Base 109B-S5 through Base Ends 109B-S4, which are shaped to the left and to the right of Resting Surface 109B-S3 (see FIG. 277).

A Side Channel 109B-S6 is shaped at each, the left-end and at the right-end of Base 109B-S5. Side Channels 109B-S6 are used for the insertion of Leveling Extension Flange Supports 104-S1 of Torque Transmitting Member Leveling Extension 97-M2 (see FIG. 260).

Unlike the Side Channels 109-S6 of Reinforcement Plate 109, Side Channels 109B-S6 of Leading End Reinforcement Plate 109B have Fillets 109B-S7. When Torque Transmitting Member 97 and Non-Torque Transmitting Member 110 are assembled on Cone 112; Torque Transmitting Member Leveling Extension 97-M2 of Torque Transmitting Member 97 is inserted into the front-end of Leading End Reinforcement Plate 109B. And as Torque Transmitting Member Leveling Extension 97-M2 is inserted into Leading End Reinforcement Plate 109B, it bends down as it descends from Leveling Extension Raising Surface 112-A5 (see FIG. 307 for Leveling Extension Raising Surface 112-A5 and FIG. 308 for an assembled Cone 112, which labeled as Cone Assembly 113). Fillets 109B-S7 are shaped so as to remove the surfaces of Base 109B-S5 that will interfere with the Flanges of Torque Transmitting Member Leveling Extension 97-M2 as it is inserted Leading End Reinforcement Plate 109B.

Additionally, the bottom surfaces of Left Tube 91B-S1 and Right Tube 91B-S2 are fixed to a Slider 109B-S8. During assembly, Slider 109B-S8 is slide-ably inserted into the Non-Torque Transmitting Member Leading End Slot 112-B2 of Cone 112 (see FIG. 307); in a manner so that Slider 109B-S8 can slide along the length of Non-Torque Transmitting Member Leading End Slot 112-B2. The cross-sectional shape of Non-Torque Transmitting Member Leading End Slot 112-B2 and Slider 109B-S8 that is inserted into it, as cut through a plane that is perpendicular to the axis of rotation of Cone 112 is shown in FIG. 280.

The engagement between Slider 109B-S8 and Non-Transmitting Member Leading End Slot 112-B2 are used to: a) transfer torque from Leading End Reinforcement Plate 109B to its Cone 112; and b) radially fix Leading End Reinforcement Plate 109B to its Cone 112. In order to radially fix Leading End Reinforcement Plate 109B to its Cone 112, the bottom portion of Slider 109B-S8 has two Protrusions 109B-S9 (see FIGS. 277 to 279) that each slide in a matching indentation of Non-Transmitting Member Leading End Slot 112-B2 (see FIG. 280).

The top-surface of Slider 109B-S8 is labeled as Slider Top Surface 109B-S10 (see FIGS. 277 to 280). Slider Top Surface 109B-S10 is used to provide a resting base for a Leveling Extension Ramp 122B.

Leveling Extension Ramp 122B is partially resting on Cone 112; as such for a good fit, the bottom surface of Leveling Extension Ramp 122B is conically shaped with the same incline as the incline of Cone 112. And since Leveling Extension Ramp 122B is also partially resting on Slider Top Surface 109B-S10, Slider Top Surface 109B-S10 is also conically shaped with the same incline as the incline of Cone 112.

Additionally, Leveling Extension Ramp 122B, which will be resting on Slider Top Surface 109B-S10, has some base thickness (see FIG. 399), but ideally the starting edge of the ramping surface of Leveling Extension Ramp 122B is level with the base surface of Cone 112. As such, in order to compensate for the overall base thickness of Leveling Extension Ramp 122B, the diameter of Slider Top Surface 109B-S10 at its small-end is the "smallest diameter Leveling Extension resting surface" of Cone 112 that is reduced by the overall base thickness of Leveling Extension Ramp 122B (see FIG. 280).

The "smallest diameter Leveling Extension resting surface" of Cone 112 that is reduced by the overall base thickness of Leveling Extension Ramp 122B is used as the diameter for the small-end of Slider Top Surface 109B-S10; because if larger diameter is used, then at the smallest pitch diameter of Cone Assembly 113, Leveling Extension Ramp 122B will have surfaces that rises above the top-surface of Cone 112.

Also, the radial-center of Slider Top Surface 109B-S6 and the mid-width of Resting Surface 109B-S3 (as well as the mid-width of all other Resting Surfaces of Non-Torque Transmitting Member 110), should all align with a radial-line of Cone 112 (see FIG. 230).

FIGS. 281 to 283 show a Leading End Reinforcement Plate 109C. Leading End Reinforcement Plate 109C is identical to Leading End Reinforcement Plate 109B, except that an Attachment Sleeve 109C-S1 is fixed to its Left Tube (which is labeled as Left Tube 109B-S1 for Leading End Reinforcement Plate 109B).

Like Hole 44-S1 of "Leading End Torque Transmitting Member Reinforcement Plate 44" (see FIGS. 111, 112, 113, and 116); Attachment Sleeve 109C-S1 has a hole that can be used to insert a Rod 50-S1 of a Spline Sleeve 50 (see FIG. 116), for the purpose of controlling and maintaining the axial position of its plate (which is Leading End Reinforcement Plate 109C).

Also if desired, Attachment Sleeve 109C-S1 can be fixed to its Right Tube (which is labeled as Right Tube 10B-S2 for Leading End Reinforcement Plate 10B), instead of its Left Tube.

A Belt Resting Filler 93 is fixed (bonded/glued/etc.) to the front end of Leading End Reinforcement Plate 109C (see FIGS. 284 to 287). Belt Resting Filler 93 is fixed and shaped such that: a) its bottom surfaces are resting on "the top surface of the portion of Torque Transmitting Member Leveling Extension 97-M2 that it is resting on a Leveling Extension Ramp 122B"; in a manner and such that its bottom surfaces fully or almost fully engage with "the top surfaces of the portion of Torque Transmitting Member Leveling Extension 97-M2 that it is resting on a Leveling Extension Ramp 122B". And such that, b) its top surfaces provide resting surfaces for Transmission Belt 90; which is accomplished by having its top surfaces, like all other Transmission Belt 90 resting surfaces of Cone Assembly 113, have a constant diameter.

In other words Belt Resting Filler 93 is shaped so as to fill in the gap between "the top surfaces of the portion of Torque Transmitting Member Leveling Extension 97-M2 that it is resting on a Leveling Extension Ramp 122B" and the ideal resting surfaces for Transmission Belt 90 of Cone Assembly 113; an example of said ideal resting surfaces are the Transmission Belt 90 resting surfaces provided by Non-Torque Transmitting Member Section 110-M1 and the Transmission Belt 90 resting surfaces provided by the portion of Torque Transmitting Member Leveling Extension 97-M2 that is resting on Leveling Extension Raising Surface 112-A5.

FIGS. 288 to 290 show a Trailing Sleeve Reinforcement Plate 109D. Trailing Sleeve Reinforcement Plate 109D is identical to Reinforcement Plate 109, except that: a) an Attachment Sleeve 109D-S5 is attached to its Left Plate 109D-S1 through an Extender 109D-S4; and b) material from its Left Plate 109D-S1 and its Base 109D-S2 are removed by a Cut 109D-S3.

Regarding item a), Attachment Sleeve 109D-S5, like Attachment Sleeve 6B-S1 (see FIG. 13), is used for the insertion of a Trailing End Slide; with which the axial position of Trailing Sleeve Reinforcement Plate 109D, and as such also the axial position of the trailing end of Non-Torque Transmitting Member 110 is controlled and maintained. Rods 50-S1 (see FIG. 116) can be used as Trailing End Slides.

The Trailing End Slide (or preferably Rod 50-S1) inserted into Attachment Sleeve 109D-S5 slides in the Non-Torque Transmitting Member Trailing End Slot 112-B4 of Cone 112 (see FIG. 307).

A Pin 109E-S4 of a Trailing End Reinforcement Plate 109E, like said Trailing End Slide, also slides in the Non-Torque Transmitting Member Trailing End Slot 112-B4. Said Non-Torque Transmitting Member Trailing End Slot 112-B4 is shaped based on the required rotational positions of Pin 109E-S4 for each pitch diameter. As such, in order to ensure that said Trailing End Slide can properly engage with Attachment Sleeve 109D-S5 for each pitch diameter, Attachment Sleeve 109D-S5 is connected to Left Plate 109D-S1 through an Extender 109D-S4, which length can be adjusted as required; and Attachment Sleeve 109D-S5 has a slotted hole that allows for some relative rotational movements between Attachment Sleeve 109D-S5 and its Trailing End Slide.

Regarding item b), the inclined bottom surface of Trailing Sleeve Reinforcement Plate 109D due to Cut 109D-S3, is necessary so that Trailing Sleeve Reinforcement Plate 109D will not interfere with Trailing End Front Wall 112-B3.

The inclined bottom surface of Trailing Sleeve Reinforcement Plate 109D due to Cut 91D-S3 is shaped so that it can rest on the top surface of its Trailing End Front Wall 112-B3 (see FIG. 307). The top surface of Trailing End Front Wall 112-B3 should be an extension of the surface of Cone 112 that is at a larger conical diameter, which is due to the height of Trailing End Front Wall 112-B3. As such, the incline of Cut 91D-S3 should be the same as the incline of Cone 112; but it is offset by the height of Trailing End Front Wall 112-B3.

For the incline of Cone 112 shown, only the bottom surface of Trailing Sleeve Reinforcement Plate 109D needs to rest on the top surface of its Trailing End Front Wall 112-B3. This might not be the case for a different incline of Cone 112; since the incline of Cone 112 determines the shape of Trailing End Front Wall 112-B3 and how it will interfere with the reinforcement plates of Non-Torque Transmitting Member 110. If additional reinforcement plates have to rest on the top surface of Trailing End Front Wall 112-B3; then they should have similar cuts like Cut 109D-S3, which ideal shape(s) can be easily obtained through simple geometry or experimentation.

FIGS. 291 to 293 show a Trailing End Reinforcement Plate 109E. Trailing End Reinforcement Plate 109E is mounted on Cone 112 so that it slides axially within a constrained curved as set by "Trailing End Front Wall 112-B3 and Non-Torque Transmitting Member Trailing End Slot 112-B4" as the pitch diameter of Cone 112 is changed. The "engagement between Trailing End Front Wall 112-B3 with Wall Engagement Insert 94 of Trailing End Reinforcement Plate 109E" is used to transfer torque from Trailing End Reinforcement Plate 109E to Trailing End Front Wall 112-B3, and from Trailing End Front Wall 112-B3 to Cone 112.

Trailing End Reinforcement Plate 109E comprises of a Base 109E-S3 (which has a Resting Surface 109E-S4 shaped on top of it) that is supported at its sides by a Left Plate 109E-S1 and a Right Plate 109E-S2. The portions of Left Plate 91E-S1 and a Right Plate 91E-S2 beneath Base 109E-S3 extend towards the middle of Trailing End Reinforcement Plate 109E so as to partially support Base 109E-S3, while leaving a gap for a Wall Engagement Insert 94.

Also, the surfaces of Right Plate 109E-S2 that will interfere with its Trailing End Front Wall 112-B3 are removed by a Cut 109E-S8. Cut 109E-S8 is preferably shaped so that it can rest on Trailing End Front Wall 112-B3.

A Rod 109E-S5 is shaped at the center of the bottom surface of Base 109E-S3. Rod 109E-S5 is used for the insertion of a Wall Engagement Insert 94, which was described previously. And the bottom-end of Rod 109E-S5 has a Locking Ring Groove 109E-S6.

Additionally, Left Plate 109E-S1 and Right Plate 109E-S2, each have two Holes 109E-S6 for a Reinforcement Cable 111 each (see FIG. 291); Holes 109E-S6 should be vertically located so that the neutral-axis of Non-Torque Transmitting Member Section 110-M1 vertically coincides with the neutral-axis of Transmission Belt 90. Obviously, if desired Left Plate 91E-S1 and Right Plate 91E-S2 can also have only one reinforcement wire hole each, instead of two reinforcement wire holes as described.

Trailing End Reinforcement Plate 109E is assembled and secured to Cone 112 in the same manner as Trailing End Reinforcement Plate 91E; refer to the description for Trailing End Reinforcement Plate 91E and see FIGS. 244 to 253.

Non-Torque Transmitting Member 110 is shown in FIGS. 294 and 300. It comprises of a Non-Torque Transmitting Member Section 110-M1, a Non-Torque Transmitting Member Leveling Extension 110-M2, and parts to connect Non-Torque Transmitting Member Leveling Extension 110-M2 to the Trailing End of Non-Torque Transmitting Member Section 110-M1.

Non-Torque Transmitting Member Section 110-M1 has surfaces that can be used to support Transmission Belt 90 when it is resting on top of it. And the bottom surface of Non-Torque Transmitting Member Leveling Extension 110-M2 has the same incline as the incline of the surfaces of its Cone (which is a Cone 112); and the top surface of Non-Torque Transmitting Member Leveling Extension 110-M2 is level so that it can provide a level resting place for the teeth of Transmission Belt 90 (see FIG. 299).

Non-Torque Transmitting Member Section 110-M1 comprises of the following previously described Reinforcement Plates for Non-Torque Transmitting Member Section 110-M1: Leading End Reinforcement Plate 109C, Trailing Sleeve Reinforcement Plate 109D, Trailing End Reinforcement Plate 109E, and Reinforcement Plates 109. These Reinforcement Plate are joined together by four Reinforcement Cables 111, Longitudinal Elastomer Members 112, and a Top Surface Elastomer Member 113 (see FIGS. 301 and 302).

Two Longitudinal Elastomer Members 112 are positioned between all adjacent Reinforcement Plates of Torque Transmitting Member Section 110-M1; one Longitudinal Elastomer Member 112 encases the Reinforcement Cables 111 that are positioned to the left of the teeth of its Reinforcement Plates and the other Longitudinal Elastomer Member 112 encases the Reinforcement Cables 111 that are positioned to the right of the teeth of its Reinforcement Plates (see FIGS. 294, 295, and 296).

The purpose of Longitudinal Elastomer Members 112 is to maintain the proper distance and alignment of the Resting Surfaces of the Reinforcement Plates of Non-Torque Transmitting Member Section 110-M1. In order to minimize stretching of Non-Torque Transmitting Member Section 110-M1, it is recommended that Longitudinal Elastomer Members 112 are strongly bonded to Reinforcement Cables 111, so that the forces on the Reinforcement Plates of Non-Torque Transmitting Member Section 110-M1 are mainly transmitted by Reinforcement Cables 111, and not the tension or compression of Longitudinal Elastomer Members 112.

And placed on top of the Resting Surfaces of the Reinforcement Plates of Non-Torque Transmitting Member Section 110-M1 is a Top Surface Elastomer Member 113 (see FIGS. 294 and 295). Top Surface Elastomer Member 113 is shown by itself in FIGS. 301 and 302. Top Surface Elastomer Member 113 is optional but it is preferred; its main purpose is to provide lateral stiffness to Non-Torque Transmitting Member Section 110-M1. And although not show that way, Non-Torque Transmitting Member Section 110-M1 and Top Surface Elastomer Member 113 are preferably pre-bend to the largest pitch diameter that they are used for; so as to minimize the amount of compression of Top Surface Elastomer Member 113 that is required due to the bending of Non-Torque Transmitting Member Section 110-M1.

In order to increase the lateral stiffness of Top Surface Elastomer Member 113, fibers/reinforcements or a kevlar sheet/carbon fiber sheet that is placed on top of rubber filler(s) shapes can be used. FIGS. 303 and 304 show a Top Surface Elastomer Member 113A. Top Surface Elastomer Member 113A is identical to Top Surface Elastomer Member 113, except that instead of being shape out of one piece of elastomer, it comprises of a Sheet 113A-M1 (which can be a kevlar sheet or carbon fiber sheet) and an Elastomer Filler 113A-M2. Elastomer Filler 113A-M2 is shaped so that its bottom surface rest on the curved surfaces of the Reinforcement Plates of Non-Torque Transmitting Member 110 (see FIG. 294), while its top surface is even/smooth. And Sheet 113A-M1 is bonded to the top surface of Elastomer Filler 113A-M2.

The cross-section of Non-Torque Transmitting Member Section 110-M1, except for its Trailing End Section (which starts with the front-surface of Trailing End Reinforcement Plate 109E and ends with rear-surface of Trailing End Reinforcement Plate 109E), has a Left Section, a Right Section, and a Top Section, such that an Empty Middle Section 110-M1-S1 is formed (see FIG. 296); this cross-section of Non-Torque Transmitting Member Section 110-M1 is referred to as the Main Cross-Section of Non-Torque Transmitting Member Section 110-M1.

The Main Cross-Section of Non-Torque Transmitting Member Section 110-M1, starts with the front-surface of Leading End Reinforcement Plate 109C and ends with the front-surface of Trailing End Reinforcement Plate 109E (see FIG. 295). The definition for front and rear of said front-surface and said rear-surface, as well as all other usage in this section; use the following reference: Leading End Reinforcement Plate 109C is positioned in front of Trailing End Reinforcement Plate 109E (see FIG. 295); or in other words, Trailing End Reinforcement Plate 109E is positioned to the rear of Leading End Reinforcement Plate 109C.

Regarding the Main Cross-Section of Non-Torque Transmitting Member Section 110-M1 (see FIG. 296), said Top Section is shaped such that it can support its Transmission Belt when it is resting on it. It is shaped by the Bases of the reinforcement plates of Non-Torque Transmitting Member Section 110-M1 (such as Base 109-S5 of Reinforcement Plates 109) and Top Surface Elastomer Member 113 (see FIG. 296).

And said Left Section and said Right Section are used to support said Top Section above Empty Middle Section 110-M1-S1. Said Left Section is shaped by the Left Plates of the reinforcement plates of Non-Torque Transmitting Member Section 110-M1, such as Left Plates 109-S1 of Reinforcement Plates 109 (see FIG. 296). And said Right Section is shaped by the Right Plates of the reinforcement plates of Non-Torque Transmitting Member Section 110-M1, such as Right Plates 91-S2 of Reinforcement Plates 109 (see FIG. 296).

In order to attach Non-Torque Transmitting Member Leveling Extension 110-M2 to Non-Torque Transmitting Member Section 110-M1, a Front Leveling Extension Plate 101 is used (see FIGS. 294 and 295). A Front Leveling Extension Plate 101, which is shown by itself in FIG. 298, is connected to Trailing End Reinforcement Plate 109E through a Left Connector Elastomer 102 and a Right Connector Elastomer 103, which are bonded to the rear surfaces of Trailing End Reinforcement Plate 109E and to the front surface of said Front Leveling Extension Plate 101 (see FIGS. 295, 297, and 300). And to the rear surface of said Front Leveling Extension Plate 101, all parts of the front-end of Non-Torque Transmitting Member Leveling Extension 110-M2 are bonded (fixed), see FIGS. 294, 295, and 300.

FIG. 299 shows a sectional-view that shows a cross-section of Non-Torque Transmitting Member Leveling Extension 110-M2. Non-Torque Transmitting Member Leveling Extension 110-M2, like Torque Transmitting Member Leveling Extension 97-M2, comprises of Top Leveling Extension Half 104 that is joined to a Bottom Leveling Extension Half 105 by a Leveling Extension Joiner 106. The purpose of splitting Non-Torque Transmitting Member Leveling Extension 110-M2 into a top-half and bottom-half is to reduce the bending resistance of Non-Torque Transmitting Member Leveling Extension 110-M2; so that a stiffer elastomer can be used.

Additionally, on the bottom surface of Bottom Leveling Extension Half 105 of Non-Torque Transmitting Member Leveling Extension 110-M2, a Left Protrusion 105-S1 and a Right Protrusion 105-S2 are shaped (see FIGS. 299, 294, and 295). Left Protrusion 105-S1 is used to maintain the alignment of a Left Front End Resting Support 108A (see FIGS. 267 to 269, and FIGS. 305 to 306). And Right Protrusion 105-S2 is used to maintain the alignment of a Right Front End Resting Support 108B (see FIGS. 267 to 269, and FIGS. 305 to 306).

In order to attach the rear-end of Non-Torque Transmitting Member Leveling Extension 110-M2 to Cone 112, the rear-end of Bottom Leveling Extension Half 105 of Non-Torque Transmitting Member Leveling Extension 110-M2 is fixed to a Rear Leveling Extension Plate 107 (see FIGS. 294 and 295). A Rear Leveling Extension Plate 107 is shown by itself in FIG. 262; it has a Locking Ring Pin 107-S2, which here is used to secure the rear-end of Non-Torque Transmitting Member Leveling Extension 110-M2 to Cone 112 by first inserting it into a Non-Torque Transmitting Member Leveling Extension Slot 112-B6 of Cone 112 and then securing it to Cone 112 using a Clamping Washer 95 and a Locking Ring.

As it is the case for Torque Transmitting Member Leveling Extension 97-M2; for Non-Torque Transmitting Member Leveling Extension 110-M2, Top Leveling Extension Half 104 is also not attached to its Rear Leveling Extension Plate 107, so that the stretching of Top Leveling Extension Half 104 and the compression of Bottom Leveling Extension Half 105 are not constrained relative to each other; so as to increase the bending flexibility of Non-Torque Transmitting Member Leveling Extension 110-M2.

Additionally, as it is the case for Torque Transmitting Member Leveling Extension 97-M2; for Non-Torque Transmitting Member Leveling Extension 110-M2, Top Leveling Extension Half 104 is also shorter than its Bottom Leveling Extension Half 105. This is so, in order to avoid interference between the rear-end of Top Leveling Extension Half 104 of Non-Torque Transmitting Member Leveling Extension 110-M2 and Trailing End Front Wall 112-A3.

Non-Torque Transmitting Member Leveling Extension 110-M2 rests on Leveling Extension Raising Surface 112-B5, which is a raised surface of Cone 112. The rear-edge of Leveling Extension Raising Surface 112-A5, which is the edge on which the front-end of Non-Torque Transmitting Member Leveling Extension 110-M2 rests, is slanted at an angle; so that at the rear-edge of Leveling Extension Raising Surface 112-A5 will not support the entire width of Non-Torque Transmitting Member Leveling Extension 110-M2. In order to provide additional support for Non-Torque Transmitting Member Leveling Extension 110-M2 at its front-end, a Left Front End Resting Support 108A-S1 and a Right Front End Resting Support 108B-S1 are used (see FIGS. 305 and 306). Left Front End Resting Support 108A-S1 and Right Front End Resting Support 108B-S1 have been described in detail in the previous section.

Left Front End Resting Support 108A and Right Front End Resting Support 108B are shown by themselves in FIGS. 267 to 269. Left Front End Resting Support 108A and Right Front End Resting Support 108B have a bottom-surface and a top-surface that are inclined (see FIG. 267). A portion of the front-end of Torque Transmitting Member Leveling Extension 97-M2 rests on said top-surface (see FIGS. 270 and 271). The incline of said bottom-surface and said top-surface is the same as the incline of Cone 112, and the "height difference between said bottom-surface and said top-surface" is the same as the "height difference between an unraised surface of Cone 112 and a raised surface of Cone 112 (such as Leveling Extension Raising Surface 112-B5)".

When viewed from the top, Left Front End Resting Support 108A and Right Front End Resting Support 108B form a triangular shape due to Cuts 108A-S2 and 108B-S2 (see FIGS. 269 and 271). The angle of Cuts 108A-S2 and 108B-S2 correspond to the angle of the rear-edge of Leveling Extension Raising Surface 112-B5. Ideally, the angle of Cuts 108A-S2 and 108B-S2 is selected such that it can support Torque Transmitting Member Leveling Extension 97-M2 as much as possible on the surface of Cone 112 that is not covered by the rear-edge of Leveling Extension Raising Surface 112-B5 without interfering with the rear-edge of Leveling Extension Raising Surface 112-B5, for all pitch-diameters of Cone 112. The ideal angle for the angle of Cuts 108A-S2 and 108B-S2 can be determined through experimentation.

Also, instead of a straight-angled cut, Cuts 108A-S2 and 108B-S2 can also have a curved-angled cut instead. This should provide better support for Torque Transmitting Member Leveling Extension 97-M2, since "the rear-edge of the raised surface on which Torque Transmitting Member Leveling Extension 97-M2 rests" has a curved-angled profile.

Instead of supporting the front-edge of Torque Transmitting Member Leveling Extension 97-M2 through one resting surface, two separate resting surfaces (which are Left Front End Resting Support 108A and Right Front End Resting Support 108B) are used. This is done because Left Front End Resting Support 108A and Right Front End Resting Support 108B will each have a smaller overall height than the height of "one resting surface that has the shape of Left Front End Resting Support 108A and Right Front End Resting Support 108B combined"; since the overall height of the resting surfaces depend on their width, due to their inclined bottom and top surfaces. And because of this, the bending stiffness of Left Front End Resting Support 108A and Right Front End Resting Support 108B will lower compared to the bending stiffness of said one resting surface, so that a stiffer elastomer can be used. If desired, one resting surface instead of two separate resting surfaces can be used.

And in order to maintain the lateral alignment of Left Front End Resting Support 108A and Right Front End Resting Support 108B relative to the front-edge of Torque Transmitting Member Leveling Extension 97-M2, Left Front End Resting Support 108A has an Indentation 108A-S1 into which Left Protrusion 105-S1 of Torque Transmitting Member Leveling Extension 97-M2 (see FIGS. 255 and 256) is inserted; and Right Front End Resting Support 108B has an Indentation 108B-S1 into which Right Protrusion 105-S2 of Torque Transmitting Member Leveling Extension 97-M2 (see FIGS. 255 and 256) is inserted.

Cone 112

Described in this section is a Cone 112 on which a Torque Transmitting Member 97 and a Non-Torque Transmitting Member 110 can be attached to; so as to form a Cone Assembly 113, which is a "Cone with One Torque Transmitting Member". A Cone 112 is shown in FIG. 307, and Cone Assembly 113 is shown in FIG. 308. All features of Cone 112 have been described previously for other cones, and will be described again in this section.

The slots of Cone 112 have the same tracing/cutting shape and function as the slots of Cone 12, which is shown in FIGS. 52 and 53. Although the cross-sectional shapes of the slots can be different; for example, see FIG. 230 for the cross-sectional shape of Torque Transmitting Member Leading End Slot 112-A2.

For Torque Transmitting Member 97, Cone 112 has the following slots (cuts) (see FIG. 307): a) Torque Transmitting Member Leading End Slot 112-A2, into which Slider 91B-S5 of Leading End Reinforcement Plate 91C is inserted; b) Torque Transmitting Member Trailing End Slot 112-A4, into which "Pin 91E-S4 of a Trailing End Reinforcement Plate 91E" and "the Trailing End Slide (or preferably Rod 50-S1) for Attachment Sleeve 91D-S5 of Trailing Sleeve Reinforcement Plate 91D" are inserted; and c) Torque Transmitting Member Leveling Extension Slot 112-A6, into which Locking Ring Pin 107-S2 of Torque Transmitting Member Leveling Extension 97-M2 is inserted. All slots of this paragraph should be shaped so that Torque Transmitting Member 97 can slide from the smallest pitch diameter of Cone Assembly 113 to the largest pitch diameter of Cone Assembly 113.

For Non-Torque Transmitting Member 110, Cone 112 has the following slots (cuts) (see FIG. 307): a) Non-Torque Transmitting Member Leading End Slot 112-B2, into which Slider 109B-S8 of Leading End Reinforcement Plate 109C is inserted; b) Non-Torque Transmitting Member Trailing End Slot 112-B4, into which "Pin 109E-S5 of a Trailing End Reinforcement Plate 109E" and "the Trailing End Slide (or preferably Rod 50-S1) for Attachment Sleeve 109D-S5 of Trailing Sleeve Reinforcement Plate 109D" are inserted; and c) Non-Torque Transmitting Member Leveling Extension Slot 112-B6, into which Locking Ring Pin 107-S2 of Non-Torque Transmitting Member Leveling Extension 110-M2 is inserted. All slots of this paragraph should be shaped so that Non-Torque Transmitting Member 110 can slide from the smallest pitch diameter of Cone Assembly 113 to the largest pitch diameter of Cone Assembly 113.

The slots shown in FIG. 307 are not to scale and are not accurately drawn, but they represent the actual relative positions (between slots) where they should be located. Somebody skilled in the art should be able to determine the accurate shape of the slots through tracing, mathematics, etc. And Cone Assembly 113 is also not accurately drawn, but it shows the correct positioning and orientation of Torque Transmitting Member 97 and Non-Torque Transmitting Member 110 on Cone 113. Somebody skilled in the art should be able to assemble a Cone 113 based on the drawings and description of this specification.

Additionally, Cone 112 also has two oppositely positioned Leveling Extension Raising Surfaces which have the same shape and functions as the two oppositely positioned Leveling Extension Raising Surfaces 30-S2 of Cone 30. For Cone 112, the two oppositely positioned Leveling Extension Raising Surfaces are labeled a Leveling Extension Raising Surface 112-A5 and Leveling Extension Raising Surface 112-B5 (see FIG. 307).

Leveling Extension Raising Surface 112-A5 and Leveling Extension Raising Surface 112-B5 are raised surfaces of a fixed height/diameter that are shaped on top of the base surface of Cone 112. All surfaces of Cone 112, except for Leveling Extension Raising Surface 112-A5, Leveling Extension Raising Surface 112-B5, Leveling Extension Ramp Clearance 112-A1, Leveling Extension Ramp Clearance 112-B1, have the same height/diameter.

Ideally, Leveling Extension Raising Surface 112-A5 is shaped so that it can support the maximum length of Torque Transmitting Member Leveling Extension 97-M2, while not interfering with Torque Transmitting Member 97 for all pitch diameters of its Cone Assembly (see FIG. 308). The ideal shape of Leveling Extension Raising Surface 112-A5 can be determined through trial-and-error and/or geometry.

And likewise Ideally, Leveling Extension Raising Surface 112-B5 is shaped so that it can support the maximum length of Non-Torque Transmitting Member Leveling Extension 110-M2, while not interfering with Non-Torque Transmitting Member 110 for all pitch diameters of its Cone Assembly (see FIG. 308). The ideal shape of Leveling Extension Raising Surface 112-B5 can be determined through trial-and-error and/or geometry.

The height/diameter of Leveling Extension Raising Surface 112-A5 should be selected so that the "resting surfaces for the Transmission Belt Teeth" of Torque Transmitting Member Section 97-M1 matches or almost matches "the height of the top-surface of Torque Transmitting Member Leveling Extension 97-M2", which in its assembled state is resting on Leveling Extension Raising Surface 112-A5.

And the height/diameter of Leveling Extension Raising Surface 112-B5 should be selected so that the "resting surfaces for the Transmission Belt Teeth" of Non-Torque Transmitting Member Section 110-M1 matches or almost matches "the height of the top-surface of Non-Torque Transmitting Member Leveling Extension 110-M2", which in its assembled state is resting on Leveling Extension Raising Surface 112-B5.

Additionally, a Leveling Extension Ramp Clearance 112-A1 is located between "the location where Non-Torque Transmitting Member Leveling Extension 110-M2 enters-and-exits Torque Transmitting Member Section 97-M1" and "its adjacent edge of Leveling Extension Raising Surface 112-B5" (see FIGS. 307 and 308). Leveling Extension Ramp Clearance 112-A2 is for a Leveling Extension Ramp 122B described below; as such the width and shape of Leveling Extension Ramp Clearance 112-A2 should be selected such that it can accommodate Leveling Extension Ramp 122B for all pitch diameters of Cone Assembly 113.

The width and shape of Leveling Extension Ramp Clearance 112-A1 depends on the edge of Leveling Extension Raising Surface 112-B5 that is adjacent to it. As such, the edge of Leveling Extension Raising Surface 112-B5 that is adjacent to Leveling Extension Ramp Clearance 112-A1 should be shaped so that it will not interfere with Leveling Extension Ramp 122B for all pitch diameters of Cone Assembly 113, while providing as much support as possible; or in other words, here Leveling Extension Ramp Clearance 112-A1 should be shaped so that it can fit Leveling Extension Ramp 122B as tight as possible for all pitch diameters of Cone Assembly 113. The edge of Leveling Extension Raising Surface 112-B5 that is adjacent to Leveling Extension Ramp Clearance 112-A1 do not have to be straight, but can be shaped so that they provide the optimal support, as can be obtained through experimentation.

Leveling Extension Ramp 122B has some thickness, but ideally the starting edge of the ramping surface of Leveling Extension Ramp 122B is level with the base surface of Cone 112. As such, in order to compensate for the overall thickness of Leveling Extension Ramp 122B, the height of Leveling Extension Ramp Clearance 112-A1 is the height of the base surface of Cone 112 that is reduced by the overall thickness of Leveling Extension Ramp 122B; such that an indentation (see FIGS. 307 and 308) is formed.

And a Leveling Extension Ramp Clearance 112-B1 is located between "the location where Torque Transmitting Member Leveling Extension 97-M2 enters-and-exits Non-Torque Transmitting Member Section 110-M1" and "its adjacent edge of Leveling Extension Raising Surface 112-A5" (see FIGS. 307 and 308). Leveling Extension Ramp Clearance 112-B1 is also for a Leveling Extension Ramp 122B; as such the width, shape, and height of Leveling Extension Ramp Clearance 112-B1 should be the same as the width, shape, and height of Leveling Extension Ramp Clearance 112-A1.

Additionally Cone 112 also has a Trailing End Front Wall 112-A3 and a Trailing End Front Wall 112-B3. Trailing End Front Wall 112-A3 and Trailing End Front Wall 112-B3 have the same shape and function as Trailing End Front Walls 86C-S3 of Cone 86C.

Trailing End Front Wall 112-A3 is shaped so that it can engage with Wall Engagement Insert 94 of Trailing End Reinforcement Plate 91E. And Trailing End Front Wall 112-B3 is shaped so that it can engage with Wall Engagement Insert 94 of Trailing End Reinforcement Plate 109E. Additional details for Trailing End Front Wall 112-A3 and Trailing End Front Wall 112-B3 are provided in the "Preferred Torque Transmitting Member" section and the "Preferred Non-Torque Transmitting Member" section.

Ramp Leveling Base 115

Ramp Leveling Base 115 of this section is not for Cone 112, but for a Cone Assembly 84A to which a slightly modified Torque Transmitting Member 97 and a slightly modified Non-Torque Transmitting Member 110 are attached. A Cone Assembly 84A to which a slightly modified Torque Transmitting Member 97 and a slightly modified Non-Torque Transmitting Member 110 are attached, is an alternate embodiment of the preferred Cone Assembly 113.

The modification to Torque Transmitting Member 97 and Non-Torque Transmitting Member 110 so that they can be used with Ramp Leveling Base 115 consist of: a) replacing their Leveling Extension, which is shaped by multiple elastomers (see FIGS. 260 and 299) with a Leveling Extension that is shaped by a single elastomer (see FIG. 311). And b) replacing their Leading End Reinforcement Plates with Leading End Reinforcement Plates for which the height/diameter of their Slider Top Surfaces are not reduced by the base thickness of a Leveling Extension Ramp 122B; since Ramp Leveling Base 115 does not have a base thickness. And c) having a Bump 85 fixed to each, the modified Torque Transmitting Member 97 and the modified Non-Torque Transmitting Member 110; Bumps 85 are used to control the rotational position of Raised Surfaces 80 of Cone Assembly 84A. Also, Ramp Leveling Base 115 does not have a base thickness means that Ramp Leveling Base 115 does not have a thickness on portions where no filling compensation between the top surface of Ramp 80-S1 and the bottom surface of its Leveling Extension is required; but it does have some thickness where filling compensation between the top surface of Ramp 80-S1 and the bottom surface of its Leveling Extension is required.

FIG. 309 shows the rear-view of a Leading End Reinforcement Plate 91D, which is the Leading End Reinforcement Plate for the modified Torque Transmitting Member 97 to be used with Ramp Leveling Base 115 (see paragraph above). And FIG. 310 shows a sectional-view of Leading End Reinforcement Plate 91D and Torque Transmitting Member Leading End Slot 84A-A2 into which it is inserted, as cut through a plane that is perpendicular to the axis of rotation of Cone Assembly 84A.

The Slider Top Surface of Leading End Reinforcement Plate 91D is labeled as Slider Top Surface 91D-S1 (see FIGS. 309 and 310). Like Slider Top Surface 91B-S6 of Leading End Reinforcement Plate 91B, Slider Top Surface 91D-S1 is conically shaped with the same incline as the incline of its cone.

The small-diameter-end of Slider Top Surface 91D-S1 preferably has a diameter that is as large as possible (so that it can provide an almost ideal resting surface even at the "largest diameter Leveling Extension resting surface" of Cone Assembly 84A), without exceeding the "smallest diameter Leveling Extension resting surface" of Cone Assembly 84A (so that it will not have surface that rises above the top-surface of Cone Assembly 84A when it is positioned at the "smallest diameter Leveling Extension resting surface" of Cone Assembly 84A.

FIG. 311 shows a rear-cross-sectional-view of a Leveling Extension 114, which is the shape of the Leveling Extension for the modified Torque Transmitting Member 97 to be used with Ramp Leveling Base 115. And FIG. 312 shows a side-view of a Leveling Extension 114 that is exiting Leading End Reinforcement Plate 91D so that it is partially resting on a Ramp 80-S1 of a Cone Assembly 84A.

A Belt Resting Filler 93 is fixed (bonded/glued/etc.) to the front end of Leading End Reinforcement Plate 91D. Belt Resting Filler 93 is attached and shaped such that its bottom surfaces are resting on top of the portion of a Leveling Extension 114 that is resting on Ramp 80-S1, while the top surfaces of Belt Resting Filler 93 provide resting surfaces for their Transmission Belt (see FIG. 312). Belt Resting Filler 93 is shown by itself in FIGS. 313 and 314.

FIG. 315 shows all items shown in FIG. 312, with the addition of a Ramp Leveling Base 115, which is shown by itself in FIGS. 316 and 317. Ramp Leveling Base 115 has a Leveling Surface 115-S1, which is shaped so that its top surface fully or almost fully engages with the "bottom surface of the portion of Leveling Extension 114 that is resting on it"; and so that its bottom surface fully or almost fully engages with the surface of Ramp 80-S1 it is resting on. The ideal shape of Leveling Surface 115-S1 can be obtained through simple experimentation. Leveling Surface 115-S1 does not have to be perfectly shaped, but a better fit reduces stress concentration on Leveling Surface 115-S1, Leveling Extension 114, and their Transmission Belt.

Leveling Surface 115-S1 is required because positioning a cross-section of Leveling Extension 114 at an angle relative to the surface of Cone 112 (not normal relative to the surface of Cone 112), as required for the cross-sections of the portion of Leveling Extension 114 that is positioned on Ramp 80-S1, changes the lateral incline of the bottom surface of that cross-section; while for continuity, the lateral incline of Ramp Surface 80-S1 should always match the lateral incline of Cone 112. In order to compensate (fill-in) for the difference in lateral incline between the bottom surface of the portion of Leveling Extension 114 that is positioned on Ramp 80-S1 and the top surface of Ramp Surface 80-S1, Leveling Surface 115-S1 is used. The ideal shape of Leveling Surface 115-S1 can be easily determined by experimentation and/or mathematics.

In order to adjust the shape Leveling Surface 115-S1 as its resting diameter is changed. Ramp Leveling Base 115 has a Neutral-Axis Cable 116. Neutral-Axis Cable 116 is positioned so that it coincides with the Neutral-Axis of the Leveling Extension 114 that is resting on top of Leveling Surface 115-S1, through-out the entire length of Ramp Leveling Base 115; this is achieved by having Neutral-Axis Cable 116 follow the Neutral-Axis of said Leveling Extension 114 as it is guided up from the bottom-end of Ramp Leveling Base 115 to the top-end of Ramp Leveling Base 115 (see FIGS. 315 to 317).

Neutral-Axis Cable 116 is joined to Leveling Surface 115-S1 through a Side Member 115-S2, which is fixed to one side of Leveling Surface 115-S1 and encloses Neutral-Axis Cable 116.

Ramp Leveling Base 115A

Described in this section is a Ramp Leveling Base 115A. Ramp Leveling Base 115A is to be used with: a) a Cone Assembly 84A; b) the modified Torque Transmitting Member 97 of the previous section that is modified so that its Leveling Extension 114 is replaced with a Torque Transmitting Member Leveling Extension 97-M2; and c) the Non-Torque Transmitting Member 110 of the previous section that is modified so that its Leveling Extension 114 is replaced with a Non-Torque Transmitting Member Leveling Extension 110-M2.

Ramp Leveling Base 115A comprises of a Right Ramp Leveling Base 115A-M1 and a Left Ramp Leveling Base 115A-M2 (see FIG. 319). Right Ramp Leveling Base 115A-M1 provides support for Bottom Leveling Extension Half 105 of Torque Transmitting Member Leveling Extension 97-M2 or Non-Torque Transmitting Member Leveling Extension 110-M2, and Left Ramp Leveling Base 115A-M2 provides support for Top Leveling Extension Half 104 of Torque Transmitting Member Leveling Extension 97-M2 or Non-Torque Transmitting Member Leveling Extension 110-M2.

FIG. 318 shows a partial side-view of a Torque Transmitting Member Leveling Extension 97-M2 that is exiting Leading End Reinforcement Plate 91D so that it is partially resting on Ramp 80A-S1 of Cone Assembly 84A through Ramp Leveling Base 115A. Ramp Leveling Base 115A comprises of a Right Ramp Leveling Base 115A-M1 and Left Ramp Leveling Base 115A-M2, which are used to guide Torque Transmitting Member Leveling Extension 97-M2 up Ramp 80A-S1.

FIG. 319 shows a rear-view of Right Ramp Leveling Base 115A-M1 and Left Ramp Leveling Base 115A-M2. In order to keep Right Ramp Leveling Base 115A-M1 and Left Ramp Leveling Base 115A-M2 from separating sideways; a Sheet 117, on which a Right Block 118 and a Left Block 119 are fixed, is used (see FIG. 320). Right Block 118 has some vertical cuts to help it bend easier (see FIG. 318); these vertical cuts are not critical and can be omitted if found unnecessary. And although not shown, Left Block 119 has similar vertical cuts.

Right Ramp Leveling Base 115A-M1 and Left Ramp Leveling Base 115A-M2 are resting on Sheet 117; and are prevented from separating through the engagement of Right Block 118 with the with the right-surface of Right Ramp Leveling Base 115A-M1 and the engagement of Left Block 119 with the with the left-surface of Left Ramp Leveling Base 115A-M2 (see FIG. 320).

The configuration for Right Ramp Leveling Base 115A-M1 and Left Ramp Leveling Base 115A-M2 shown in FIG. 319 should work. But if it is found more ideal based on experimentation, then the length of the base of Right Ramp Leveling Base 115A-M1 can be shortened. The reason for this is because the material of the base Right Ramp Leveling Base 115A-M1 that extends further up the incline of the cone it is resting on might not stretch as forced per the Neutral-Axis Cable of Right Ramp Leveling Base 115A-M1, since it provides some resistance to being stretched as forced by the material that is closer to the Neutral-Axis Cable of Right Ramp Leveling Base 115A-M1. Accordingly, FIG. 321 shows a rear-view of a Left Ramp Leveling Base 115A-M2 and a Right Ramp Leveling Base 115B-M1; where Right Ramp Leveling Base 115B-M1 is identical to Right Ramp Leveling Base 115A-M1 except for its base being shortened; also shown are Sheet 117, Right Block 118, and a Left Block 119.

Right Ramp Leveling Base 115A-M1 is shown by itself in FIGS. 322 and 323. It comprises of a Base 115A-M1-S1 that is fixed to Right Side Member 115A-M1-S2. Right Side Member 115A-M1-S2 has an Indentation 115A-M1-S3 and a Cable 120.

Cable 120 is positioned so that the Neutral-Axis of Right Ramp Leveling Base 115A-M1 coincides or almost coincides with the Neutral-Axis of the Bottom Leveling Extension Half 105 that is resting on top of Base 115A-M1-S1, through-out the entire length of Right Ramp Leveling Base 115A-M1; this is achieved by having Cable 120 follow the Neutral-Axis of said Bottom Leveling Extension Half 105 as it is guided up from the bottom-end of Right Ramp Leveling Base 115A-M1 to the top-end of Right Ramp Leveling Base 115A-M1.

Left Ramp Leveling Base 115A-M2 is shown by itself in FIGS. 324 to 326. It comprises of a Base 115A-M2-S1 that is fixed to Left Side Member 115A-M2-S2. Left Side Member 115A-M2-S2 has an Indentation 115A-M2-S3 and a Cable 121.

Cable 121 is positioned so that the Neutral-Axis of Left Ramp Leveling Base 115A-M2 coincides or almost coincides with the Neutral-Axis of the Top Leveling Extension Half 104 that is resting on top of Base 115A-M2-S1, through-out the entire length of Left Ramp Leveling Base 115A-M2; this is achieved by having Cable 121 follow the Neutral-Axis of said Top Leveling Extension Half 104 as it is guided up from the bottom-end of Left Ramp Leveling Base 115A-M2 to the top-end of Left Ramp Leveling Base 115A-M2.

The Belt Resting Filler that is to be used with Right Ramp Leveling Base 115A-M1 and Left Ramp Leveling Base 115A-M2 is shown in FIGS. 327 and 328 where it is labeled as Belt Resting Filler 93A. Belt Resting Filler 93A has the same purpose as Belt Resting Filler 93 and is fixed to its Leading End Reinforcement Plate in the same manner.

The only difference between Belt Resting Filler 93A and Belt Resting Filler 93 is that Belt Resting Filler 93A has a Protrusion 93A-S1 on each of its sides. In the assembled state of its Cone Assembly; one Protrusion 93A-S1 is positioned in Indentation 115A-M1-S3 of Right Ramp Leveling Base 115A-M1, while the other Protrusion 93A-S1 is positioned in Indentation 115A-M2-S3 of Left Ramp Leveling Base 115A-M2. The purpose of this is to prevent Belt Resting Filler 93A from separating from its Cone Assembly due to centrifugal forces. If necessary, there can be some vertical play between Protrusions 93A-S1 and their Indentations (which are Indentation 115A-M1-S3 and Indentation 115A-M2-S3).

Because of the thickness of: a) Base 115A-M1-S1 of Right Ramp Leveling Base 115A-M1, b) Base 115A-M2-S1 of Left Ramp Leveling Base 115A-M2, and c) Sheet 111; Leading End Reinforcement Plate 91D and Ramp 80-S1 have to be modified accordingly. For the items of this section; Leading End Reinforcement Plate 91D is replaced with Leading End Reinforcement Plate 91E, and Ramp 80-S1 is replaced with Ramp 80A-S1.

FIG. 329 shows a Ramp 80-S1, while FIG. 330 shows a Ramp 80A-S1. The height/diameter of Ramp 80A-S1 is: "the height/diameter of Ramp 80-S1" minus "the thickness of Base 115A-M1-S1 plus the thickness of Sheet 111". Note: "thickness of Base 115A-M1-S1" is the same as "thickness of Base 115A-M2-S1"; so that either the thickness of Base 115A-M1-S1 or the thickness of Base 115A-M2-S1 can be used to calculate the height/diameter of Ramp 80A-S1. For FIGS. 329 and 330, the ramps are shown on a conical surface of infinite diameter (straight surface), because of time limitations.

FIGS. 331 and 332 show a Leading End Reinforcement Plate 91E which has a Slider Top Surface 91E-S1. The only difference between Leading End Reinforcement Plate 91E and Leading End Reinforcement Plate 91D (see FIGS. 309 and 310) is that Slider Top Surface 91E-S1 is lower than Slider Top Surface 91D-S1 in order to account of the thickness of the bases of the Ramp Leveling Bases Halves and the sheet that is used to prevent them from separating.

Flexible Ramp 122

The ramping surface provided by Right Ramp Leveling Base 115A-M1 and Left Ramp Leveling Base 115A-M2 will not be perfect; since a solid ramp (such as Ramp 80-S1 or Ramp 80A-S1) cannot provide an ideal ramping surface for a Leveling Extension. An ideal ramp has to bend as dictated by the bending of its Leveling Extension, and a solid ramp cannot bend. The ideal bending of a ramp is dictated by the neutral-axis(s) of its Leveling Extension, which changes as the Leveling Extension is slid from one axial position on its cone to another axial position on its cone; and a solid ramp cannot have a changeable neutral-axis. In order to obtain a better fit, a Flexible Ramp 122 can be used.

For Cone Assembly 113, one Flexible Ramp 122 is used to raise Torque Transmitting Member Leveling Extension 97-M2 from a base surface of Cone 112 to the raised surface of Cone 112 that is labeled as Leveling Extension Raising Surface 112-A5, for all pitch diameters of Cone Assembly 113. And another Flexible Ramp 122 is used to raise Non-Torque Transmitting Member Leveling Extension 110-M2 from a base surface of Cone 112 to the raised surface of Cone 112 that is labeled as Leveling Extension Raising Surface 112-B5, for all pitch diameters of Cone Assembly 113.

When Torque Transmitting Member Leveling Extension 97-M2 and Non-Torque Transmitting Member Leveling Extension 110-M2 are positioned on the raised surfaces of Cone 112, they can support the teeth of Transmission Belt 90; even-though the teeth of Torque Transmitting Member 97 have tooth bases and Non-Torque Transmitting Member 110 has a base surface for the teeth of its Transmission Belt. Since the thickness of said tooth bases and said base surface are compensated by positioning Torque Transmitting Member Leveling Extension 97-M2 and Non-Torque Transmitting Member Leveling Extension 110-M2 on the raised surfaces of Cone 112.

Torque Transmitting Member Leveling Extension 97-M2 and Non-Torque Transmitting Member Leveling Extension 110-M2 can each be practically positioned on a raised surface of Cone 112 by a Flexible Ramp 122. Since a Flexible Ramp 122 provides an ideal or almost ideal ramping surface for a Torque Transmitting Member Leveling Extension 97-M2 or a Non-Torque Transmitting Member Leveling Extension 110-M2; so as to not significantly reduce the load capacity of the Torque Transmitting Member Leveling Extension 97-M2 or the Non-Torque Transmitting Member Leveling Extension 110-M2 it raises; and as such also to not significantly decrease the torque capacity of said Cone Assembly 113.

FIGS. 333 and 334 show a Flexible Ramp 122 and a Torque Transmitting Member Leveling Extension (which comprises of a Top Leveling Extension Half 104 and a Bottom Leveling Extension Half 105) that is resting on top of it.

Flexible Ramp 122 is shown by itself in FIG. 335. It mainly comprises of a Left Flexible Ramp 122-M1, a Right Flexible Ramp 122-M2, and a Joining Sheet 123 that has Side Blocks 126. Joining Sheet 123 and its Side Blocks 126 are used to prevent Left Flexible Ramp 122-M1 and Right Flexible Ramp 122-M2 from separating sideways.

Left Flexible Ramp 122-M1 is shown by itself as rear-view in FIG. 336, and as side-view in FIG. 337, its main shapes are a Ramp 122-M1-S1 and Side Wall 122-M1-S2.

Ramp 122-M1-S1 is used to ramp-up/raise a Top Leveling Extension Half 104 (see FIGS. 259 and 333), which is resting on top of Ramp 122-M1-S1, from the bottom-end of Ramp 122-M1-S1 to the top-end of Ramp 122-M1-S1. The top surface of Ramp 122-M1-S1 is shaped such that it has lateral inclines that match the lateral inclines of the bottom surface of a Top Leveling Extension Half 104, from the bottom-end of Ramp 122-M1-S1 to the top-end of Ramp 122-M1-S1; note: the lateral incline of the bottom surface of a Top Leveling Extension Half 104 that is resting on Ramp 122-M1-S1 is not constant along the length of Ramp 122-M1-S1, since the tilt of the cross-sections of said Top Leveling Extension Half 104 change as Top Leveling Extension Half 104 is bended as it is ramped-up Ramp 122-M1-S1. The lateral incline of a section of Ramp 122-M1-S1 depends on the difference in height between the left-end and the right-end of that section of Ramp 122-M1-S1.

Having the top surface of Ramp 122-M1-S1 shaped such that it lateral inclines match the lateral inclines of the bottom surface of a Top Leveling Extension Half 104, from the bottom-end of Ramp 122-M1-S1 to the top-end of Ramp 122-M1-S1; allows the top surface of Ramp 122-M1-S1 to fully or almost fully engage with the bottom surface of a Top Leveling Extension Half 104 from the bottom-end of Ramp 122-M1-S1 to the top-end of Ramp 122-M1-S1. The ideal shape of the top surface of Ramp 122-M1-S1 can be easily determined by experimentation and/or mathematics.

And the bottom surface of Ramp 122-M1-S1 is shaped such that it has a lateral incline that substantially matches the lateral incline of Cone 112. This allows the bottom surface of Ramp 122-M1-S1 to fully or almost fully engage with the surface of Cone 112 it is resting on.

In order to ensure that Ramp 122-M1-S1 provides a matching resting surface for a Top Leveling Extension Half 104 for all pitch diameters of Cone Assembly 113; Side Wall 122-M1-S2 is used to control the bending of Left Flexible Ramp 122-M1, so that it matches the bending of the Top Leveling Extension Half 104 that is resting on top of it.

Side Wall 122-M1-S2 is connected to Ramp 122-M1-S1 such that Left Flexible Ramp 122-M1 bends as one unit. This can be accomplished by shaping Left Flexible Ramp 122-M1 out of a single material.

The ideal shape of Side Wall 122-M1-S2 is such that the neutral-axis of Left Flexible Ramp 122-M1 coincides or almost coincides with the neutral-axis of Top Leveling Extension Half 104 that is resting on top of it through-out the entire length of Left Flexible Ramp 122-M1. This is achieved by having Side Wall 122-M1-S2 shaped such that the neutral-axis of Left Flexible Ramp 122-M1 follows the neutral-axis of said Top Leveling Extension Half 104 as it is ramped-up/raised from the bottom-end of Ramp 122-M1-S1 to the top-end of Ramp 122-M1-S1, in a manner such that the neutral-axis of Left Flexible Ramp 122-M1 always "coincides" or "almost coincides" with the neutral-axis of said Top Leveling Extension Half 104.

Although not absolutely necessary, in order to reduce the size of Side Wall 122-M1-S2, Side Wall 122-M1-S2 can have a Cable 124. Cable 124 is significantly less elastic than the elastomer portion of Side Wall 122-M1-S2, as such it takes far less material to control the neutral-axis of Left Flexible Ramp 122-M1 using Cable 124. At the neutral-axis of Left Flexible Ramp 122-M1, no compression or stretching occurs; since all compression and stretching of Left Flexible Ramp 122-M1 occurs above and below the neutral-axis of Left Flexible Ramp 122-M1.

In FIG. 333, Cable 124 is positioned so that it always coincides with the neutral-axis of Top Leveling Extension Half 104 as Top Leveling Extension Half 104 is ramped-up/raised by Ramp 122-M1-S1. This would be accurate if Cable 124 does not stretch at all as Left Flexible Ramp 122-M1 is bent. But since Left Flexible Ramp 122-M1 has some compression and stretching resistance, and here Left Flexible Ramp 122-M1 has more surfaces below Cable 124 than above Cable 124; bending Left Flexible Ramp 122-M1 might slightly stretch Cable 124. So the ideal position of Cable 124 might not identically coincide with the neutral-axis of Top Leveling Extension Half 104. The accurate position of Cable 124 and shape of Side Wall 122-M1-S2 can easily be obtained through engineering (neutral-axis calculations) and experimentation.

Right Flexible Ramp 122-M2 is shown by itself as rear-view in FIG. 338, as side-view in FIG. 340, as sectional-view in FIG. 339, and as a partial-side-view in FIG. 341. The main shapes of Right Flexible Ramp 122-M2 are a Ramp 122-M2-S1 and Side Wall 122-M2-S2.

Ramp 122-M2-S1 is used to ramp-up/raise a Bottom Leveling Extension Half 105 (see FIGS. 259 and 333), which is resting on top of Ramp 122-M2-S1, from the bottom-end of Ramp 122-M2-S1 to the top-end of Ramp 122-M2-S1. The top surface of Ramp 122-M2-S1 is shaped such that it has lateral inclines that match the lateral inclines of the bottom surface of a Bottom Leveling Extension Half 105, from the bottom-end of Ramp 122-M2-S1 to the top-end of Ramp 122-M2-S1; note: the lateral incline of the bottom surface of a Bottom Leveling Extension Half 105 that is resting on Ramp 122-M2-S1 is not constant along the length of Ramp 122-M2-S1, since the tilt of the cross-sections of said Bottom Leveling Extension Half 105 change as Bottom Leveling Extension Half 105 is bended as it is ramped-up Ramp 122-M2-S1. The lateral incline of a section of Ramp 122-M2-S1 depends on the difference in height between the left-end and the right-end of that section of Ramp 122-M2-S1.

Having the top surface of Ramp 122-M2-S1 shaped such that it lateral inclines match the lateral inclines of the bottom surface of a Bottom Leveling Extension Half 105, from the bottom-end of Ramp 122-M2-S1 to the top-end of Ramp 122-M2-S1; allows the top surface of Ramp 122-M2-S1 to fully or almost fully engage with the bottom surface of a Bottom Leveling Extension Half 105 from the bottom-end of Ramp 122-M2-S1 to the top-end of Ramp 122-M2-S1. The ideal shape of the top surface of Ramp 122-M2-S1 can be easily determined by experimentation and/or mathematics.

And the bottom surface of Ramp 122-M2-S1 is shaped such that it has a lateral incline that substantially matches the lateral incline of Cone 112. This allows the bottom surface of Ramp 122-M2-S1 to fully or almost fully engage with the surface of Cone 112 it is resting on.

In order to ensure that Ramp 122-M2-S1 provides a matching resting surface for a Bottom Leveling Extension Half 105 for all pitch diameters of Cone Assembly 113; Side Wall 122-M2-S2 is used to control the bending of Right Flexible Ramp 122-M2, so that it matches the bending of the Bottom Leveling Extension Half 105 that is resting on top of it; this will ensure that the compression and stretching of the top surface of Ramp 122-M2-S1 matches the compression and stretching of the bottom surface of said Bottom Leveling Extension Half 105.

Side Wall 122-M2-S2 is connected to Ramp 122-M2-S1 such that Right Flexible Ramp 122-M2 bends as one unit. This can be accomplished by shaping Right Flexible Ramp 122-M2 out of a single material.

The ideal shape of Side Wall 122-M2-S2 is such that the neutral-axis of Right Flexible Ramp 122-M2 coincides or almost coincides with the neutral-axis of Bottom Leveling Extension Half 105 that is resting on top of it through-out the entire length of Right Flexible Ramp 122-M2. This is achieved by having Side Wall 122-M2-S2 shaped such that the neutral-axis of Right Flexible Ramp 122-M2 follows the neutral-axis of said Bottom Leveling Extension Half 105 as it is ramped-up/raised from the bottom-end of Ramp 122-M2-S1 to the top-end of Ramp 122-M2-S1, in a manner such that the neutral-axis of Right Flexible Ramp 122-M2 always "coincides" or "almost coincides" with the neutral-axis of said Bottom Leveling Extension Half 105.

Although not absolutely necessary, in order to reduce the size of Side Wall 122-M2-S2, Side Wall 122-M2-S2 can have a Cable 125. Cable 125 is significantly less elastic than the elastomer portion of Side Wall 122-M2-S2, as such it takes far less material to control the neutral-axis of Right Flexible Ramp 122-M2 using Cable 125. At the neutral-axis of Right Flexible Ramp 122-M2, no compression or stretching occurs; since all compression and stretching of Right Flexible Ramp 122-M2 occurs above and below the neutral-axis of Right Flexible Ramp 122-M2.

In FIG. 333, Cable 125 is positioned so that it always coincides with the neutral-axis of Bottom Leveling Extension Half 105 as Bottom Leveling Extension Half 105 is ramped-up/raised by Ramp 122-M2-S1. This would be accurate if Cable 125 does not stretch at all as Right Flexible Ramp 122-M2 is bent. But since Right Flexible Ramp 122-M2 has some compression and stretching resistance, and here Right Flexible Ramp 122-M2 has more surfaces below Cable 125 than above Cable 125; bending Right Flexible Ramp 122-M22 might slightly stretch Cable 125. So the ideal position of Cable 125 might not identically coincide with the neutral-axis of Bottom Leveling Extension Half 105. The accurate position of Cable 125 and the accurate shape of Side Wall 122-M2-S2 can easily be obtained through engineering (neutral-axis calculations) and experimentation.

Joining Sheet 123 is shown in FIGS. 342 and 343. In order to prevent Left Flexible Ramp 122-M1 and Right Flexible Ramp 122-M2 from separating sideways, Side Blocks 126 are fixed to Joining Sheet 123. Here the engagement of the inner side surfaces of Side Blocks 126 with the outer surfaces of Left Flexible Ramp 122-M1 and Right Flexible Ramp 122-M2, will prevent Left Flexible Ramp 122-M1 and a Right Flexible Ramp 122-M2 from separating sideways.

Although not shown that way, Flexible Ramp 122 is preferably pre-bend to its largest pitch diameter; so that it only has to bend from its largest pitch diameter to its smallest pitch diameter. This will minimize distortion of the shape of its ramps (which are Ramp 122-M1-S1 and Ramp 122-M2-S1) due to bending, and allows Left Flexible Ramp 122-M1 and Right Flexible Ramp 122-M2 to be stiffer.

Hooks for the Protrusions of a Belt Resting Filler

In order to use Belt Resting Filler 93A with Flexible Ramp 122, a Left Hook 127 and a Right Hook 128 can be used. The engagement of Protrusions 93A-S1 of Belt Resting Filler 93A (see FIGS. 327 and 328) with Left Hook 127 and Right Hook 128 is used to prevent Belt Resting Filler 93A from separating from its Cone Assembly 113 due to centrifugal forces. Because of this purpose, it is preferred that Left Hook 127 and Right Hook 128 are used with Flexible Ramp 122.

FIG. 344 shows a rear-view of a Flexible Ramp 122 to which a Left Hook 127 and a Right Hook 128 are attached. And FIG. 345 shows a partial-left-side-view of that Flexible Ramp 122; and FIG. 346 shows a partial-right-side-view of that Flexible Ramp 122. Left Hook 127 and Right Hook 128 are preferable made out of a rigid material such as steel or hard plastic.

When used with Belt Resting Filler 93A, it is recommended that a Left Hook 127 and a Right Hook 128 are used "at" or "near" the unsupported end of Belt Resting Filler 93A, which is the end of Belt Resting Filler 93A that is not fixed to a Reinforcement Plate 91C or a Reinforcement Plate 109C. More Left Hooks 127 and Right Hooks 128 can be used as beneficial.

Left Hook 127 is shown by itself in FIG. 347. It comprises of a Hook 127-S1 and a Vertical Member 127-S2. Hook 127-S1 is shaped on Vertical Member 127-S2 at a height so that it engages with a Protrusion 93A-S1 of a Belt Resting Filler 93A, when it is fixed to a Flexible Ramp 122 and when its Belt Resting Filler 93A and its Flexible Ramp 122 are assembled on Cone Assembly 113.

And Right Hook 128 is shown by itself in FIG. 348. It comprises of a Hook 128-S1 and Vertical Member 128-S2. Hook 128-S1 is shaped on Vertical Member 128-S2 at a height so that it also engages with a Protrusion 93A-S1 of a Belt Resting Filler 93A, when it is fixed to a Flexible Ramp 122 and when its Belt Resting Filler 93A and its Flexible Ramp 122 are assembled on Cone Assembly 113.

The engagement between a Hook 127-S1 with its Protrusion 93A-S1 will cause a moment in Vertical Member 127-S2. This moment can cause Vertical Member 127-S2 to tilt away from the surface of Flexible Ramp 122, which will then reduce the ability of Hook 127-S1 to properly engage with its Protrusion 93A-S1. The same applies for Hook 128-S1 and its Vertical Member 128-S2.

In order to prevent the issue of the previous paragraph, Hook 127-S1 can be replaced with a Hook 127A-S1, so as to form a Left Hook 127A. And Hook 128-S1 can be replaced with a Hook 128A-S1, so as to form a Right Hook 128A. FIG. 349 shows a rear-view of a Flexible Ramp 122 to which a Left Hook 127A and a Right Hook 128A are attached.

When Left Hook 127A and Right Hook 128A are used, Belt Resting Filler 93A should be replaced with a Belt Resting Filler 93B. Belt Resting Filler 93B is identical to Belt Resting Filler 93A, except that its protrusions, which are labeled as Protrusions 93B-S1, have Indentations 93B-S2. Belt Resting Filler 93B is shown in FIGS. 350 to 353.

Left Hook 127A is shown by itself in FIGS. 354 and 355. It comprises of a Hook 127A-S1 and a Vertical Member 127A-S2. Hook 127A-S1 is shaped on Vertical Member 127A-S2 at a height so that it engages with a Protrusion 93B-S1 of a Belt Resting Filler 93B, when it is fixed to a Flexible Ramp 122 and when its Belt Resting Filler 93A and its Flexible Ramp 122 are assembled on Cone Assembly 113.

Additionally, Hook 127A-S1 has a Hook Protrusion 127A-S3, which is shaped such that it is positioned inside an Indentation 93B-S2 of a Protrusions 93B-S1 of a Belt Resting Filler 93B, when Hook 127A-S1 and Belt Resting Filler 93B are assembled on Cone Assembly 113. The engagement between Hook Protrusion 127A-S2 and Indentation 93B-S2 will prevent or minimize any lateral or rotational movements between Hook 127A-S1 and its Protrusions 93B-S1, so that Hook 127A-S1 is always properly engaged with its Protrusions 93B-S1.

Right Hook 128A is shown by itself in FIGS. 356 and 357. It comprises of a Hook 128A-S1 and a Vertical Member 128A-S2. Hook 128A-S1 is shaped on Vertical Member 128A-S2 at a height so that it engages with a Protrusion 93B-S1 of a Belt Resting Filler 93B, when it is fixed to a Flexible Ramp 122 and when its Belt Resting Filler 93A and its Flexible Ramp 122 are assembled on Cone Assembly 113.

Additionally, Hook 128A-S1 has a Hook Protrusion 128A-S3, which is shaped such that it is positioned inside an Indentation 93B-S2 of a Protrusions 93B-S1 of a Belt Resting Filler 93B, when Hook 128A-S1 and Belt Resting Filler 93B are assembled on Cone Assembly 113. The engagement between Hook Protrusion 128A-S2 and Indentation 93B-S2 will prevent or minimize any lateral or rotational movements between Hook 128A-S1 and its Protrusions 93B-S1, so that Hook 128A-S1 is always properly engaged with its Protrusions 93B-S1.

FIG. 358 shows a rear-view of a fully assembled Ramp 122 that uses a Left Hook 127A and a Right Hook 128A, which is used to raise Torque Transmitting Leveling Extension 97-M2. FIG. 358 also shows Belt Resting Filler 93B, which is attached to a Reinforcement Plate 93C of Torque Transmitting Member 97 (not shown); which is used to provide a level resting base for Transmission Belt 90 on top of the portion of Torque Transmitting Leveling Extension 97-M2 that is raised by Ramp 122. And FIG. 358 also shows the engagement between Left Hook 127A and a Right Hook 128A with Belt Resting Filler 93B.

Flexible Ramp 122A

In this section a Flexible Ramp 122A is described. Flexible Ramp 122A is for a Leveling Extension that is shaped by a single elastomer, such as Leveling Extension 114. It can be used for a Cone Assembly that uses a Cone 112, a Torque Transmitting Member 97 for which Torque Transmitting Leveling Extension 97-M2 is replaced with a Leveling Extension 114, and a Non-Torque Transmitting Member 110 for which Non-Torque Transmitting Leveling Extension 110-M2 is replaced with a Leveling Extension 114.

A Torque Transmitting Member 97 for which Torque Transmitting Leveling Extension 97-M2 is replaced with a Leveling Extension 114, is labeled as Torque Transmitting Member 97A. And Non-Torque Transmitting Member 110 for which Non-Torque Transmitting Leveling Extension 110-M2 is replaced with a Leveling Extension 114 is labeled as Non-Torque Transmitting Member 110A. Torque Transmitting Member 97A and Non-Torque Transmitting Member 110A are described in later in this specification.

For the Cone Assembly of the previous paragraph, one Flexible Ramp 122A is used to raise Leveling Extension 114 of Torque Transmitting Member 97A from a base surface of Cone 112 to the raised surface of Cone 112 that is labeled as Leveling Extension Raising Surface 112-A5, for all pitch diameters of said Cone Assembly.

And another Flexible Ramp 122A is used to raise Leveling Extension 114 of Non-Torque Transmitting Member 110A from a base surface of Cone 112 to the raised surface of Cone 112 that is labeled as Leveling Extension Raising Surface 112-B5 for all pitch diameters of said Cone Assembly.

When Leveling Extension 114 of Torque Transmitting Member 97A and Leveling Extension 114 of Non-Torque Transmitting Member 110A are positioned on the raised surfaces of Cone 112, they can support the teeth of Transmission Belt 90; even-though the teeth of Torque Transmitting Member 97 have tooth bases and Non-Torque Transmitting Member 110 has a base surface for the teeth of its Transmission Belt. Since the thickness of said tooth bases and said base surface are compensated by positioning Leveling Extension 114 of Torque Transmitting Member 97A and Leveling Extension 114 of Non-Torque Transmitting Member 110A on the raised surfaces of Cone 112.

And Leveling Extension 114 of Torque Transmitting Member 97A and Leveling Extension 114 of Non-Torque Transmitting Member 110A can each be practically positioned on a raised surface of Cone 112 by a Flexible Ramp 122A. Since Flexible Ramp 122A provides an ideal or almost ideal ramping surface for a Leveling Extension 114; so as to not significantly reduce the load capacity of the Leveling Extension 114 it raises; and as such also to not significantly decrease the torque capacity of its Cone Assembly.

FIGS. 359 and 360 show a Flexible Ramp 122A and a Leveling Extension 114 that is resting on top of it.

Flexible Ramp 122A is shown by itself as rear-view in FIG. 361, as side-view in FIG. 363, as sectional-view in FIG. 362, and as a partial-side-view in FIG. 364. The main shapes of Flexible Ramp 122A are a Ramp 122A-S1 and Side Wall 122A-S2.

Ramp 122A-S1 is used to ramp-up/raise a Leveling Extension 114, which is resting on top of Ramp 122A-S1, from the bottom-end of Ramp 122A-S1 to the top-end of Ramp 122A-S1. The top surface of Ramp 122A-S1 is shaped such that it has lateral inclines that match the lateral inclines of the bottom surface of a Leveling Extension 114, from the bottom-end of Ramp 122A-S1 to the top-end of Ramp 122A-S1; note: the lateral incline of the bottom surface of a Leveling Extension 114 that is resting on Ramp 122A-S1 is not constant along the length of Ramp 122A-S1, since the tilt of the cross-sections of said Leveling Extension 114 change as said Leveling Extension 114 is bended as it is ramped-up Ramp 122A-S1. The lateral incline of a section of Ramp 122A-S1 depends on the difference in height between the left-end and the right-end of that section of Ramp 122A-S1.

Having the top surface of Ramp 122A-S1 shaped such that it lateral inclines match the lateral inclines of the bottom surface of a Leveling Extension 114, from the bottom-end of Ramp 122A-S1 to the top-end of Ramp 122A-S1; allows the top surface of Ramp 122A-S1 to fully or almost fully engage with the bottom surface of a Leveling Extension 114 from the bottom-end of Ramp 122A-S1 to the top-end of Ramp 122A-S1. The ideal shape of the top surface of Ramp 122A-S1 can be easily determined by experimentation and/or mathematics.

And the bottom surface of Ramp 122A-S1 is shaped such that it has a lateral incline that substantially matches the lateral incline of Cone 112. This allows the bottom surface of Ramp 122A-S1 to fully or almost fully engage with the surface of Cone 112 it is resting on.

In order to ensure that Ramp 122A-S1 provides a matching resting surface for Leveling Extension 114 for all pitch diameters of its Cone Assembly; Side Wall 122A-S2 is used to control the bending of Flexible Ramp 122A, so that it matches the bending of the Leveling Extension 114 that is resting on top of it; this will ensure that the compression and stretching of the top surface of Ramp 122A-S1 matches the compression and stretching of the bottom surface of said Leveling Extension 114.

Side Wall 122A-S2 is connected to Ramp 122A-S1 such that Flexible Ramp 122A bends as one unit. This can be accomplished by shaping Flexible Ramp 122A out of a single material.

The ideal shape of Side Wall 122A-S2 is such that the neutral-axis of Flexible Ramp 122A coincides or almost coincides with the neutral-axis of Leveling Extension 114 that is resting on top of it through-out the entire length of Flexible Ramp 122A. This is achieved by having Side Wall 122A-S2 shaped such that the neutral-axis of Flexible Ramp 122A follows the neutral-axis of said Leveling Extension 114 as it is ramped-up/raised from the bottom-end of Ramp 122A-S1 to the top-end of Ramp 122A-S1, in a manner such that the neutral-axis of Flexible Ramp 122A always "coincides" or "almost coincides" with the neutral-axis of said Leveling Extension 114.

Although not absolutely necessary, in order to reduce the size of Side Wall 122A-S2, Side Wall 122A-S2 can have a Cable 129. Cable 129 is significantly less elastic than the elastomer portion of Side Wall 122A-S2, as such it takes far less material to control the neutral-axis of Flexible Ramp 122A using Cable 129. At the neutral-axis of Flexible Ramp 122A, no compression or stretching occurs; since all compression and stretching of Flexible Ramp 122A occurs above and below the neutral-axis of Flexible Ramp 122A.

In FIG. 359, Cable 129 is positioned so that it always coincides with the neutral-axis of Leveling Extension 114 as Leveling Extension 114 is ramped-up/raised by Ramp 122A-S1. This would be accurate if Cable 129 does not stretch at all as Flexible Ramp 122A is bent. But since Flexible Ramp 122A has some compression and stretching resistance, and here Flexible Ramp 122A has more surfaces below Cable 129 than above Cable 129; bending Flexible Ramp 122A might slightly stretch Cable 129. So the ideal position of Cable 129 might not identically coincide with the neutral-axis of Leveling Extension 114. The accurate position of Cable 129 and the accurate shape of Side Wall 122A-S2 can easily be obtained through engineering (neutral-axis calculations) and experimentation.

Although not shown that way, Flexible Ramp 122A is preferably pre-bend to its largest pitch diameter; so that it only has to bend from its largest pitch diameter to its smallest pitch diameter. This will minimize distortion of the shape of Ramp 122A-S1 due to bending and allows Flexible Ramp 122A to be stiffer.

Belt Resting Filler 93C

As described in the "Ramp Tooth Resting Filler 68D (FIGS. 168 to 174)" section, a better resting base for a Transmission Belt can be obtained by splitting a Belt Resting Filler into two parts that can freely move lengthwise relative to each other.

Based on the idea above, Belt Resting Filler 93B is split lengthwise; so as to obtain a Belt Resting Filler 93C. There are no specific requirements for splitting Belt Resting Filler 93B, except that the splitted parts will not interfere with each other for all pitch diameters of their Cone Assembly. And it is probably preferably to split Belt Resting Filler 93B mid-length to minimize the overall length of each split.

A side-view of Belt Resting Filler 93C is shown in FIG. 365; and a rear-view of Belt Resting Filler 93C is shown in FIG. 366. Belt Resting Filler 93C is basically identical to Belt Resting Filler 93B, except that: a) it is split into Rear Belt Resting Filler 93C-M1, and Front Belt Resting Filler 93C-M2; and b) the front end of the Indentations 93B-S2 of Front Belt Resting Filler 93C-M2 each have Front Wall 93C-S1 (see FIGS. 365 and 366). Rear Belt Resting Filler 93C-M1 is shown by itself in FIG. 367; and Front Belt Resting Filler 93C-M2 is shown by itself in FIG. 368.

When Belt Resting Filler 93C is assembled on its Cone Assembly, a Left Hook 127A and a Right Hook 128A should be used to hold the front end of Front Belt Resting Filler 93C-M2 in place; in a manner such that the front-surface of Hook Protrusion 127A-S3 of Left Hook 127A is engaged with the back-surface of a Front Wall 93C-S1, and the front-surface of Hook Protrusion 128A-S3 of Right Hook 128A is also engaged with the back-surface of a Front Wall 93C-S1. Here Left Hook 127A and Right Hook 128A should be positioned such that the engagements between Hook Protrusion 127A-S3 and Hook Protrusion 128A-S3 with Front Walls 93C-S1 will keep Belt Resting Filler 93C-M in contact with the Leveling Extension it is resting on.

When Belt Resting Filler 93C is used, additional sets of hooks (consisting of a Left Hook 127A and its laterally oppositely positioned Right Hook 128A) should be used. A set of hooks should be used to support the rear-end of Front Belt Resting Filler 93C-M2, and another set of hooks should be used to support the front-end of Rear Belt Resting Filler 93C-M1. More Left Hooks 127 and Right Hooks 128 can be used as beneficial.

Although not shown that way, Belt Resting Filler 93C is preferably pre-bend to its largest pitch diameter; so that it only has to bend from its largest pitch diameter to its smallest pitch diameter. This will minimize distortion of the shape of Belt Resting Filler 93C due to bending and allows Belt Resting Filler 93C to be stiffer. It is recommended that all Belt Resting Fillers of this disclosure are pre-bend to their largest pitch diameter.

Flexible Ramp 122B

For Flexible Ramp 122, Left Flexible Ramp 122-M1 will not provide an ideal resting surface for Top Leveling Extension Half 104. Since Top Leveling Extension Half 104 is also partially resting on the top-surface of Bottom Leveling Extension Half 105; and the ramp outline provided by the top surface of Bottom Leveling Extension Half 105 and the ramp outline provided by Ramp 122-M1-S1 of Left Flexible Ramp 122-M1, will not provide a corresponding resting surface for Top Leveling Extension Half 104. This is because Bottom Leveling Extension Half 105 bends at its own neutral-axis, which is different from the neutral-axis of Top Leveling Extension Half 104 and the neutral-axis of Left Flexible Ramp 122-M1.

This issue is addressed by Flexible Ramp 122B. Flexible Ramp 122B is identical to Flexible Ramp 122, except that: a) Left Flexible Ramp 122B-M1, is replaced with a Left Flexible Wall 122B-M1; and b) Right Flexible Ramp 122-M2 is replaced with a Right Flexible Ramp 122B-M2.

Right Flexible Ramp 122B-M2 is identical to Right Flexible Ramp 122-M2; except that: a) Right Flexible Ramp 122B-M2 has a Ramp 122B-M1-S1 instead of a Ramp 122-M2-S1. Ramp 122B-M2-S1 is identical to Ramp 122-M2-S1, except that it is extended such that it also provides a ramping/resting surface for the bottom surface of a Top Leveling Extension Half 104 that is not resting on the top-surface of its Bottom Leveling Extension Half 105. And b) the shape of the Side Wall of Right Flexible Ramp 122B-M2 is different than the shape of the Side Wall of Right Flexible Ramp 122-M2; this is because the shape of Ramp 122B-M2-S1 is different than the shape of Ramp 122-M2-S1, so that different neutral-axis adjusting shape is needed for the Side Wall of Right Flexible Ramp 122B-M2.

Here the neutral-axis of Right Flexible Ramp 122B-M2 does not correspond to the neutral-axis of Top Leveling Extension Half 104; but since Top Leveling Extension Half 104 is resting on the top-surface of Bottom Leveling Extension Half 105, it cannot dip or raise as Right Flexible Ramp 122B-M2 is bent; and the incline of the surface of Top Leveling Extension Half 104 that is resting on Ramp 122B-M2-S1 should match the incline of Ramp 122B-M2-S1, since the curvature Top Leveling Extension Half 104 is shaped by the curvature of the top-surface of Bottom Leveling Extension Half 105, which is resting and such shaped by the curvature of Ramp 122B-M2-S1.

For Cone Assembly 113, one Flexible Ramp 122B is used to raise Torque Transmitting Member Leveling Extension 97-M2 from a base surface of Cone 112 to the raised surface of Cone 112 that is labeled as Leveling Extension Raising Surface 112-A5, for all pitch diameters of Cone Assembly 113. And another Flexible Ramp 122B is used to raise Non-Torque Transmitting Member Leveling Extension 110-M2 from a base surface of Cone 112 to the raised surface of Cone 112 that is labeled as Leveling Extension Raising Surface 112-B5, for all pitch diameters of Cone Assembly 113.

When Torque Transmitting Member Leveling Extension 97-M2 and Non-Torque Transmitting Member Leveling Extension 110-M2 are positioned on the raised surfaces of Cone 112, they can support the teeth of Transmission Belt 90; even-though the teeth of Torque Transmitting Member 97 have tooth bases and Non-Torque Transmitting Member 110 has a base surface for the teeth of its Transmission Belt. Since the thickness of said tooth bases and said base surface are compensated by positioning Torque Transmitting Member Leveling Extension 97-M2 and Non-Torque Transmitting Member Leveling Extension 110-M2 on the raised surfaces of Cone 112.

Torque Transmitting Member Leveling Extension 97-M2 and Non-Torque Transmitting Member Leveling Extension 110-M2 can each be practically positioned on a raised surface of Cone 112 by a Flexible Ramp 122B. Since a Flexible Ramp 122B provides an ideal or almost ideal ramping surface for a Torque Transmitting Member Leveling Extension 97-M2 or a Non-Torque Transmitting Member Leveling Extension 110-M2; so as to not significantly reduce the load capacity of the Torque Transmitting Member Leveling Extension 97-M2 or the Non-Torque Transmitting Member Leveling Extension 110-M2 it raises; and as such also to not significantly decrease the torque capacity of Cone Assembly 113.

FIGS. 369 and 370 show a Flexible Ramp 122B and a Leveling Extension (which comprises of a Top Leveling Extension Half 104 and a Bottom Leveling Extension Half 105 that is resting on top of it.

Flexible Ramp 122B is shown by itself in FIG. 371. It mainly comprises of a Left Flexible Wall 122B-M1, a Right Flexible Ramp 122B-M2, and a Joining Sheet 123 that has Side Blocks 126. Joining Sheet 123 and its Side Blocks 126 are used to prevent Left Flexible Wall 122B-M1 and Right Flexible Ramp 122B-M2 from separating sideways.

Left Flexible Wall 122B-M1 is shown by itself as rear-view in FIG. 372, and as side-view in FIG. 373. The main purpose of Left Flexible Wall 122B-M1 is to help laterally fix Flexible Ramp 122B to its Leveling Extension.

Right Flexible Ramp 122B-M2 is shown by itself as rear-view in FIG. 374, as side-view in FIG. 376, as sectional-view in FIG. 375, and as a partial-side-view in FIG. 377. The main shapes of Right Flexible Ramp 122B-M2 are a Ramp 122B-M2-S1 and Side Wall 122B-M2-S2.

Ramp 122B-M2-S1 is used to ramp-up/raise a Bottom Leveling Extension Half 105, which is resting on top of Ramp 122B-M2-S1, from the bottom-end of Ramp 122B-M2-S1 to the top-end of Ramp 122B-M2-S1. Additionally, Ramp 122B-M2-S1 is also used to provide a resting surface for the bottom surface of the "Top Leveling Extension Half 104 that is joined to said Bottom Leveling Extension Half 105" that is not resting on the top-surface of said Bottom Leveling Extension Half 105, from the bottom-end of Ramp 122B-M2-S1 to the top-end of Ramp 122B-M2-S1.

The top surface of Ramp 122B-M2-S1 is shaped such that it has lateral inclines that match the lateral inclines of the bottom surface of said Bottom Leveling Extension Half 105, from the bottom-end of Ramp 122B-M2-S1 to the top-end of Ramp 122B-M2-S1. And the top surface of said Ramp 122B-M2-S1 is long enough such that it provides a ramping/resting surface for said Bottom Leveling Extension Half 105 and the bottom surface of the "Top Leveling Extension Half 104 that is joined to said Bottom Leveling Extension Half 105" that is not resting on the top-surface of said Bottom Leveling Extension Half 105

The lateral incline of the bottom surface of a Bottom Leveling Extension Half 105 that is resting on Ramp 122B-M2-S1 is not constant along the length of Ramp 122B-M2-S1, since the tilt of the cross-sections of said Bottom Leveling Extension Half 105 change as Bottom Leveling Extension Half 105 is bended as it is ramped-up Ramp 122B-M2-S1. The lateral incline of a section of Ramp 122B-M2-S1 depends on the difference in height between the left-end and the right-end of that section of Ramp 122B-M2-S1.

Having the top surface of Ramp 122B-M2-S1 shaped such that it lateral inclines match the lateral inclines of the bottom surface of a Bottom Leveling Extension Half 105, from the bottom-end of Ramp 122B-M2-S1 to the top-end of Ramp 122B-M2-S1; allows the top surface of Ramp 122B-M2-S1 to fully or almost fully engage with the bottom surface of a Bottom Leveling Extension Half 105 from the bottom-end of Ramp 122B-M2-S1 to the top-end of Ramp 122B-M2-S1. The ideal shape of the top surface of Ramp 122B-M2-S1 can be easily determined by experimentation and/or mathematics.

And the bottom surface of Ramp 122B-M2-S1 is shaped such that it has a lateral incline that substantially matches the lateral incline of Cone 112. This allows the bottom surface of Ramp 122B-M2-S1 to fully or almost fully engage with the surface of Cone 112 it is resting on.

In order to ensure that Ramp 122B-M2-S1 provides a matching resting surface for a Bottom Leveling Extension Half 105 for all pitch diameters of Cone Assembly 113; Side Wall 122B-M2-S2 is used to control the bending of Right Flexible Ramp 122B-M2, so that it matches the bending of the Bottom Leveling Extension Half 105 that is resting on top of it; this will ensure that the compression and stretching of the top surface of Ramp 122B-M2-S1 matches the compression and stretching of the bottom surface of said Bottom Leveling Extension Half 105.

Side Wall 122B-M2-S2 is connected to Ramp 122B-M2-S1 such that Right Flexible Ramp 122B-M2 bends as one unit. This can be accomplished by shaping Right Flexible Ramp 122B-M2 out of a single material.

The ideal shape of Side Wall 122B-M2-S2 is such that the neutral-axis of Right Flexible Ramp 122B-M2 coincides or almost coincides with the neutral-axis of Bottom Leveling Extension Half 105 that is resting on top of it through-out the entire length of Right Flexible Ramp 122B-M2. This is achieved by having Side Wall 122B-M2-S2 shaped such that the neutral-axis of Right Flexible Ramp 122B-M2 follows the neutral-axis of said Bottom Leveling Extension Half 105 as it is ramped-up/raised from the bottom-end of Ramp 122B-M2-S1 to the top-end of Ramp 122B-M2-S1, in a manner such that the neutral-axis of Right Flexible Ramp 122B-M2 always "coincides" or "almost coincides" with the neutral-axis of said Bottom Leveling Extension Half 105.

Although not absolutely necessary, in order to reduce the size of Side Wall 122B-M2-S2, Side Wall 122B-M2-S2 can have a Cable 130. Cable 130 is significantly less elastic than the elastomer portion of Side Wall 122B-M2-S2, as such it takes far less material to control the neutral-axis of Right Flexible Ramp 122B-M2 using Cable 130. At the neutral-axis of Right Flexible Ramp 122B-M2, no compression or stretching occurs; since all compression and stretching of Right Flexible Ramp 122B-M2 occurs above and below the neutral-axis of Right Flexible Ramp 122B-M2.

In FIG. 369, Cable 130 is positioned so that it always coincides with the neutral-axis of Bottom Leveling Extension Half 105 as Bottom Leveling Extension Half 105 is ramped-up/raised by Ramp 122B-M2-S1. This would be accurate if Cable 130 does not stretch at all as Right Flexible Ramp 122B-M2 is bent. But since Right Flexible Ramp 122B-M2 has some compression and stretching resistance, and here Right Flexible Ramp 122B-M2 has more surfaces below Cable 130 than above Cable 130; bending Right Flexible Ramp 122B-M22 might slightly stretch Cable 130. So the ideal position of Cable 130 might not identically coincide with the neutral-axis of Bottom Leveling Extension Half 105. The accurate position of Cable 130 and shape of Side Wall 122B-M2-S2 can easily be obtained through engineering (neutral-axis calculations) and experimentation.

In order to prevent Left Flexible Wall 122B-M1 and Right Flexible Ramp 122B-M2 from separating sideways, a Joining Sheet 123 is used (see FIGS. 342 and 343). Joining Sheet 123 has Side Blocks 126 fixed to it. Here the engagement between the inner side surfaces of Side Blocks 126 with the outer surfaces of Left Flexible Wall 122B-M1 and Right Flexible Ramp 122B-M2, will prevent Left Flexible Wall 122B-M1 and a Right Flexible Ramp 122B-M2 from separating sideways.

Although not shown that way, Left Flexible Wall 122B-M1 and Right Flexible Ramp 122B-M2 are preferably pre-bend to their largest pitch diameter; so that they only have to bend from their largest pitch diameter to their smallest pitch diameter. This will minimize distortion of the shape of Left Flexible Wall 122B-M1 and Right Flexible Ramp 122B-M2 due to bending, and allows Left Flexible Wall 122B-M1 and Right Flexible Ramp 122B-M2 to be stiffer.

Right Flexible Ramp 122C-M2

Described in this section is a Right Flexible Ramp 122C-M2 from which a Right Flexible Ramp 122D-M2, described below, can be derived. Right Flexible Ramp 122D-M2 can be used to replace Right Flexible Ramp 122B-M2 of a Flexible Ramp 122B.

Right Flexible Ramp 122C-M2 is identical to Right Flexible Ramp 122B-M2; except that for Right Flexible Ramp 122C-M2: a) its ramp (which is Ramp 122C-M2-S1) is just a ramping sheet, and not an actual ramp. As such, unlike Ramp 122B-M2-S1 of Right Flexible Ramp 122B-M1, Ramp 122B-M2-S1 does not have a bottom surface that can rest on the inclined surface of Cone 112. And b) the shape of the Side Wall of Right Flexible Ramp 122C-M2 is different than the shape of the Side Wall of Right Flexible Ramp 122B-M2; this is because the shape of Ramp 122C-M2-S1 is different than the shape of Ramp 122B-M2-S1, so that different neutral-axis adjusting shape is needed for the Side Wall of Right Flexible Ramp 122C-M2.

Right Flexible Ramp 122C-M2 is shown by itself as rear-view in FIG. 378, as side-view in FIG. 380, as sectional-view in FIG. 378, and as a partial-side-view in FIG. 381. The main shapes of Right Flexible Ramp 122C-M2 are a Ramp 122C-M2-S1 and Side Wall 122C-M2-S2.

Ramp 122C-M2-S1 is used to ramp-up/raise a Bottom Leveling Extension Half 105 (see FIGS. 259 and 333), which is resting on top of Ramp 122C-M2-S1, from the bottom-end of Ramp 122C-M2-S1 to the top-end of Ramp 122C-M2-S1. The top surface of Ramp 122C-M2-S1 is shaped such that it has lateral inclines that match the lateral inclines of the bottom surface of a Bottom Leveling Extension Half 105, from the bottom-end of Ramp 122C-M2-S1 to the top-end of Ramp 122C-M2-S1; note: the lateral incline of the bottom surface of a Bottom Leveling Extension Half 105 that is resting on Ramp 122C-M2-S1 is not constant along the length of Ramp 122C-M2-S1, since the tilt of the cross-sections of said Bottom Leveling Extension Half 105 change as Bottom Leveling Extension Half 105 is bended as it is ramped-up Ramp 122C-M2-S1. The lateral incline of a section of Ramp 122C-M2-S1 depends on the difference in height between the left-end and the right-end of that section of Ramp 122C-M2-S1.

Having the top surface of Ramp 122C-M2-S1 shaped such that it lateral inclines match the lateral inclines of the bottom surface of a Bottom Leveling Extension Half 105, from the bottom-end of Ramp 122C-M2-S1 to the top-end of Ramp 122C-M2-S1; allows the top surface of Ramp 122C-M2-S1 to fully or almost fully engage with the bottom surface of a Bottom Leveling Extension Half 105 from the bottom-end of Ramp 122C-M2-S1 to the top-end of Ramp 122C-M2-S1. The ideal shape of the top surface of Ramp 122C-M2-S1 can be easily determined through experimentation and/or mathematics.

And the bottom surface of Ramp 122C-M2-S1 is shaped such that it has a lateral incline that substantially matches the lateral incline of Cone 112. This allows the bottom surface of Ramp 122C-M2-S1 to fully or almost fully engage with the surface of Cone 112 it is resting on.

In order to ensure that Ramp 122C-M2-S1 provides a matching resting surface for a Bottom Leveling Extension Half 105 for all pitch diameters of Cone Assembly 113; Side Wall 122C-M2-S2 is used to control the bending of Right Flexible Ramp 122C-M2, so that it matches the bending of the Bottom Leveling Extension Half 105 that is resting on top of it; this will ensure that the compression and stretching of the top surface of Ramp 122C-M2-S1 matches the compression and stretching of the bottom surface of said Bottom Leveling Extension Half 105.

Side Wall 122C-M2-S2 is connected to Ramp 122C-M2-S1 such that Right Flexible Ramp 122C-M2 bends as one unit. This can be accomplished by shaping Right Flexible Ramp 122C-M2 out of a single material.

The ideal shape of Side Wall 122C-M2-S2 is such that the neutral-axis of Right Flexible Ramp 122C-M2 coincides or almost coincides with the neutral-axis of Bottom Leveling Extension Half 105 that is resting on top of it through-out the entire length of Right Flexible Ramp 122C-M2. This is achieved by having Side Wall 122C-M2-S2 shaped such that the neutral-axis of Right Flexible Ramp 122C-M2 follows the neutral-axis of said Bottom Leveling Extension Half 105 as it is ramped-up/raised from the bottom-end of Ramp 122C-M2-S1 to the top-end of Ramp 122C-M2-S1, in a manner such that the neutral-axis of Right Flexible Ramp 122C-M2 always "coincides" or "almost coincides" with the neutral-axis of said Bottom Leveling Extension Half 105.

Although not absolutely necessary, in order to reduce the size of Side Wall 122C-M2-S2, Side Wall 122C-M2-S2 can have a Cable 131. Cable 131 is significantly less elastic than the elastomer portion of Side Wall 122C-M2-S2, as such it takes far less material to control the neutral-axis of Right Flexible Ramp 122C-M2 using Cable 131. At the neutral-axis of Right Flexible Ramp 122C-M2, no compression or stretching occurs; since all compression and stretching of Right Flexible Ramp 122C-M2 occurs above and below the neutral-axis of Right Flexible Ramp 122C-M2.

In FIG. 378, Cable 131 is positioned so that it always coincides with the neutral-axis of Bottom Leveling Extension Half 105 as Bottom Leveling Extension Half 105 is ramped-up/raised by Ramp 122C-M2-S1. This would be accurate if Cable 131 does not stretch at all as Right Flexible Ramp 122C-M2 is bent. But since Right Flexible Ramp 122C-M2 has some compression and stretching resistance, and here Right Flexible Ramp 122C-M2 has more surfaces below Cable 131 than above Cable 131; bending Right Flexible Ramp 122C-M22 might slightly stretch Cable 131. So the ideal position of Cable 131 might not identically coincide with the neutral-axis of Bottom Leveling Extension Half 105. The accurate position of Cable 131 and the accurate shape of Side Wall 122C-M2-S2 can easily be obtained through engineering (neutral-axis calculations) and experimentation.

Flexible Ramp 122D-M2

Right Flexible Ramp 122D-M2 is identical to Right Flexible Ramp 122C-M2; except that for Right Flexible Ramp 122D-M2; its ramp/ramping sheet is supported by supporting plates.

The supporting plates of Right Flexible Ramp 122D-M2 will not change the neutral-axis of Ramp 122C-M2-S1; as such Right Flexible Ramp 122D-M2 is identical to Right Flexible Ramp 122C-M2, except for having supporting plates.

Right Flexible Ramp 122D-M2 is shown as rear-view in FIG. 382, as a sectional-view in FIG. 383, and as a side-view in FIG. 384. It comprises of a Right Flexible Ramp 122C-M2 and the following supporting plates: Supporting Plate 132, Supporting Plate 133, Supporting Plate 134, Supporting Plate 135, Supporting Plate 136, Supporting Plate 137, Supporting Plate 138, and Supporting Plate 139.

The supporting plates are shaped such that they can support Ramp 122C-M2-S1 when Right Flexible Ramp 122C-M2 is resting on the surface of Cone 112, and they are fixed to Ramp 122C-M2-S1 by bonding the their top-ends to the bottom surface of Ramp 122C-M2-S1.

Right Flexible Ramp 122E-M2

Right Flexible Ramp 122E-M2, like Right Flexible Ramp 122D-M2, can also be used to replace Right Flexible Ramp 122B-M2 of a Flexible Ramp 122B.

Right Flexible Ramp 122E-M2 is identical to Right Flexible Ramp 122D-M2; except that for Right Flexible Ramp 122E-M2: a) the supporting plates have a top-ends that are rounded, and fillers are placed between the supporting plates. And b) the shape of the Side Wall of Right Flexible Ramp 122E-M2 is different from the shape of the Side Wall of Right Flexible Ramp 122D-M2; this is because the fillers will change the neutral-axis of the ramping sheet, which is supported by supporting plates.

Right Flexible Ramp 122E-M2 is shown by itself as rear-view for which the hidden lines for the supporting plates are not shown in FIG. 385, as side-view in FIG. 387, and as a sectional-view in FIG. 386. The main shapes of Right Flexible Ramp 122E-M2 are a Ramp 122E-M2-S1 and Side Wall 122E-M2-S2.

Ramp 122E-M2-S1 is used to ramp-up/raise a Bottom Leveling Extension Half 105 (see FIGS. 259 and 333), which is resting on top of Ramp 122E-M2-S1, from the bottom-end of Ramp 122E-M2-S1 to the top-end of Ramp 122E-M2-S1. The top surface of Ramp 122E-M2-S1 is shaped such that it has lateral inclines that match the lateral inclines of the bottom surface of a Bottom Leveling Extension Half 105, from the bottom-end of Ramp 122E-M2-S1 to the top-end of Ramp 122E-M2-S1; note: the lateral incline of the bottom surface of a Bottom Leveling Extension Half 105 that is resting on Ramp 122E-M2-S1 is not constant along the length of Ramp 122E-M2-S1, since the tilt of the cross-sections of said Bottom Leveling Extension Half 105 change as Bottom Leveling Extension Half 105 is bended as it is ramped-up Ramp 122E-M2-S1. The lateral incline of a section of Ramp 122E-M2-S1 depends on the difference in height between the left-end and the right-end of that section of Ramp 122E-M2-S1.

Having the top surface of Ramp 122E-M2-S1 shaped such that it lateral inclines match the lateral inclines of the bottom surface of a Bottom Leveling Extension Half 105, from the bottom-end of Ramp 122E-M2-S1 to the top-end of Ramp 122E-M2-S1; allows the top surface of Ramp 122E-M2-S1 to fully or almost fully engage with the bottom surface of a Bottom Leveling Extension Half 105 from the bottom-end of Ramp 122E-M2-S1 to the top-end of Ramp 122E-M2-S1. The ideal shape of the top surface of Ramp 122E-M2-S1 can be easily determined through experimentation and/or mathematics.

And the bottom surface of Ramp 122E-M2-S1 is shaped such that it has a lateral incline that substantially matches the lateral incline of Cone 112. This allows the bottom surface of Ramp 122E-M2-S1 to fully or almost fully engage with the surface of Cone 112 it is resting on.

In order to ensure that Ramp 122E-M2-S1 provides a matching resting surface for a Bottom Leveling Extension Half 105 for all pitch diameters of Cone Assembly 113; Side Wall 122E-M2-S2 is used to control the bending of Right Flexible Ramp 122E-M2, so that it matches the bending of the Bottom Leveling Extension Half 105 that is resting on top of it; this will ensure that the compression and stretching of the top surface of Ramp 122E-M2-S1 matches the compression and stretching of the bottom surface of said Bottom Leveling Extension Half 105.

Side Wall 122E-M2-S2 is connected to Ramp 122E-M2-S1 such that Right Flexible Ramp 122E-M2 bends as one unit. This can be accomplished by shaping Right Flexible Ramp 122E-M2 out of a single material.

The ideal shape of Side Wall 122E-M2-S2 is such that the neutral-axis of Right Flexible Ramp 122E-M2 coincides or almost coincides with the neutral-axis of Bottom Leveling Extension Half 105 that is resting on top of it through-out the entire length of Right Flexible Ramp 122E-M2. This is achieved by having Side Wall 122E-M2-S2 shaped such that the neutral-axis of Right Flexible Ramp 122E-M2 follows the neutral-axis of said Bottom Leveling Extension Half 105 as it is ramped-up/raised from the bottom-end of Ramp 122E-M2-S1 to the top-end of Ramp 122E-M2-S1, in a manner such that the neutral-axis of Right Flexible Ramp 122E-M2 always "coincides" or "almost coincides" with the neutral-axis of said Bottom Leveling Extension Half 105.

Although not absolutely necessary, in order to reduce the size of Side Wall 122E-M2-S2, Side Wall 122E-M2-S2 can have a Cable 140. Cable 140 is significantly less elastic than the elastomer portion of Side Wall 122E-M2-S2, as such it takes far less material to control the neutral-axis of Right Flexible Ramp 122E-M2 using Cable 140. At the neutral-axis of Right Flexible Ramp 122E-M2, no compression or stretching occurs; since all compression and stretching of Right Flexible Ramp 122E-M2 occurs above and below the neutral-axis of Right Flexible Ramp 122E-M2.

In FIG. 385, Cable 140 is positioned so that it always coincides with the neutral-axis of Bottom Leveling Extension Half 105 as Bottom Leveling Extension Half 105 is ramped-up/raised by Ramp 122E-M2-S1. This would be accurate if Cable 140 does not stretch at all as Right Flexible Ramp 122E-M2 is bent. But since Right Flexible Ramp 122E-M2 has some compression and stretching resistance, and here Right Flexible Ramp 122E-M2 has more surfaces below Cable 140 than above Cable 140; bending Right Flexible Ramp 122E-M22 might slightly stretch Cable 140. So the ideal position of Cable 140 might not identically coincide with the neutral-axis of Bottom Leveling Extension Half 105. The accurate position of Cable 140 and the accurate shape of Side Wall 122E-M2-S2 can easily be obtained through engineering (neutral-axis calculations) and experimentation.

And As described earlier, for Right Flexible Ramp 122E-M2, the top-ends of its supporting plates are rounded. Since the top-ends of its supporting plates are rounded, there are some supporting plates that are too short to support a rounded top-end; these supporting plates are removed. And it is preferred that the top-ends of the supporting plates are not bonded to the bottom surface of Ramp 122E-M2-S1. In FIG. 386, the supporting plates for Right Flexible Ramp 122E-M2 are labeled as: Supporting Plate 141, Supporting Plate 142, Supporting Plate 143, Supporting Plate 144, Supporting Plate 145, and Supporting Plate 146.

And also as described earlier, fillers are placed between the supporting plates of Right Flexible Ramp 122E-M2. These fillers are labeled as Filler 147, Filler 148, Filler 149, Filler 150, Filler 151, and Filler 152. These fillers should be bonded to "the bottom surface of Ramp 122E-M2-S1" and "the supporting plates". The main purpose of the fillers is to bond the supporting plates to Ramp 122E-M2-S1. In order to maintain the flexibility of Right Flexible Ramp 122E-M2, it is recommended that the fillers are made out of a softer elastomer than the rest of Right Flexible Ramp 122E-M2; and it is not necessary to fill each filler down to the bottom surface of its supporting plate(s), if proper bonding and stability for the supporting plates can be achieved with less filling material.

Elastic Rope Assembly for Holding in Place Belt Resting Fillers 93 and 93A/B/C Described in this section is an Elastic Rope Assembly 153 for holding in place Belt Resting Fillers 93, Belt Resting Fillers 93A, Belt Resting Fillers 93B, or Belt Resting Fillers 93C of a Cone Assembly; so as to prevent these Belt Resting Fillers from excessively deforming due to centrifugal forces.

When assembled on its Cone Assembly; one end of Elastic Rope Assembly 153 is attached to the leading-end of Torque Transmitting Member 97, and the other end of Elastic Rope Assembly 153 is attached to the rear-end of Torque Transmitting Member Section 97-M1; so that Elastic Rope Assembly 153 wraps around the portions of its Cone 112 that contain: the Belt Resting Filler attached to the leading-end of Torque Transmitting Member 97, Non-Torque Transmitting Member 110, the Belt Resting Filler attached to the leading-end of Non-Torque Transmitting Member 110, and Torque Transmitting Member Leveling Extension 97-M2.

Elastic Rope Assembly 153 is shown in FIGS. 388 and 389. It comprises of an Elastic Rope 153-S1 to which Hooks 153-S2 are fixed at each of its ends. The width/diameter of Elastic Rope 153-S1 should be larger than the width of each Hook 153-S2 (see FIG. 388); so that when Elastic Rope Assembly 153 is assembled on Cone 112, Hooks 153-S2 will not prevent Elastic Rope Assembly 153 from completely resting on the Belt Resting Filler attached to the leading-end of Torque Transmitting Member 97, Non-Torque Transmitting Member 110, the Belt Resting Filler attached to the leading-end of Non-Torque Transmitting Member 110, and Torque Transmitting Member Leveling Extension 97-M2.

Hooks 153-S2, which are fixed at each end of Elastic Rope Assembly 153, can each be attached to a plate/item using a Hook Attachment Plate 154. Hook Attachment Plate 154 is shown in FIGS. 390 to 392. It is shaped like a plate that has an Attachment Surface 154-S1 and a curved Hole 154-S2. Attachment Surface 154-S1 is the surface of Hook Attachment Plate 154 that is used to fix Hook Attachment Plate 154 to a surface of a plate/item. And Hole 154-S2 is a curved hole into which a Hook 153-S2 can be inserted.

In order to be able to use Elastic Rope Assembly 153 with Cone Assembly 113, a Hook Attachment Plate 154 should each be attached to Leading End Reinforcement Plate 91C of Torque Transmitting Member 97 and to Front Leveling Extension Plate 101 of Torque Transmitting Member 97; in a manner as described below. The Hook Attachment Plates 154 will each be used to insert one Hook 153-S2 of Elastic Rope Assembly 153.

Hook Attachment Plate 154 should be attached to Leading End Reinforcement Plate 91C so that it is positioned at the middle of the width of the front-surface of the tooth of Leading End Reinforcement Plate 91C; at a height so that the bottom surface of "the end of Elastic Rope Assembly 153 that is attached to Leading End Reinforcement Plate 91C through this Hook Attachment Plate 154", is resting on top the Belt Resting Filler that is attached to Leading End Reinforcement Plate 91C (see FIGS. 393 and 394).

Hook Attachment Plate 154 should be attached to "Front Leveling Extension Plate 101 of Torque Transmitting Member 97" so that it is positioned at the middle of the width of said Front Leveling Extension Plate 101; at a height so that the bottom surface of "the end of Elastic Rope Assembly 153 that is attached to said Front Leveling Extension Plate 101 through this Hook Attachment Plate 154", is resting on top of Torque Transmitting Member Leveling Extension 97-M2.

In order to position Hook Attachment Plate 154 at that height; here a Plate 155 is fixed to the top surface of said Front Leveling Extension Plate 101 at the mid-width of said Front Leveling Extension Plate 101. Plate 155 has a surface that allows Hook Attachment Plate 154 to be positioned as required by the previous paragraph; and Hook Attachment Plate 154 is fixed to the rear-surface of Plate 155 as required by the previous paragraph (see FIGS. 395 and 396).

When the Hook Attachment Plate 154 that is fixed to said Front Leveling Extension Plate 101 is used to hold one end of Elastic Rope Assembly 153 in place, a moment is applied on said Front Leveling Extension Plate 101 due to the tension of in Elastic Rope Assembly 153. The only effect of this moment is that it might cause Torque Transmitting Member Leveling Extension 97-M2 to slightly bend-up, so as to create a slight bump on Torque Transmitting Member Leveling Extension 97-M2. This slight bump on Torque Torque Transmitting Member Leveling Extension 97-M2 will be flattened-out by the tension of its Transmission Belt, so that no design changes due to this moment are required.

Through the Hook Attachment Plates 154 of the previous paragraphs, Elastic Rope Assembly 153 can be looped from the front-end of Torque Transmitting Member 97 to the rear-end of Torque Transmitting Member 97; so that it is resting on: the Belt Resting Filler attached to the leading-end of Torque Transmitting Member 97, Non-Torque Transmitting Member 110, the Belt Resting Filler attached to the leading-end of Non-Torque Transmitting Member 110, and Torque Transmitting Member Leveling Extension 97-M2.

In order to accommodate Elastic Rope Assembly 153, a Transmission Belt 90 is modified to a Transmission Belt 90A. Transmission Belt 90A is identical to Transmission Belt 90, except that its Teeth 90A-S1 have an Indentation 90A-S1 (see FIGS. 397 and 398). Indentation 90A-S1 is shaped such that Elastic Rope Assembly 153 can be positioned inside of it when Transmission Belt 90A is resting on a surface on which Elastic Rope Assembly 153 rests.

Indentation 90A-S1 will slightly weaken the compressive strength of Transmission Belt 90A. In order to reduce this issue, Indentation 90A-S1 can be dimensioned such that its engagement with Elastic Rope Assembly 153 will support Transmission Belt 90A. And the teeth of Torque Transmitting Member 97 can also be reshaped such that they have bumps for supporting Indentations 90A-S1.

Flexible Ramp 122E

Flexible Ramp 122E is identical to Right Flexible Ramp 122B; except that for Flexible Ramp 122E, Right Flexible Ramp 122B-M2 is replaced with Right Flexible Ramp 122E-M2. Right Flexible Ramp 122E is shown in FIG. 399. Flexible Ramp 122E can be used to replaced Flexible Ramp 122B on a Cone Assembly Flexible Ramp 122F Flexible Ramp 122F is identical to Right Flexible Ramp 122B; except that for Flexible Ramp 122F, Right Flexible Ramp 122B-M2 is replaced with Right Flexible Ramp 122-M2. Right Flexible Ramp 122F is shown in FIG. 400. Flexible Ramp 122F can be used to replaced Flexible Ramp 122B on a Cone Assembly Torque Transmitting Member 97A and Non-Torque Transmitting Member 110A As described previously a Torque Transmitting Member 97 for which Torque Transmitting Leveling Extension 97-M2 is replaced with a Leveling Extension 114, is labeled as Torque Transmitting Member 97A. And a Non-Torque Transmitting Member 110 for which Non-Torque Transmitting Leveling Extension 110-M2 is replaced with a Leveling Extension 114 is labeled as Non-Torque Transmitting Member 110A. Torque Transmitting Member 97A is shown in FIGS. 402 and 403; and Non-Torque Transmitting Member 110A is shown in FIGS. 404 and 405.

Like Torque Transmitting Leveling Extension 97-M2 and Non-Torque Transmitting Leveling Extension 110-M2, the Leveling Extensions 114 of Torque Transmitting Member 97A and Non-Torque Transmitting Member 110A also each have a Left Protrusion and a Right Protrusion that are used to maintain the alignment of a Left Front End Resting Support 108 and a Right Front End Resting Support 108B. The Left Protrusions, which were labeled as Left Protrusions 105-S1 for Torque Transmitting Leveling Extension 97-M2 and Non-Torque Transmitting Leveling Extension 110-M2, are for the Leveling Extensions 114 of Torque Transmitting Member 97A and Non-Torque Transmitting Member 110A labeled as Left Protrusions 114-S1 (see FIGS. 402 to 405). And the Right Protrusions, which were labeled as Right Protrusions 105-S2 for Torque Transmitting Leveling Extension 97-M2 and Non-Torque Transmitting Leveling Extension 110-M2, are for the Leveling Extensions 114 of Torque Transmitting Member 97A and Non-Torque Transmitting Member 110A labeled as Right Protrusions 114-S2 (see FIGS. 402 to 405).

And the Rear Leveling Extension Plates 107 of Torque Transmitting Leveling Extension 97-M2 and Non-Torque Transmitting Leveling Extension 110-M2, are for the Leveling Extensions 114 of Torque Transmitting Member 97A and Non-Torque Transmitting Member 110A replaced with a Rear Leveling Extension Plates 107A (see FIGS. 402 to 405).

A Rear Leveling Extension Plates 107A have the same purpose as Rear Leveling Extension Plates 107. But while Rear Leveling Extension Plates 107 are each shaped such that they match the cross-sectional shape of a Bottom Leveling Extension Half 105; Rear Leveling Extension Plates 107A are each shaped such that they match the cross-sectional shape of a Leveling Extension 114. A rear-view of a Rear Leveling Extension Plate 107A is shown in FIG. 401.

PREFERRED EMBODIMENT OF THE INVENTION (BEST MODE)

The preferred embodiment of this specification is a Flexible Ramp 122E. A Cone Assembly that use Flexible Ramps 122E, and CVT's that can be formed by said Cone Assembly were described in this specification.

Said Cone Assembly that use Flexible Ramps 122E is a Cone Assembly 113 for which: a) Belt Resting Filler 93 is replaced with Belt Resting Filler 93C, b) its Cone Assembly 113 uses Elastic Rope Assembly 153; c) Left Hooks 127A are attached to Left Flexible Wall 122B-M1 as described in the "Belt Resting Filler 93C" section; and d) Right Hooks 128A are attached to Right Flexible Ramp 122E-M2 as described in the "Belt Resting Filler 93C" section.

Flexible Ramp 122E is an alternate embodiment of Flexible Ramp 122B, Flexible Ramp 122A, and Flexible Ramp 122F. The defining/claimable features of the Flexible Ramps are: a) they have a Flexible Ramp that is able to raise a Leveling Extension (which includes Leveling Extension 114, and the Leveling Extension formed by Top Leveling Extension Half 104 and a Bottom Leveling Extension Half 105) from a base surface of a cone to a raised surface of a cone; and b) said Flexible Ramp has a "Side Wall or surface" that is shaped such that the neutral axis of said Flexible Ramp substantially matches the neutral axis of the "Leveling Extension or Leveling Extension Half" that is resting on top of it. All other features of the Flexible Ramps, such as Joining Sheet 123, can be easily modified or replaced.

CONCLUSION, RAMIFICATIONS, AND SCOPE

While my above description contains many specificities, these should not be construed as limitations on the scope, but rather as an exemplification of one or several embodiment(s) thereof. Many other variations are possible.

Accordingly, the scope should be determined not by the embodiment(s) illustrated, but by the appended claims and their legal equivalents.

I claim:

1. A Flexible Ramp (122-M2) for a Cone Assembly that uses a Torque Transmitting Member (97); said Cone Assembly is to be used with a Transmission Belt (90) that has its teeth shaped below its belt; and said Torque Transmitting Member (97) has teeth that can engage with said teeth of said Transmission Belt (90);

said Flexible Ramp (122-M2) can be used to raise a Leveling Extension of said Torque Transmitting Member (97) or a Non-Torque Transmitting Member (110) from a base surface of a Cone (112) of said Cone Assembly to a raised surface (112-A5, or 112-B5) of said Cone (112), for all pitch diameters of said Cone Assembly;

said Leveling Extension comprises of a Top Leveling Extension Half (104) that is joined to a Bottom Leveling Extension Half (105) by a Leveling Extension Joiner (106);

when said Leveling Extension is positioned on said raised surface (112-A5, or 112-B5), it can support said teeth of said Transmission Belt (90); even-though said teeth of said Torque Transmitting Member (97) have tooth bases, and said Non-Torque Transmitting Member (110) has a base surface for said teeth of said Transmission Belt (90); since the thickness of said tooth bases and said base surface can be compensated by the height of said raised surface (112-A5, or 112-B5) on which said Leveling Extension is positioned;

said Leveling Extension can be practically positioned on said raised surface (112-A5, or 112-B5) using said Flexible Ramp (122-M2); since said Flexible Ramp (122-M2) provides an ideal or almost ideal ramping surface for said Leveling Extension; so as to not significantly reduce the load capacity of said Leveling Extension as it is being raised, and as such also to not significantly decrease the torque capacity of said Cone Assembly;

allowing said teeth of said Torque Transmitting Member (97) to have tooth bases will greatly increase the strength of said teeth of said Torque Transmitting Member (97), since said tooth bases will link the separate tooth sides of said teeth of said Torque Transmitting Member (97) so that they will bend as a single unit; and allowing said Non-Torque Transmitting Member (110) to have said base surface will significantly reduce the stress on said Transmission Belt (90), so that more torque can be transmitted;

said Flexible Ramp (122-M2) comprises:

a) a Ramp (122-M2-S1)

said Ramp (122-M2-S1) is used to raise said Bottom Leveling Extension Half (105), from the bottom-end of said Ramp (122-M2-S1) to the top-end of said Ramp (122-M2-S1);

a top surface of said Ramp (122-M2-S1) is shaped such that it has lateral inclines that substantially match the lateral inclines of a bottom surface of said Bottom Leveling Extension Half (105), from the bottom-end of said Ramp (122-M2-S1) to the top-end of said Ramp (122-M2-S1);

a bottom surface of said Ramp (122-M2-S1) is shaped such that it has a lateral incline that substantially matches the lateral incline of said Cone (112);

b) a Side Wall (122-M2-S2)

said Side Wall (122-M2-S2) is used to control the bending of said Flexible Ramp (122-M2) so that it matches the bending of said Bottom Leveling Extension Half (105); this will ensure that the compression and stretching of said top surface of said Ramp (122-M2-S1) matches the compression and stretching of said bottom surface of said Bottom Leveling Extension Half (105);

said Side Wall (122-M2-S2) is connected to said Ramp (122-M2-S1) such that said Flexible Ramp (122-M2) bends as one unit, which can be accomplished by shaping said Flexible Ramp (122-M2) out of a single material;

said Side Wall (122-M2-S2) is shaped such that the neutral-axis of said Flexible Ramp (122-M2) coincides or almost coincides with the neutral-axis of said Bottom Leveling Extension Half (105) throughout the entire length of said Flexible Ramp (122-M2); this is achieved by having said Side Wall (122-M2-S2) shaped such that the neutral-axis of said Flexible Ramp (122-M2) follows the neutral-axis of said Bottom Leveling Extension Half (105) as it is raised from the bottom-end of said Ramp (122-M2-S1) to the top-end of said Ramp (122-M2-S1), in a manner such that the neutral-axis of said Flexible Ramp (122-M2) always coincides or almost coincides with the neutral-axis of said Bottom Leveling Extension Half (105).

2. The Flexible Ramp (122-M2) of claim 1, wherein said Side Wall (122-M2-S2) has a Cable (125) that is used to help control the neutral-axis of said Flexible Ramp (122-M2).

3. A Flexible Ramp (122B-M2) for a Cone Assembly that uses a Torque Transmitting Member (97); said Cone Assembly is to be used with a Transmission Belt (90) that has its teeth shaped below its belt; and said Torque Transmitting Member (97) has teeth that can engage with said teeth of said Transmission Belt (90);

said Flexible Ramp (122B-M2) can be used to raise a Leveling Extension of said Torque Transmitting Member (97) or a Non-Torque Transmitting Member (110) from a base surface of a Cone (112) of said Cone Assembly to a raised surface (112-A5, or 112-B5) of said Cone (112) for all pitch diameters of said Cone Assembly;

said Leveling Extension comprises of a Top Leveling Extension Half (104) that is joined to a Bottom Leveling Extension Half (105) by a Leveling Extension Joiner (106);

when said Leveling Extension is positioned on said raised surface (112-A5, or 112-B5), it can support said teeth of said Transmission Belt (90); even-though said teeth of said Torque Transmitting Member (97) have tooth bases, and said Non-Torque Transmitting Member (110) has a base surface for said teeth of said Transmission Belt (90); since the thickness of said tooth bases and said base surface can be compensated by the height of said raised surface (112-A5, or 112-B5) on which said Leveling Extension is positioned;

said Leveling Extension can be practically positioned on said raised surface (112-A5, or 112-B5) using said Flexible Ramp (122B-M2); since said Flexible Ramp (122B-M2) provides an ideal or almost ideal ramping surface for said Leveling Extension; so as to not significantly reduce the load capacity of said Leveling Extension as it is being raised, and as such also to not significantly decrease the torque capacity of said Cone Assembly;

allowing said teeth of said Torque Transmitting Member (97) to have tooth bases will greatly increase the strength of said teeth of said Torque Transmitting Member (97), since said tooth bases will link the separate tooth sides of said teeth of said Torque Transmitting Member (97) so that they will bend as a single unit; and allowing said Non-Torque Transmitting Member (110) to have said base surface will significantly reduce the stress on said Transmission Belt (90), so that more torque can be transmitted;

said Flexible Ramp (122B-M2) comprises:

a) a Ramp (122B-M2-S1)

said Ramp (122B-M2-S1) is used to raise said Bottom Leveling Extension Half (105), from the bottom-end of said Ramp (122B-M2-S1) to the top-end of said Ramp (122B-M2-S1); additionally, said Ramp (122B-M2-S1) is also used to provide a resting surface for a bottom surface of said Top Leveling Extension Half (104) that is not resting on a top-surface of said Bottom Leveling Extension Half (105), from the bottom-end of said (Ramp (122B-M2-S1) to the top-end of said Ramp (122B-M2-S1);

a top surface of said Ramp (122B-M2-S1) is shaped such that it has lateral inclines that substantially match the lateral inelines of a bottom surface of said Bottom Leveling Extension Half (105), from the bottom-end of said Ramp (122B-M2-S1) to the top-end of said Ramp (122B-M2-S1);

said top surface of said Ramp (122B-M2-S1) wide enough such that it provides a ramping surface for said Bottom Leveling Extension Half (105) and said bottom surface of said Top Leveling Extension Half (104) that is not resting on said top-surface of said Bottom Leveling Extension Half (105); and a bottom surface of said Ramp (122B-M2-S1) is shaped such that it has a lateral incline that substantially matches the lateral incline of said Cone (112);

b) a Side Wall (122B-M2-S2)

said Side Wall (122B-M2-S2) is used to control the bending of said Flexible Ramp (122B-M2) so that it matches the bending of said Bottom Leveling Extension Half (105); this will ensure that the compression and stretching of said top surface of said Ramp (122B-M2-S1) matches the compression and stretching of said bottom surface of said Bottom Leveling Extension Half (105);

said Side Wall (122B-M2-S2) is connected to said Ramp (122B-M2-S1) such that said Flexible Ramp (122B-M2) bends as one unit, which can be accomplished by shaping said Flexible Ramp (122B-M2) out of a single material;

said Side Wall (122B-M2-S2) is shaped such that the neutral-axis of said Flexible Ramp (122B-M2) coincides or almost coincides with the neutral-axis of said Bottom Leveling Extension Half (105) throughout the entire length of said Flexible Ramp (122B-

M2); this is achieved by having said Side Wall (122B-M2-S2) shaped such that the neutral-axis of said Flexible Ramp (122B-M2) follows the neutral-axis of said Bottom Leveling Extension Half (105) as it is raised from the bottom-end of said Ramp (122B-M2-S1) to the top-end of said Ramp (122B-M2-S1), in a manner such that the neutral-axis of said Flexible Ramp (122B-M2) always coincides or almost coincides with the neutral-axis of said Bottom Leveling Extension Half (105).

4. The Flexible Ramp (122B-M2) of claim 3, wherein said Side Wall has a Cable (130) that is used to help control the neutral-axis of said Flexible Ramp (122B-M2).

* * * * *